US012810794B2

(12) United States Patent
Kimura et al.

(10) Patent No.: US 12,810,794 B2
(45) Date of Patent: Nov. 24, 2026

(54) DISPLAY DEVICE INCLUDING PIXELS

(71) Applicant: SEMICONDUCTOR ENERGY LABORATORY CO., LTD., Atsugi (JP)

(72) Inventors: Hajime Kimura, Kanagawa (JP); Shunpei Yamazaki, Tokyo (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 0 days.

(21) Appl. No.: 18/227,458

(22) Filed: Jul. 28, 2023

(65) Prior Publication Data

US 2024/0054955 A1 Feb. 15, 2024

(30) Foreign Application Priority Data

Aug. 10, 2022 (JP) ................................ 2022-127671

(51) Int. Cl.

*G09G 3/3233* (2016.01)
*G09G 3/32* (2016.01)
*G09G 3/36* (2006.01)

(52) U.S. Cl.

CPC ............. *G09G 3/3233* (2013.01); *G09G 3/32* (2013.01); *G09G 3/3648* (2013.01); *G09G 2300/0426* (2013.01); *G09G 2354/00* (2013.01)

(58) Field of Classification Search

CPC ...... G09G 3/3233; G09G 3/32; G09G 3/3648; G09G 2300/0426; G09G 2300/0417;

(Continued)

(56) References Cited

U.S. PATENT DOCUMENTS 6,518,962 B2 2/2003 Kimura et al.
7,429,985 B2 9/2008 Kimura. et al.

(Continued)

FOREIGN PATENT DOCUMENTS

JP 2003-216110 A 7/2003
JP 2004-038210 A 2/2004

(Continued)

OTHER PUBLICATIONS

Yeom.H et al., "Oxide Vertical TFTs for the Application to the Ultra High Resolution Display", SID Digest '16 : SID International Symposium Digest of Technical Papers, May 22, 2016, pp. 820-822.

*Primary Examiner* — Stephen G Sherman

(74) *Attorney, Agent, or Firm* — NIXON PEABODY LLP; Jeffrey L. Costellia

(57) ABSTRACT

A display device driven at high speed is provided. The display device includes pixels, a first signal line, a second signal line, a scan line, and an insulating layer. The first signal line includes a region overlapping with the second signal line with the insulating layer therebetween. The pixels each include a first transistor and a second transistor. The first signal line functions as one of a source and a drain of the first transistor in each of pixels in one column including a first pixel. In the first pixel, the first transistor includes a first semiconductor layer. The first semiconductor layer includes a region in contact with a sidewall of a first opening in the insulating layer. The second signal line functions as one of a source and a drain of the second transistor in each of the pixels in one row including the first pixel.

11 Claims, 69 Drawing Sheets

(58) Field of Classification Search
CPC ... G09G 2300/0852; G09G 2310/0251; G09G 2320/0295; G09G 2354/00; H10D 30/67; H10D 86/423; H10D 86/441; H10D 86/421; H10D 86/60; H10K 59/1213; H10K 59/126; H10K 59/131; G02F 1/136286
See application file for complete search history.

(56) References Cited

U.S. PATENT DOCUMENTS

| | | | | |
|---|---|---|---|---|
| 7,671,826 | B2 | 3/2010 | Kimura | |
| 7,768,485 | B2 | 8/2010 | Uchino et al. | |
| 8,242,986 | B2 | 8/2012 | Kimura | |
| 8,325,111 | B2 | 12/2012 | Kimura | |
| 9,647,000 | B2 | 5/2017 | Sasaki | |
| 9,691,772 | B2 | 6/2017 | Noda et al. | |
| 10,002,567 | B2 | 6/2018 | Uchino et al. | |
| 10,263,015 | B2 | 4/2019 | Sasaki | |
| 11,785,827 | B2 | 10/2023 | Yamazaki. et al. | |
| 2007/0108446 | A1* | 5/2007 | Akimoto | H10D 64/62 257/E29.147 |
| 2010/0163865 | A1* | 7/2010 | Arai | H10D 30/6757 257/E21.414 |
| 2014/0175435 | A1* | 6/2014 | Yamazaki | H10D 30/6713 257/43 |
| 2014/0253533 | A1* | 9/2014 | Miyake | G09G 3/3655 345/212 |
| 2015/0243220 | A1 | 8/2015 | Kim et al. | |

FOREIGN PATENT DOCUMENTS

| | | | | |
|---|---|---|---|---|
| JP | 2005-345722 A | | 12/2005 | |
| JP | 2007-179041 A | | 7/2007 | |
| JP | 2007-310311 A | | 11/2007 | |
| JP | 2008-034760 A | | 2/2008 | |
| JP | 2013-210644 A | | 10/2013 | |
| JP | 2016146422 A | * | 8/2016 | H10D 86/441 |
| WO | WO-2018/087625 | | 5/2018 | |

* cited by examiner

FIG. 35A1
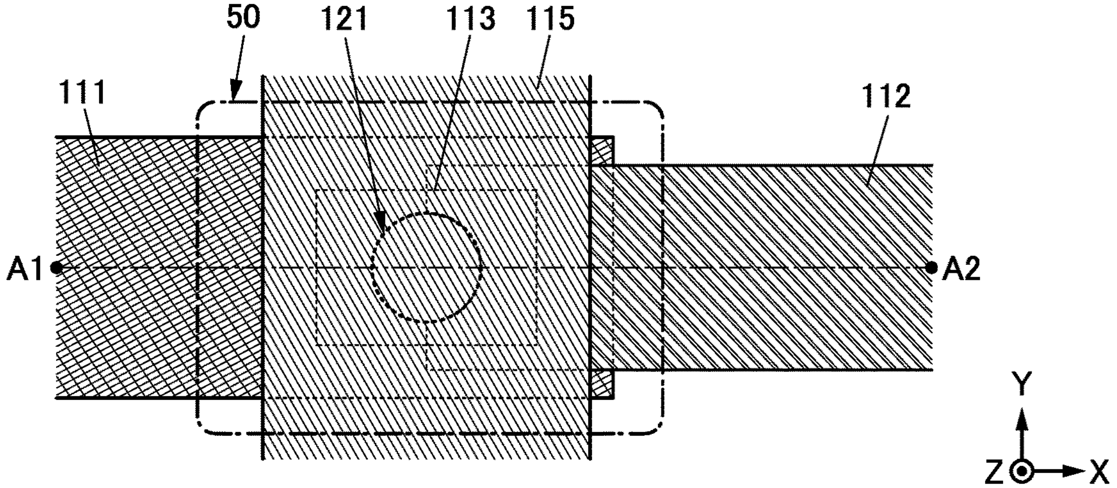
FIG. 35A2
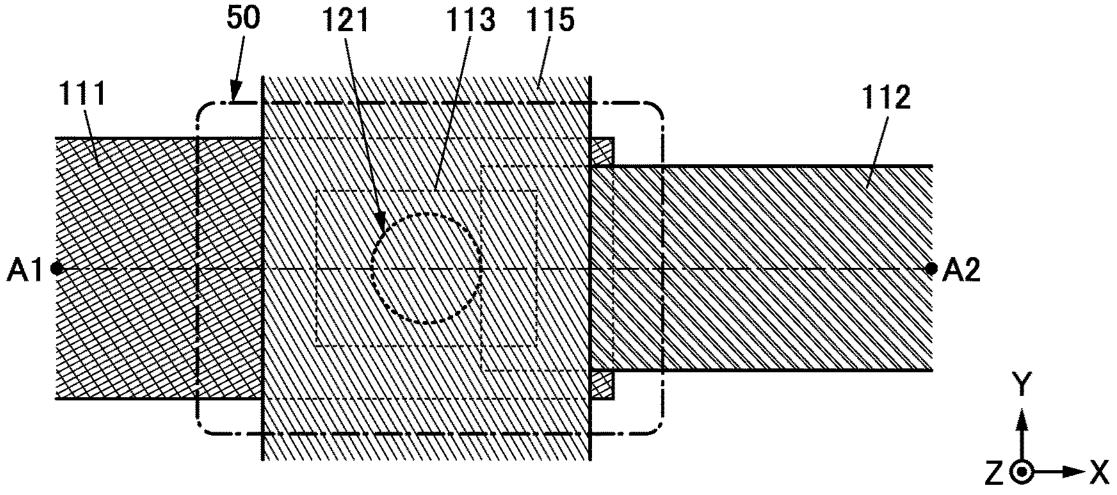
FIG. 35B
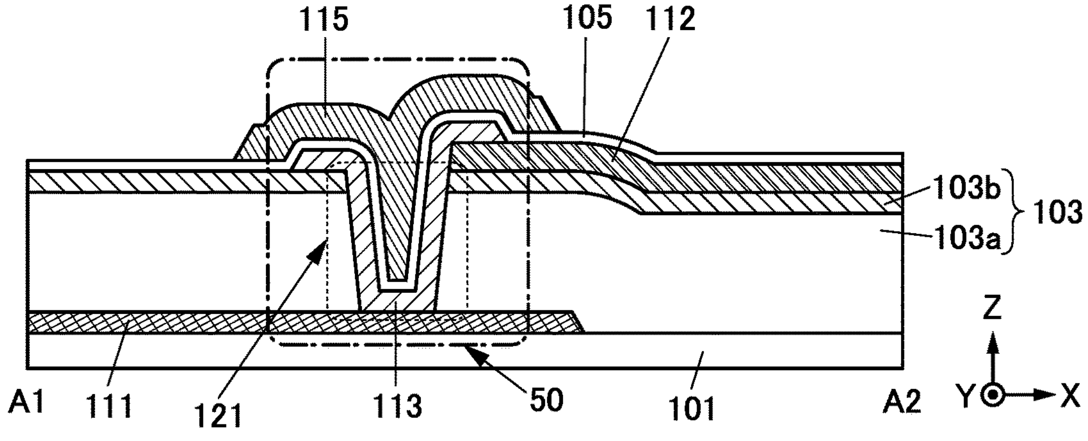

FIG. 39A1
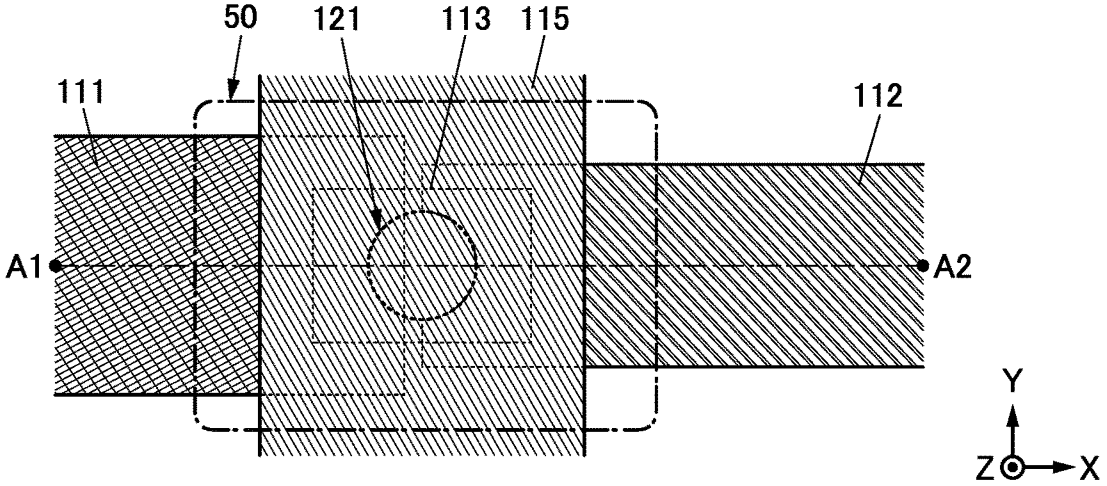
FIG. 39A2
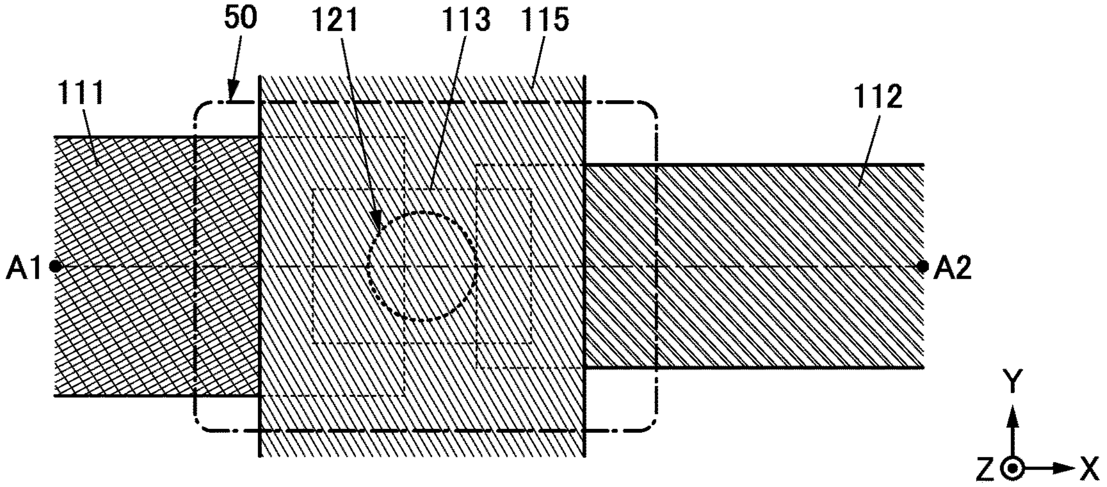
FIG. 39B
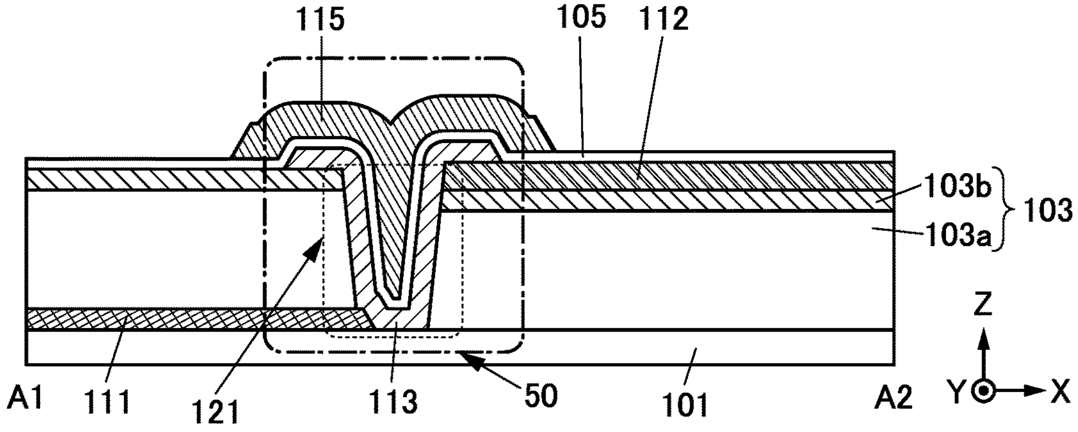

FIG. 43A1
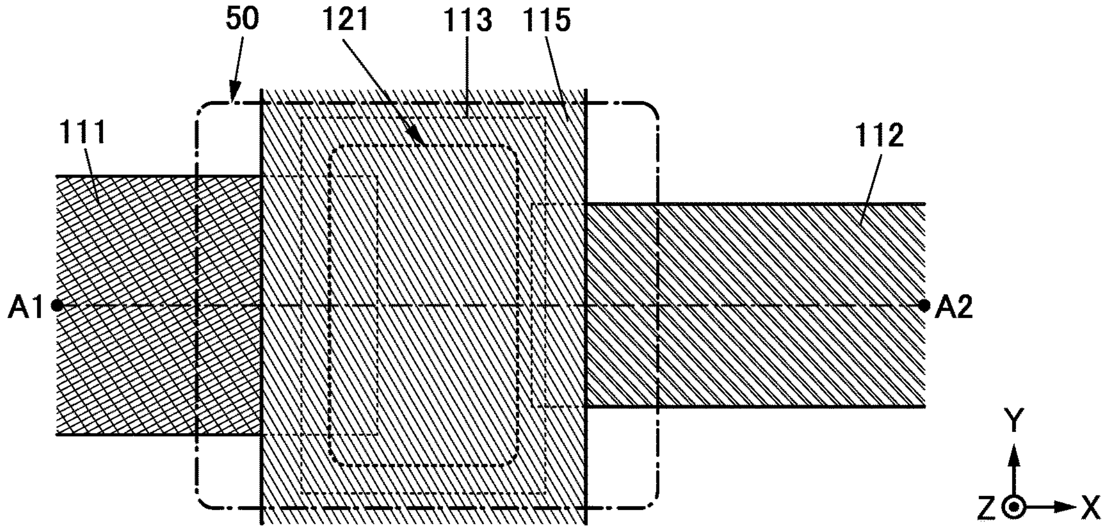
FIG. 43A2
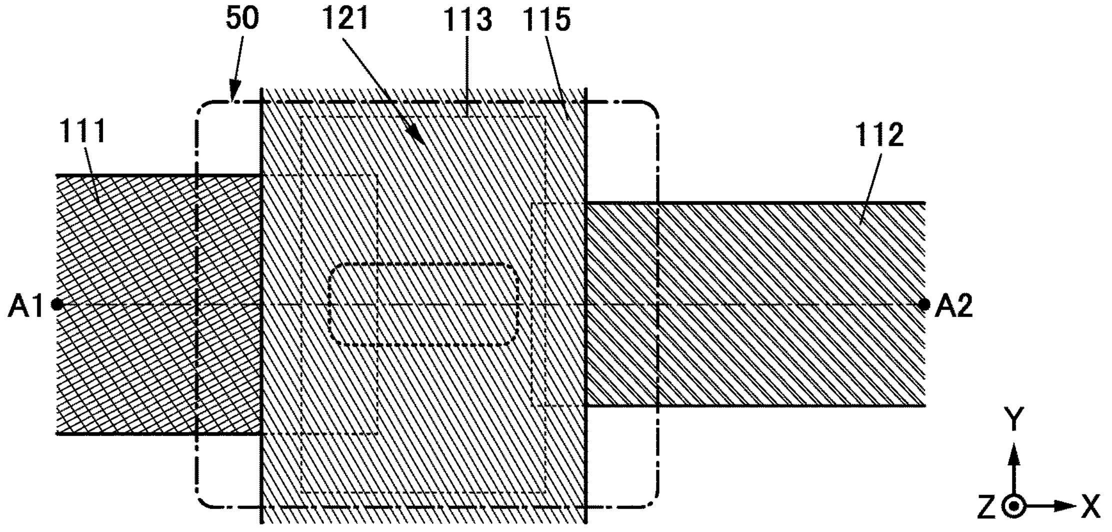
FIG. 43B
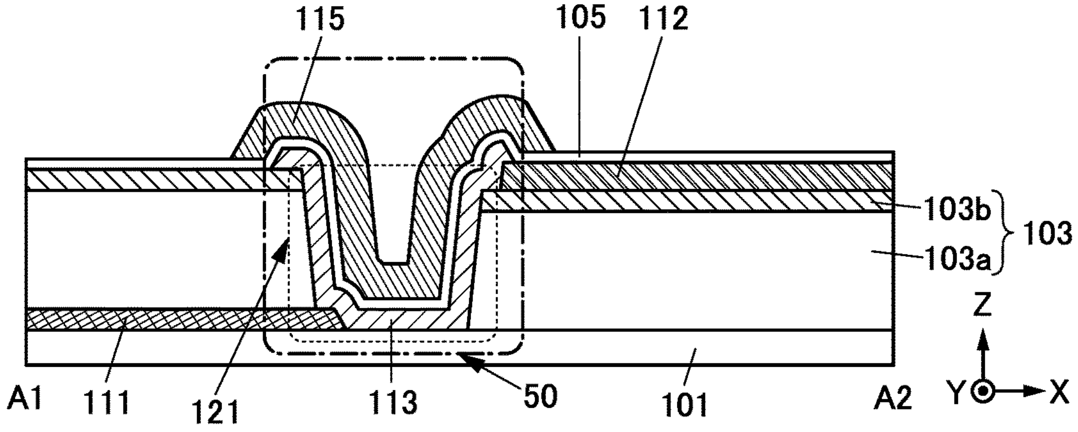

DISPLAY DEVICE INCLUDING PIXELS

BACKGROUND OF THE INVENTION

1. Field of the Invention

One embodiment of the present invention relates to a display device, a semiconductor device, a display module, and an electronic device. One embodiment of the present invention relates to a method for manufacturing a display device and a method for manufacturing a semiconductor device.

Note that one embodiment of the present invention is not limited to the above technical field. Examples of the technical field of one embodiment of the present invention include a semiconductor device, a display device, a light-emitting apparatus, a power storage device, a memory device, an electronic device, a lighting device, an input device (e.g., a touch sensor), an input/output device (e.g., a touch panel), a method for driving any of them, and a method for manufacturing any of them.

2. Description of the Related Art

Semiconductor devices including transistors have been widely used in display devices and electronic devices, and required to achieve increasingly high integration and high-speed operation. Highly integrated semiconductor devices are required for application to high-definition display devices, for example. One way of increasing the degree of integration of transistors is the recent development of miniaturized transistors.

In recent years, there has been a need for display devices applicable to virtual reality (VR), augmented reality (AR), substitutional reality (SR), or mixed reality (MR). VR, AR, SR, and MR are collectively referred to as extended reality (XR). Display devices for XR have been expected to have higher definition and higher color reproducibility such that realistic feeling and the sense of immersion can be enhanced. Examples of the apparatuses that can be used as such display devices include a liquid crystal display device and a light-emitting apparatus including a light-emitting element such as an organic electroluminescent (EL) element or a light-emitting diode (LED).

Patent Document 1 discloses a display device for VR using organic EL elements (also referred to as organic EL devices).

REFERENCE

[Patent Document 1] International Publication No. WO2018/087625

SUMMARY OF THE INVENTION

In the case of a high-definition display device including a large number of pixels per unit area, for example, the display device is preferably driven at high speed in order to perform display at a desired frame frequency.

In view of the above, an object of one embodiment of the present invention is to provide a display device which is driven at high speed and a manufacturing method of the display device. Another object of one embodiment of the present invention is to provide a high-definition display device and a manufacturing method of the display device. Another object of one embodiment of the present invention is to provide a display device including a miniaturized transistor and a manufacturing method of the display device. Another object of one embodiment of the present invention is to provide a display device including a transistor with a high on-state current and a manufacturing method of the display device. Another object of one embodiment of the present invention is to provide a display device having favorable electrical characteristics and a manufacturing method of the display device. Another object of one embodiment of the present invention is to provide a novel semiconductor device and a manufacturing method of the semiconductor device.

Note that the description of these objects does not preclude the existence of other objects. In one embodiment of the present invention, there is no need to achieve all these objects. Note that other objects can be derived from the description of the specification, the drawings, the claims, and the like.

(1) One embodiment of the present invention is a display device including a plurality of pixels arranged in a matrix of a plurality of rows and a plurality of columns, a first signal line, a second signal line, a scan line, and an insulating layer. The first signal line includes a region overlapping with the second signal line with the insulating layer therebetween. The plurality of pixels each include a first transistor and a second transistor. The first signal line functions as one of a source and a drain of the first transistor in each of pixels in one column including a first pixel. In the first pixel, the first transistor includes a first semiconductor layer, a first conductive layer, and a gate insulating layer over the first semiconductor layer. The first conductive layer functions as the other of the source and the drain of the first transistor. The first semiconductor layer includes a region in contact with a sidewall of a first opening in the insulating layer, a region in contact with a top surface of the first signal line and overlapping with the first opening in a plan view, and a region in contact with a top surface of the first conductive layer. The scan line includes a region overlapping with the first semiconductor layer with the gate insulating layer therebetween. The scan line functions as a gate of the first transistor. The second signal line functions as one of a source and a drain of the second transistor in each of the pixels in one row including the first pixel. The insulating layer is over the first signal line. The second signal line and the first conductive layer are over the insulating layer.

(2) In the structure of (1), the second transistor in the first pixel can include a second conductive layer and a second semiconductor layer. The second conductive layer can function as the other of the source and the drain of the second transistor. The second semiconductor layer can include a region in contact with a sidewall of a second opening in the insulating layer, a region in contact with a top surface of the second conductive layer and overlapping with the second opening in a plan view, and a region in contact with a top surface of the second signal line. The insulating layer can be over the second conductive layer.

(3) One embodiment of the present invention is a display device including a plurality of pixels arranged in a matrix of a plurality of rows and a plurality of columns, a first signal line, a second signal line, a scan line, and an insulating layer. The first signal line includes a region overlapping with the second signal line with the insulating layer therebetween. The plurality of pixels each include a first transistor and a second transistor. The first signal line functions as one of a source and a drain of the first transistor in each of pixels in one column including a first pixel. In the first pixel, the first transistor includes a first semiconductor layer, a first conductive layer, and a gate insulating layer over the first semiconductor layer. The first conductive layer functions as the other of the source and the drain of the first transistor. The first semiconductor layer includes a region in contact with a sidewall of a first opening in the insulating layer, a region in contact with a top surface of the first signal line, and a region in contact with a top surface of the first conductive layer and overlapping with the first opening in a plan view. The scan line includes a region overlapping with the first semiconductor layer with the gate insulating layer therebetween. The scan line functions as a gate of the first transistor. The second signal line functions as one of a source and a drain of the second transistor in each of the pixels in one row including the first pixel. The insulating layer is over the second signal line and the first conductive layer. The first signal line is over the insulating layer.

(4) In the structure of (3), the second transistor in the first pixel can include a second conductive layer and a second semiconductor layer. The second conductive layer can function as the other of the source and the drain of the second transistor. The second semiconductor layer can include a region in contact with a sidewall of a second opening in the insulating layer, a region in contact with a top surface of the second conductive layer, and a region in contact with a top surface of the second signal line and overlapping with the second opening in a plan view. The second conductive layer can be over the insulating layer.

(5) In any of the structures of (1) and (3), the first conductive layer and the second signal line can be formed using the same material.

(6) In any of the structures of (2) and (4), the first conductive layer and the second signal line can be formed using the same material and the second conductive layer and the first signal line can be formed using the same material.

(7) In any of the structures of (1) to (4), in each of the plurality of pixels, a gate of the second transistor may be electrically connected to one of the source and the drain of the first transistor.

(8) A display device including a plurality of pixels arranged in m rows and n columns, m scan lines, n signal lines, m current supply lines, and an insulating layer. The n signal lines include regions overlapping with the respective m current supply lines with the insulating layer therebetween. The plurality of pixels each include a first transistor and a second transistor. An h-th scan line functions as a gate of the first transistor of each of pixels in an h-th row. A k-th signal line functions as one of a source and a drain of the first transistor of each of pixels in a k-th column. An h-th current supply line functions as one of a source and a drain of the second transistor of each of the pixels in the h-th row. In each of the pixels in the k-th column, the first transistor includes a first semiconductor layer including a first region in contact with a sidewall of an opening in the insulating layer and a second region in contact with a top surface of the k-th signal line. Note that m and n are each an integer greater than or equal to 2, h is an integer greater than or equal to 1 and less than or equal to m, and k is an integer greater than or equal to 1 and less than or equal to n.

(9) In the structure of (8), when the h-th current supply line and the h-th scan line include a region where they are substantially parallel to each other, a space between the h-th current supply line and the h-th scan line can include a region with a width smaller than a wiring width of the h-th current supply line.

(10) In the structure of (8), when h is an integer greater than or equal to 3 and less than or equal to m and an (h−1)-th current supply line and the h-th scan line include a region where they are substantially parallel to each other, a space between the (h−1)-th current supply line and the h-th scan line can include a region with a width smaller than a wiring width of the (h−1)-th current supply line.

(11) In any of the structures of (8) to (10), in the n signal lines, the regions overlapping with the respective m current supply lines can be above the insulating layer.

(12) In any of the structures of (8) to (10), in the n signal lines, the regions overlapping with the respective m current supply lines can be below the insulating layer.

One embodiment of the present invention is can provide a display device which is driven at high speed and a manufacturing method of the display device. Alternatively, one embodiment of the present invention can provide a high-definition display device and a manufacturing method of the display device. Alternatively, one embodiment of the present invention can provide a display device including a miniaturized transistor and a manufacturing method of the display device. Alternatively, one embodiment of the present invention can provide a display device including a transistor with a high on-state current and a manufacturing method of the display device. Alternatively, one embodiment of the present invention can provide a display device having favorable electrical characteristics and a manufacturing method of the display device. Alternatively, one embodiment of the present invention can provide a novel semiconductor device and a manufacturing method of the semiconductor device.

Note that the description of these effects does not preclude the existence of other effects. One embodiment of the present invention does not necessarily have all of these effects. Other effects can be derived from the description of the specification, the drawings, and the claims.

BRIEF DESCRIPTION OF THE DRAWINGS

In the accompanying drawings:

FIG. 33A is a plan view illustrating a structure example of a display device and FIG. 33B1, FIG. 33B2, and FIG. 33B3 are cross-sectional views illustrating structure examples of the display device;

FIG. 35A1 and FIG. 35A2 are plan views illustrating structure examples of a display device and FIG. 35B is a cross-sectional view illustrating the structure example of the display device;

FIG. 39A1 and FIG. 39A2 are plan views illustrating structure examples of a display device and FIG. 39B is a cross-sectional view illustrating the structure example of the display device;

FIG. 43A1 and FIG. 43A2 are plan views illustrating structure examples of a display device and FIG. 43B is a cross-sectional view illustrating the structure example of the display device;

FIG. 44A is a plan view illustrating a structure example of a display device and FIG. 44B1 and FIG. 44B2 are cross-sectional views illustrating structure examples of the display device;

DETAILED DESCRIPTION OF THE INVENTION

Figure 1A:
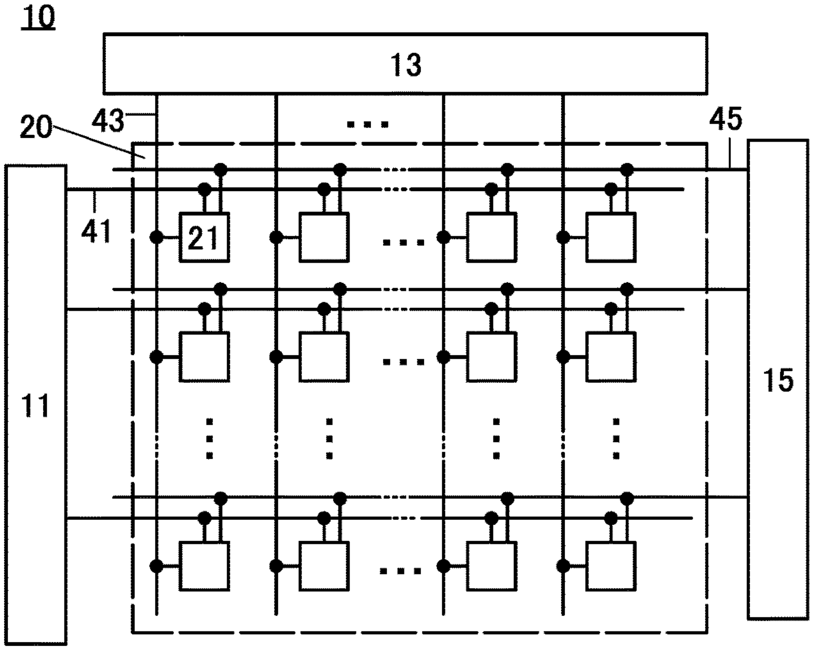
FIG. 1A is a block diagram illustrating a configuration example of a display device.

Embodiments will be described in detail with reference to the drawings. Note that the embodiments of the present invention are not limited to the following description, and it will be readily appreciated by those skilled in the art that modes and details of the present invention can be modified in various ways without departing from the spirit and scope of the present invention. Therefore, the present invention should not be construed as being limited to the description in the following embodiments.

Note that in structures of the invention described below, the same portions or portions having similar functions are denoted by the same reference numerals in different drawings, and the description thereof is not repeated. The same hatching pattern is used for portions having similar functions, and the portions are not denoted by specific reference numerals in some cases. Furthermore, a plurality of layers formed in the same step are shown with the same hatching pattern in some cases.

The position, size, range, or the like of each structure illustrated in drawings is not accurately represented in some cases for easy understanding. Therefore, the disclosed invention is not necessarily limited to the position, size, range, or the like disclosed in the drawings.

Note that the terms "film" and "layer" can be used interchangeably depending on the case or the circumstances. For example, the term "conductive layer" can be replaced with the term "conductive film" in some cases. As another example, the term "insulating film" can be replaced with the term "insulating layer" in some cases.

In this specification and the like, the terms such as "electrode" and "wiring" do not limit the functions of the components. For example, an "electrode" is used as part of a "wiring" in some cases, and vice versa. Furthermore, the term "electrode" or "wiring" can also mean a combination of a plurality of electrodes or wirings provided in an integrated manner, for example.

In this specification and the like, the expressions "one of a source and a drain" (or a first electrode or a first terminal) and "the other of the source and the drain" (or a second electrode or a second terminal) are used to describe the connection relation of a transistor. This is because a source and a drain of a transistor are interchangeable depending on the structure, operation conditions, or the like of the transistor. Note that the source or the drain of the transistor can also be referred to as a source (or drain) terminal, a source (or drain) electrode, or the like as appropriate depending on the situation.

In this specification and the like, a structure in which at least light-emitting layers are separately formed for light-emitting elements with different emission wavelengths is referred to as a side-by-side (SBS) structure in some cases. The SBS structure can optimize materials and structures of light-emitting elements and thus can extend freedom of choice of materials and structures, whereby the luminance and the reliability can be easily improved.

In this specification and the like, a hole or an electron is sometimes referred to as a carrier. Specifically, a hole-injection layer or an electron-injection layer may be referred to as a carrier-injection layer, a hole-transport layer or an electron-transport layer may be referred to as a carrier-transport layer, and a hole-blocking layer or an electron-blocking layer may be referred to as a carrier-blocking layer. Note that in some cases, the above-described carrier-injection layer, carrier-transport layer, and carrier-blocking layer cannot be distinguished from each other depending on the cross-sectional shape, properties, or the like. One layer may have two or three functions of the carrier-injection layer, the carrier-transport layer, and the carrier-blocking layer in some cases.

In this specification and the like, a light-emitting element (also referred to as a light-emitting device) includes an EL layer between a pair of electrodes. The EL layer includes at least a light-emitting layer. Examples of layers (also referred to as functional layers) in the EL layer include a light-emitting layer, carrier-injection layers (a hole-injection layer and an electron-injection layer), carrier-transport layers (a hole-transport layer and an electron-transport layer), and carrier-blocking layers (a hole-blocking layer and an electron-blocking layer).

In this specification and the like, a light-receiving element (also referred to as a light-receiving device) includes at least an active layer functioning as a photoelectric conversion layer between a pair of electrodes.

In this specification and the like, the term "island shape" refers to a state where two or more layers formed using the same material in the same step are physically separated from each other. For example, "island-shaped light-emitting layer" means a state where the light-emitting layer and its adjacent light-emitting layer are physically separated from each other.

In this specification and the like, a tapered shape refers to a shape such that at least part of the side surface of a component is inclined with respect to a substrate surface or a formation surface of the component. For example, a tapered shape preferably includes a region where the angle between the inclined side surface and the substrate surface or the surface where a component is formed (such an angle is also referred to as a taper angle) is less than 90°. Note that the side surface of the component, the substrate surface, and the formation surface are not necessarily completely flat and may be substantially flat with a slight curvature or with slight unevenness.

In this specification and the like, when a side surface of a layer has a tapered shape, an outermost portion of the side surface of the layer is referred to as an end portion of the layer unless otherwise specified. For example, an end portion of a bottom surface of a layer that is positioned outside an end portion of a top surface is simply referred to as an end portion unless otherwise specified.

In this specification and the like, a mask layer (also referred to as a sacrificial layer) refers to a layer that is positioned above at least a light-emitting layer (specifically, a layer processed into an island shape among layers included in an EL layer) and has a function of protecting the light-emitting layer in the manufacturing process.

In this specification and the like, step disconnection refers to a phenomenon in which a layer, a film, or an electrode is split because of the shape of the formation surface (e.g., a step).

In this specification and the like, the expression "having substantially the same planar shape" means that at least outlines of stacked layers partly overlap each other. The expression "having substantially the same planar shape" also includes the case where the outlines do not completely overlap each other; for instance, the edge of the upper layer may be positioned on the inner side or the outer side of the edge of the lower layer.

In this specification and the like, terms for describing arrangement, such as "over", "above", "under", "below", "left", and "right", are used for convenience in describing a positional relation between components with reference to drawings. The positional relation between components is changed as appropriate in accordance with the direction from which each component is described. Thus, the positional relation is not limited to that described with a term used in this specification and can be explained with other terms as appropriate depending on the situation.

Note that in this specification, although a minimum unit in which independent operation is performed in one "pixel" is defined as a "subpixel" in the description for convenience, a "subpixel" and a "pixel" may be replaced with each other.

In this specification and the like, a metal oxide means an oxide of metal in a broad sense. Metal oxides are classified into an oxide insulator, an oxide conductor (including a transparent oxide conductor), an oxide semiconductor (also simply referred to as OS), and the like. For example, a metal oxide used in a semiconductor layer of a transistor is referred to as an oxide semiconductor in some cases. That is, an OS transistor can also be referred to as a transistor including a metal oxide or an oxide semiconductor. Note that a metal oxide containing nitrogen is also called a metal oxide in some cases. In addition, a metal oxide containing nitrogen may be referred to as a metal oxynitride.

Embodiment 1

In this embodiment, display devices and transistors of embodiments of the present invention will be described.

In this specification and the like, the term "parallel" indicates that the angle formed between two straight lines is greater than or equal to −10' and less than or equal to 10°. Thus, the case where the angle is greater than or equal to −5° and less than or equal to 5° is also included. The terms "approximately parallel" and "substantially parallel" indicate that the angle formed between two straight lines is greater than or equal to −30° and less than or equal to 30°. The term "perpendicular" indicates that the angle formed between two straight lines is greater than or equal to 800 and less than or equal to 100°. Thus, the case where the angle is greater than or equal to 850 and less than or equal to 950 is also included. The terms "approximately perpendicular" and "substantially perpendicular" indicate that the angle formed between two straight lines is greater than or equal to 60° and less than or equal to 120°.

In this specification and the like, the term "orthogonal" indicates that two straight lines intersect with or are connected to each other so that the angle formed between the lines is greater than or equal to 80° and less than or equal to 100°. Thus, the case where the angle is greater than or equal to 85° and less than or equal to 950 is also included. The terms "approximately orthogonal" and "substantially orthogonal" indicate that two straight lines intersect with or are connected to each other so that the angle formed between the lines is greater than or equal to 60° and less than or equal to 1200.

<Transistor>

In the transistor of one embodiment of the present invention, a source electrode and a drain electrode are positioned at different levels.

An insulating layer is provided between the source electrode and the drain electrode, and the source electrode and the drain electrode are not level with each other. Note that the insulating layer may include a region level with the source electrode. The insulating layer may include a region level with the drain electrode.

An opening is provided in the insulating layer between the source electrode and the drain electrode, and a semiconductor layer of the transistor is placed along a sidewall of the opening. The opening reaches one of the source electrode and the drain electrode that is positioned at a lower level.

In the transistor of one embodiment of the present invention, the source electrode and the drain electrode may include a region where they overlap with each other in a plan view. In such a case, for example, the insulating layer is provided between the source electrode and the drain electrode in the region where they overlap with each other.

The transistor of one embodiment of the present invention can be used for a display device.

<Display Device>

The display device of one embodiment of the present invention includes a plurality of pixels arranged in a matrix, a first signal line, a scan line, and a second signal line. The matrix includes a plurality of rows and a plurality of columns, for example. In the matrix, the column direction is orthogonal or substantially orthogonal to the row direction, for example. The column direction does not necessarily intersect with the row direction perpendicularly. For example, the column direction may intersect with the row direction obliquely. The display device of one embodiment of the present invention includes a plurality of pixels arranged in m rows and n columns, m scan lines, n signal lines, and m current supply lines. Here, m and n are each an integer greater than or equal to 2. The m scan lines and the m current supply lines are wirings extending in the row direction and the n signal lines are wirings extending in the column direction, for example. In the display device of one embodiment of the present invention, the current supply lines may be wirings extending in the column direction, for example. In this case, the number of current supply lines is n. The scan line can have a function of, for example, supplying a signal from a scan line driver circuit of the display device to the pixel or the like. The scan line is referred to as a gate line in some cases. The first signal line can have a function of, for example, supplying a signal from a signal line driver circuit of the display device to the pixel or the like. The first signal line is referred to as a source line in some cases. The second signal line can have a function of, for example, supplying a power supply potential to the pixel or the like. The second signal line is referred to as a power supply line in some cases. The second signal line can have a function of, for example, supplying current to a light-emitting element or the like. The second signal line is referred to as a current supply line in some cases. The second signal line may be a wiring having a function of supplying a signal from the signal line driver circuit of the display device.

The plurality of pixels each include at least one transistor of one embodiment of the present invention.

The first signal line, the scan line, and the second signal line are wirings each extending in one direction. The wirings each extend along a straight line, for example. Note that the wirings may each include a curved region. The wirings may each include a region with a different thickness. The wirings may each include a branched region.

The first signal line extends substantially along the column direction and the scan line extends substantially along the row direction. The second signal line extends substantially along the row direction. The first signal line and the second signal line include a region where they intersect with each other. For example, the first signal line and the second signal line include a region where they are orthogonal or substantially orthogonal to each other.

In the display device, the first signal line is provided for each pixel column, for example. That is, in the case where the pixel matrix includes a plurality of columns, a plurality of first signal lines are provided. The first signal line is electrically connected to the plurality of pixels in the corresponding column. The first signal line extends along the corresponding column, for example. Note that one first signal line may be provided for a plurality of pixel columns.

In the display device, the second signal line is provided for each pixel row, for example. That is, in the case where the pixel matrix includes a plurality of rows, a plurality of second signal lines are provided. The second signal line is electrically connected to the plurality of pixels in the corresponding row. The second signal line extends along the corresponding row, for example. Note that one second signal line may be provided for a plurality of pixel rows. In the display device, the scan line is provided for each pixel row, for example. That is, in the case where the pixel matrix includes a plurality of rows, a plurality of scan lines are provided. The scan line is electrically connected to the plurality of pixels in the corresponding row. The scan line extends along the corresponding row, for example. Note that one scan line may be provided for a plurality of pixel rows.

The scan line is preferably electrically connected to a gate of the transistor included in the pixel. In the case where the pixel includes a plurality of transistors, the scan line is electrically connected to at least one of the plurality of transistors. Note that the display device may include a second scan line. The scan line and the second scan line are electrically connected to gates of different transistors included in the pixel, for example. The number of scan lines connected to one pixel is not limited to one or two and may be three or more.

In the above, the column and the row may be replaced with each other. For example, the first signal line may extend substantially along the row direction. The scan line may extend substantially along the column direction. The second signal line may extend substantially along the column direction.

[Signal Line and Transistor]

In one embodiment of the present invention, the pixel includes a first transistor and a second transistor. The first signal line is electrically connected to a source or a drain of the first transistor and the second signal line is electrically connected to a source or a drain of the second transistor.

A source electrode and a drain electrode of the first transistor are conductive layers positioned at different levels. Thus, the source electrode and the drain electrode can overlap with each other without being short-circuited.

In a semiconductor device of one embodiment of the present invention, one of the source electrode and the drain electrode of the first transistor is substantially level with the first signal line and the other of the source electrode and the drain electrode of the first transistor is substantially level with the second signal line, whereby the first signal line and the second signal line can intersect with each other without being short-circuited. Consequently, the area of the circuit included in the display device can be reduced.

In a plan view, the first signal line and the second signal line include a region where they overlap with each other with a first insulating layer therebetween. The first insulating layer includes a first opening, and a first semiconductor layer of the first transistor is provided along a sidewall of the first opening.

Note that the first signal line preferably also serves as the one of the source electrode and the drain electrode of the first transistor. When the first signal line also serves as the one of the source electrode and the drain electrode of the first transistor, the area of the circuit included in the display device can be reduced.

The first semiconductor layer preferably includes a region in contact with a top surface of the source electrode and a region in contact with a top surface of the drain electrode. In the case where the first signal line also serves as the one of the source electrode and the drain electrode of the first transistor, the first semiconductor layer preferably includes a region in contact with a top surface of the first signal line.

[Scan Line]

In the display device of one embodiment of the present invention, the scan line is preferably level with neither the first signal line nor the second signal line. The scan line is a conductive layer including a region level with a gate electrode of the first transistor, for example.

The second signal line and the scan line are arranged along the row of the pixel matrix, for example. The second signal line and the scan line preferably include a region where they are parallel or substantially parallel to each other. In the case where the second signal line and the scan line are parallel or substantially parallel to each other, the second signal line and the scan line are positioned at different levels and thus can be close to each other in a plan view.

A space between the second signal line and the scan line includes a region with a width smaller than the wiring width of the second signal line, for example. Here, the wiring width of the second signal line is equal to, for example, the wiring width of a region provided parallel to the scan line. The space between the second signal line and the scan line includes a region with a width smaller than the wiring width of the scan line, for example. Here, the wiring width of the scan line is equal to, for example, the wiring width of a region provided parallel to the second signal line. The space between the second signal line and the scan line includes a region with a width smaller than the width of a space between conductive layers obtained by processing a conductive film to be the scan line (a third conductive film described later), for example. The space between the second signal line and the scan line includes a region with a width smaller than the width of a space between conductive layers obtained by processing a conductive film to be the second signal scan line (a second conductive film described later), for example.

Here, the width of a space between two wirings refers to, for example, the shortest distance between a side of one wiring close to the other wiring and a side of the other wiring close to the one wiring in a plan view, and the sides are preferably parallel or substantially parallel to the direction in which the wirings extend.

Here, the width of a space between two conductive layers refers to, for example, the shortest distance between a side of one conductive layer close to the other conductive layer and a side of the other conductive layer close to the one conductive layer in a plan view.

<Manufacturing Method of Display Device>

An example of a manufacturing method of the display device of one embodiment of the present invention will be described.

[First Conductive Film and Second Conductive Film]

The one of the source electrode and the drain electrode of the first transistor and the first signal line are preferably conductive layers obtained by processing one conductive film (hereinafter, referred to as a first conductive film). The other of the source electrode and the drain electrode of the first transistor and the second signal line are preferably conductive layers obtained by processing one conductive film (hereinafter, referred to as the second conductive film).

First, the case where the first conductive film is formed earlier than the second conductive film is described.

First, the first conductive film is formed. The first conductive film is processed to form a plurality of conductive layers including the one of the source electrode and the drain electrode of the first transistor and the first signal line. After that, a first insulating layer is formed over the plurality of conductive layers, and the second conductive film is formed over the first insulating layer. The second conductive film is processed to form a plurality of conductive layers including the other of the source electrode and the drain electrode of the first transistor and the second signal line. Then, an opening is formed in the first insulating layer, the first semiconductor layer is formed along a sidewall of the opening, and a second insulating layer, a gate electrode, and the like are formed over the first semiconductor layer. The second insulating layer has a function of a gate insulating layer of the first transistor.

Next, the case where the first conductive film is formed after the formation of the second conductive film is described.

First, the second conductive film is formed and then processed to form a plurality of conductive layers including the other of the source electrode and the drain electrode of the first transistor and the second signal line. After that, the first insulating layer is formed over the plurality of conductive layers, the first conductive film is formed over the first insulating layer, and the first conductive film is processed to form a plurality of conductive layers including one of the source electrode and the drain electrode of the first transistor and the first signal line. Then, an opening is formed in the first insulating layer, the first semiconductor layer is formed along a sidewall of the opening, and the second insulating layer, the gate electrode, and the like are formed over the first semiconductor layer.

The conductive layer obtained by processing the first conductive film and the conductive layer obtained by processing the second conductive film are positioned at different levels. Specifically, for example, the conductive layer obtained by processing the first conductive film and the conductive layer obtained by processing the second conductive film are observed at different levels in cross-sectional observation or the like of the display device.

Between the conductive layer obtained by processing the first conductive film and the conductive layer obtained by processing the second conductive film, the first insulating layer or part of the first insulating layer may be provided.

[Third Conductive Film]

The scan line and the gate electrode of the first transistor are preferably conductive layers obtained by processing one conductive film (hereinafter, referred to as the third conductive film).

In the manufacturing process of the display device of one embodiment of the present invention, the second insulating layer is formed over the first semiconductor layer. The second insulating layer has a function of the gate insulating layer of the first transistor. The second insulating layer is provided to cover the first signal line and the second signal line. The third conductive film is formed over the second insulating layer. The third conductive film is processed to form a plurality of conductive layers including the gate electrode of the first transistor and the scan line.

Note that by processing the third conductive film, an auxiliary wiring of one of the first signal line and the second signal line that is positioned over the first insulating layer can be provided. Provision of the auxiliary wiring, which is electrically connected to the signal line, can suppress the delay of a signal supplied to the signal line, a change in signal voltage, and the like. The signal line and the auxiliary wiring preferably overlap with each other.

Although the conductive layer obtained by processing the first conductive film and the conductive layer obtained by processing the second conductive film are positioned at different levels, the conductive layer obtained by processing the second conductive film may include a region substantially level with the conductive layer obtained by processing the first conductive film. Also in that case, a region other than the above-described region and the conductive layer obtained by processing the first conductive film are positioned at different levels. In some cases, the conductive layer obtained by processing the first conductive film may include a region substantially level with the conductive layer obtained by processing the second conductive film. Also in that case, a region other than the above-described region and the conductive layer obtained by processing the second conductive film are positioned at different levels.

[Second Transistor]

Conductive layers positioned at different levels may be used as a source electrode and a drain electrode of the second transistor. For example, the conductive layer obtained by processing the first conductive film can be used as one of the source electrode and the drain electrode and the conductive layer obtained by processing the second conductive film can be used as the other of the source electrode and the drain electrode. In such a case, for example, the first insulating layer includes a second opening, and a second semiconductor layer of the second transistor is provided along a sidewall of the second opening.

Note that the second signal line preferably also serves as the one of the source electrode and the drain electrode of the second transistor. When the second signal line also serves as the one of the source electrode and the drain electrode of the second transistor, the area of the circuit included in the display device can be reduced.

The second semiconductor layer preferably includes a region in contact with a top surface of the source electrode and a region in contact with a top surface of the drain electrode. In the structure in which the second signal line also serves as the one of the source electrode and the drain electrode of the second transistor, the second semiconductor layer preferably includes a region in contact with a top surface of the second signal line.

<Structure Example of Display Device>

FIG. 1A is a block diagram illustrating a configuration example of a display device 10 that is the display device of one embodiment of the present invention. The display device 10 includes a display portion 20, a scan line driver circuit 11, a signal line driver circuit 13, and a power supply circuit 15. The display portion 20 includes a plurality of pixels 21 arranged in a matrix.

The scan line driver circuit 11 is electrically connected to the pixels 21 through wirings 41. Specifically, the pixels 21 in the same row are electrically connected to the scan line driver circuit 11 through the same wiring 41.

The signal line driver circuit 13 is electrically connected to the pixels 21 through wirings 43. Specifically, the pixels 21 in the same row are electrically connected to the signal line driver circuit 13 through the same wiring 43.

The power supply circuit 15 is electrically connected to the pixels 21 through wirings 45. For example, the pixels 21 in the same row can be electrically connected to the power supply circuit 15 through the same wiring 45.

The pixel 21 includes a display element, with which an image can be displayed on the display portion 20. Specifically, the luminance of light emitted from the pixel 21 is controlled by the display element, whereby an image can be displayed on the display portion 20. As the display element, for example, a light-emitting element can be used, and specifically, an organic EL element can be used. As the display element, a liquid crystal element (also referred to as a liquid crystal device) may also be used.

The scan line driver circuit 11 has a function of selecting the pixel 21 to which image data is to be written. Specifically, the scan line driver circuit 11 can select the pixel 21 to which image data is to be written by outputting a signal to the wiring 41. Here, the scan line driver circuit 11 can write image data to the pixel 21 by outputting the signal to the wiring 41 in the first row, outputting the signal to the wiring 41 in the second row, and outputting the signals to the wirings 41 from the third row to the last row sequentially. Thus, the signal output from the scan line driver circuit 11 to the wiring 41 is a scan signal, and the wiring 41 can be referred to as a scan line. Note that the scan line driver circuit is referred to as a gate driver in some cases. The wiring 41 is referred to as a gate line in some cases.

The signal line driver circuit 13 has a function of generating image data. The image data is supplied to the pixel 21 through the wiring 43. For example, image data can be written to all the pixels 21 included in a row selected by the scan line driver circuit 11. Here, the image data can be represented as a signal. Thus, the wiring 43 can be referred to as a signal line. Note that the signal line driver circuit is referred to as a source driver in some cases. The wiring 43 is referred to as a source line in some cases.

The power supply circuit 15 has a function of generating a power supply potential and supplying it to the wiring 45. The power supply circuit 15 has a function of generating, for example, a high power supply potential (hereinafter, also simply referred to as "high potential" or "VDD") and supplying it to the wiring 45. The power supply circuit 15 may have a function of generating a low power supply potential (hereinafter, also simply referred to as "low potential" or "VSS"). The power supply circuit 15 can output a pulse signal by sequentially switching a high power supply potential and a low power supply potential. Alternatively, the power supply circuit 15 can output pulse signals by row-by-row scanning. The wiring 45 is supplied with a power supply potential and thus can be referred to as a power supply line. Furthermore, current flows from the wiring 45 to a light-emitting element (e.g., a light-emitting element 60 described later) through a transistor included in the pixel (a transistor 52 described later). Thus, the wiring 45 is referred to as a current supply line in some cases. The wiring 45 may be supplied with a pulse signal and thus is referred to as a pulse line in some cases. By supplying a pulse potential to the wiring 45, variation in the threshold voltage and mobility of the transistor 52 can be corrected.

A constant potential signal, a pulse signal, or the like is supplied to each of the wirings 41, 43, and 45.

Figure 1B:
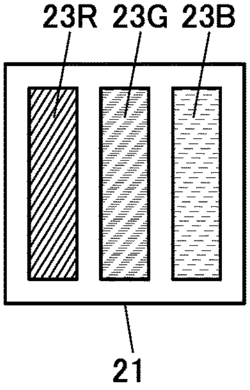
FIG. 1B is a plan view illustrating a structure example of a pixel.

FIG. 1B is a plan view illustrating a structure example of the pixel 21. The pixel 21 includes a plurality of subpixels 23. FIG. 1B illustrates an example in which the pixel 21 includes subpixels 23R, 23G, and 23B. Here, in the case where the pixel 21 includes a light-emitting element as the display element, for example, a planar shape of the subpixel illustrated in FIG. 1B corresponds to the planar shape of a light-emitting region of the light-emitting element. Although the subpixels 23R, 23G, and 23B have the same or substantially the same aperture ratio or size of a light-emitting region in FIG. 1B, one embodiment of the present invention is not limited thereto. The aperture ratio of each of the subpixels 23R, 23G, and 23B can be determined as appropriate. The subpixels 23R, 23G, and 23B may have different aperture ratios, or two or more of the subpixels 23R, 23G, and 23B may have the same or substantially the same aperture ratio.

In this specification and the like, for example, description common to the subpixels 23R, 23G, and 23B is sometimes made using the collective term "subpixel 23". As for other components that are distinguished from each other using letters of the alphabet, matters common to the components are sometimes described using reference numerals excluding the letters of the alphabet.

The pixel 21 illustrated in FIG. 1B employs stripe arrangement as the arrangement method of the subpixels 23. Examples of the arrangement of the subpixels 23 include S-stripe arrangement, matrix arrangement, delta arrangement, Bayer arrangement, and PenTile arrangement. Embodiment 2 can be referred to for an example of the planar shape of the subpixel, arrangement of the subpixels, and the like.

The subpixels 23R, 23G, and 23B emit light of different colors. The subpixels 23R, 23G, and 23B can be of three colors of red (R), green (G), and blue (B) or of three colors of yellow (Y), cyan (C), and magenta (M), for example. The pixel 21 may include four or more subpixels 23. For example, the pixel 21 may include subpixels of four colors of R, G, B, and white (W) or subpixels of four colors of R, G, B, and infrared (IR) light. Accordingly, the display device 10 can display a full-color image on the display portion 20.

Figure 1C:
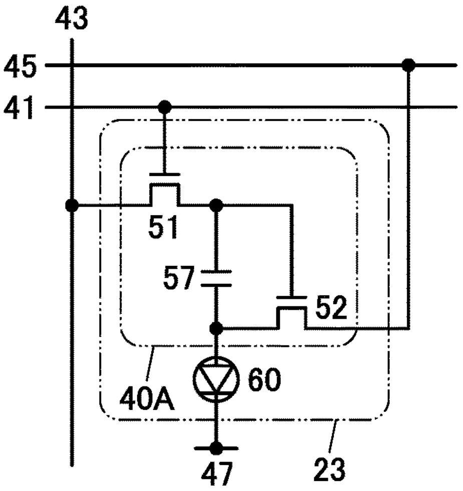
FIGS. 1C to 1E are circuit diagrams illustrating configuration examples of the pixel.

FIG. 1C is a circuit diagram illustrating a configuration example of the subpixel 23. The subpixel 23 illustrated in FIG. 1C includes a pixel circuit 40A and the light-emitting element 60.

The pixel circuit 40A includes a transistor 51, the transistor 52, and a capacitor 57. That is, the pixel circuit 40A is a 2Tr1C-type pixel circuit.

In the pixel circuit 40A, one of a source and a drain of the transistor 51 is electrically connected to the wiring 43. The other of the source and the drain of the transistor 51 is electrically connected to a gate of the transistor 52. The gate of the transistor 52 is electrically connected to one electrode of the capacitor 57. A gate of the transistor 51 is electrically connected to the wiring 41.

One of a source and a drain of the transistor 52 is electrically connected to the wiring 45. The other of the source and the drain of the transistor 52 is electrically connected to the other electrode of the capacitor 57. The other electrode of the capacitor 57 is electrically connected to one electrode of the light-emitting element 60. The other electrode of the light-emitting element 60 is electrically connected to a wiring 47. Here, the one electrode of the light-emitting element 60 is also referred to as a pixel electrode. The wiring 47 can be shared between all the pixels 21, for example; thus, the other electrode of the light-emitting element 60 can also be referred to as a common electrode.

As described above, the wiring 41, the wiring 43, and the wiring 45 function as a scan line, a signal line, and a power supply line, respectively. The wiring 47 functions as a power supply line; for example, when the wiring 45 is supplied with a high power supply potential, the wiring 47 is supplied with a low power supply potential. The wiring 47 can be electrically connected to the power supply circuit 15, for example.

The transistor 51 has a function of a switch and has a function of controlling the conduction state or the non-conduction state between the wiring 43 and the gate of the transistor 52 on the basis of the potential of the wiring 41. When the transistor 51 is turned on, image data is written to the pixel circuit 40A, and when the transistor 51 is turned off, the written image data is retained.

The transistor 52 has a function of controlling the amount of current flowing through the light-emitting element 60 and is also referred to as a driving transistor. The capacitor 57 has a function of retaining the gate potential of the transistor 52. The luminance of light emitted from the light-emitting element 60 is controlled in accordance with a potential that corresponds to image data and is supplied to the gate of the transistor 52. Specifically, in the case where the wiring 45 is supplied with a high power supply potential and the wiring 47 is supplied with a low power supply potential, the amount of current flowing from the wiring 45 to the wiring 47 is controlled in accordance with the gate potential of the transistor 52, whereby the luminance of light emitted from the light-emitting element 60 is controlled.

OS transistors are preferably used as the transistors 51 and 52. An OS transistor has much higher field-effect mobility than a transistor containing amorphous silicon, for example. Thus, by using OS transistors as the transistors 51 and 52, the display device 10 can be driven at high speed.

An OS transistor has an extremely low leakage current between a source and a drain in an off state (hereinafter, also referred to as an off-state current). Thus, by using an OS transistor as the transistor 51, charge accumulated in the capacitor 57 can be retained for a long period. Therefore, image data written to the subpixel 23 can be retained for a long period and therefore the frequency of the refresh operation (rewriting image data to the subpixel 23) can be reduced. Thus, power consumption of the display device 10 can be reduced.

To increase the emission luminance of the light-emitting element 60, it is necessary to increase the amount of current flowing through the light-emitting element 60. To increase the current amount, it is necessary to increase the source-drain voltage of the transistor 52 which is a driving transistor. Since an OS transistor has a higher withstand voltage between the source and the drain than a transistor including silicon (also referred to as a Si transistor), a high voltage can be applied between the source and the drain of the OS transistor. Thus, with the use of an OS transistor as the transistor 52, the amount of current flowing through the light-emitting element 60 can be increased, resulting in an increase in emission luminance of the light-emitting element 60.

When transistors are driven in a saturation region, a change in source-drain current relative to a change in gate-source voltage can be smaller in an OS transistor than in a Si transistor. Accordingly, when an OS transistor is used as the transistor 52, current flowing between the source and the drain can be set minutely by a change in a gate-source voltage; hence, the amount of current flowing through the light-emitting element 60 can be controlled. Therefore, the luminance of light emitted from the subpixel 23 can be controlled minutely. Accordingly, the number of gray levels represented by the subpixel 23 can be increased.

Regarding saturation characteristics of current flowing when transistors are driven in the saturation region, even when the source-drain voltage of an OS transistor increases gradually, a more stable current (saturation current) can be fed through the OS transistor than through a Si transistor. Thus, by using an OS transistor as the transistor 52, a stable current can be fed through light-emitting elements 60 even when the current-voltage characteristics of the light-emitting elements 60 vary, for example. In other words, when the OS transistor is driven in the saturation region, the source-drain current hardly changes with an increase in the source-drain voltage; hence, the emission luminance of the light-emitting element 60 can be stable.

As described above, by using an OS transistor as the transistor 52, it is possible to inhibit black-level degradation, increase the luminance, increase the number of gray levels, and suppress variations in light-emitting elements, for example.

As the light-emitting element 60, an organic light-emitting diode (OLED) or a quantum-dot light-emitting diode (QLED) is preferably used, for example. Examples of a light-emitting substance contained in the light-emitting element 60 include a substance exhibiting fluorescence (a fluorescent material), a substance exhibiting phosphorescence (a phosphorescent material), a substance exhibiting thermally activated delayed fluorescence (a thermally activated delayed fluorescent (TADF) material), and an inorganic compound (e.g., a quantum dot material). Alternatively, an LED such as a micro-LED can be used as the light-emitting element 60.

Figure 1D:
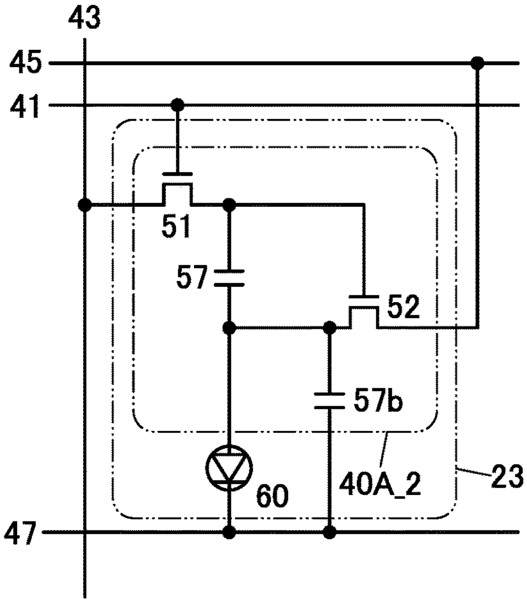

The subpixel 23 illustrated in FIG. 1D includes a pixel circuit 40A_2 and the light-emitting element 60. The pixel circuit 40A_2 includes a capacitor 57*b* in addition to the components of the pixel circuit 40A. One electrode of the capacitor 57*b* is electrically connected to the other of the source and the drain of the transistor 52. The other electrode of the capacitor 57*b* is electrically connected to the wiring 47. By providing the capacitor 57*b* and adjusting its capacitance value, variation in the threshold voltage and mobility of the transistor 52 can be corrected more appropriately.

Figure 1E:
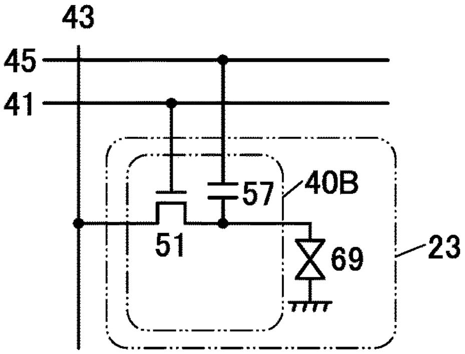

FIG. 1E is a circuit diagram illustrating a configuration example of the subpixel 23. The subpixel 23 illustrated in FIG. 1E includes a pixel circuit 40B and a liquid crystal element 69.

The pixel circuit 40B includes the transistor 51 and the capacitor 57. That is, the pixel circuit 40B is a 1Tr1C-type pixel circuit.

In the pixel circuit 40B, one of the source and the drain of the transistor 51 is electrically connected to the wiring 43. The other of the source and the drain of the transistor 51 is electrically connected to one electrode of the capacitor 57. The one electrode of the capacitor 57 is electrically connected to one electrode of the liquid crystal element 69. The gate of the transistor 51 is electrically connected to the wiring 41. Here, the one electrode of the liquid crystal element 69 is also referred to as a pixel electrode. The other electrode of the liquid crystal element 69 may be referred to as a common electrode.

In the pixel circuit 40B, the transistor 51 has a function of a switch and has a function of controlling the conduction state or the non-conduction state between the wiring 43 and the one electrode of the liquid crystal element 69 on the basis of the potential of the wiring 41. When the transistor 51 is turned on, image data is written to the pixel circuit 40B, and when the transistor 51 is turned off, the written image data is retained.

The capacitor 57 has a function of retaining the potential of the one electrode of the liquid crystal element 69. The alignment state of the liquid crystal element 69 is controlled in accordance with a potential that corresponds to image data and is supplied to the one electrode of the liquid crystal element 69.

The liquid crystal element 69 can employ any of the following modes: a twisted nematic (TN) mode, a super-twisted nematic (STN) mode, a vertical alignment (VA) mode, an axially symmetric aligned micro-cell (ASM) mode, an optically compensated birefringence (OCB) mode, a ferroelectric liquid crystal (FLC) mode, an antiferroelectric liquid crystal (AFLC) mode, an MVA mode, a patterned vertical alignment (PVA) mode, an IPS mode, an FFS mode, and a transverse bend alignment (TBA) mode. Other examples of the mode include an electrically controlled birefringence (ECB) mode, a polymer dispersed liquid crystal (PDLC) mode, a polymer network liquid crystal (PNLC) mode, and a guest-host mode. Note that the present invention is not limited to these modes, and various modes can be employed.

Figure 2A:
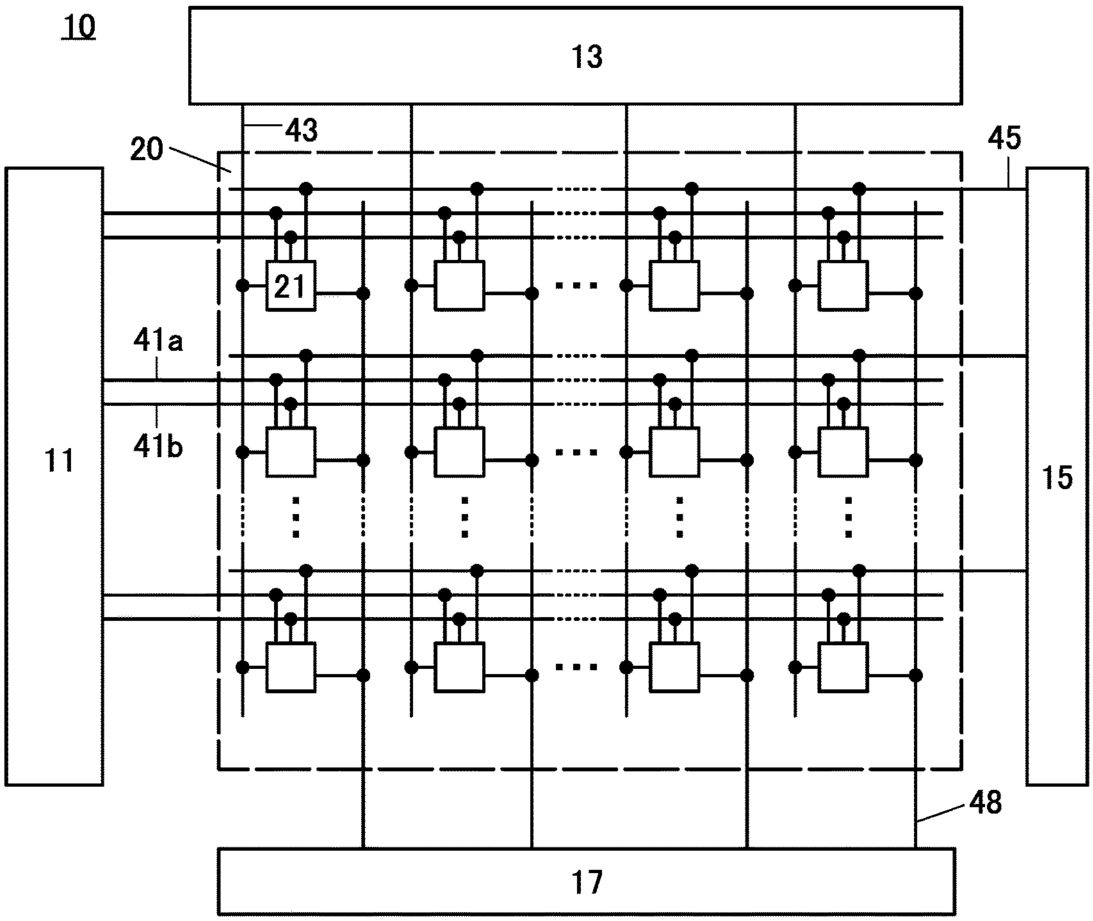
FIG. 2A is a block diagram illustrating a configuration example of a display device and FIG. 2B is a circuit diagram illustrating a configuration example of a pixel.

FIG. 2A is a block diagram illustrating a configuration example of the display device 10, which is a modification example of the display device 10 illustrated in FIG. 1A. The display device 10 illustrated in FIG. 2A is different from the display device 10 illustrated in FIG. 1A in including wirings 41*a* and 41*b* as the wiring 41 and including a reference potential generation circuit 17.

The reference potential generation circuit 17 is electrically connected to the pixels 21 through wirings 48. For example, all the pixels 21 can be electrically connected to the reference potential generation circuit 17 through the wirings 48. The reference potential generation circuit 17 has a function of generating a reference potential and supplying it to the wiring 48. The potential of the wiring 48 is a reference potential and thus the wiring 48 can be referred to as a reference potential line. Note that the electrical characteristics of the pixels may be read out to the reference potential generation circuit 17 outside the pixels through the wirings 48. That is, the reference potential generation circuit 17 may have a function of sensing the electrical characteristics of the pixels. By reading the electrical characteristics of the pixels with the reference potential generation circuit 17, deterioration, variation, and the like of elements (a transistor, a light-emitting element, and the like) in each pixel may be sensed. By feeding back the read characteristics to a video signal, deterioration and variation of image quality may be corrected.

Figure 2B:
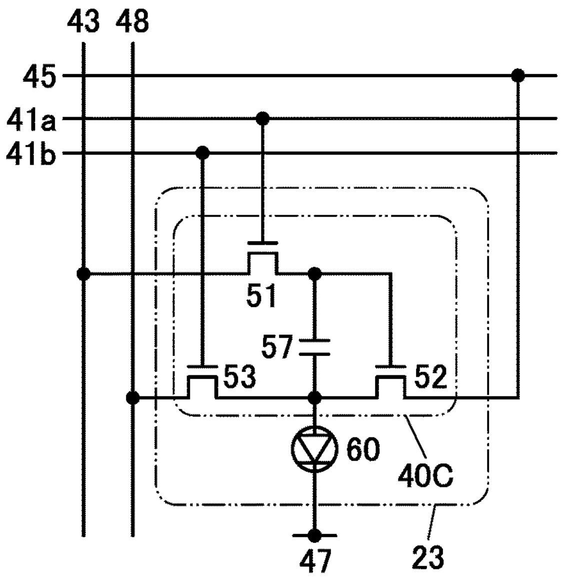

FIG. 2B is a circuit diagram illustrating a configuration example of the subpixel 23 included in the pixel 21 illustrated in FIG. 2A. The subpixel 23 illustrated in FIG. 2B includes a pixel circuit 40C and the light-emitting element 60. The pixel circuit 40C has a structure in which a transistor 53 is added to the pixel circuit 40A. The pixel circuit 40C is a 3Tr1C-type pixel circuit.

In the pixel circuit 40C, the gate of the transistor 51 is electrically connected to the wiring 41*a*. One of a source and a drain of the transistor 53 is electrically connected to the other of the source and the drain of the transistor 52, the other electrode of the capacitor 57, and one electrode of the light-emitting element 60. The other of the source and the drain of the transistor 53 is electrically connected to the wiring 48. A gate of the transistor 53 is electrically connected to the wiring 41*b*.

The transistor 53 has a function of a switch and has a function of controlling the conduction state or the non-conduction state between the wiring 48 and the one electrode of the light-emitting element 60 on the basis of the potential of the wiring 41*b*. A reference potential is supplied to the wiring 48, for example. Variations in the gate-source voltage of the transistor 52 can be inhibited by the reference potential of the wiring 48 supplied through the transistor 53.

A current value that can be used for setting of pixel parameters can be obtained with the use of the wiring 48. Specifically, the wiring 48 can function as a monitor line for outputting current flowing through the transistor 52 or current flowing through the light-emitting element 60 to the outside of the pixel 21. Current output to the wiring 48 can be converted into a potential by a source follower circuit, for example. Alternatively, the current can be converted into a digital signal by an A/D converter, for example. In the case where the wiring 48 functions as a monitor line, the display device 10 does not necessarily include the reference potential generation circuit 17. In the case where the wiring 48 functions as a monitor line, the columns including the pixels 21 can be electrically connected to the respective wirings 48.

An OS transistor is preferably used as the transistor 53. As described above, an OS transistor has much higher field-effect mobility than a transistor containing amorphous silicon, for example. Thus, by using an OS transistor as the transistor 53, the display device 10 can be driven at high speed.

Figure 3A:
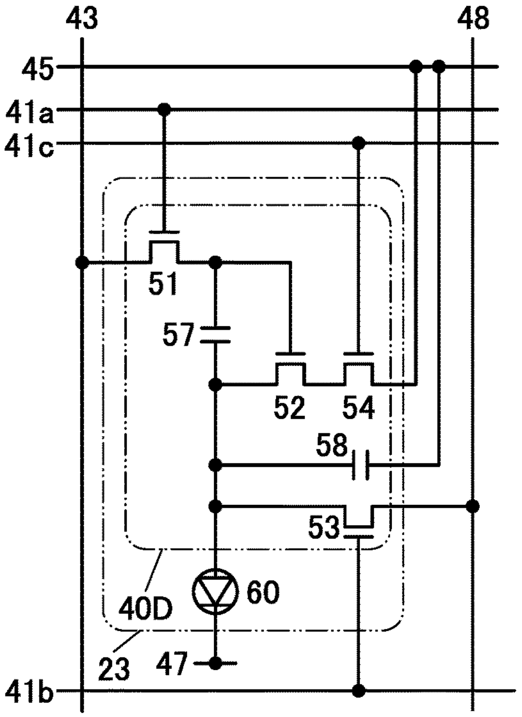
FIGS. 3A to 3C are circuit diagrams illustrating configuration examples of a pixel.
Figure 3B:
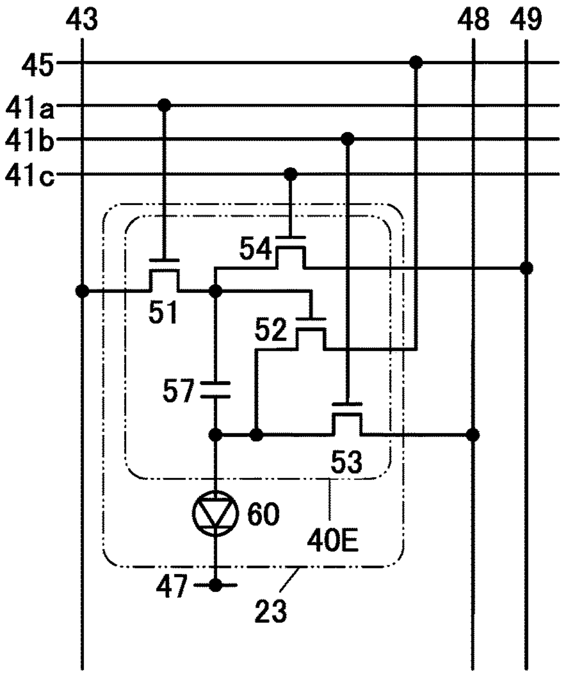
Figure 3C:
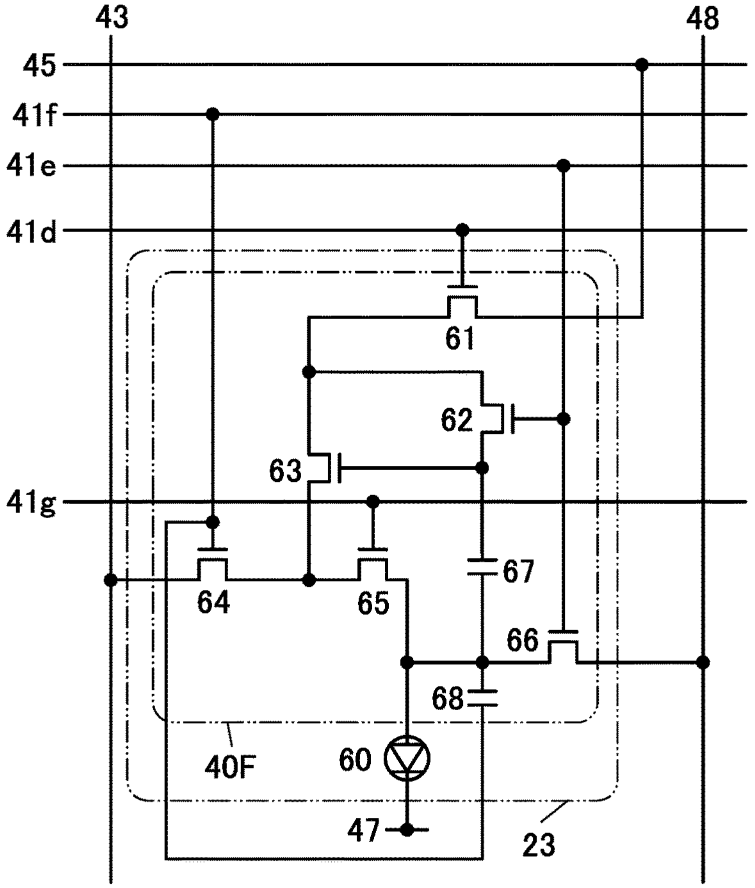

FIGS. 3A to 3C are circuit diagrams illustrating configuration examples of the subpixel 23 included in the pixel 21 illustrated in FIG. 2A. The subpixel 23 illustrated in FIG. 3A includes a pixel circuit 40D and the light-emitting element 60. The pixel circuit 40D has a structure in which a transistor 54 and a capacitor 58 are added to the pixel circuit 40C. The pixel circuit 40D is a 4Tr2C-type pixel circuit.

In the pixel circuit 40D, one of the source and the drain of the transistor 52 is electrically connected to one of a source and a drain of the transistor 54. The other of the source and the drain of the transistor 54 is electrically connected to the wiring 45. A gate of the transistor 54 is electrically connected to a wiring 41*c*. One electrode of the capacitor 58 is electrically connected to the other of the source and the drain of the transistor 52, one of the source and the drain of the transistor 53, the other electrode of the capacitor 57, and one electrode of the light-emitting element 60. The other electrode of the capacitor 58 is electrically connected to the wiring 45.

The wiring 41c is electrically connected to the scan line driver circuit 11. In other words, in the case where the subpixel 23 included in the pixel 21 has the structure illustrated in FIG. 3A, the wirings 41a, 41b, and 41c are provided as the wiring 41 in the display device 10.

The transistor 54 has a function of a switch and has a function of controlling the conduction state or the non-conduction state between the wiring 45 and the one of the source and the drain of the transistor 52 on the basis of the potential of the wiring 41c.

When the transistor 54 is turned on, current corresponding to the gate potential of the transistor 52 flows from the wiring 45 to the wiring 47, for example. Thus, the light-emitting element 60 emits light with a luminance corresponding to the gate potential of the transistor 52. Meanwhile, when the transistor 54 is turned off, current can be made not to flow through the light-emitting element 60; thus, the light-emitting element 60 can be made not to emit light.

An OS transistor is preferably used as the transistor 54. As described above, an OS transistor has much higher field-effect mobility than a transistor containing amorphous silicon, for example. Thus, by using an OS transistor as the transistor 54, the display device 10 can be driven at high speed.

The subpixel 23 illustrated in FIG. 3B includes a pixel circuit 40E and the light-emitting element 60. The pixel circuit 40E has a structure in which the transistor 54 is added to the pixel circuit 40C. The pixel circuit 40E is a 4Tr1C-type pixel circuit.

In the pixel circuit 40E, one of the source and the drain of the transistor 54 is electrically connected to the other of the source and the drain of the transistor 51, the gate of the transistor 52, and one electrode of the capacitor 57. The other of the source and the drain of the transistor 54 is electrically connected to a wiring 49. The gate of the transistor 54 is electrically connected to the wiring 41c. In the case where the subpixel 23 has the structure illustrated in FIG. 3B, the wirings 41a, 41b, and 41c are provided as the wiring 41 in the display device 10.

When the transistor 54 is turned on, the gate potential of the transistor 52 can be the potential of the wiring 49. Accordingly, current can be made not to flow through the light-emitting element 60; thus, the light-emitting element 60 can be made not to emit light.

The subpixel 23 illustrated in FIG. 3C includes a pixel circuit 40F and the light-emitting element 60.

The pixel circuit 40F includes a transistor 61, a transistor 62, a transistor 63, a transistor 64, a transistor 65, a transistor 66, a capacitor 67, and a capacitor 68. That is, the pixel circuit 40F is a 6Tr2C-type pixel circuit.

In the pixel circuit 40F, one of a source and a drain of the transistor 61 is electrically connected to the wiring 45. The other of the source and the drain of the transistor 61 is electrically connected to one of a source and a drain of the transistor 62. The one of the source and the drain of the transistor 62 is electrically connected to one of a source and a drain of the transistor 63. A gate of the transistor 61 is electrically connected to a wiring 41d.

The other of the source and the drain of the transistor 62 is electrically connected to a gate of the transistor 63. The gate of the transistor 63 is electrically connected to one electrode of the capacitor 67. A gate of the transistor 62 is electrically connected to a wiring 41e.

One of a source and a drain of the transistor 64 is electrically connected to the wiring 43. The other of the source and the drain of the transistor 64 is electrically connected to the other of the source and the drain of the transistor 63. The other of the source and the drain of the transistor 63 is electrically connected to the other of a source and a drain of the transistor 65. A gate of the transistor 64 is electrically connected to a wiring 41f.

The other of the source and the drain of the transistor 65 is electrically connected to one of a source and a drain of the transistor 66. The one of the source and the drain of the transistor 66 is electrically connected to the other electrode of the capacitor 67. The other electrode of the capacitor 67 is electrically connected to one electrode of the capacitor 68. The one electrode of the capacitor 68 is electrically connected to one electrode of the light-emitting element 60. A gate of the transistor 65 is electrically connected to a wiring 41g.

The other of the source and the drain of the transistor 66 is electrically connected to the wiring 48. A gate of the transistor 66 is electrically connected to the wiring 41e.

The other electrode of the capacitor 68 is electrically connected to the wiring 41f. The other electrode of the light-emitting element 60 is electrically connected to the wiring 47.

The wirings 41d, 41e, 41f, and 41g are electrically connected to the scan line driver circuit 11. In other words, in the case where the subpixel 23 included in the pixel 21 has the structure illustrated in FIG. 3C, the wirings 41d, 41e, 41f, and 41g are provided as the wiring 41 in the display device 10.

The transistors 61, 62, 64, 65, and 66 each have a function of a switch. The transistor 61 has a function of controlling the conduction state or the non-conduction state between the wiring 45 and the one of the source and the drain of the transistor 62 and between the wiring 45 and the one of the source and the drain of the transistor 63 on the basis of the potential of the wiring 41d. The transistor 62 has a function of controlling the conduction state or the non-conduction state between the other of the source and the drain of the transistor 61 and the one of the source and the drain of the transistor 63 and between the gate of the transistor 63 and the one electrode of the capacitor 67 on the basis of the potential of the wiring 41e. The transistor 64 has a function of controlling the conduction state or the non-conduction state between the wiring 43 and the other of the source and the drain of the transistor 63 and between the wiring 43 and the one of the source and the drain of the transistor 65 on the basis of the potential of the wiring 41f. The transistor 65 has a function of controlling the conduction state or the non-conduction state between the one electrode of the light-emitting element 60 and the other of the source and the drain of the transistor 63 and between the one electrode of the light-emitting element 60 and the other of the source and the drain of the transistor 64 on the basis of the potential of the wiring 41g. The transistor 66 has a function of controlling the conduction state or the non-conduction state between the wiring 48 and the one electrode of the light-emitting element 60 on the basis of the potential of the wiring 41e.

OS transistors are preferably used as the transistors 61 to 66. An OS transistor has much higher field-effect mobility than a transistor containing amorphous silicon, for example. Thus, by using OS transistors as the transistors 61 to 66, the display device 10 can be driven at high speed.

[Structure Examples of Transistor]

Figure 4A:
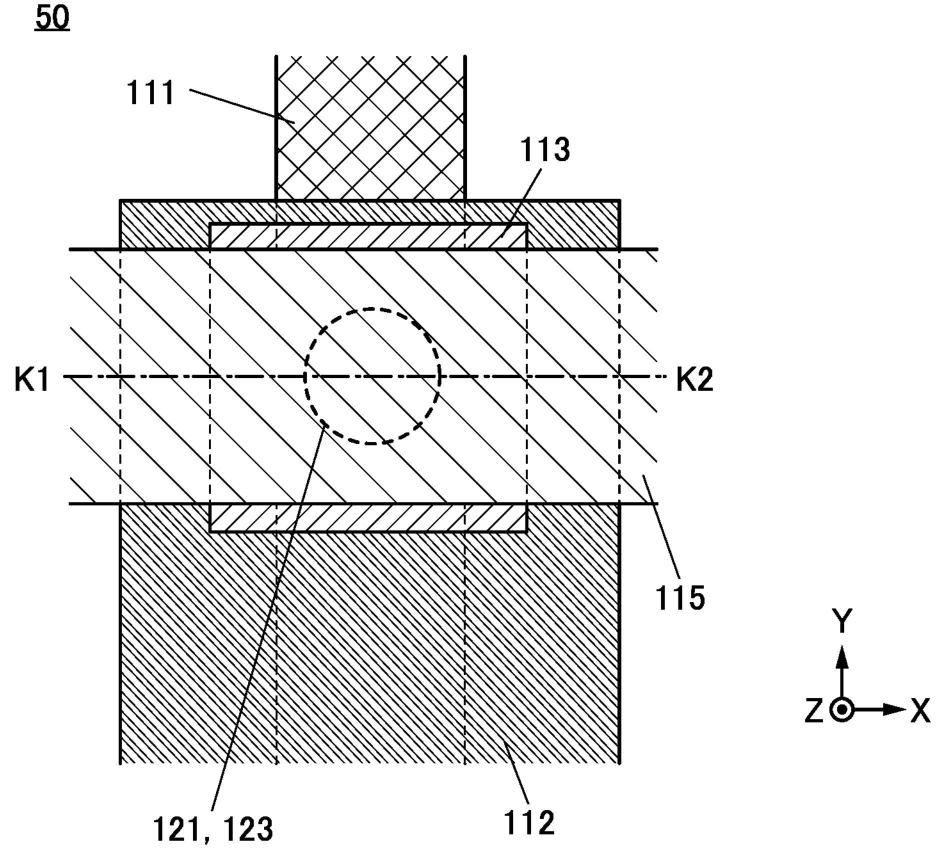
FIG. 4A is a plan view illustrating a structure example of a transistor and FIG. 4B is a cross-sectional view illustrating the structure example of the transistor.
Figure 4B:
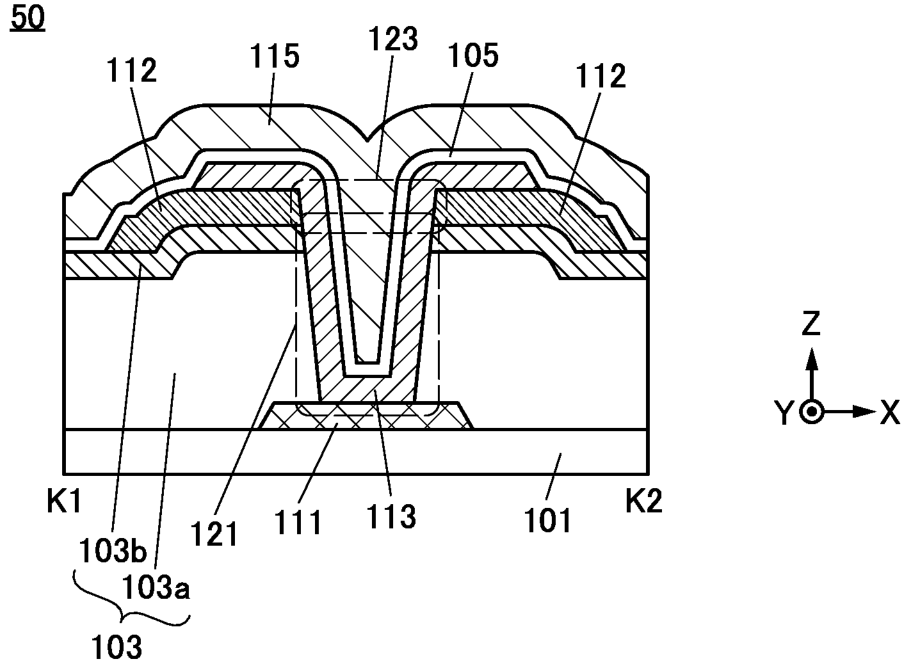

FIGS. 4A and 4B illustrate a structure example of a transistor of one embodiment of the present invention.

FIG. 4A is a plan view illustrating a structure example of a semiconductor device included in a display device of one embodiment of the present invention. Specifically, FIG. 4A is a plan view illustrating a structure of a transistor 50 included in the display device of one embodiment of the present invention and the vicinity thereof. FIG. 4B is a cross-sectional view taken along dashed-dotted line K1-K2 in FIG. 4A. Note that in FIG. 4A, some components of the transistor 50, such as an insulating layer, are not illustrated. For example, also in the following plan views of transistors, some components, such as an insulating layer, are not illustrated.

The transistor 50 is provided over a substrate 101. The transistor 50 includes a conductive layer 111, a conductive layer 112, a semiconductor layer 113, an insulating layer 105, and a conductive layer 115.

In FIGS. 4A and 4B, the direction where the conductive layer 115 extends is referred to as the X direction. The direction perpendicular to the X direction and parallel to a top surface of the substrate 101, for example, is referred to as the Y direction. The direction perpendicular the top surface of the substrate 101 is referred to as the Z direction. The definition of the X, Y, and Z directions applies in some drawings and does not apply in other drawings. The X, Y, and Z directions can be regarded as perpendicular to one another.

The conductive layer 111 functions as one of a source electrode and a drain electrode of the transistor 50. The conductive layer 112 functions as the other of the source electrode and the drain electrode of the transistor 50. The insulating layer 105 functions as a gate insulating layer of the transistor 50. The conductive layer 115 functions as a gate electrode of the transistor 50.

In the semiconductor layer 113, the whole region that is between the source electrode and the drain electrode and overlaps with the gate electrode with the gate insulating layer therebetween functions as a channel formation region. In the semiconductor layer 113, a region in contact with the source electrode functions as a source region and a region in contact with the drain electrode functions as a drain region.

The conductive layer 111 is provided over the substrate 101, an insulating layer 103 is provided over the substrate 101 and the conductive layer 111, and the conductive layer 112 is provided over the insulating layer 103. The insulating layer 103 can have a function of an interlayer insulating layer. The conductive layers 111 and 112 partly overlap with each other with the insulating layer 103 therebetween. FIG. 4B illustrates an example in which the insulating layer 103 has a two-layer structure of an insulating layer 103*a* and an insulating layer 103*b* over the insulating layer 103*a*.

The insulating layer 103 has an opening 121 reaching the conductive layer 111. The conductive layer 112 has an opening 123 reaching the opening 121. That is, the opening 123 includes a region overlapping with the opening 121.

The conductive layer 112 has the opening 123 in a region overlapping with the conductive layer 111. The conductive layer 112 can be formed to surround the periphery of the opening 121 in a plan view. The conductive layer 112 is preferably absent in the opening 121. In other words, preferably, the conductive layer 112 is not in contact with a side surface of the insulating layer 103 on the opening 121 side.

FIG. 4A each shows an example in which each of the openings 121 and 123 are circular in a plan view. High processing accuracy to form each of the openings 121 and 123 in a minute size is possible when the planar shapes of the openings 121 and 123 are each circular. Note that in this specification and the like, a circle is not limited to a perfect circle. For example, the planar shapes of the openings 121 and 123 may be elliptical.

FIG. 4B illustrates an example in which an end portion of the conductive layer 112 on the opening 123 side is the same or substantially the same as an end portion of the insulating layer 103 on the opening 121 side. In other words, the planar shape of the opening 123 is the same or substantially the same as the planar shape of the opening 121. Note that here, the end portion of the conductive layer 112 on the opening 123 side refers to an end portion of a bottom surface of the conductive layer 112 on the opening 123 side. The bottom surface of the conductive layer 112 refers to a surface on the insulating layer 103 side. The end portion of the insulating layer 103 on the opening 121 side refers to an end portion of a top surface of the insulating layer 103 on the opening 121 side. The top surface of the insulating layer 103 refers to a surface on the conductive layer 112 side. The planar shape of the opening 123 refers to the planar shape of the end portion of the bottom surface of the conductive layer 112 on the opening 123 side. The planar shape of the opening 121 refers to the planar shape of the end portion of the top surface of the insulating layer 103 on the opening 121 side.

In the case where end portions are the same or substantially the same, the end portions can also be said to be aligned or substantially aligned with each other. In the case where end portions are aligned or substantially aligned with each other and the case where planar shapes are the same or substantially the same, it can be said that outlines of stacked layers overlap with each other at least partly in a plan view. For example, the case of patterning or partly patterning an upper layer and a lower layer with the use of the same mask pattern is included. The expression "end portions are aligned or substantially aligned with each other" or "planar shapes are the same or substantially the same" also includes the case where the outlines do not completely overlap with each other; for instance, the end portion of the upper layer may be positioned on the inner side or the outer side compared to the end portion of the lower layer.

The opening 121 can be formed using a resist mask used for formation of the opening 123, for example. Specifically, first, the conductive layer 111 is formed over the substrate 101, the insulating layer 103 is formed over the substrate 101 and the conductive layer 111, a conductive film to be the conductive layer 112 is formed over the insulating layer 103, and a resist mask is formed over the conductive film. After that, the opening 123 is formed in the conductive film using the resist mask and then the opening 121 is formed in the insulating layer 103 using the resist mask, whereby an end portion of the opening 121 and an end portion of the opening 123 can be the same or substantially the same. With such a structure, the process can be simplified.

The semiconductor layer 113 is provided to cover the openings 121 and 123 and include a region positioned in the openings 121 and 123. The semiconductor layer 113 has a shape along the shapes of top and side surfaces of the conductive layer 112, a side surface of the insulating layer 103, and a top surface of the conductive layer 111. The semiconductor layer 113 includes a region in contact with, for example, the top and side surfaces of the conductive layer 112, the side surface of the insulating layer 103, and the top surface of the conductive layer 111.

The semiconductor layer 113 preferably covers the end portion of the conductive layer 112 on the opening 123 side. In FIG. 4B, an end portion of the semiconductor layer 113 is positioned over the conductive layer 112. That is, the end portion of the semiconductor layer 113 is in contact with the top surface of the conductive layer 112.

Although the semiconductor layer 113 has a single-layer structure in FIG. 4B and the like, one embodiment of the present invention is not limited thereto. The semiconductor layer 113 may have a stacked-layer structure of two or more layers.

The insulating layer 105 functioning as the gate insulating layer of the transistor 50 is provided to cover the openings 121 and 123 and include a region positioned in the openings 121 and 123. The insulating layer 105 is provided over the semiconductor layer 113, the conductive layer 112, and the insulating layer 103. The insulating layer 105 can include a region in contact with top and side surfaces of the semiconductor layer 113, the top and side surfaces of the conductive layer 112, and the top surface of the insulating layer 103. The insulating layer 105 has a shape along the shapes of the top surface of the insulating layer 103, the top and side surfaces of the conductive layer 112, and the top and side surfaces of the semiconductor layer 113.

The conductive layer 115 functioning as the gate electrode of the transistor 50 can be provided over the insulating layer 105 and include a region in contact with a top surface of the insulating layer 105. The conductive layer 115 includes a region overlapping with the semiconductor layer 113 with the insulating layer 105 therebetween. The conductive layer 115 has a shape along the top surface of the insulating layer 105.

For example, as illustrated in FIG. 4B, the conductive layer 115 includes a region overlapping with the semiconductor layer 113 with the insulating layer 105 therebetween in the openings 121 and 123. Moreover, in the example illustrated in FIG. 4B, the conductive layer 115 includes regions overlapping with the conductive layers 111 and 112 with the insulating layer 105 and the semiconductor layer 113 therebetween. The conductive layer 115 covers the entire semiconductor layer 113 in the opening 121. With such a structure, a gate electric field can be applied to the entire semiconductor layer 113, which allows the transistor 50 to have better electrical characteristics, such as a higher on-state current.

FIG. 4A illustrates an example in which the conductive layer 111 extends in the Y direction, the conductive layer 115 extends in the X direction, and the opening 123 is provided in a region where the extending conductive layer 111 overlaps with the extending conductive layer 115. Here, it can be said that the conductive layer 111 is a wiring extending in the Y direction, the conductive layer 115 is a wiring extending in the X direction, and the opening 123 is provided to overlap with an intersection point of the wiring extending in the X direction and the wiring extending in the Y direction.

The transistor 50 is a so-called top-gate transistor, in which the gate electrode is provided above the semiconductor layer 113. Furthermore, since a bottom surface of the semiconductor layer 113 includes a region in contact with the source electrode and the drain electrode, the transistor 50 can be referred to as a top-gate bottom-contact (TGBC) transistor.

The transistor 50 can be used as at least one of the transistors included in the pixel 21, for example. For example, the transistor 50 can be used as at least one of the transistors 51 to 54 and 61 to 66. The transistor 50 may be used as at least one of the transistors included in the scan line driver circuit 11, the signal line driver circuit 13, the power supply circuit 15, and the reference potential generation circuit 17.

Figure 5A:
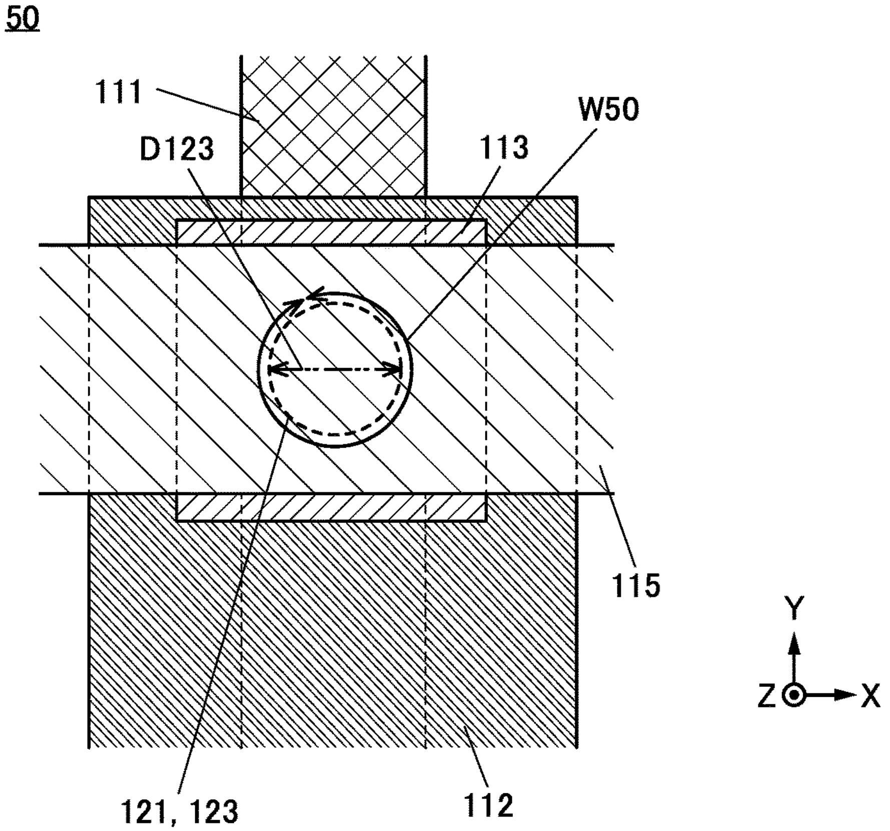
FIG. 5A is a plan view illustrating a structure example of a transistor and FIG. 5B is a cross-sectional view illustrating the structure example of the transistor.
Figure 5B:
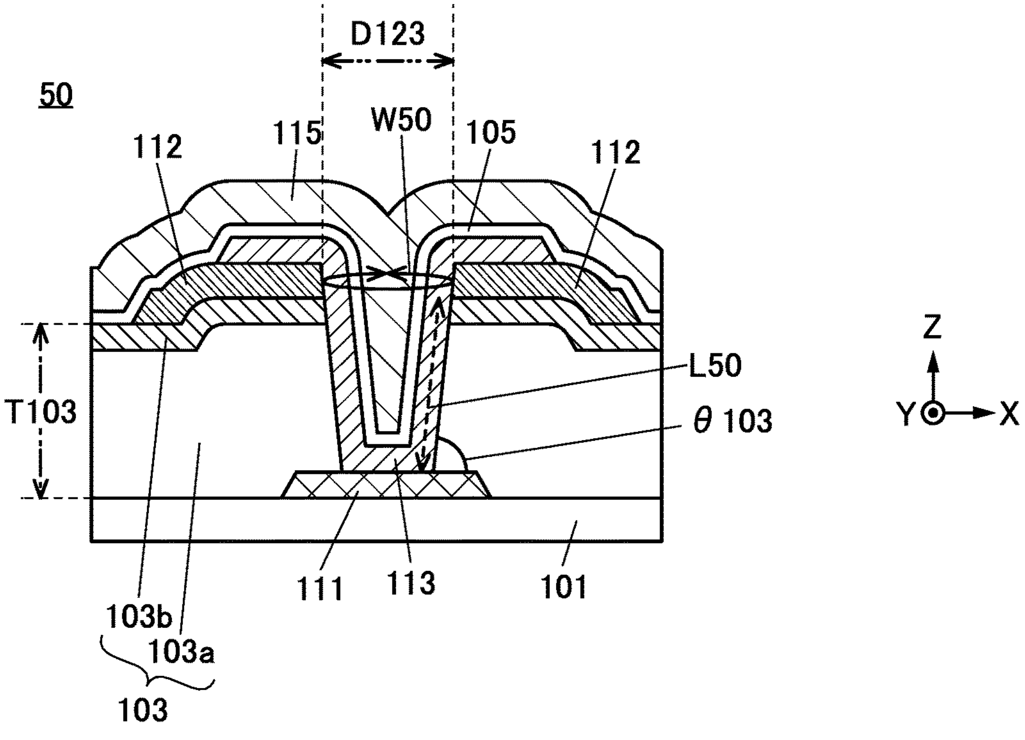

Here, the channel length and the channel width of the transistor 50 will be described with reference to FIGS. 5A and 5B. Like FIG. 4A, FIG. 5A is a plan view illustrating a structure example of the transistor 50 and the vicinity thereof. Like FIG. 4B, FIG. 5B is a plan view illustrating a structure example of the transistor 50 and the vicinity thereof.

In the semiconductor layer 113, a region in contact with the conductive layer 111 functions as one of a source region and a drain region, a region in contact with the conductive layer 112 functions as the other of the source region and the drain region, and a region between the source region and the drain region functions as a channel formation region.

The channel length of the transistor 50 is a distance between the source region and the drain region. In FIG. 5B, a channel length L50 of the transistor 50 is indicated by a dashed double-headed arrow. In a cross-sectional view, the channel length L50 is a distance between an end portion of the region where the semiconductor layer 113 is in contact with the conductive layer 111 and an end portion of the region where the semiconductor layer 113 is in contact with the conductive layer 112.

Here, the channel length L50 of the transistor 50 corresponds to the length of a side surface of the insulating layer 103 on the opening 121 side when seen from an XZ plane. That is, the channel length L50 is determined depending on a thickness T103 of the insulating layer 103 and an angle θ103 formed between the side surface of the insulating layer 103 on the opening 121 side and a surface on which the insulating layer 103 is formed (here, the top surface of the conductive layer 111), and is not affected by the performance of a light-exposure apparatus used for manufacturing the transistor. Thus, the channel length L50 can be a smaller value than the resolution limit of the light-exposure apparatus and thus the transistor can be miniaturized. For example, the channel length L50 is preferably longer than or equal to 0.010 μm and shorter than 3.0 μm, further preferably longer than or equal to 0.050 μm and shorter than 3.0 μm, further preferably longer than or equal to 0.10 μm and shorter than 3.0 μm, further preferably longer than or equal to 0.15 μm and shorter than 3.0 μm, further preferably longer than or equal to 0.20 μm and shorter than 3.0 μm, further preferably longer than or equal to 0.20 μm and shorter than 2.5 μm, further preferably longer than or equal to 0.20 μm and shorter than 2.0 μm, further preferably longer than or equal to 0.20 μm and shorter than 1.5 μm, further preferably longer than or equal to 0.30 μm and shorter than 1.5 μm, further preferably longer than or equal to 0.30 μm and shorter than or equal to 1.2 μm, further preferably longer than or equal to 0.40 μm and shorter than or equal to 1.2 μm, further preferably longer than or equal to 0.40 μm and shorter than or equal to 1.0 μm, further preferably longer than or equal to 0.50 μm and shorter than or equal to 1.0 μm. In FIG. 5B, the thickness T103 of the insulating layer 103 is indicated by a dashed-dotted double-headed arrow.

When the transistor 50 is used as the transistor included in the pixel 21, the transistor included in the pixel 21 can be miniaturized, and the pixel 21 can be miniaturized. Accordingly, the display device 10 can be a high-definition display device. The transistor 50 with a short channel length L50 can have a high on-state current. Thus, with the use of the transistor 50 as the transistor included in the display device 10, such as the transistor included in the pixel 21, the display device 10 can be driven at high speed.

The channel length L50 can be controlled by adjusting the thickness T103 and the angle θ103 of the insulating layer 103.

The thickness T103 of the insulating layer 103 is preferably larger than or equal to 0.010 μm and smaller than 3.0 μm, further preferably larger than or equal to 0.050 μm and smaller than 3.0 μm, further preferably larger than or equal to 0.10 μm and smaller than 3.0 μm, further preferably larger than or equal to 0.15 μm and smaller than 3.0 μm, further preferably larger than or equal to 0.20 μm and smaller than 3.0 μm, further preferably larger than or equal to 0.20 μm and smaller than 2.5 m, further preferably larger than or equal to 0.20 μm and smaller than 2.0 μm, further preferably larger than or equal to 0.20 μm and smaller than 1.5 μm, further preferably larger than or equal to 0.30 μm and smaller than 1.5 μm, further preferably larger than or equal to 0.30 μm and smaller than or equal to 1.2 μm, further preferably larger than or equal to 0.40 μm and smaller than or equal to 1.2 μm, further preferably larger than or equal to 0.40 μm and smaller than or equal to 1.0 μm, further preferably larger than or equal to 0.50 μm and smaller than or equal to 1.0 μm.

The side surface of the insulating layer 103 on the opening 121 side preferably has a tapered shape. The angle θ103 formed between the side surface of the insulating layer 103 on the opening 121 side and the surface on which the insulating layer 103 is formed (here, the top surface of the conductive layer 111) is preferably smaller than 90°. By reducing the angle θ103, coverage with the layer (e.g., the semiconductor layer 113) over the insulating layer 103 can be improved. However, reducing the angle θ103 might reduce the contact area between the semiconductor layer 113 and the conductive layer 111 to increase the contact resistance between the semiconductor layer 113 and the conductive layer 111. The angle θ103 is preferably larger than or equal to 450 and smaller than 90°, further preferably larger than or equal to 50° and smaller than 90°, further preferably larger than or equal to 550 and smaller than 90°, further preferably larger than or equal to 60° and smaller than 90°, further preferably larger than or equal to 60° and smaller than or equal to 85°, further preferably larger than or equal to 65° and smaller than or equal to 85°, further preferably larger than or equal to 65° and smaller than or equal to 80°, further preferably larger than or equal to 700 and smaller than or equal to 80°. When the angle θ103 is in the above range, the coverage with the layer (e.g., the semiconductor layer 113) over the conductive layer 111 and the insulating layer 103 can be improved and a defect such as step disconnection or a void can be inhibited from occurring in the layer. In addition, the contact resistance between the semiconductor layer 113 and the conductive layer 111 can be reduced.

Although FIG. 5B and the like illustrate a structure in which the side surface of the insulating layer 103 on the opening 121 side is linear in a cross-sectional view, one embodiment of the present invention is not limited thereto. In a cross-sectional view, the side surface of the insulating layer 103 on the opening 121 side may be curved or include both a linear region and a curved region.

The channel width of the transistor 50 is the width of the source region or the drain region in a direction orthogonal to the channel length direction. In other words, the channel width is the width of the region where the semiconductor layer 113 is in contact with the conductive layer 111 or the width of the region where the semiconductor layer 113 is in contact with the conductive layer 112 in the direction orthogonal to the channel length direction. Here, the channel width of the transistor 50 is described as the width of the region where the semiconductor layer 113 is in contact with the conductive layer 112 in the direction orthogonal to the channel length direction. In FIGS. 5A and 5B, a channel width W50 of the transistor 50 is indicated by a solid double-headed arrow. In a plan view, the channel width W50 is the length of the end portion of the bottom surface of the conductive layer 112 on the opening 123 side.

The channel width W50 is determined depending on the planar shape of the opening 123. In FIGS. 5A and 5B, a width D123 of the opening 123 is denoted by a dashed double-dotted double-headed arrow. The width D123 is the shorter side of the smallest rectangle circumscribing the opening 123 in a plan view. When the opening 123 is formed by a photolithography method, the width D123 of the opening 123 is larger than or equal to the resolution limit of the light-exposure apparatus. For example, the width D123 is preferably larger than or equal to 0.20 μm and smaller than 5.0 μm, further preferably larger than or equal to 0.20 μm and smaller than 4.5 μm, further preferably larger than or equal to 0.20 μm and smaller than 4.0 μm, further preferably larger than or equal to 0.20 μm and smaller than 3.5 μm, further preferably larger than or equal to 0.20 μm and smaller than 3.0 μm, further preferably larger than or equal to 0.20 μm and smaller than 2.5 μm, further preferably larger than or equal to 0.20 μm and smaller than 2.0 μm, further preferably larger than or equal to 0.20 μm and smaller than 1.5 μm, further preferably larger than or equal to 0.30 μm and smaller than 1.5 μm, further preferably larger than or equal to 0.30 μm and smaller than or equal to 1.2 μm, further preferably larger than or equal to 0.40 μm and smaller than or equal to 1.2 μm, further preferably larger than or equal to 0.40 μm and smaller than or equal to 1.0 μm, further preferably larger than or equal to 0.50 μm and smaller than or equal to 1.0 μm. Note that when the planar shape of the opening 123 is circular, the width D123 corresponds to the diameter of the opening 123, the channel width W50 can be equal to the length of the periphery of the opening 123 in a plan view and calculated to be "D123×π".

Structure examples each including a pixel circuit are described below. The components of FIG. 1C or 1D or FIG. 6A described later are used for describing the structures illustrated in FIGS. 6B to 6D, FIGS. 7A to 7C, FIGS. 8A to 8C, FIGS. 9A and 9B, FIG. 10, FIG. 11, FIG. 12, FIGS. 13A and 13B, FIG. 14, FIG. 15, FIG. 16, FIGS. 17A and 17B, FIGS. 18A to 18C, FIGS. 19A and 19B, FIGS. 20A to 20D, FIGS. 21A and 21B, FIG. 22, FIG. 23, FIG. 24, FIG. 25, and FIGS. 26A to 26C. The structures illustrated in FIG. 6B to FIG. 26C can be employed for, for example, the circuit diagrams in FIG. 2B to FIG. 3C as appropriate. For example, the structures of one or more of a plurality of transistors and one or more of a plurality of wirings included in the structures illustrated in FIG. 6B to FIG. 26C can be employed for those included in FIG. 2B to FIG. 3C as appropriate.

Figure 6A:
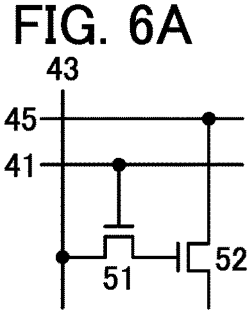
FIG. 6A is a circuit diagram illustrating a configuration example including a pixel circuit.
Figure 6D:
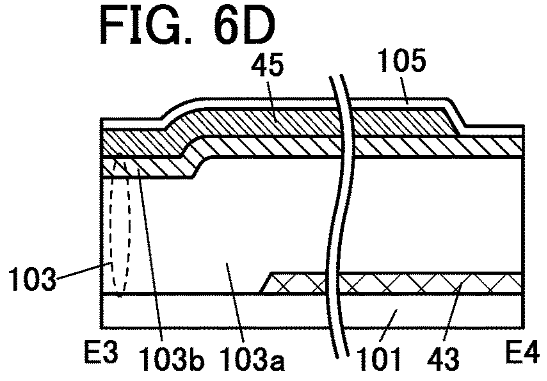
FIGS. 6C and 6D are cross-sectional views illustrating the structure example including the pixel circuit.
Figure 6B:
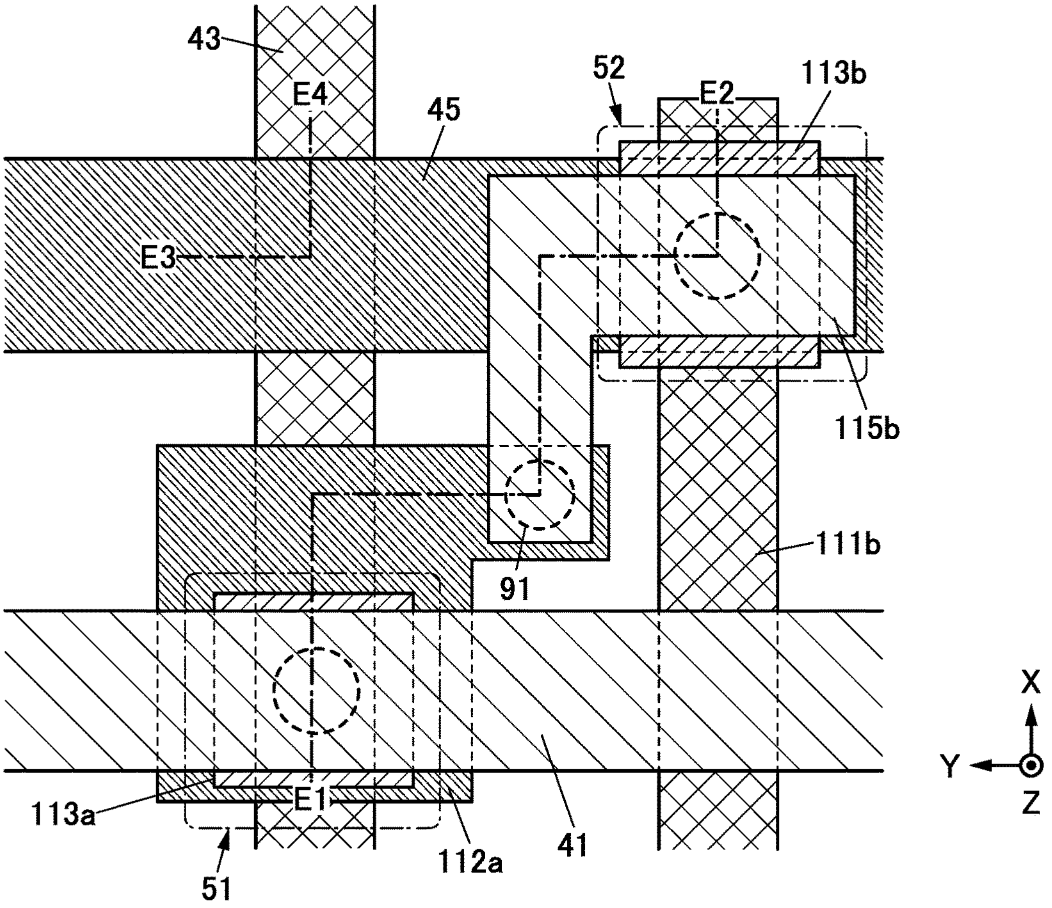
FIG. 6B is a plan view illustrating a structure example including a pixel circuit.
Figure 6C:
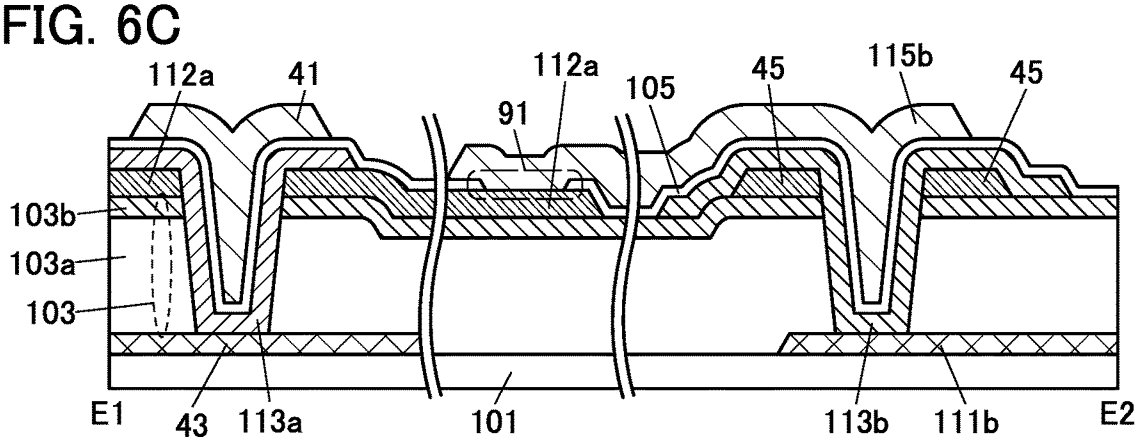

Specifically, for example, the structure of the transistor 51 illustrated in FIGS. 6B and 6C can be employed for any one of the transistors 61 to 66 included in FIG. 3C.

[Structure Example Including a Plurality of Transistors]

FIG. 6A shows a circuit diagram illustrating some of the components illustrated in FIG. 1C and the like. The circuit diagram in FIG. 6A includes the transistors 51 and 52 and the wirings 41, 43, and 45.

FIG. 6B illustrates a structure example applicable to the circuit diagram in FIG. 6A. The wirings 41 and 45 are wirings extending in the Y direction. The wiring 43 is a wiring extending in the X direction and intersecting with the wirings 41 and 45. FIG. 6C is a cross-sectional view taken along dashed-dotted line E1-E2 in FIG. 6B. FIG. 6D is a cross-sectional view taken along dashed-dotted line E3-E4 in FIG. 6B.

The wirings 43 and 45 are wirings positioned at different levels and the wiring 45 is positioned above the wiring 43. The insulating layer 103 is provided between the wiring 43 and the wiring 45.

The wirings 45 and 41 are wirings positioned at different levels and the wiring 41 is positioned above the wiring 45. The wiring 41 includes, for example, a region positioned at a higher level than a top surface of the wiring 45 by the thicknesses of the semiconductor layer 113*a* and the insulating layer 105. In addition, the wiring 41 includes, for example, a region positioned at a higher level than the top surface of the wiring 45 by the thickness of the insulating layer 105. The wiring 41 and the wiring 45 are arranged parallel or substantially parallel to each other in a plan view.

The wiring 43 can function as one of the source electrode and the drain electrode of the transistor 51. A semiconductor layer 113*a* of the transistor 51 includes a region overlapping with the wiring 43. The semiconductor layer 113*a* is provided to be in contact with a top surface of the wiring 43.

The wiring 41 can function as the gate electrode of the transistor 51.

The insulating layer 105 is provided between the semiconductor layer 113*a* and the wiring 41. The insulating layer 105 has a function of a gate insulating layer of the transistor 51.

The wiring 45 can function as one of the source electrode and the drain electrode of the transistor 52. A semiconductor layer 113*b* of the transistor 52 is provided to be in contact with a top surface of a conductive layer 111*b* functioning as the other of the source electrode and the drain electrode of the transistor 52. A conductive layer 115*b* functions as the gate electrode of the transistor 52.

An opening 91 is provided in the insulating layer 105. In a region overlapping with the opening 91, the conductive layer 115*b* is preferably in contact with a top surface of a conductive layer 112*a*.

The description of the transistor 50 illustrated in FIGS. 4A and 4B and the like is applicable to the transistors 51 and 52 in the structure example illustrated in FIGS. 6B and 6C. For the components of the transistors 51 and 52, for example, the description of the corresponding components of the transistor 50 can be referred to.

It can be said that the conductive layer 111, the conductive layer 112, the semiconductor layer 113, and the conductive layer 115 of the transistor 50 respectively correspond to, for example, the wiring 43, the conductive layer 112*a*, the semiconductor layer 113*a*, and the wiring 41 of the transistor 51 illustrated in FIGS. 6B and 6C.

It can be said that the conductive layer 111, the conductive layer 112, the semiconductor layer 113, and the conductive layer 115 of the transistor 50 respectively correspond to, for example, the conductive layer 111*b*, the wiring 45, the semiconductor layer 113*b*, and the conductive layer 115*b* of the transistor 52 illustrated in FIGS. 6B and 6C.

As illustrated in FIG. 6D, in a region where the wiring 43 intersects with the wiring 45, the insulating layer 103 is provided over the wiring 43 and the wiring 45 is provided over the insulating layer 103.

Figure 7A:
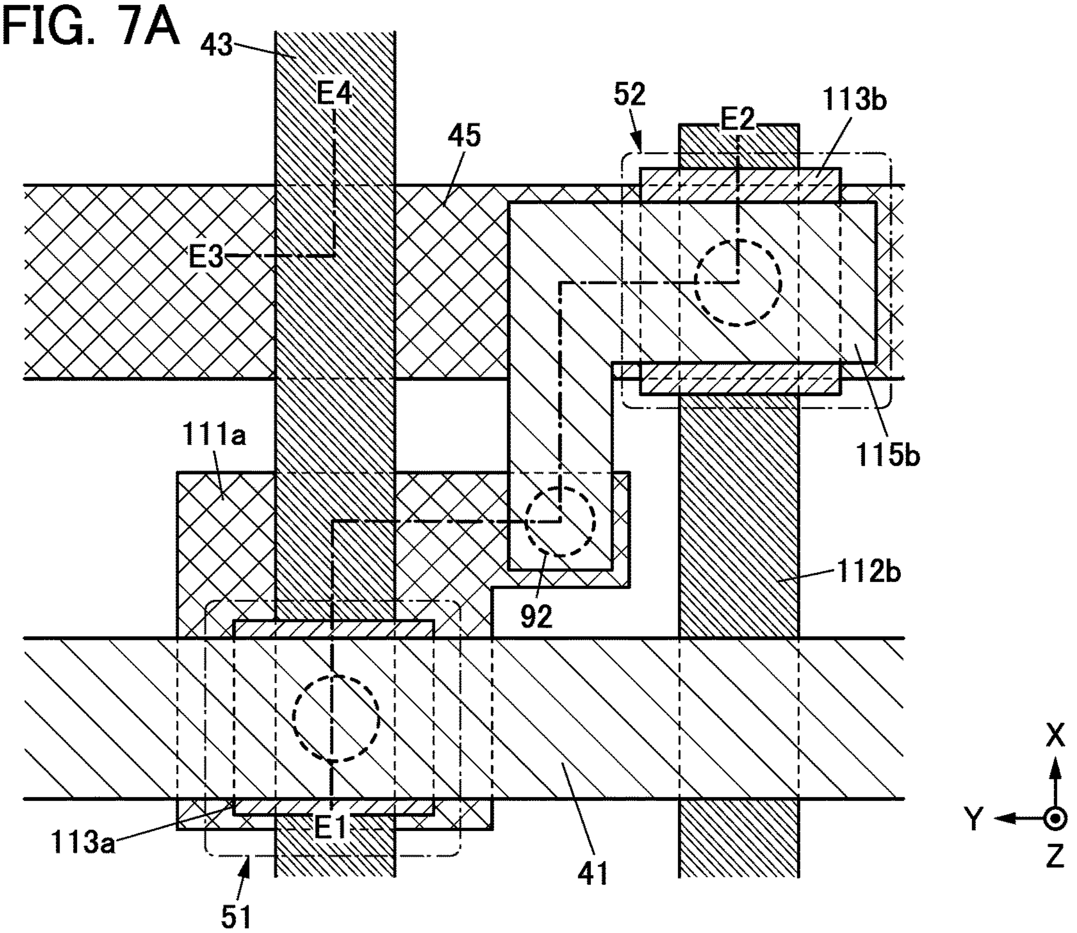
FIG. 7A is a plan view illustrating a structure example including a pixel circuit and FIGS. 7B and 7C are cross-sectional views illustrating the structure example including the pixel circuit.
Figure 7B:
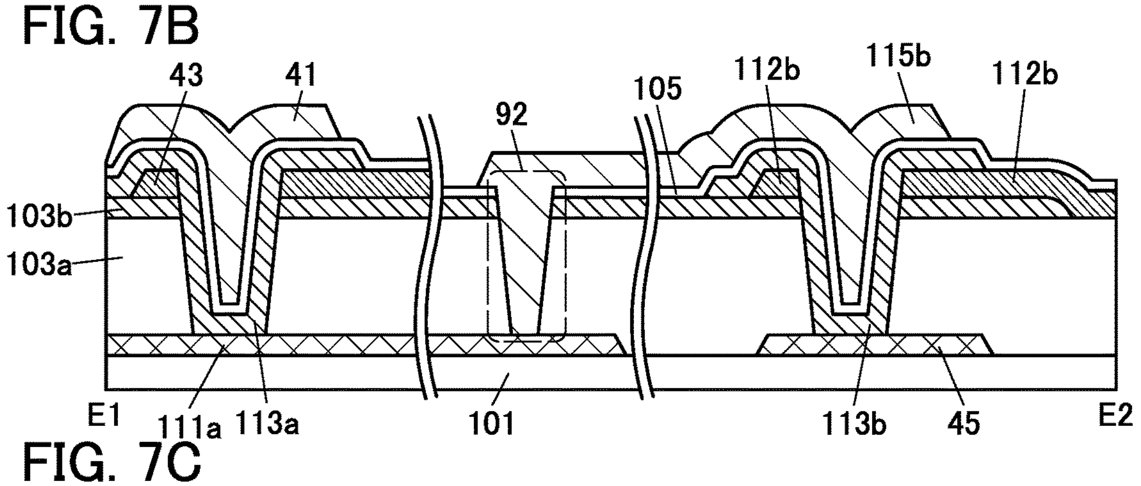
Figure 7C:
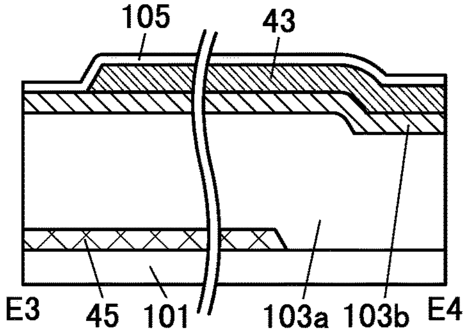

A structure example illustrated in FIG. 7A is different from that in FIG. 6B in that the wiring 43 is positioned above the wiring 45, for example. FIG. 7B is a cross-sectional view taken along dashed-dotted line E1-E2 in FIG. 7A. FIG. 7C is a cross-sectional view taken along dashed-dotted line E3-E4 in FIG. 7A.

In FIGS. 7A and 7B, the wiring 43 is positioned above the wiring 45 and the wirings 43 and 45 are wirings positioned at different levels. The insulating layer 103 is provided between the wiring 43 and the wiring 45.

The wiring 41 is positioned above the wiring 43 and the wirings 43 and 41 are wirings positioned at different levels. The wiring 41 includes, for example, a region positioned at a higher level than the top surface of the wiring 43 by the thicknesses of the semiconductor layer 113*a* and the insulating layer 105. In addition, the wiring 41 includes, for example, a region positioned at a higher level than the top surface of the wiring 43 by the thickness of the insulating layer 105.

The wiring 43 can function as one of the source electrode and the drain electrode of the transistor 51. The semiconductor layer 113*a* includes a region positioned in an opening in the wiring 43 and a region provided to be in contact with the top surface of the wiring 43. The semiconductor layer 113*a* also includes a region overlapping with a conductive layer 111*a* functioning as the other of the source electrode and the drain electrode of the transistor 51. The semiconductor layer 113*a* is provided to be in contact with a top surface of the conductive layer 111*a*.

The insulating layer 105 is provided between the semiconductor layer 113*a* and the wiring 41. The insulating layer 105 has a function of the gate insulating layer of the transistor 51.

The wiring 45 can function as one of the source electrode and the drain electrode of the transistor 52. The semiconductor layer 113*b* of the transistor 52 is provided to be in contact with the top surface of the wiring 45. The conductive layer 115*b* functions as the gate electrode of the transistor 52. A conductive layer 112*b* functions as the other of the source electrode and the drain electrode of the transistor 52.

An opening 92 is provided in the insulating layers 105, 103*b*, and 103*a*. In a region overlapping with the opening 92, the conductive layer 115*b* is preferably in contact with the top surface of the conductive layer 111*a*.

It can be said that the conductive layer 111, the conductive layer 112, the semiconductor layer 113, and the conductive layer 115 of the transistor 50 respectively correspond to, for example, the conductive layer 111*a*, the wiring 43, the semiconductor layer 113*a*, and the wiring 41 of the transistor 51 illustrated in FIGS. 7A and 7B.

It can be said that the conductive layer 111, the conductive layer 112, the semiconductor layer 113, and the conductive layer 115 of the transistor 50 respectively correspond to, for example, the wiring 45, the conductive layer 112*b*, the semiconductor layer 113*b*, and the conductive layer 115*b* of the transistor 52 illustrated in FIGS. 7A and 7B.

As illustrated in FIG. 7C, in a region where the wiring 43 intersects with the wiring 45, the insulating layer 103 is provided over the wiring 45 and the wiring 43 is provided over the insulating layer 103.

Figure 8A:
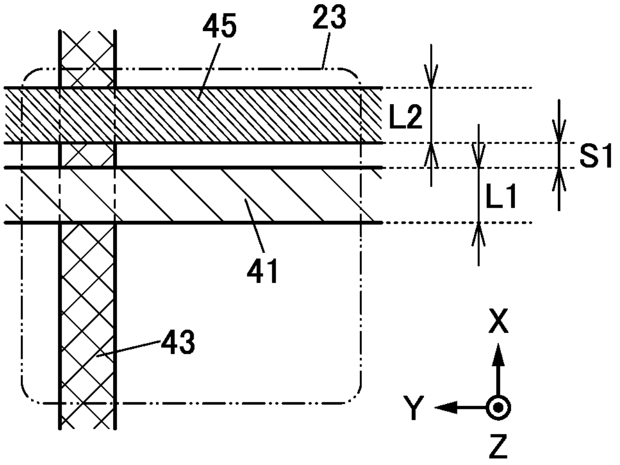
FIGS. 8A to 8C are plan views illustrating structure examples each including a pixel circuit.
Figure 8B:
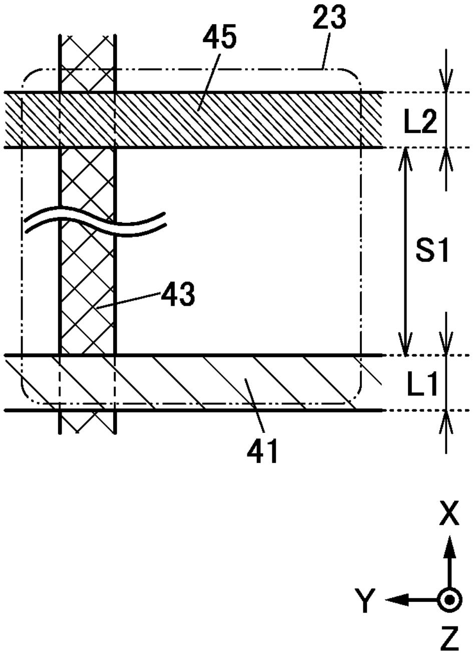

FIGS. 8A and 8B each illustrate only the wirings 41, 43, and 45 included in the subpixel 23.

In FIG. 8A, a space S1 between the wiring 41 and the wiring 45 is smaller than a wiring width L1 of the wiring 41 and a wiring width L2 of the wiring 45. The wirings 41 and 45 are positioned at different levels and thus can be arranged with such a small space therebetween.

Figure 8C:
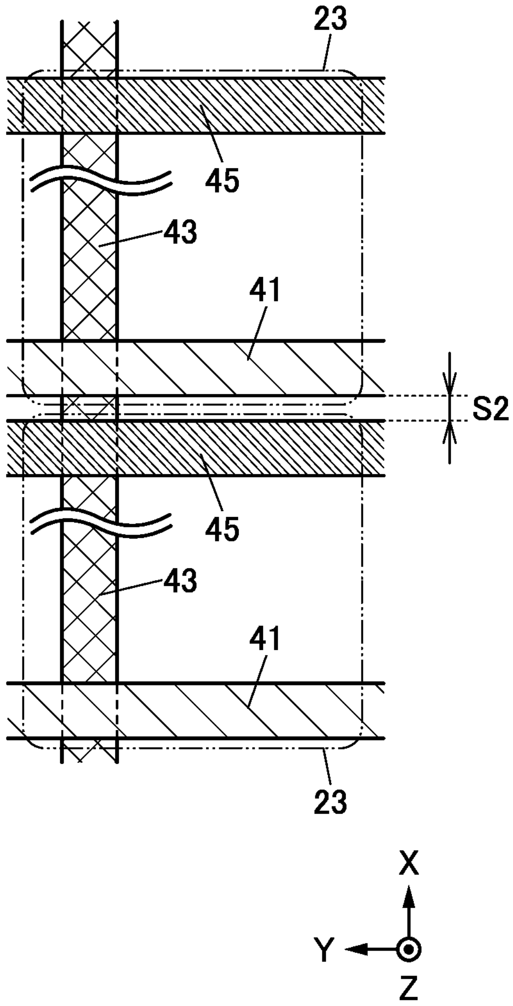

In FIG. 8B, the space S1 between the wiring 41 and the wiring 45 is larger than the wiring width L1 of the wiring 41 and the wiring width L2 of the wiring 45. Such arrangement has a high degree of freedom because a transistor, a capacitor, another wiring, or the like can be provided between the wiring 41 and the wiring 45. FIG. 8C illustrates a structure example in which two structures illustrated FIG. 8B are arranged in the X direction. In FIG. 8C, a space S2 between the wirings 45 and 41 of subpixels 23 that are adjacent in the positive X direction can be small. The space S2 is smaller than the wiring width L1 of the wiring 41 and the wiring width L2 of the wiring 45, for example. Even between adjacent subpixels, the wirings 41 and 45 can be provided with a small space therebetween owing to their different heights.

The case is considered as an example where the display device of one embodiment of the present invention includes a plurality of pixels arranged in m rows and n columns, m wirings 41 and m wirings 45 extending in the row direction, and n wirings 43 extending in the column direction. Here, the row direction and the column direction can be respectively the Y direction and the X direction in FIG. 8C, for example. Two pixels adjacent in the X direction are a pixel in the h-th row and the k-th column and a pixel in the (h−1)-th row and the k-th column. Here, h is an integer greater than or equal to 3 and less than or equal to m, and k is an integer greater than or equal to 1 and less than or equal to n. The width of a space between the (h−1)-th wiring 45 and the h-th wiring 41 is preferably smaller than the wiring width of the (h−1)-th wiring 45.

Although the expression "a plurality of pixels arranged in m rows and n columns" is used here, the term "pixel" can be replaced with the term "subpixel" in the above when the pixel includes a plurality of subpixels.

When a column includes three subpixels arranged in the row direction, n is a value three times as large as n described above, for example; thus, n described here is denoted by n' to be distinguished from n described above. Note that n' is a value three times as large as n.

That is, the display device of one embodiment of the present invention includes a plurality of subpixels arranged in m rows and n' columns, m wirings 41 and m wirings 45 extending in the row direction, and n' wirings 43 extending in the column direction. The width of the space between the (h−1)-th wiring 45 and the h-th wiring 41 is preferably smaller than the wiring width of the (h−1)-th wiring 45.

Structure Example 1 Including Pixel Circuit

Figure 9A:
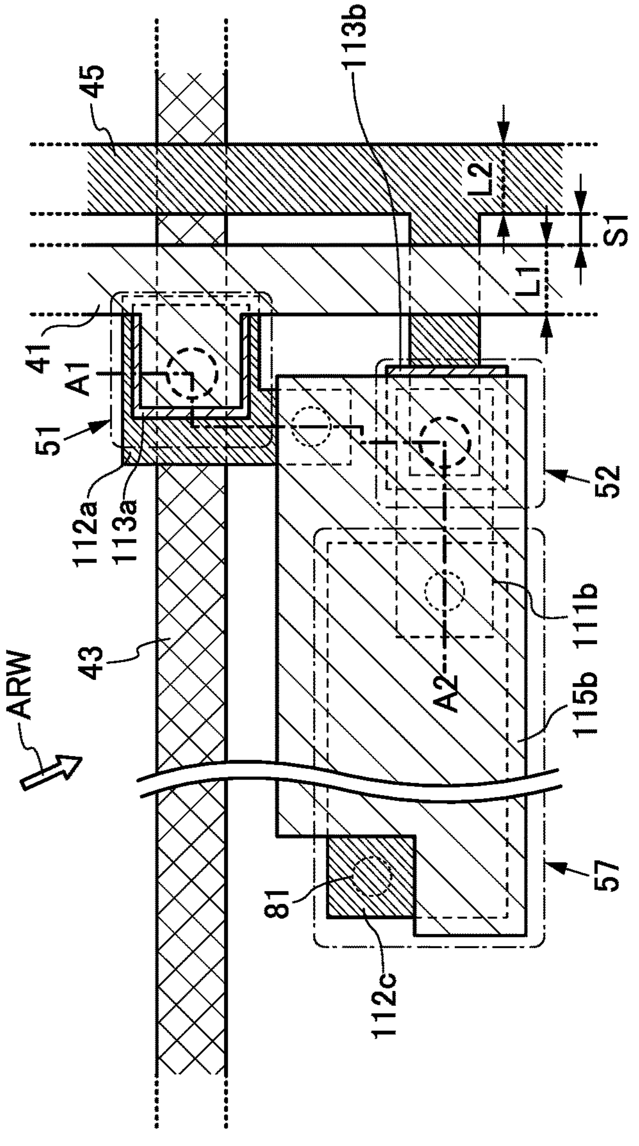
FIG. 9A is a plan view illustrating a structure example including a pixel circuit and FIG. 9B is a cross-sectional view illustrating the structure example including the pixel circuit.
Figure 9B:
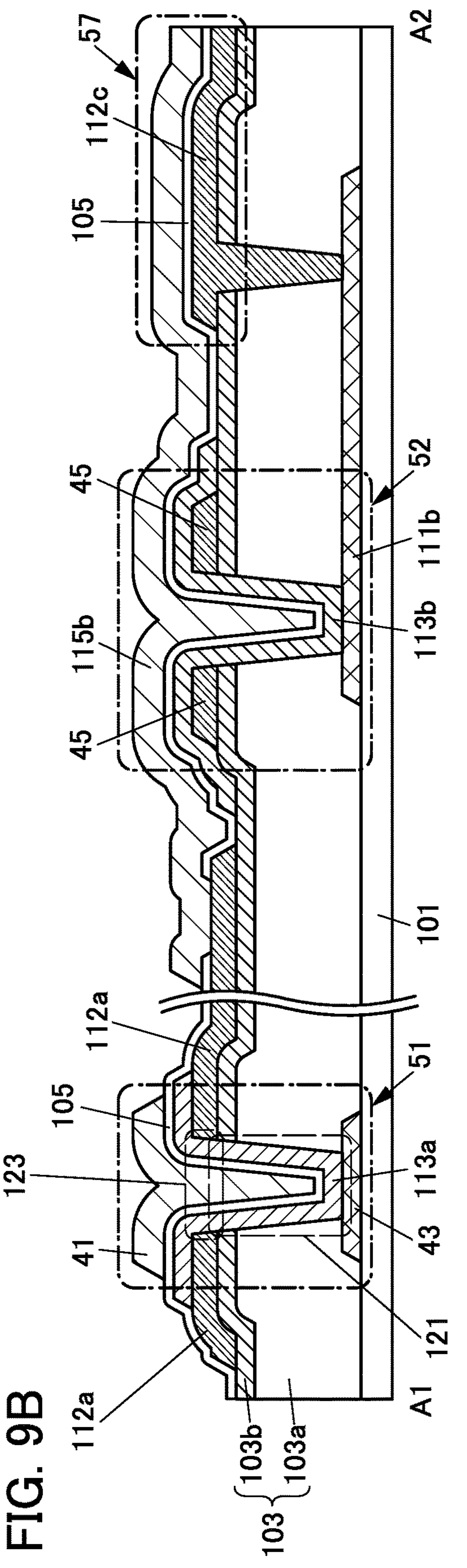
Figure 10:
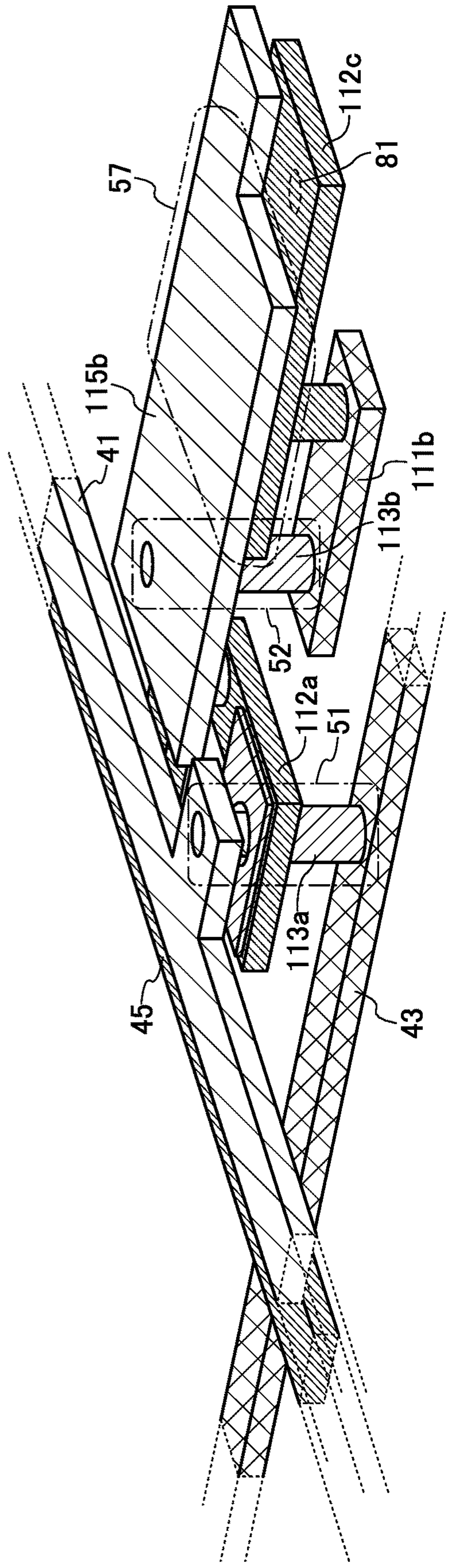
FIG. 10 is a perspective view illustrating a structure example including a pixel circuit.

FIG. 9A is a top view illustrating a structure example including the pixel circuit 40A and the wirings 41, 43, and 45 illustrated in FIG. 1C. FIG. 9B is a cross-sectional view taken along dashed line A1-A2 in FIG. 9A. FIG. 10 is a perspective view of the structure example including the pixel circuit 40A and the wirings 41, 43, and 45, which is seen from the direction of an arrow ARW in FIG. 9A.

In FIG. 9A, FIG. 10, and the following top views, perspective views, and the like, some components, such as a conductive layer electrically connected to the light-emitting element 60, are not illustrated. Moreover, in FIG. 9A, FIG. 10, and the following top views, perspective views, and the like, some components of a display device, such as a substrate and an insulating layer, are not illustrated.

In FIG. 10, a layer over the conductive layer 115*b* and the wiring 41 is not illustrated.

In this specification and the like, a plan view can be rephrased as a top view in some cases.

Note that in a top view and a perspective view, the shapes of a conductive layer, a semiconductor layer, and the like may be simplified. For easy viewing of the drawing, the position of each component may be different between a top view, a perspective view, and a cross-sectional view. Thus, the size, position, shape, and the like of each component may be different between a top view and a cross-sectional view. Furthermore, the size, position, shape, and the like of each component may be different between a perspective view and a cross-sectional view.

The wirings 41 and 45 are wirings extending in the Y direction. The wiring 43 is a wiring extending in the X direction and intersecting with the wirings 41 and 45.

The wirings 43 and 45 are wirings positioned at different levels and the wiring 45 is positioned above the wiring 43. The insulating layer 103 is provided between the wiring 43 and the wiring 45.

The wirings 45 and 41 are wirings positioned at different levels and the wiring 41 is positioned above the wiring 45. The wiring 41 includes, for example, a region positioned at a higher level than the top surface of the wiring 45 by the thicknesses of the semiconductor layer 113*a* and the insulating layer 105. In addition, the wiring 41 includes, for example, a region positioned at a higher level than the top surface of the wiring 45 by the thickness of the insulating layer 105. The wiring 41 and the wiring 45 are arranged parallel or substantially parallel to each other. The space Si between the wiring 41 and the wiring 45 is smaller than the wiring width L1 of the wiring 41 and the wiring width L2 of the wiring 45. The wirings 41 and 45 are positioned at different levels and thus can be arranged with a small space Si.

The wiring 43 can function as one of the source electrode and the drain electrode of the transistor 51. The semiconductor layer 113*a* of the transistor 51 includes a region overlapping with the wiring 43. The insulating layer 103 has the opening 121 reaching the wiring 43. The conductive layer 112*a* has the opening 123 in a region overlapping with the opening 121. The semiconductor layer 113*a* is provided to cover the openings 121 and 123 and include a region positioned in the openings 121 and 123. The semiconductor layer 113*a* is provided to be in contact with the top surface of the wiring 43. The semiconductor layer 113*a* includes a region positioned in the opening 123 in the conductive layer 112*a* functioning as the other of the source electrode and the drain electrode of the transistor 51 and a region provided to be in contact with the top surface of the conductive layer 112*a*.

The wiring 41 can function as the gate electrode of the transistor 51. The wiring width of the wiring 41 is large in a region overlapping with the semiconductor layer 113*a* of the transistor 51. In other words, the wiring 41 branches in the region overlapping with the semiconductor layer 113*a* of the transistor 51.

The insulating layer 105 is provided between the semiconductor layer 113*a* and the wiring 41. The insulating layer 105 has a function of the gate insulating layer of the transistor 51.

The wiring 45 can function as one of the source electrode and the drain electrode of the transistor 52. The semiconductor layer 113*b* of the transistor 52 is provided to be in contact with the top surface of the conductive layer 111*b* functioning as the other of the source electrode and the drain electrode of the transistor 52. The conductive layer 115*b* functions as the gate electrode of the transistor 52 and one electrode of the capacitor 57.

A conductive layer 112*c* functions as the other electrode of the capacitor 57.

The wiring 41 and the conductive layer 115*b* preferably include regions level with each other. The wiring 41 and the conductive layer 115*b* contain the same materials, for example. In the case where the wiring 41 has a stacked-layer structure, the conductive layer 115*b* has a stacked-layer structure similar to that of the wiring 41, for example. The wiring 41 and the conductive layer 115*b* can be formed by processing one conductive film, for example. Here, the levels of the wiring, the conductive layer, the semiconductor layer, the insulating layer, and the like included in the display device can each be a distance from a reference surface, for example. As the reference surface, for example, a surface of a substrate, a flat region of a film provided over the substrate, or the like can be used.

The wiring 43 and the conductive layer 111*b* preferably include regions level with each other. The wiring 43 and the conductive layer 111*b* contain the same materials, for example. In the case where the wiring 43 has a stacked-layer structure, the conductive layer 111*b* has a stacked-layer structure similar to that of the wiring 43, for example. The wiring 43 and the conductive layer 111*b* can be formed by processing one conductive film, for example.

The wiring 45 and the conductive layers 112*a* and 112*c* preferably include regions level with each other. The wiring 45 and the conductive layers 112*a* and 112*c* contain the same materials, for example. In the case where the wiring 45 has a stacked-layer structure, the conductive layers 112*a* and 112*c* each have a stacked-layer structure similar to that of the wiring 45, for example. The wiring 45 and the conductive layers 112*a* and 112*c* can be formed by processing one conductive film, for example.

The conductive layer 112*c* includes a region provided to fill an opening in the insulating layer 103. In the region, the conductive layer 112*c* is preferably in contact with the conductive layer 111*b*. Alternatively, a plug may be provided in the opening in the insulating layer 103 so that the conductive layer 112*c* is electrically connected to the conductive layer 111*b* through the plug.

The conductive layer 115*b* includes a region provided to fill an opening in the insulating layer 105. In the region, the conductive layer 115*b* is preferably in contact with the conductive layer 112*a*. Alternatively, a plug may be provided in the opening in the insulating layer 105 so that the conductive layer 115*b* is electrically connected to the conductive layer 112*a* through the plug.

The insulating layer 105 is provided between the semiconductor layer 113*b* and the conductive layer 115*b* and between the conductive layer 112*c* and the conductive layer 115*b*. The insulating layer 105 has functions of a gate insulating layer of the transistor 52 and a dielectric layer of the capacitor 57.

In the case where a light-emitting element is provided above the capacitor 57, a pixel electrode of the light-emitting element is provided to be in contact with a region 81 of a top surface of the conductive layer 112*c*, for example.

The description of the transistor 50 illustrated in FIGS. 4A and 4B and the like is applicable to the transistors 51 and 52. For the components of the transistors 51 and 52, for example, the description of the corresponding components of the transistor 50 can be referred to.

It can be said that the conductive layer 111, the conductive layer 112, the semiconductor layer 113, and the conductive layer 115 of the transistor 50 respectively correspond to, for example, the wiring 43, the conductive layer 112*a*, the semiconductor layer 113*a*, and the wiring 41 of the transistor 51 illustrated in FIGS. 9A and 9B.

It can be said that the conductive layer 111, the conductive layer 112, the semiconductor layer 113, and the conductive layer 115 of the transistor 50 respectively correspond to, for example, the conductive layer 111*b*, the wiring 45, the semiconductor layer 113*b*, and the conductive layer 115*b* of the transistor 52 illustrated in FIGS. 9A and 9B.

Figure 11:
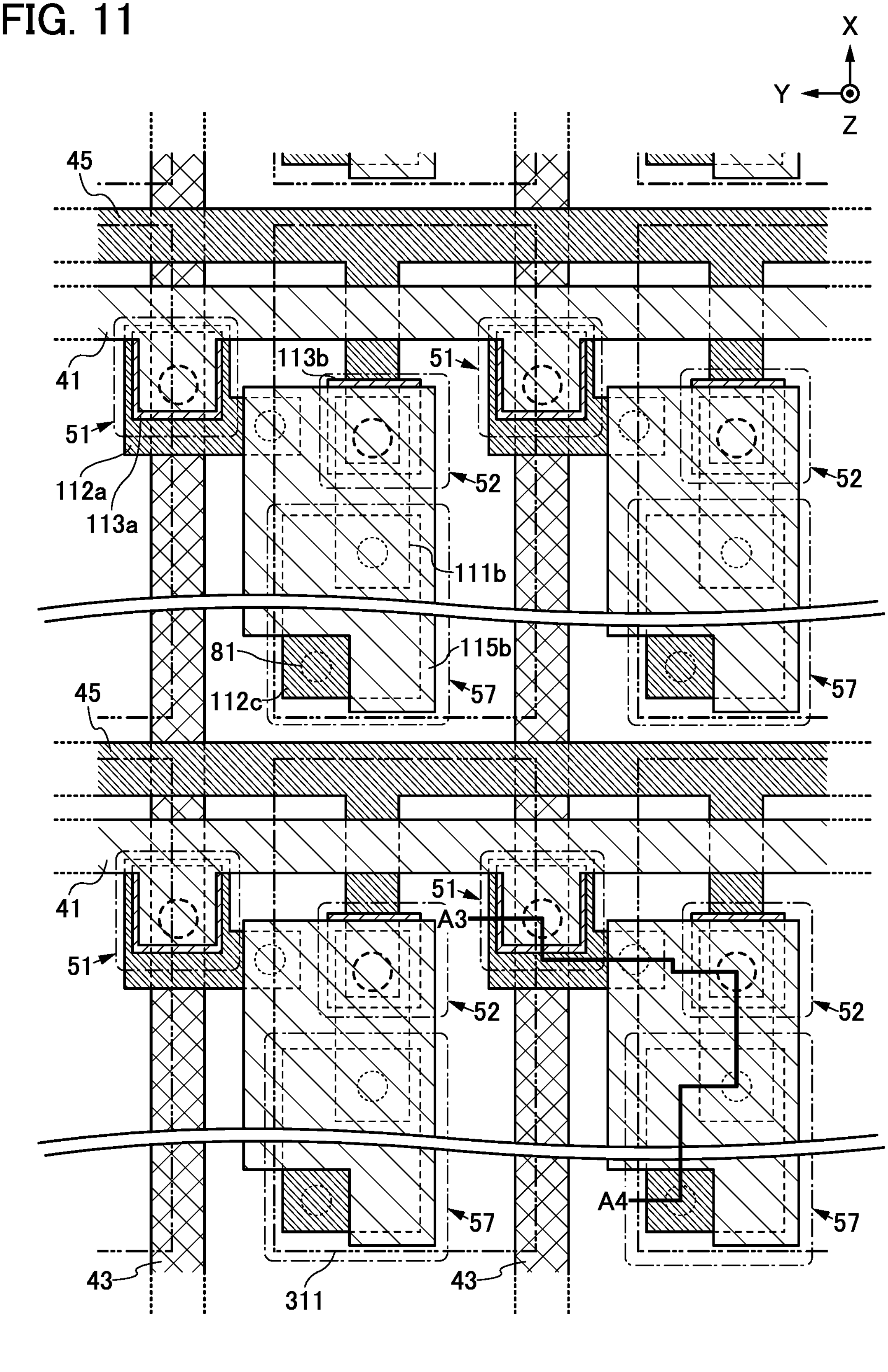
FIG. 11 is a plan view illustrating a structure example including a pixel circuit.

FIG. 11 illustrates an example in which a plurality of structures illustrated in FIG. 9A are arranged in the row direction and the column direction. In FIG. 11, a pixel electrode 311 electrically connected to the light-emitting element 60 is denoted by a dashed double-dotted line. The pixel electrode 311 is provided to be in contact with the region 81 of the top surface of the conductive layer 112*c*, for example. An example of a cross section including the pixel electrode 311 is described later in FIG. 12 and the like.

Figure 12:
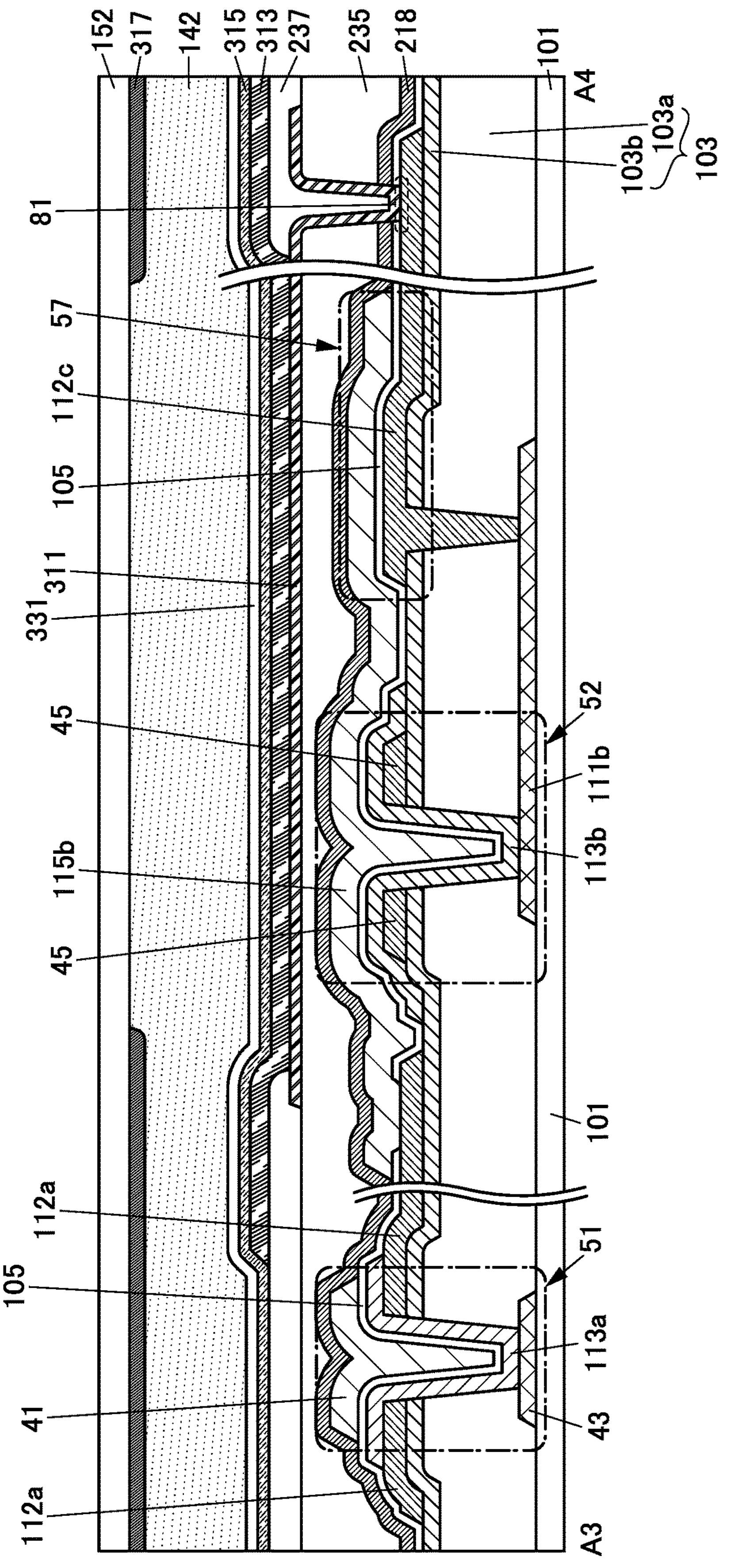
FIG. 12 is a cross-sectional view illustrating a structure example including a pixel circuit.

FIG. 12 is a cross-sectional view taken along bold line A3-A4 in FIG. 11. The insulating layer 218 is provided to cover the wiring 41, the conductive layer 115*b*, the insulating layer 105, and the conductive layer 112*c*. An insulating layer 235 is provided over the insulating layer 218. An opening reaching the conductive layer 112*c* is provided in the insulating layers 105, 218, and 235. The pixel electrode 311 is provided to cover the opening and part of the top surface of the conductive layer 112*c*. The pixel electrode 311 is provided to be in contact with the top surface of the conductive layer 112*c* in the region 81, for example.

An insulating layer 237 can be provided to cover an end portion of a top surface of the pixel electrode 311. A layer 313 is provided over the pixel electrode 311 and a common electrode 315 is provided over the layer 313. The insulating layer 237 functions as a partition (also referred to as a bank or a spacer). The insulating layer 237 can inhibit contact between the pixel electrode 311 and the common electrode 315 to inhibit a short circuit in the light-emitting element 60.

The layer 313 is a layer including a light-emitting layer of the light-emitting element 60, for example. A protective layer 331 may be provided to cover the common electrode 315. The light-emitting element 60 includes the pixel electrode 311, the layer 313 over the pixel electrode 311, and the common electrode 315 over the layer 313. Note that the layer 313 can be referred to as an EL layer. The common electrode is also referred to as a counter electrode.

A substrate 152 is attached above the protective layer 331 with an adhesive layer 142. A light-blocking layer 317 may be provided on the surface of the substrate 152 that faces the adhesive layer 142. The light-blocking layer 317 can be provided between the adjacent light-emitting elements 60. The light-blocking layer 317 can prevent color mixture by blocking light emitted from the adjacent subpixels 23. Note that a structure without the light-blocking layer 317 may be employed.

Structure Example 2 Including Pixel Circuit

Figure 13A:
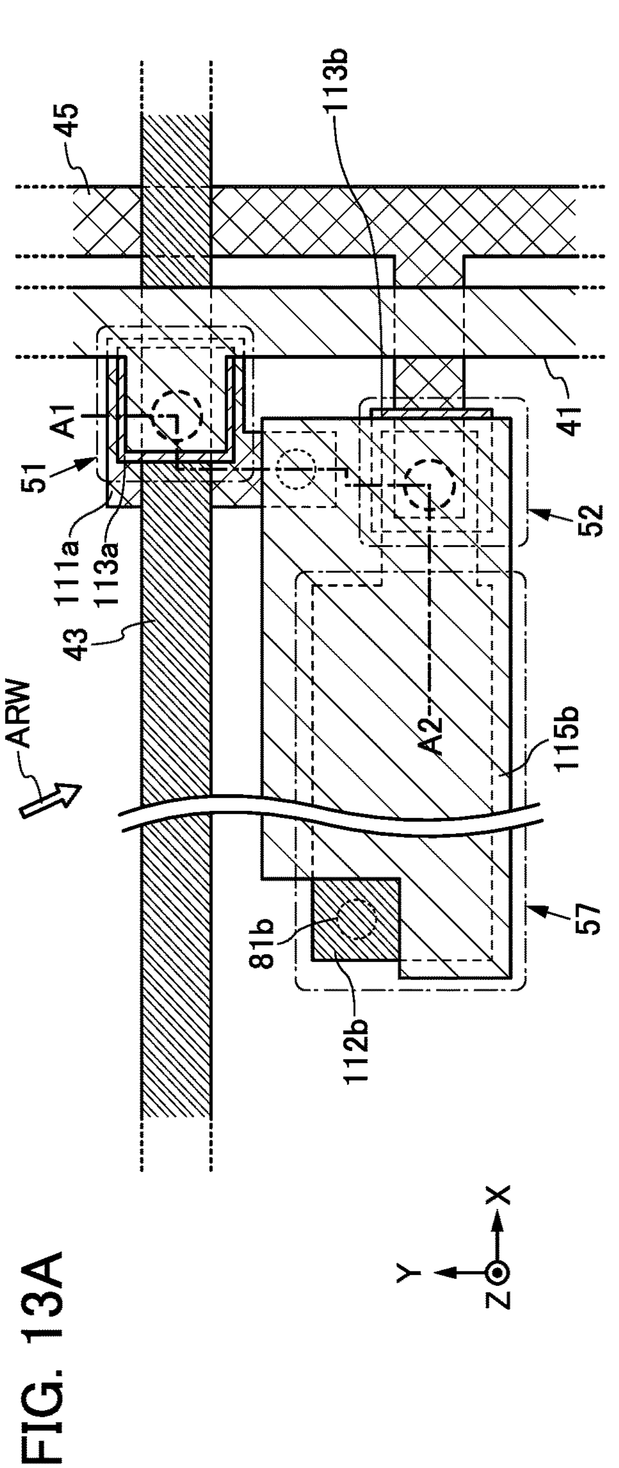
FIG. 13A is a plan view illustrating a structure example including a pixel circuit and FIG. 13B is a cross-sectional view illustrating the structure example including the pixel circuit.
Figure 13B:
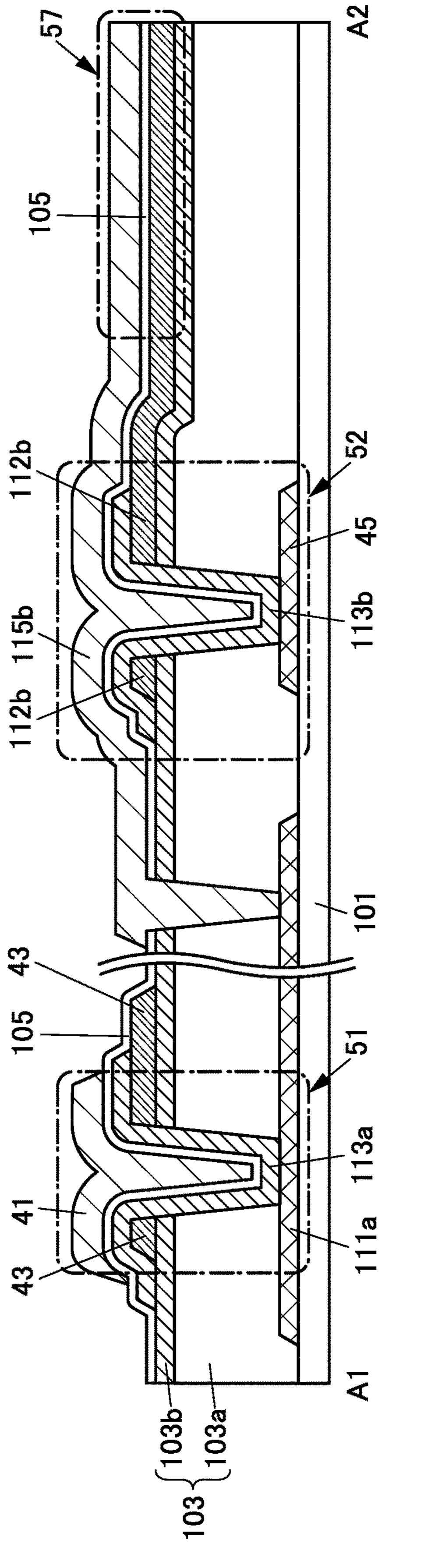
Figure 14:
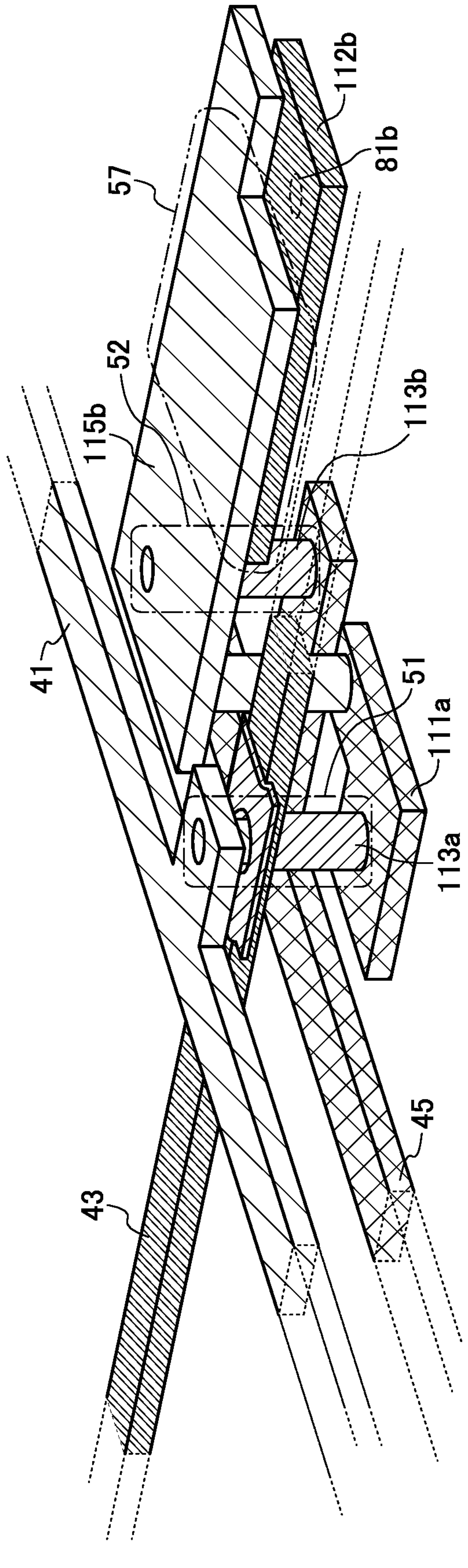
FIG. 14 is a perspective view illustrating a structure example including a pixel circuit.

FIG. 13A is a top view illustrating a structure example including the pixel circuit 40A and the wirings 41, 43, and 45 illustrated in FIG. 1C, and is different from FIG. 9A in that the wiring 43 is positioned above the wiring 45, for example. FIG. 13B is a cross-sectional view taken along dashed line A1-A2 in FIG. 13A. FIG. 14 is a perspective view of the structure example including the pixel circuit 40A and the wirings 41, 43, and 45, which is seen from the direction of an arrow ARW in FIG. 13A.

In FIG. 14, a layer over the conductive layer 115*b* and the wiring 41 is not illustrated.

In FIGS. 13A and 13B and FIG. 14, the wiring 43 is positioned above the wiring 45 and the wirings 43 and 45 are wirings positioned at different levels. The insulating layer 103 is provided between the wiring 43 and the wiring 45.

The wiring 41 is positioned above the wiring 43 and the wirings 43 and 41 are wirings positioned at different levels. The wiring 41 includes, for example, a region positioned at a higher level than the top surface of the wiring 43 by the thicknesses of the semiconductor layer 113*a* and the insulating layer 105. In addition, the wiring 41 includes, for example, a region positioned at a higher level than the top surface of the wiring 43 by the thickness of the insulating layer 105.

The wiring 43 can function as one of the source electrode and the drain electrode of the transistor 51. The semiconductor layer 113*a* includes a region positioned in an opening in the wiring 43 and a region provided to be in contact with the top surface of the wiring 43. The semiconductor layer 113*a* also includes a region overlapping with the conductive layer 111*a* functioning as the other of the source electrode and the drain electrode of the transistor 51. The semiconductor layer 113*a* is provided to be in contact with the top surface of the conductive layer 111*a*.

The insulating layer 105 is provided between the semiconductor layer 113*a* and the wiring 41. The insulating layer 105 has a function of the gate insulating layer of the transistor 51.

The insulating layer 103 is provided between the semiconductor layer 113*a* and the wiring 41. The insulating layer 103 has a function of the gate insulating layer of the transistor 51.

The wiring 45 can function as one of the source electrode and the drain electrode of the transistor 52. The semiconductor layer 113*b* of the transistor 52 is provided to be in contact with the top surface of the wiring 45. The conductive layer 115*b* functions as the gate electrode of the transistor 52 and one electrode of the capacitor 57. The conductive layer 112*b* functions as the other of the source electrode and the drain electrode of the transistor 52 and the other electrode of the capacitor 57. The semiconductor layer 113*b* includes a region positioned in an opening in the conductive layer 112*b* and a region provided to be in contact with a top surface of the conductive layer 112*b*.

In the structure illustrated in FIGS. 13A and 13B and FIG. 14, the wiring 43 and the conductive layer 112*b* preferably include regions level with each other. The wiring 43 and the conductive layer 112*b* contain the same materials, for example. In the case where the wiring 43 has a stacked-layer structure, the conductive layer 112*b* has a stacked-layer structure similar to that of the wiring 43, for example. The wiring 43 and the conductive layer 112*b* can be formed by processing one conductive film, for example.

In the structure illustrated in FIGS. 13A and 13B and FIG. 14, the wiring 45 and the conductive layer 111*a* preferably include regions level with each other. The wiring 45 and the conductive layer 11*a* contain the same materials, for example. In the case where the wiring 45 has a stacked-layer structure, the conductive layer 111*a* has a stacked-layer structure similar to that of the wiring 45, for example. The wiring 45 and the conductive layer 111*a* can be formed by processing one conductive film, for example.

The insulating layer 105 is provided between the semiconductor layer 113*b* and the conductive layer 115*b* and between the conductive layer 112*b* and the conductive layer 115*b*. The insulating layer has functions of the gate insulating layer of the transistor 52 and the dielectric layer of the capacitor 57.

In FIGS. 13A and 13B and FIG. 14, the conductive layer 115*b* includes a region provided to fill an opening in the insulating layers 103 and 105. In the region, the conductive layer 115*b* is preferably in contact with the conductive layer 111*a*. Alternatively, a plug may be provided in the opening in the insulating layers 103 and 105 so that the conductive layer 115*b* is electrically connected to the conductive layer 111*a* through the plug.

In the case where a light-emitting element is provided above the capacitor 57, a pixel electrode of the light-emitting element is provided to be in contact with a region 81*b* of the top surface of the conductive layer 112*b*, for example.

It can be said that the conductive layer 111, the conductive layer 112, the semiconductor layer 113, and the conductive layer 115 of the transistor 50 respectively correspond to, for example, the conductive layer 111*a*, the wiring 43, the semiconductor layer 113*a*, and the wiring 41 of the transistor 51 illustrated in FIGS. 13A and 13B.

It can be said that the conductive layer 111, the conductive layer 112, the semiconductor layer 113, and the conductive layer 115 of the transistor 50 respectively correspond to, for example, the wiring 45, the conductive layer 112*b*, the semiconductor layer 113*b*, and the conductive layer 115*b* of the transistor 52 illustrated in FIGS. 13A and 13B.

Figure 15:
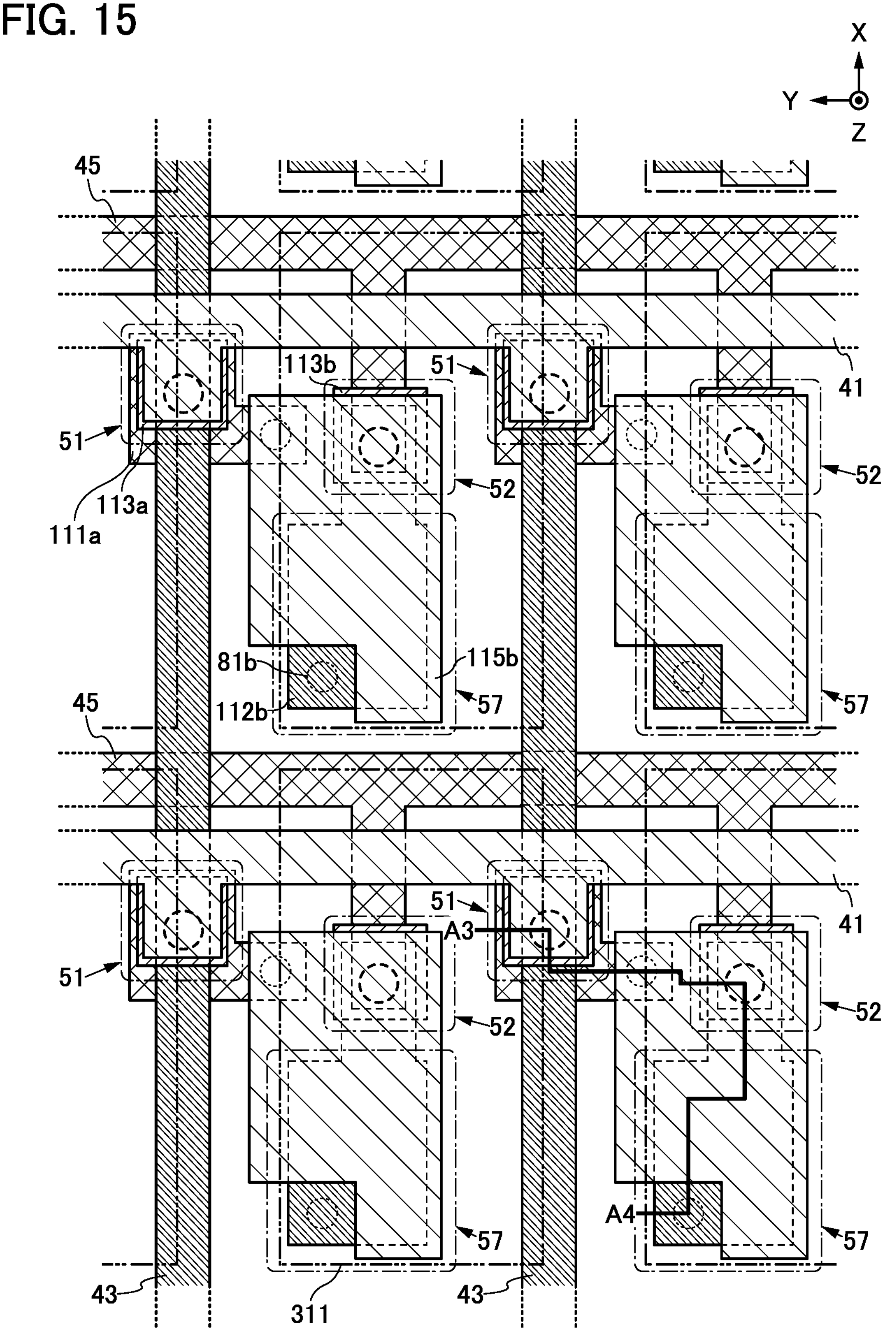
FIG. 15 is a plan view illustrating a structure example including a pixel circuit.

FIG. 15 illustrates an example in which two pixel circuits 40A illustrated in FIG. 13A are arranged in each of the row direction and the column direction.

Figure 16:
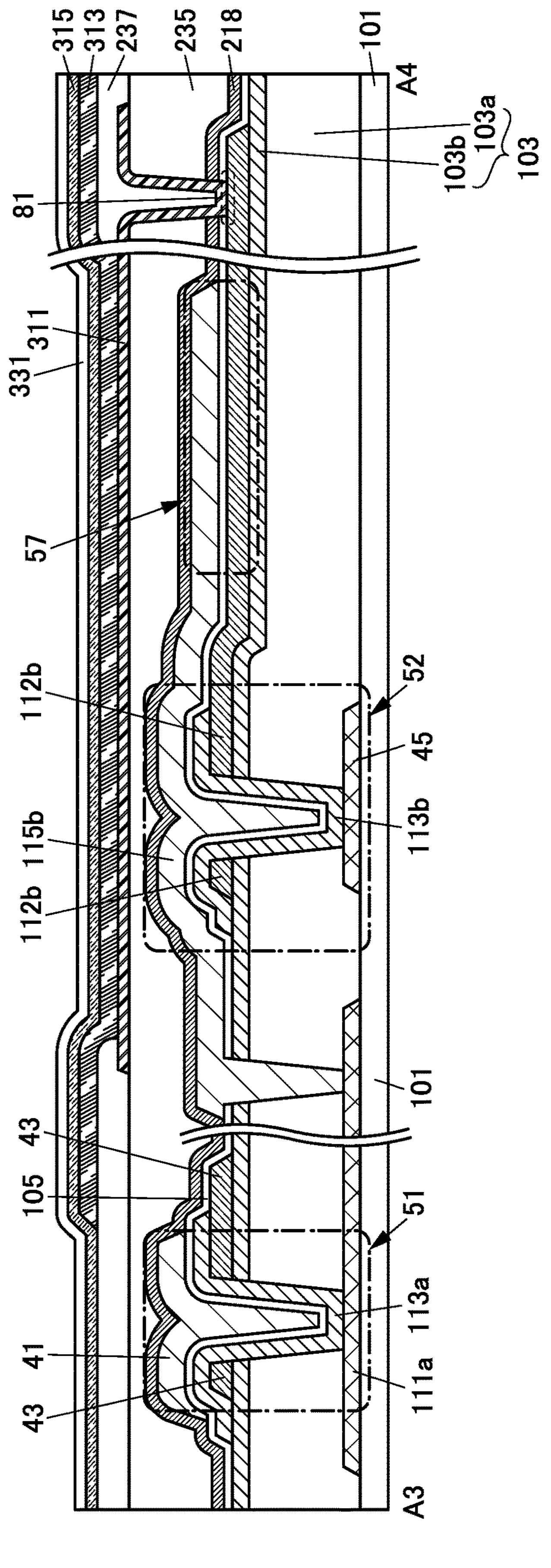
FIG. 16 is a cross-sectional view illustrating a structure example including a pixel circuit.

FIG. 16 is a cross-sectional view taken along bold line A3-A4 in FIG. 15. The insulating layer 218 is provided to cover the wiring 41, the conductive layer 115*b*, the insulating layer 105, and the conductive layer 112*b*. The insulating layer 235 is provided over the insulating layer 218. An opening reaching the conductive layer 112*b* is provided in the insulating layers 105, 218, and 235. The pixel electrode 311 is provided to cover the opening and part of the top surface of the conductive layer 112*b*. The pixel electrode 311 is provided to be in contact with the top surface of the conductive layer 112*b* in the region 81*b*, for example. The insulating layer 237 may be provided to cover the end portion of the top surface of the pixel electrode 311. The layer 313 is provided over the pixel electrode 311 and the common electrode 315 is provided over the layer 313. The layer 313 is a layer including the light-emitting layer of the light-emitting element 60, for example. The protective layer 331 may be provided to cover the common electrode 315.

Structure Example 3 Including Pixel Circuit

Figure 17A:
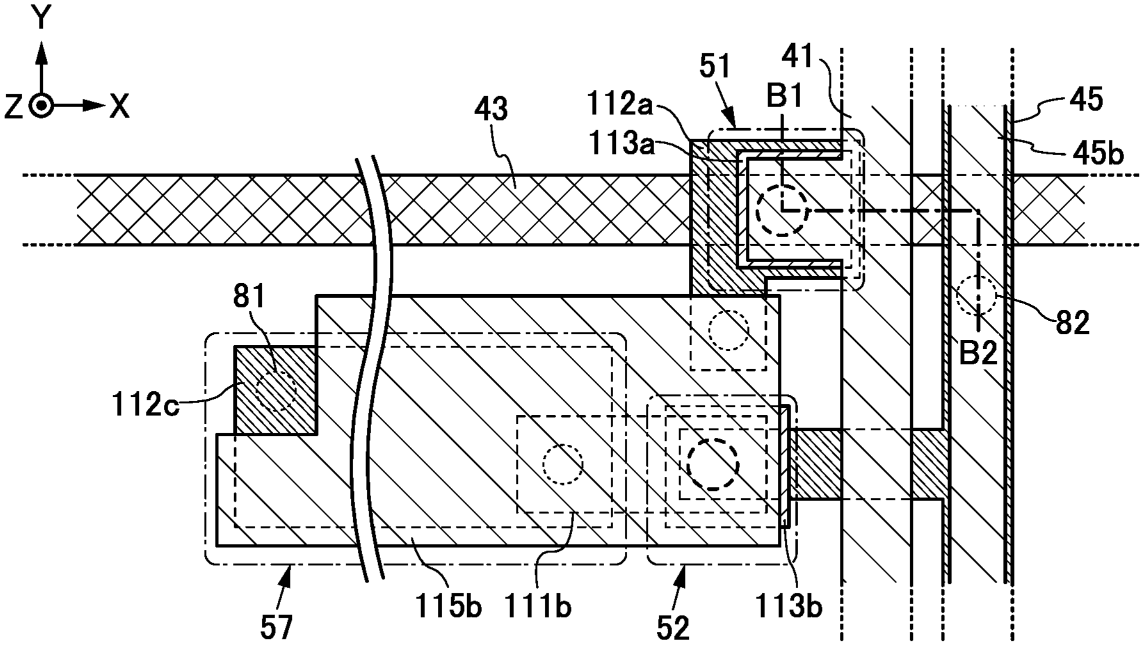
FIG. 17A is a plan view illustrating a structure example including a pixel circuit and FIG. 17B is a cross-sectional view illustrating the structure example including the pixel circuit.
Figure 17B:
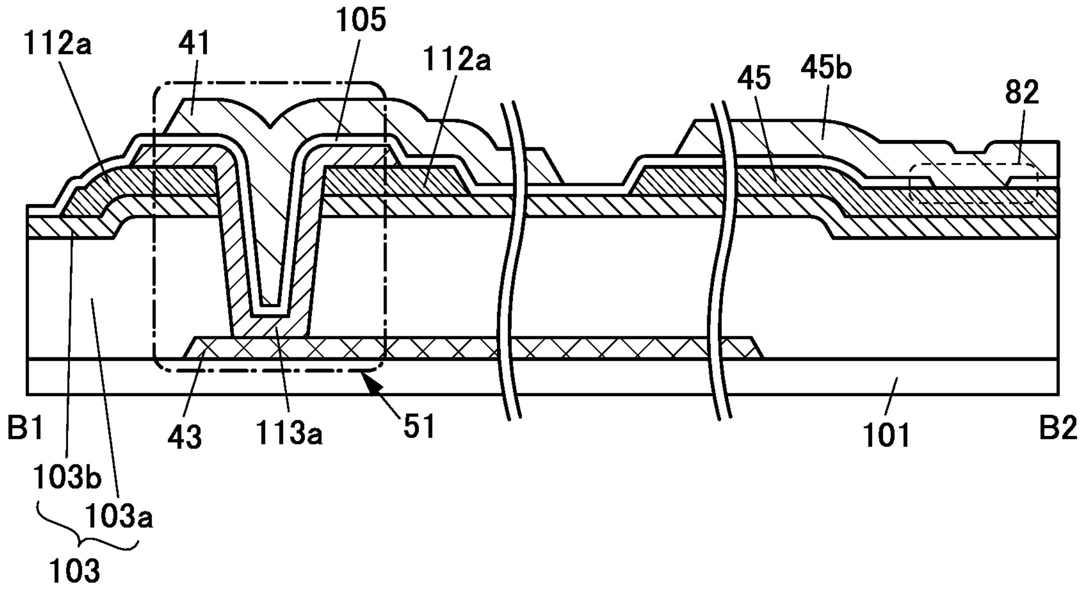

FIG. 17A is a top view illustrating a structure example including the pixel circuit 40A and the wirings 41, 43, and 45 illustrated in FIG. 1C. FIG. 17B is a cross-sectional view taken along dashed line B1-B2 in FIG. 17A. The structure illustrated in FIG. 17A is different from that in FIG. 9A in that an auxiliary wiring 45*b* is provided to overlap with the wiring 45, for example.

The auxiliary wiring 45*b* is a wiring extending in the Y direction. The auxiliary wiring 45*b* is provided to overlap with the wiring 45. Although FIG. 17A illustrates an example in which the auxiliary wiring 45*b* has a smaller width than the wiring 45, the width of the auxiliary wiring 45*b* may be the same as or larger than that of the wiring 45. The auxiliary wiring 45*b* is provided so that at least part of the auxiliary wiring 45*b* overlaps with the wiring 45, for example.

Alternatively, the auxiliary wiring 45*b* may be provided so that part of the auxiliary wiring 45*b* does not overlap with the wiring 45. In such a case, for example, the auxiliary wiring 45*b* is provided close to the wiring 45.

The auxiliary wiring 45*b* and the wiring 41 preferably include regions level with each other. The auxiliary wiring 45*b* and the wiring 41 contain the same materials, for example. In the case where the wiring 41 has a stacked-layer structure, the auxiliary wiring 45*b* has a stacked-layer structure similar to that of the wiring 41, for example. The auxiliary wiring 45*b* and the wiring 41 can be formed by processing one conductive film, for example.

An opening 82 is provided in a region of the insulating layer 105 overlapping with the wiring 45 and the auxiliary wiring 45*b*. Through the opening 82, the wiring 45 can be in contact with and electrically connected to the auxiliary wiring 45*b*.

Structure Example 4 Including Pixel Circuit

Figure 18A:
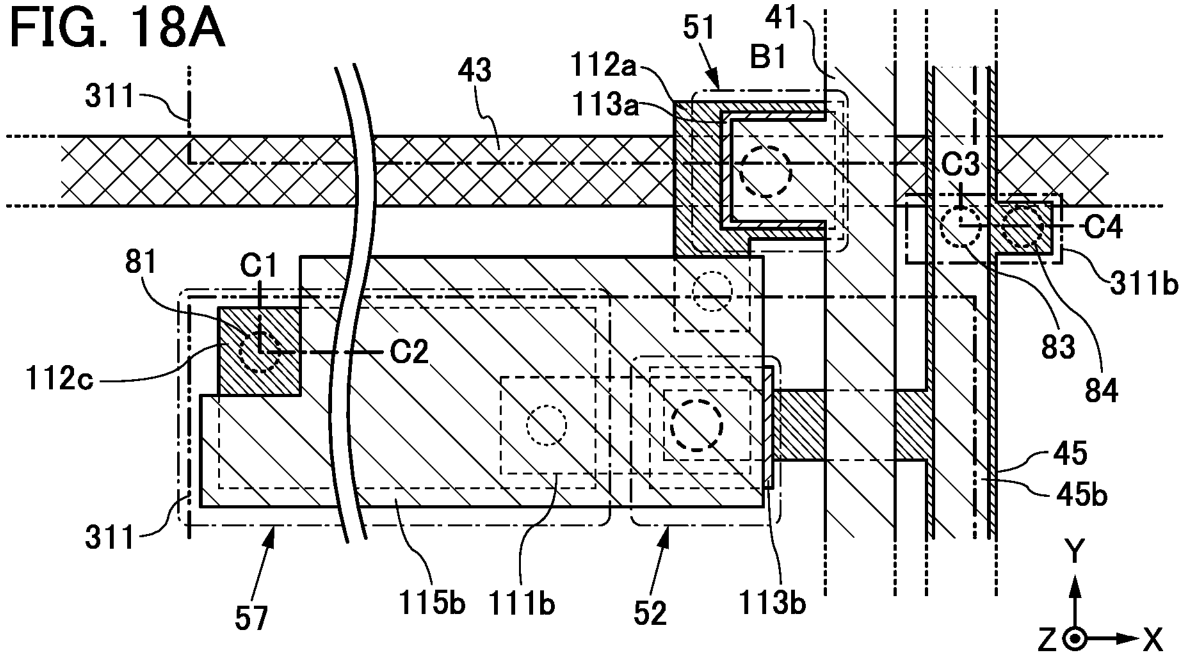
FIG. 18A is a plan view illustrating a structure example including a pixel circuit and FIGS. 18B and 18C are cross-sectional views illustrating the structure example including the pixel circuit.
Figure 18B:
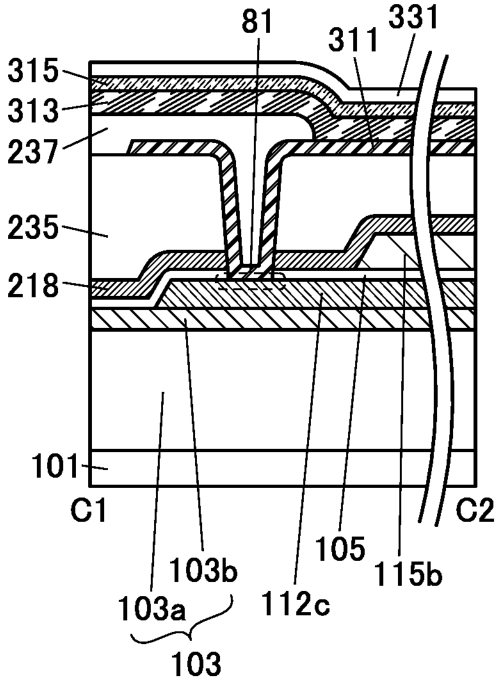
Figure 18C:
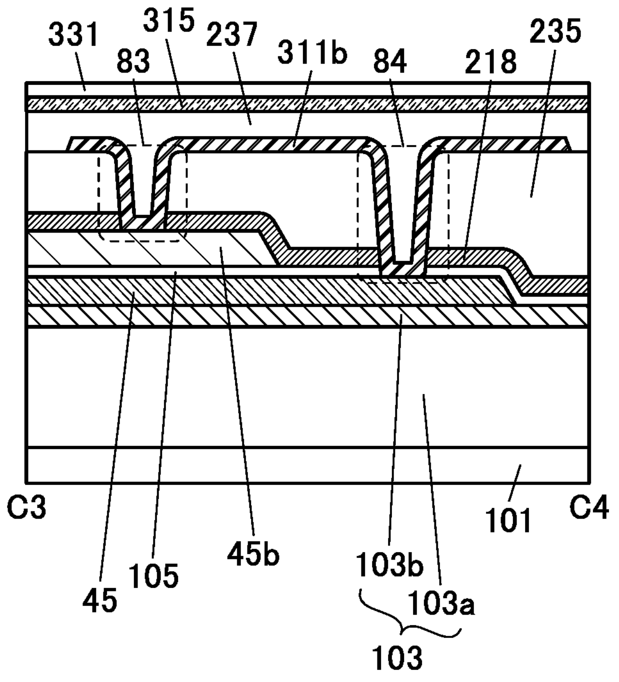

FIG. 18A is a top view illustrating a structure example including the pixel circuit 40A and the wirings 41, 43, and 45 illustrated in FIG. 1C. FIG. 18B is a cross-sectional view taken along dashed line C1-C2 in FIG. 18A, and FIG. 18C is a cross-sectional view taken along dashed line C3-C4 in FIG. 18A. The structure illustrated in FIG. 18A is different from that in FIG. 17A in that the wiring 45 is electrically connected to the auxiliary wiring 45*b* through a conductive layer 311*b* and the wiring 45 has a shape different from that in FIG. 17A, for example.

FIG. 18A and the like illustrate the pixel electrode 311 electrically connected to the light-emitting element 60. Although not illustrated, the pixel electrode is preferably included in the structures in FIG. 9A, FIG. 13A, FIG. 17A, and the like as in the structure in FIG. 18A.

As illustrated in FIG. 18B, the insulating layer 218 is provided to cover the conductive layer 112*c*, the insulating layer 105, and the conductive layer 115*b*. The insulating layer 235 is provided over the insulating layer 218. An opening reaching the conductive layer 112*c* is provided in the insulating layers 105, 218, and 235. The pixel electrode 311 is provided to cover the opening. The insulating layer 237 may be provided to cover the end portion of the top surface of the pixel electrode 311. The layer 313 is provided over the pixel electrode 311 and the common electrode 315 is provided over the layer 313. The protective layer 331 may be provided to cover the common electrode 315.

As illustrated in FIG. 18C, an opening 83 reaching the auxiliary wiring 45*b* is provided in the insulating layers 235 and 218, and an opening 84 reaching the wiring 45 is provided in the insulating layers 235, 218, and 105. The opening 84 overlaps with a region of the wiring 45 having a large wiring width (see FIG. 18A). The region of the wiring 45 overlapping with the opening 84 does not overlap with the auxiliary wiring 45*b*.

The conductive layer 311*b* is provided to cover a top surface of the insulating layer 235 and the openings 83 and 84. The wiring 45 is electrically connected to the auxiliary wiring 45*b* through the conductive layer 311*b*. The conductive layer 311*b* is preferably in contact with the top surface of the wiring 45. Moreover, the conductive layer 311*b* is preferably in contact with a top surface of the auxiliary wiring 45*b*.

The conductive layer 311*b* and the pixel electrode 311 can be formed by processing one conductive film, for example. This can simplify the manufacturing process of the display device, for example.

Structure Example 5 Including Pixel Circuit

Figure 19A:
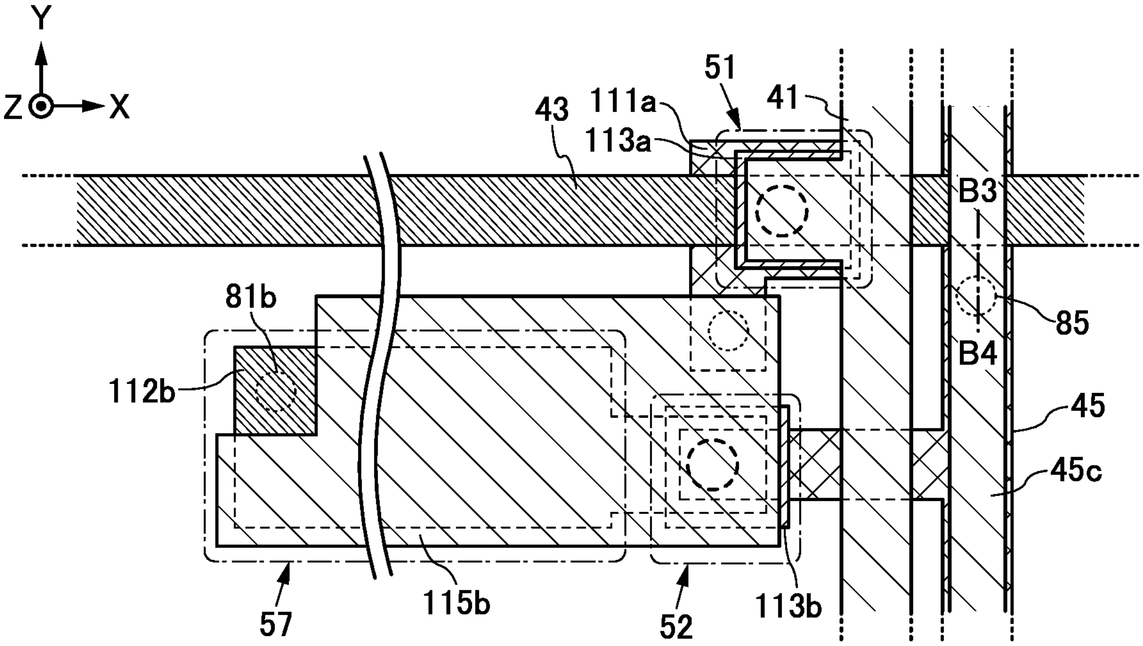
FIG. 19A is a plan view illustrating a structure example including a pixel circuit and FIG. 19B is a cross-sectional view illustrating the structure example including the pixel circuit.
Figure 19B:
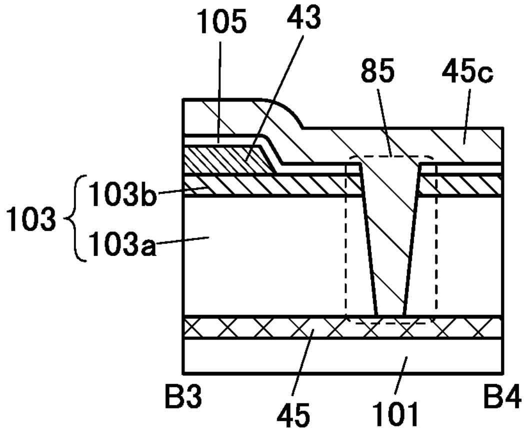

FIG. 19A is a top view illustrating a structure example including the pixel circuit 40A and the wirings 41, 43, and 45 illustrated in FIG. 1C. FIG. 19B is a cross-sectional view taken along dashed line B3-B4 in FIG. 19A. The structure illustrated in FIG. 19A is different from that in FIG. 13A in that an auxiliary wiring 45*c* is provided to overlap with the wiring 45, for example.

The auxiliary wiring 45*c* is a wiring extending in the Y direction. The auxiliary wiring 45*c* is provided to overlap with the wiring 45. Although FIG. 19A illustrates an example in which the auxiliary wiring 45*c* has a smaller width than the wiring 45, the width of the auxiliary wiring 45*c* may be the same as or larger than that of the wiring 45. The auxiliary wiring 45*c* is provided so that at least part of the auxiliary wiring 45*c* overlaps with the wiring 45, for example.

Alternatively, the auxiliary wiring 45*c* may be provided so that part of the auxiliary wiring 45*c* does not overlap with the wiring 45. In such a case, for example, the auxiliary wiring 45*c* is provided close to the wiring 45.

The auxiliary wiring 45*c* and the wiring 41 preferably include regions level with each other. The auxiliary wiring 45*c* and the wiring 41 contain the same materials, for example. In the case where the wiring 41 has a stacked-layer structure, the auxiliary wiring 45*c* has a stacked-layer structure similar to that of the wiring 41, for example. The auxiliary wiring 45*c* and the wiring 41 can be formed by processing one conductive film, for example.

An opening 85 is provided in regions of the insulating layers 103 and 105 overlapping with the wiring 45 and the auxiliary wiring 45*b*. Through the opening 85, the wiring 45 can be in contact with and electrically connected to the auxiliary wiring 45*c*.

Structure Example 6 Including Pixel Circuit

Figure 20A:
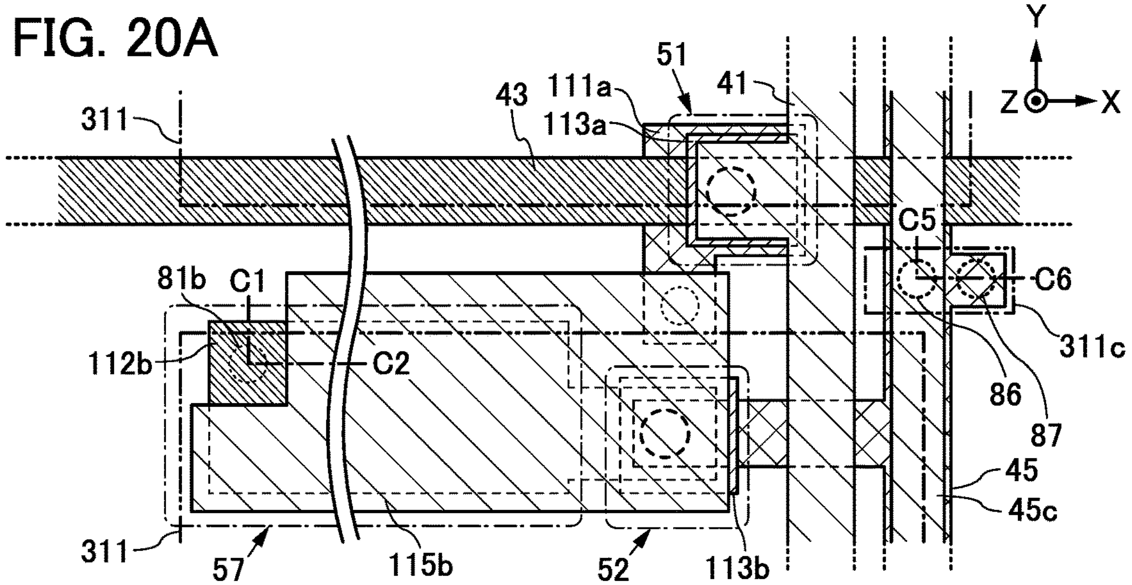
FIG. 20A is a plan view illustrating a structure example including a pixel circuit and FIGS. 20B to 20D are cross-sectional views illustrating the structure example including the pixel circuit.
Figure 20B:
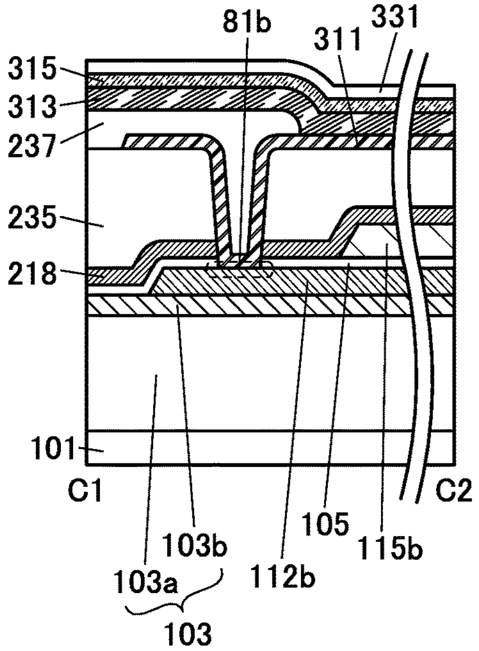
Figure 20C:
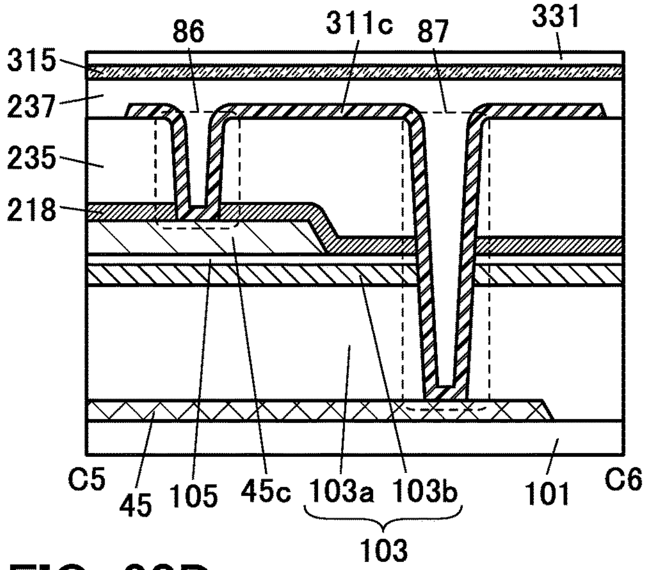

FIG. 20A is a top view illustrating a structure example including the pixel circuit 40A and the wirings 41, 43, and 45 illustrated in FIG. 1C. FIG. 20B is a cross-sectional view taken along dashed line C1-C2 in FIG. 20A, and FIG. 20C is a cross-sectional view taken along dashed line C5-C6 in FIG. 20A. The structure illustrated in FIG. 20A is different from that in FIG. 19A in that the wiring 45 is electrically connected to the auxiliary wiring 45*c* through a conductive layer 311*c* and the wiring 45 has a shape different from that in FIG. 19A, for example.

In FIG. 20A, the pixel electrode 311 electrically connected to the light-emitting element 60 is denoted by a dashed double-dotted line.

As illustrated in FIG. 20B, the insulating layer 218 is provided to cover the conductive layer 112*b*, the insulating layer 105, and the conductive layer 115*b*. The insulating layer 235 is provided over the insulating layer 218. An opening reaching the conductive layer 112*b* is provided in the insulating layers 105, 218, and 235 and the pixel electrode 311 is provided to cover the opening. The pixel electrode 311 is provided to be in contact with the top surface of the conductive layer 112*b* in the region 81*b*, for example.

As illustrated in FIG. 20C, an opening 86 reaching the auxiliary wiring 45*c* is provided in the insulating layers 235 and 218, and an opening 87 reaching the wiring 45 is provided in the insulating layers 235, 218, 105, and 103. The opening 87 overlaps with a region of the wiring 45 having a large wiring width (see FIG. 20A). The region of the wiring 45 overlapping with the opening 87 does not overlap with the auxiliary wiring 45*c*.

The conductive layer 311*c* is provided to cover the top surface of the insulating layer 235 and the openings 86 and 87. The wiring 45 is electrically connected to the auxiliary wiring 45*c* through the conductive layer 311*c*. The conductive layer 311*c* is preferably in contact with the top surface of the wiring 45. The conductive layer 311*c* is preferably in contact with the top surface of the auxiliary wiring 45*b*.

The conductive layer 311*c* and the pixel electrode 311 can be formed by processing one conductive film, for example.

Figure 20D:
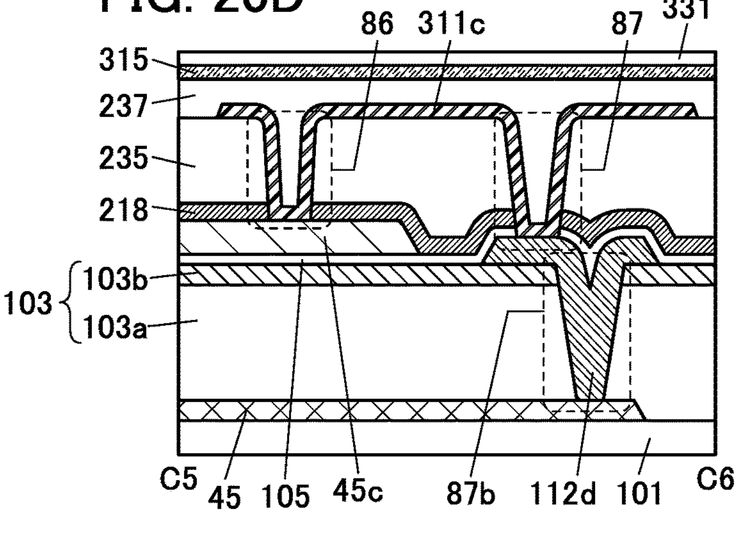

As illustrated in FIG. 20D, an opening 87*b* may be provided in the insulating layer 103 and a conductive layer 112*d* may be provided to cover the opening 87*b* and the top surface of the wiring 45 that is exposed by the provision of the opening 87*b*. In that case, the opening 87 is provided in the insulating layers 235, 218, and 105 and the conductive layer 311*c* is provided to cover the opening 87 and a top surface of the conductive layer 112*d* that is exposed by the provision of the opening 87. In FIG. 20D, the wiring 45 is electrically connected to the auxiliary wiring 45*c* through the conductive layers 311*c* and 112*d*.

Note that the conductive layer 112*d* preferably includes a region level with the wiring 43. The conductive layer 112*d* and the wiring 43 contain the same materials, for example. In the case where the wiring 43 has a stacked-layer structure, the conductive layer 112*d* has a stacked-layer structure similar to that of the wiring 43, for example.

Structure Example 7 Including Pixel Circuit

Figure 21A:
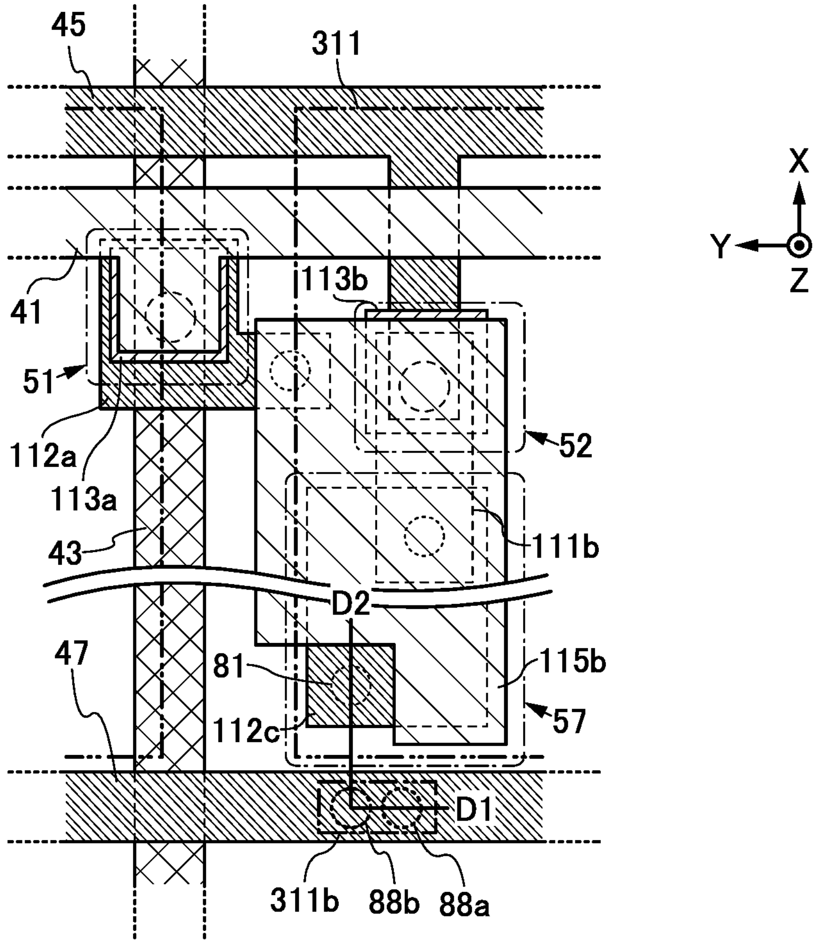
FIG. 21A is a plan view illustrating a structure example including a pixel circuit and FIG. 21B is a cross-sectional view illustrating the structure example including the pixel circuit.
Figure 21B:
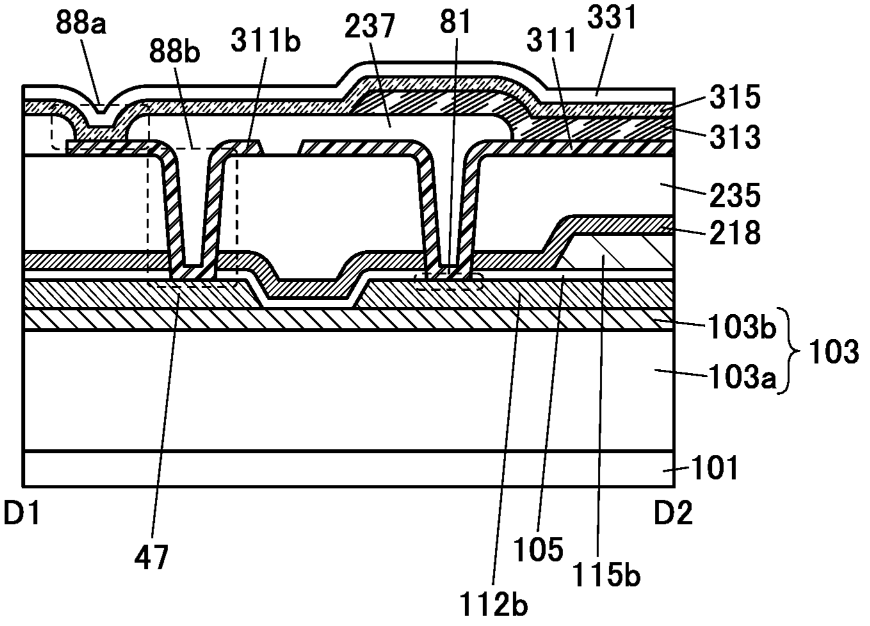

A structure illustrated in FIG. 21A includes the wiring 47 in addition to the components illustrated in FIG. 9A. FIG. 21B is a cross-sectional view taken along solid line D1-D2 in FIG. 21A. The wiring 47 can function as a signal line, for example. The wiring 47 is electrically connected to the common electrode 315 of the light-emitting element 60, for example.

In FIGS. 21A and 21B, the wiring 47 is positioned at a higher level than the wiring 43. The wirings 47 and 45 preferably include regions level with each other.

In the structure example illustrated in FIGS. 21A and 21B, the common electrode 315 is electrically connected to the wiring 47 through the conductive layer 311*b*. The conductive layer 311*b* and the pixel electrode 311 are preferably formed by processing one conductive film, for example. The common electrode 315 is provided to cover an opening 88*a* in the insulating layer 237 and part of a top surface of the conductive layer 311*b*. The conductive layer 311*b* is provided to cover an opening 88*b* provided in the insulating layers 235, 218, and 105 and part of a top surface of the wiring 47.

Figure 22:
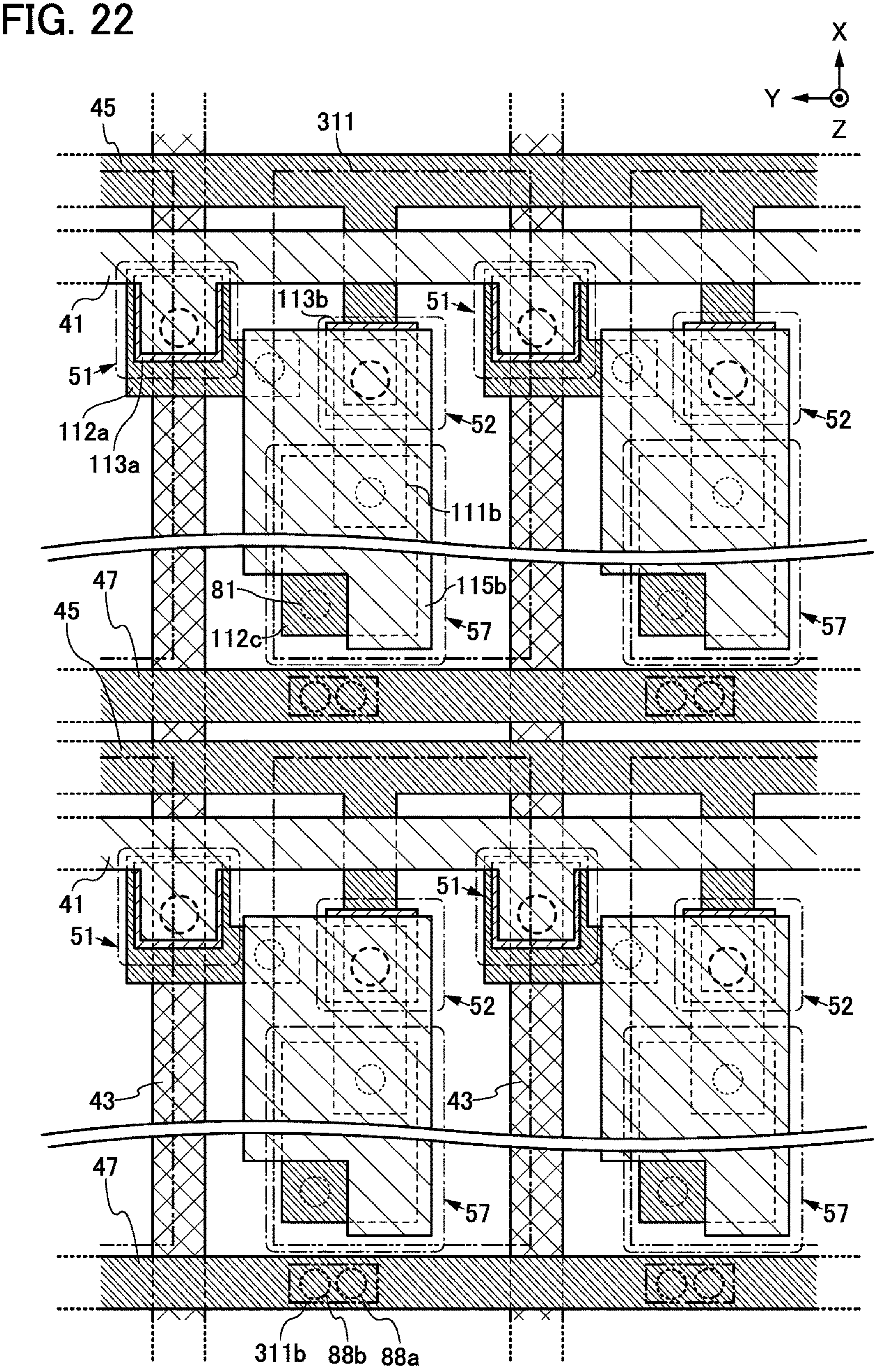
FIG. 22 is a plan view illustrating a structure example including a pixel circuit.

FIG. 22 illustrates an example in which a plurality of structures illustrated in FIG. 21A are arranged in the row direction and the column direction.

Figure 23:
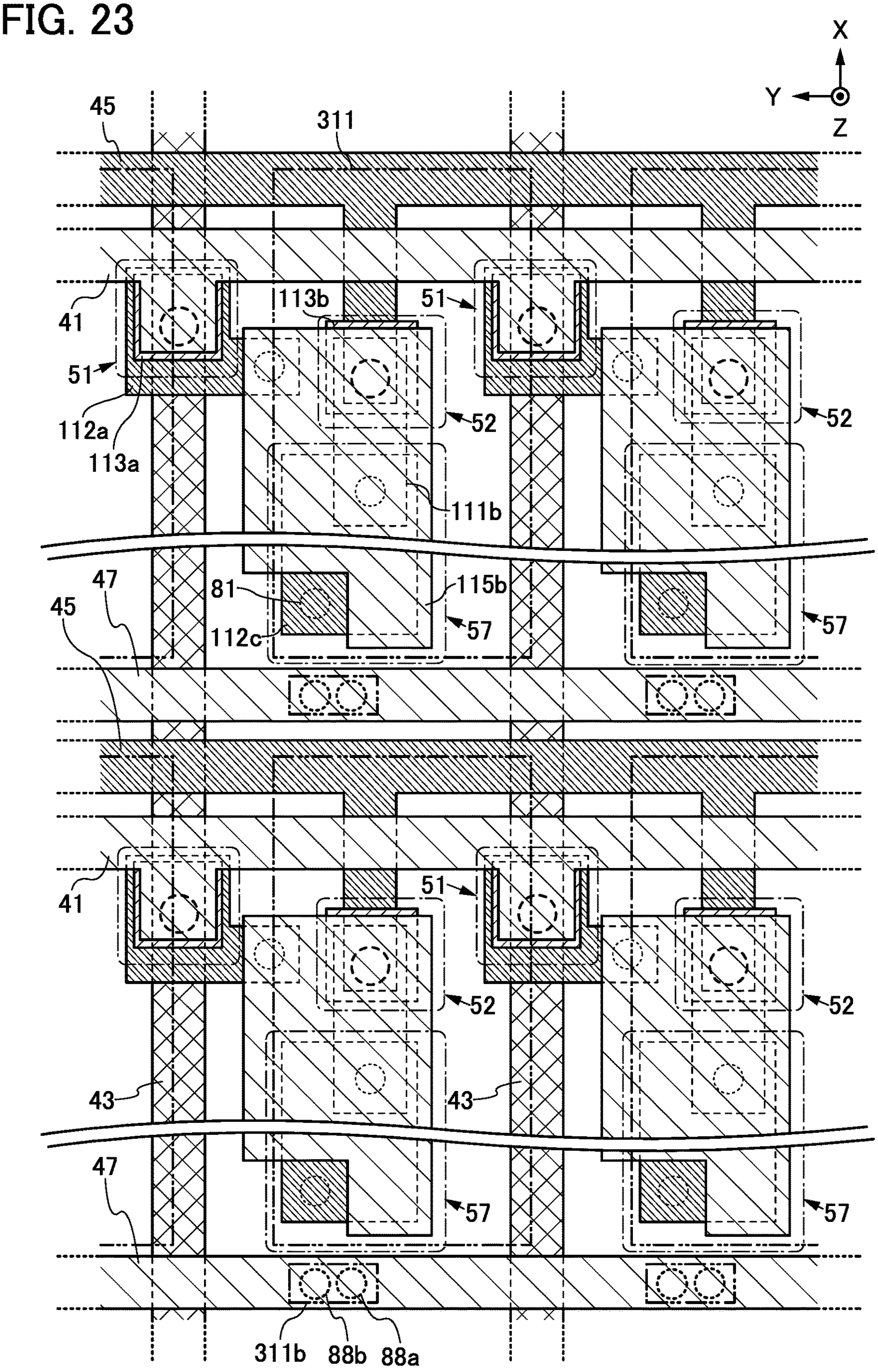
FIG. 23 is a plan view illustrating a structure example including a pixel circuit.

The structure illustrated in FIG. 23 is different from that in FIG. 22 in that the wirings 47 and 41 are formed using the same layer. The wirings 47 and 41 are formed using the same layer and thus include regions level with each other in a cross-sectional view, for example.

Figure 24:
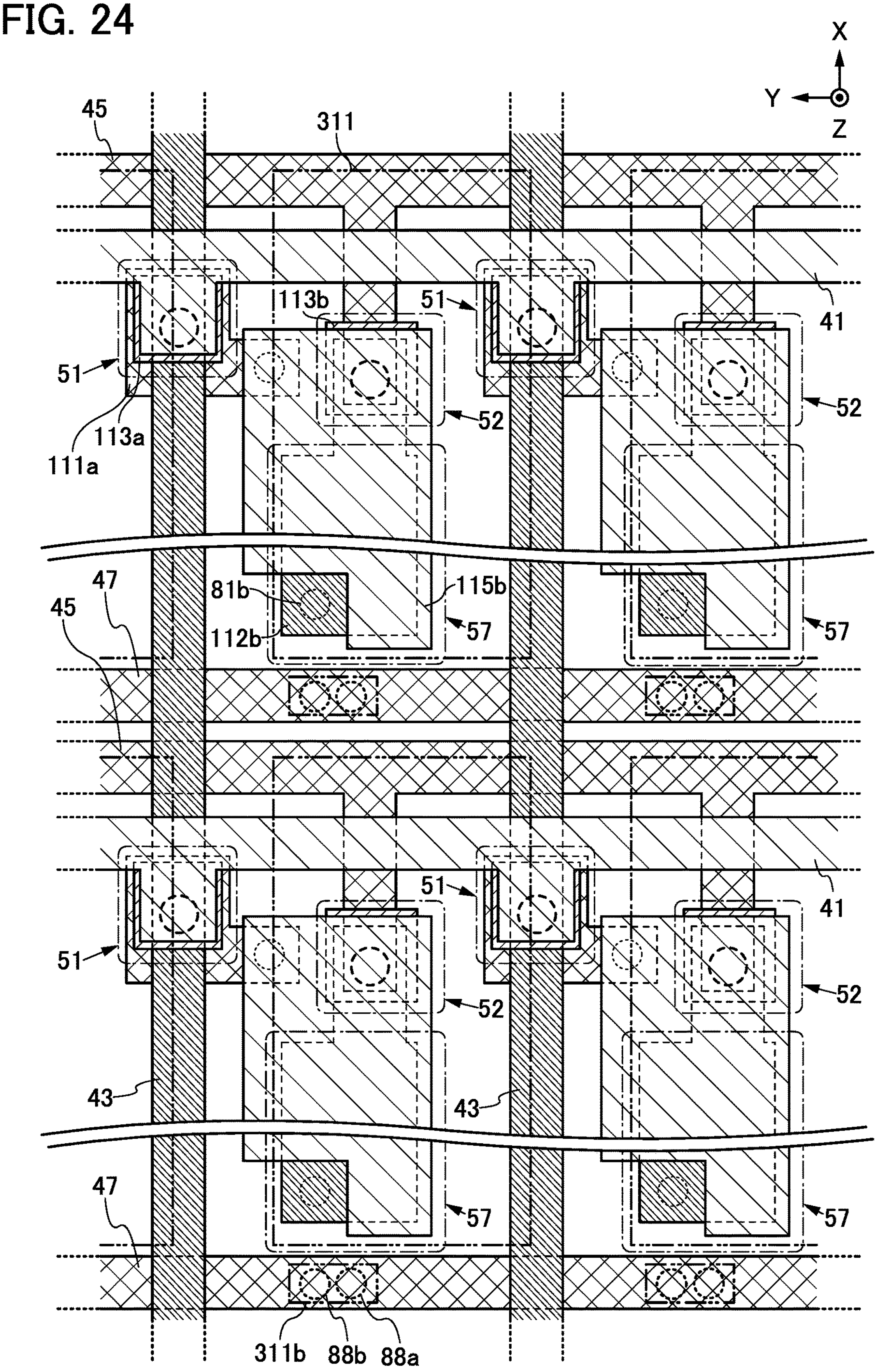
FIG. 24 is a plan view illustrating a structure example including a pixel circuit.

FIG. 24 illustrates an example in which a plurality of structures illustrated in FIG. 13A each further including the wiring 47 are arranged in the row direction and the column direction.

Figure 25:
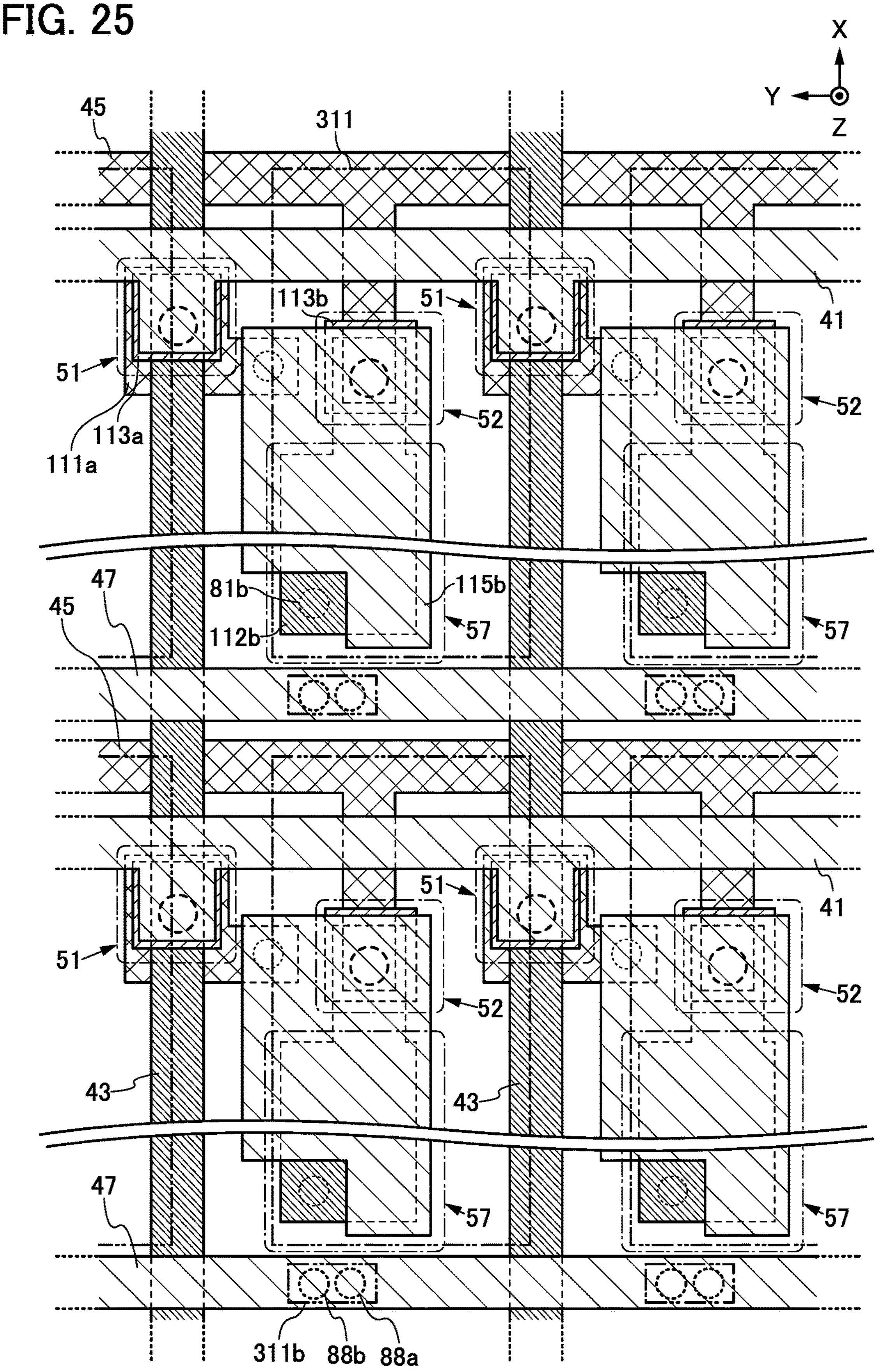
FIG. 25 is a plan view illustrating a structure example including a pixel circuit.

The structure illustrated in FIG. 25 is different from that in FIG. 24 in that the wirings 47 and 41 are formed using the same layer. The wirings 47 and 41 are formed using the same layer and thus include regions level with each other in a cross-sectional view, for example.

In FIGS. 21A and 21B, FIG. 22, and FIG. 24, the wirings 47 and 45 contain the same materials, for example. In the case where the wiring 47 has a stacked-layer structure, the wiring 45 has a stacked-layer structure similar to that of the wiring 47, for example. The wirings 47 and 45 can be formed by processing one conductive film, for example.

In FIG. 23 and FIG. 25, the wirings 47 and 41 contain the same materials, for example. In the case where the wiring 47 has a stacked-layer structure, the wiring 41 has a stacked-layer structure similar to that of the wiring 47, for example. The wirings 47 and 41 can be formed by processing one conductive film, for example.

Structure Example 8 Including Pixel Circuit

Figures 26A, 26B, 26C:
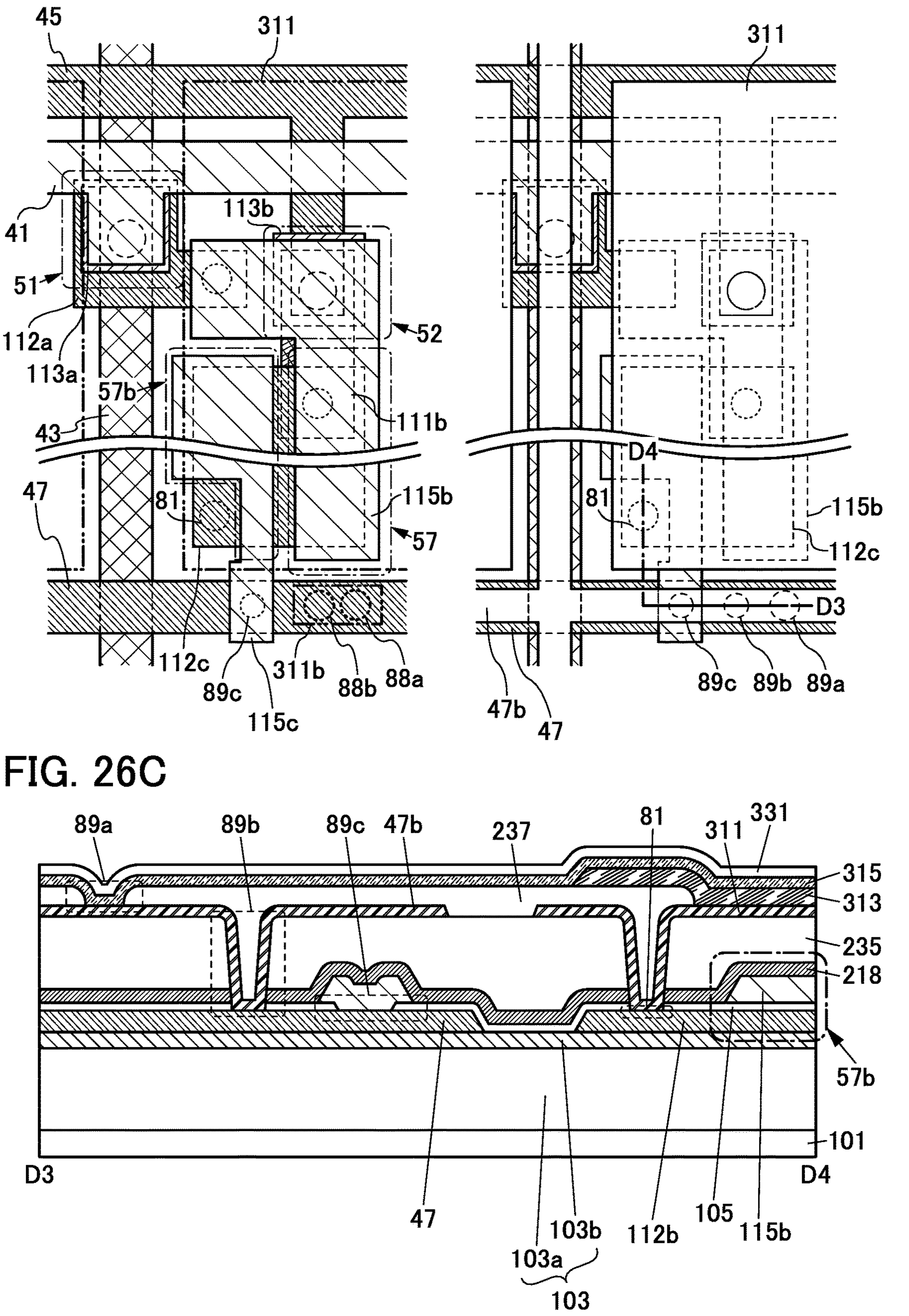
FIGS. 26A and 26B are plan views illustrating structure examples each including a pixel circuit and FIG. 26C is a cross-sectional view illustrating the structure example including the pixel circuit.

FIG. 26A is a top view illustrating a structure example including the pixel circuit 40A_2 and the wirings 41, 43, 45, and 47 illustrated in FIG. 1D. The pixel circuit 40A_2 includes the capacitor 57*b* in addition to the components of the pixel circuit 40A.

The conductive layer 112*c* includes a region functioning as one electrode of the capacitor 57*b*. A conductive layer 115*c* functions as the other electrode of the capacitor 57*b*. The conductive layer 115*c* preferably includes a region level with the conductive layer 115*b*. The conductive layer 115*c* and the conductive layer 115*b* can be formed by processing one conductive film, for example.

The conductive layer 115*c* is electrically connected to the wiring 47, for example. The conductive layer 115*c* includes a region overlapping with the wiring 47. The conductive layer 115*c* is provided to cover part of the top surface of the wiring 47 and an opening 89*c* provided in the insulating layer 105.

As illustrated in FIG. 26B, it is possible to provide a wiring 47*b* having a shape obtained by combining a wiring extending in the longitudinal direction and a wiring extending in the lateral direction. The structure illustrated in FIG. 26B is different from that in FIG. 26A in including the wiring 47*b* instead of the conductive layer 311*b*. By providing a plurality of structures illustrated in FIG. 26B in the longitudinal direction and the lateral direction, a lattice shape can be formed by the wirings 47*b*.

The wiring 47*b* preferably includes a region overlapping with the wiring 47 and linearly extending in substantially the same direction as the wiring 47. The width of the region overlapping with the wiring 47 is substantially equal to or smaller than that of the wiring 47, for example. Alternatively, the width of the region may be larger than that of the wiring 47, and the width is appropriately adjusted so that the wiring 47*b* is apart from the pixel electrode 311 or the like. In addition, the wiring 47*b* preferably includes a region overlapping with the wiring 43 and linearly extending in substantially the same direction as the wiring 43. The width of the region overlapping with the wiring 43 can be substantially equal to or smaller than that of the wiring 43. Alternatively, the width of the region may be larger than that of the wiring 43, and the width is appropriately adjusted so that the wiring 47*b* is apart from the pixel electrode 311 or the like.

In the example illustrated in FIG. 26B, for example, the wiring 47*b* has a shape obtained by combining a region overlapping with the wiring 47, having a smaller wiring width than the wiring 47, and extending substantially linearly and a region overlapping with the wiring 43, having a smaller wiring width than the wiring 43, and extending substantially linearly. FIG. 26C is a cross-sectional view taken along dashed-dotted line D3-D4 in FIG. 26B.

The wiring 47*b* preferably functions as an auxiliary electrode for supplementing the conductivity of the common electrode 315, for example. By providing an auxiliary electrode of the common electrode 315, a drop in voltage due to the resistance of the common electrode can be inhibited even in a large-sized display device.

In FIGS. 26B and 26C, the wiring 47b and the pixel electrode 311 can be formed by processing one conductive film, for example.

In the structure example illustrated in FIGS. 26B and 26C, the common electrode 315 is electrically connected to the wiring 47 through the wiring 47b. The wiring 47b and the pixel electrode 311 are preferably formed by processing one conductive film, for example. The common electrode 315 is provided to cover an opening 89a in the insulating layer 237 and part of a top surface of the wiring 47b. The wiring 47b is provided to cover an opening 89b provided in the insulating layers 235, 218, and 105 and part of the top surface of the wiring 47.

<Manufacturing Method Example of Display Device>

An example of a method for manufacturing the structure illustrated in FIG. 9B is described with reference to FIGS. 27A to 27C and FIGS. 28A and 28B.

Figure 27A:
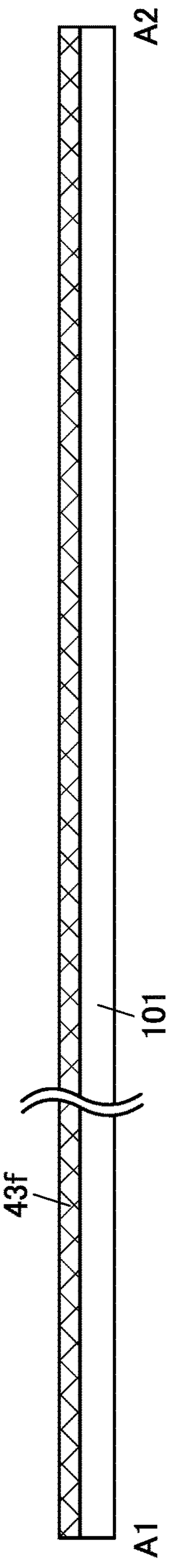
FIGS. 27A to 27C are cross-sectional views illustrating a method for manufacturing a structure example including a pixel circuit.

First, a first conductive film 43f to be the wiring 43, the conductive layer 111b, and the like is formed over the substrate 101 (FIG. 27A).

Figure 27B:
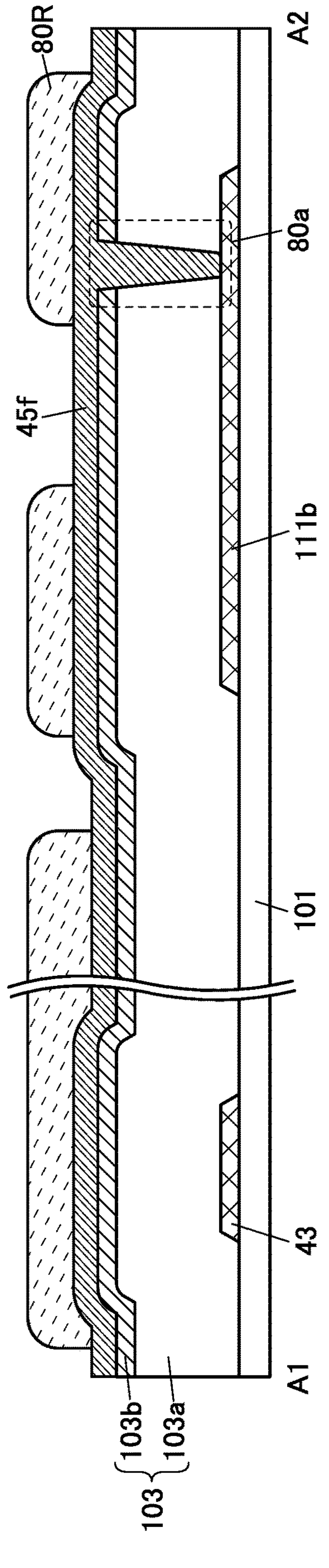

Next, the first conductive film 43f is processed to form the wiring 43 and the conductive layer 111b. Next, the insulating layer 103a is formed over the substrate 101, the wiring 43, and the conductive layer 111b. After that, the insulating layer 103b is formed over the insulating layer 103a. After that, an opening 80a is provided in the insulating layers 103a and 103b. Then, a second conductive film 45f is formed to cover a top surface of the insulating layer 103b, the opening 80a, and the top surface of the conductive layer 111b exposed by the provision of the opening 80a. After that, resist masks 80R are formed over the second conductive film 45f (FIG. 27B).

Figure 27C:
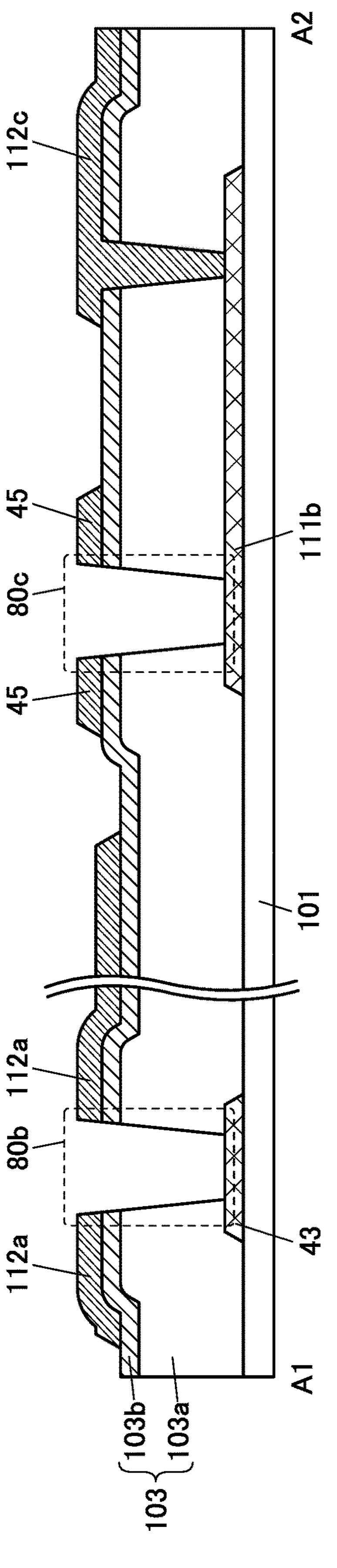

Next, regions of the second conductive film 45f that are not covered with the resist masks 80R are removed. After that, an opening 80b and an opening 80c are provided in the remaining regions of the second conductive film 45f and the insulating layers 103b and 103a. The openings 80b and 80c are provided, so that the wiring 45, the conductive layer 112a, and the conductive layer 112c are formed (FIG. 27C).

Figure 28A:
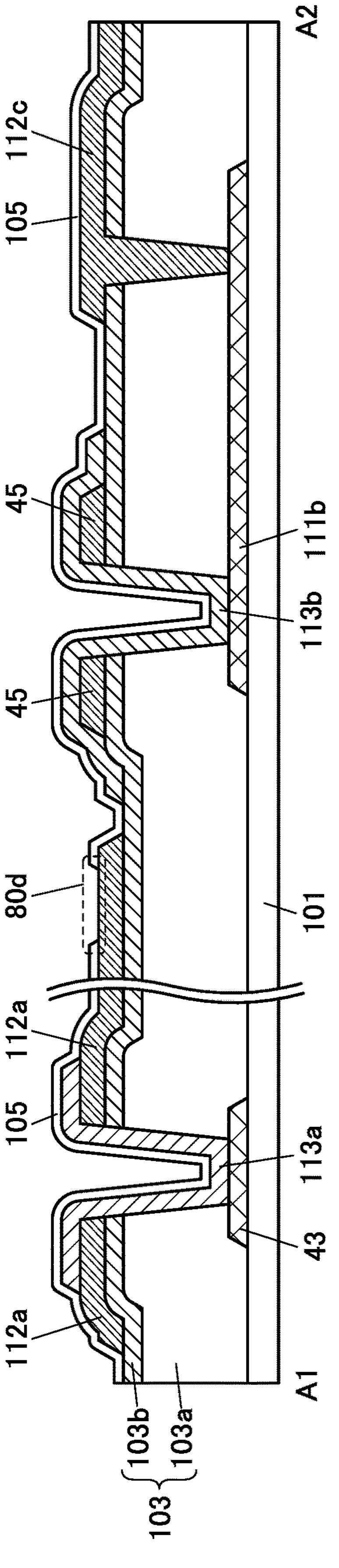
FIGS. 28A and 28B are cross-sectional views illustrating a method for manufacturing a structure example including a pixel circuit.

Next, a semiconductor film is formed over the wiring 45, the conductive layers 112a and 112c, and the insulating layer 103b, and the semiconductor film is processed to form the semiconductor layers 113a and 113b. After that, the insulating layer 105 is formed over the semiconductor layers 113a and 113b and the conductive layers 112a and 112c. After that, an opening 80d is provided in the insulating layer 105 (FIG. 28A).

Figure 28B:
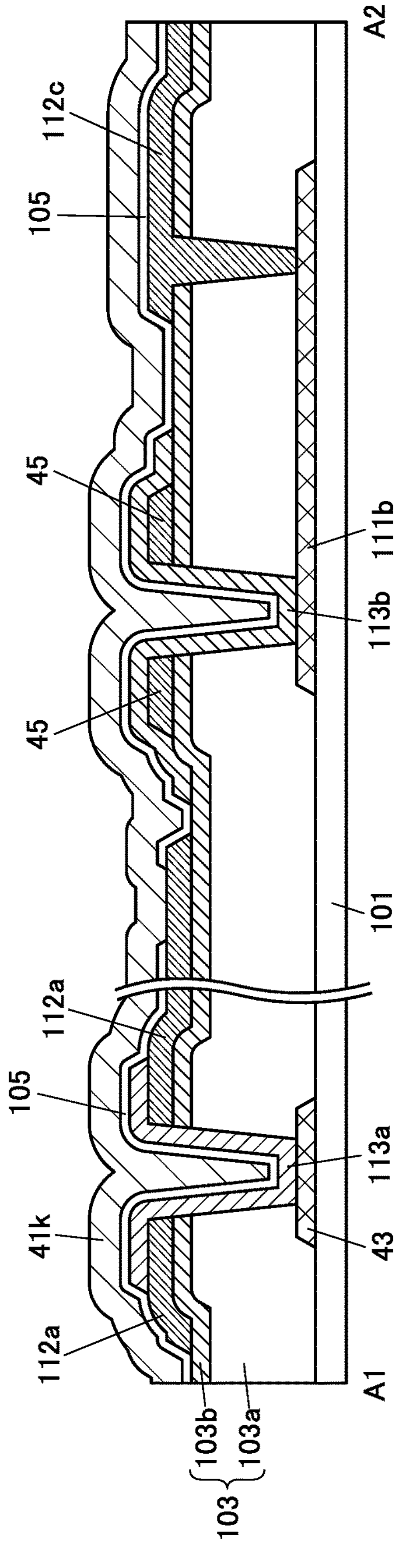

Next, a third conductive film 41k is formed over the insulating layer 105, the opening 80d, and the conductive layer 112a exposed by the provision of the opening 80d (FIG. 28B). After that, the third conductive film 41k is processed to form the wiring 41 and the conductive layer 115b, whereby the structure illustrated in FIG. 9B can be manufactured.

Here, both the wiring 43 and the conductive layer 111b are formed using the first conductive film 43f. Both the wiring 43 and the conductive layer 111b are preferably provided on and in contact with the substrate 101. The wiring 43 and the conductive layer 111b preferably include regions level with each other, for example.

Here, all of the wiring 45 and the conductive layers 112a and 112c are formed using the second conductive film 45f. All of the wiring 45 and the conductive layers 112a and 112c are preferably provided on and in contact with the insulating layer 103. The wiring 45 and the conductive layers 112a and 112c preferably include regions level with each other, for example.

Note that the top surface of the insulating layer 103 may be uneven depending on unevenness of a surface on which the insulating layer 103 is formed. In that case, the level may vary from region to region also in the second conductive film 45f depending on unevenness of a surface on which the second conductive film 45f is formed. Thus, the levels of the wiring 45 and the conductive layers 112a and 112c may be different from each other depending on unevenness of the surface on which the second conductive film 45f is formed.

Both the wiring 41 and the conductive layer 115b are formed using the third conductive film 41k. Both the wiring 41 and the conductive layer 115b are preferably provided on and in contact with the insulating layer 105. The wiring 41 and the conductive layer 115b preferably include regions level with each other, for example.

Note that the top surface of the insulating layer 105 may be uneven depending on unevenness of a surface on which the insulating layer 105 is formed. In that case, the level may vary from region to region also in the third conductive film 41k depending on unevenness of a surface on which the third conductive film 41k is formed. Thus, the levels of the wiring 41 and the conductive layer 115b may be different from each other depending on unevenness of the surface on which the third conductive film 41k is formed.

Figure 29A:
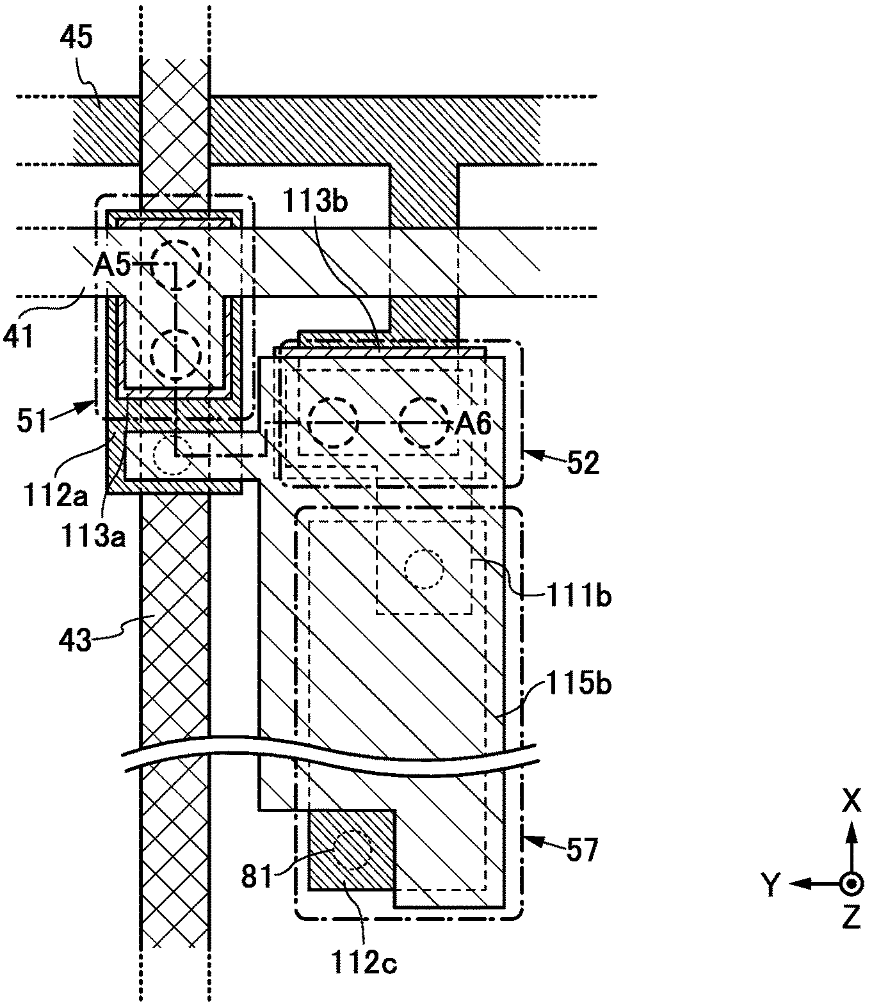
FIG. 29A is a plan view illustrating a structure example including a pixel circuit and FIG. 29B is a cross-sectional view illustrating the structure example including the pixel circuit.
Figure 29B:
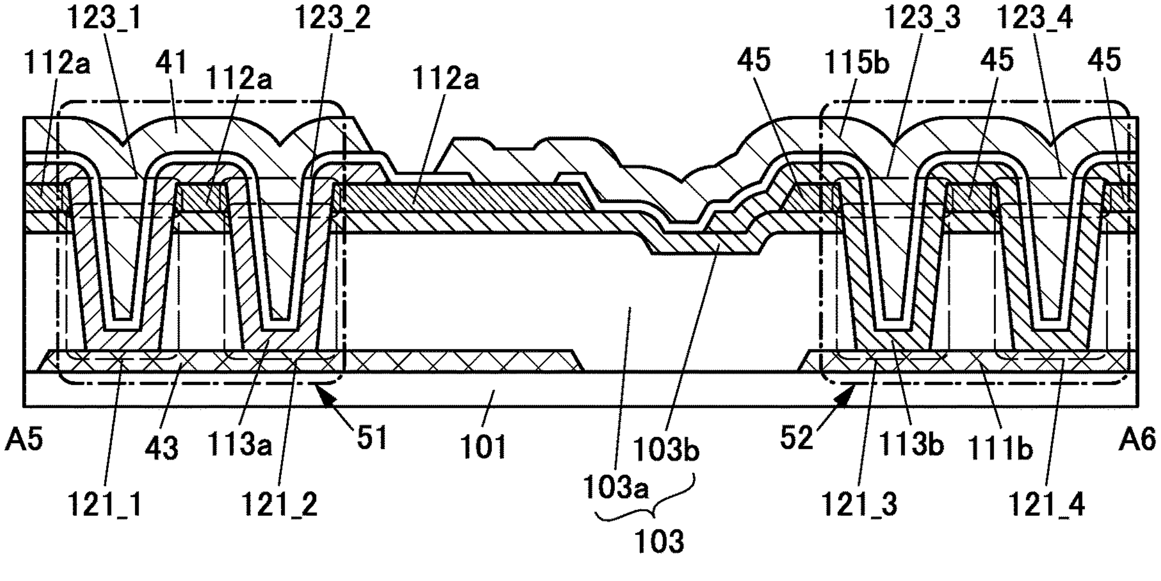

FIGS. 29A and 29B illustrate an example in which the semiconductor layer 113a of the transistor 51 is provided to be positioned in a plurality of openings provided in the insulating layer 103 and a plurality of openings provided in the conductive layer 112a. Also in this example, the semiconductor layer 113b of the transistor 52 is provided to be positioned in a plurality of openings provided in the insulating layer 103 and a plurality of openings provided in the wiring 45. It can be expressed that the transistor 51 illustrated in FIG. 29B has a structure in which a first transistor whose channel formation region is a region of the semiconductor layer 113a provided in an opening 1211 and a second transistor whose channel formation region is a region of the semiconductor layer 113a provided in an opening 121_2 are connected in parallel. It can be expressed that the transistor 52 illustrated in FIG. 29B has a structure in which a third transistor whose channel formation region is a region of the semiconductor layer 113b provided in an opening 121_3 and a fourth transistor whose channel formation region is a region of the semiconductor layer 113b provided in an opening 121_4 are connected in parallel.

In FIGS. 29A and 29B, the insulating layer 103 has four openings 121 (hereinafter, the openings 121_1, 121_2, 121_3, and 1214) reaching the conductive layer 111a. The conductive layer 112a has an opening 123_1 and an opening 123_2 reaching the opening 121_1 and the opening 1212, respectively. The wiring 45 has an opening 123_3 and an opening 1234 reaching the opening 1213 and the opening 121_4, respectively.

The semiconductor layer 113a is provided to cover the openings 121_1, 123_1, 121_2, and 123_2 and include regions positioned in the openings 121_1, 123_1, 121_2, and 123_2.

The semiconductor layer 113b is provided to cover the openings 1213, 123_3, 1214, and 123_4 and include regions positioned in the openings 121_3, 123_3, 121_4, and 123_4.

Components of the display device of this embodiment will be described below.

<Components of Display Device>

[Semiconductor Layer 113]

The semiconductor material that can be used for the semiconductor layer 113 is not particularly limited. For example, a single-element semiconductor or a compound semiconductor can be used. As the single-element semiconductor, silicon or germanium can be used, for example. Examples of the compound semiconductor include gallium arsenide and silicon germanium. As the compound semiconductor, an organic substance having semiconductor characteristics or a metal oxide having semiconductor characteristics (also referred to as an oxide semiconductor) can be used. Note that such a semiconductor material may contain an impurity as a dopant.

There is no particular limitation on the crystallinity of a semiconductor material used for the semiconductor layer 113, and an amorphous semiconductor or a semiconductor having crystallinity (a single-crystal semiconductor, a polycrystalline semiconductor, a microcrystalline semiconductor, or a semiconductor partly including crystal regions) may be used. It is preferable to use a semiconductor having crystallinity, in which case deterioration of the transistor characteristics can be suppressed.

For the semiconductor layer 113, silicon can be used. Examples of silicon include single crystal silicon, polycrystalline silicon, microcrystalline silicon, and amorphous silicon. An example of polycrystalline silicon is low-temperature polysilicon (LTPS).

A transistor including amorphous silicon in the semiconductor layer 113 can be formed over a large-sized glass substrate, thereby reducing the manufacturing cost. A transistor including polycrystalline silicon in the semiconductor layer 113 has high field-effect mobility and enables high-speed driving. A transistor including microcrystalline silicon in the semiconductor layer 113 has higher field-effect mobility and enables higher speed driving than the transistor including amorphous silicon.

The semiconductor layer 113 preferably includes a metal oxide (an oxide semiconductor). Examples of the metal oxide that can be used for the semiconductor layer 113 include indium oxide, gallium oxide, and zinc oxide. The metal oxide preferably contains at least indium (In) or zinc (Zn). The metal oxide preferably contains two or three kinds selected from indium, the element M, and zinc. The element M is one or more of gallium, aluminum, silicon, boron, yttrium, tin, copper, vanadium, beryllium, titanium, iron, nickel, germanium, zirconium, molybdenum, lanthanum, cerium, neodymium, hafnium, tantalum, tungsten, cobalt, and magnesium. Specifically, the element M is preferably one or more of aluminum, gallium, yttrium, and tin.

Examples of the metal oxide that can be used for the semiconductor layer 113 include indium oxide, indium zinc oxide (In—Zn oxide), indium tin oxide (In—Sn oxide), indium titanium oxide (In—Ti oxide), indium aluminum zinc oxide (In—Al—Zn oxide, also referred to as IAZO), indium tin zinc oxide (In—Sn—Zn oxide), indium titanium zinc oxide (In—Ti—Zn oxide), indium gallium zinc oxide (In—Ga—Zn oxide, also referred to as IGZO), indium gallium tin zinc oxide (In—Ga—Sn—Zn oxide), and indium gallium aluminum zinc oxide (In—Ga—Al—Zn oxide, also referred to as IGAZO or IAGZO). Alternatively, indium tin oxide containing silicon or the like can be used.

The element M is preferably one or more selected from gallium, aluminum, yttrium, and tin. In particular, the element M is preferably gallium.

The composition of the metal oxide included in the semiconductor layer 113 significantly affects the electrical characteristics and reliability of the transistor 50.

For example, a metal oxide with a higher content of indium enables the transistor to have a high on-state current.

As the In—Zn oxide used for the semiconductor layer 113, a metal oxide in which the atomic ratio of indium is higher than or equal to that of zinc is preferably used. For example, a metal oxide with metal elements in an atomic ratio of In:Zn=1:1, In:Zn=2:1, In:Zn=3:1, In:Zn=4:1, In:Zn=5:1, In:Zn=7:1, or In:Zn=10:1, or the vicinity thereof can be used.

In the case where In—Sn oxide is used for the semiconductor layer 113, a metal oxide in which the atomic ratio of indium is higher than or equal to that of tin is preferably used. For example, a metal oxide with metal elements in an atomic ratio of In:Sn=1:1, In:Sn=2:1, In:Sn=3:1, In:Sn=4:1, In:Sn=5:1, In:Sn=7:1, or In:Sn=10:1, or the vicinity thereof can be used.

In the case where In—Sn—Zn oxide is used for the semiconductor layer 113, a metal oxide in which the atomic ratio of indium is higher than that of tin is preferably used. It is further preferable to use a metal oxide in which the atomic ratio of zinc is higher than that of tin. For example, a metal oxide with metal elements in any of the following atomic ratios can be used: In:Sn:Zn=2:1:3, In:Sn:Zn=3:1:2, In:Sn:Zn=4:2:3, In:Sn:Zn=4:2:4.1, In:Sn:Zn=5:1:3, In:Sn:Zn=5:1:6, In:Sn:Zn=5:1:7, In:Sn:Zn=5:1:8, In:Sn:Zn=6:1:6, In:Sn:Zn=10:1:3, In:Sn:Zn=10:1:6, In:Sn:Zn=10:1:7, In:Sn:Zn=10:1:8, In:Sn:Zn=5:2:5, In:Sn:Zn=10:1:10, In:Sn:Zn=20:1:10, In:Sn:Zn=40:1:10, or the vicinity thereof.

In the case where In—Al—Zn oxide is used for the semiconductor layer 113, a metal oxide in which the atomic ratio of indium is higher than that of aluminum is preferably used. It is further preferable to use a metal oxide in which the atomic ratio of zinc is higher than that of aluminum. For example, a metal oxide with metal elements in any of the following atomic ratios can be used: In:Al:Zn=2:1:3, In:Al:Zn=3:1:2, In:Al:Zn=4:2:3, In:Al:Zn=4:2:4.1, In:Al:Zn=5:1:3, In:Al:Zn=5:1:6, In:Al:Zn=5:1:7, In:Al:Zn=5:1:8, In:Al:Zn=6:1:6, In:Al:Zn=10:1:3, In:Al:Zn=10:1:6, In:Al:Zn=10:1:7, In:Al:Zn=10:1:8, In:Al:Zn=5:2:5, In:Al:Zn=10:1:10, In:Al:Zn=20:1:10, In:Al:Zn=40:1:10, or the vicinity thereof.

In the case where In—Ga—Zn oxide is used for the semiconductor layer 113, a metal oxide in which the atomic ratio of indium is higher than that of gallium is preferably used. It is further preferable to use a metal oxide in which the atomic ratio of zinc is higher than that of gallium. For example, a metal oxide with metal elements in any of the following atomic ratios can be used for the semiconductor layer 113: In:Ga:Zn=2:1:3, In:Ga:Zn=3:1:2, In:Ga:Zn=4:2:3, In:Ga:Zn=4:2:4.1, In:Ga:Zn=5:1:3, In:Ga:Zn=5:1:6, In:Ga:Zn=5:1:7, In:Ga:Zn=5:1:8, In:Ga:Zn=6:1:6, In:Ga:Zn=10:1:3, In:Ga:Zn=10:1:6, In:Ga:Zn=10:1:7, In:Ga:Zn=10:1:8, In:Ga:Zn=5:2:5, In:Ga:Zn=10:1:10, In:Ga:Zn=20:1:10, In:Ga:Zn=40:1:10, or the vicinity thereof.

In the case where In-M-Zn oxide is used for the semiconductor layer 113, a metal oxide in which the atomic ratio of indium is higher than that of the element M can be used. It is further preferable to use a metal oxide in which the atomic ratio of zinc is higher than that of the element M. For example, a metal oxide with metal elements in any of the following atomic ratios can be used for the semiconductor layer 113: In:M:Zn=2:1:3, In:M:Zn=3:1:2, In:M:Zn=4:2:3, In:M:Zn=4:2:4.1, In:M:Zn=5:1:3, In:M:Zn=5:1:6, In:M:Zn=5:1:7, In:M:Zn=5:1:8, In:M:Zn=6:1:6, In:M:Zn=10:1:3, In:M:Zn=10:1:6, In:M:Zn=10:1:7, In:M:Zn=10:1:8, In:M:Zn=5:2:5, In:M:Zn=10:1:10, In:M:Zn=20:1:10, In:M:Zn=40:1:10, or the vicinity thereof.

In the case where a plurality of metal elements are contained as the element M, the atomic ratio of the sum of the metal elements can be the atomic ratio of the element M. In In—Ga—Al—Zn oxide where gallium and aluminum are contained as the element M, for example, the atomic ratio of the sum of gallium and aluminum can be the atomic ratio of the element M. The atomic ratio of indium to the element M to zinc is preferably within the ranges given above.

It is preferable to use a metal oxide in which the proportion of the number of indium atoms to the number of atoms of the metal elements contained in the metal oxide is higher than or equal to 30 atomic % and lower than or equal to 100 atomic %, preferably higher than or equal to 30 atomic % and lower than or equal to 95 atomic %, further preferably higher than or equal to 35 atomic % and lower than or equal to 95 atomic %, further preferably higher than or equal to 35 atomic % and lower than or equal to 90 atomic %, further preferably higher than or equal to 40 atomic % and lower than or equal to 90 atomic %, further preferably higher than or equal to 45 atomic % and lower than or equal to 90 atomic %, further preferably higher than or equal to 50 atomic % and lower than or equal to 80 atomic %, further preferably higher than or equal to 60 atomic % and lower than or equal to 80 atomic %, further preferably higher than or equal to 70 atomic % and lower than or equal to 80 atomic %. For example, when In—Ga—Zn oxide is used for the semiconductor layer 113, the proportion of the number of indium atoms to the total number of indium atoms, atoms of the element M, and zinc atoms is preferably within the ranges given above.

In this specification and the like, the proportion of the number of indium atoms to the number of atom of the metal elements contained is sometimes referred to as indium content. The same applies to other metal elements.

A metal oxide with a higher indium content enables the transistor to have a high on-state current. By using such a transistor as a transistor required to have a high on-state current, a display device having excellent electrical characteristics can be provided.

As an analysis method of the composition of a metal oxide, for example, energy dispersive X-ray spectroscopy (EDX), X-ray photoelectron spectroscopy (XPS), inductively coupled plasma-mass spectrometry (ICP-MS), inductively coupled plasma-atomic emission spectroscopy (ICP-AES), or the like can be used. Alternatively, any of these methods may be combined with each other for the analysis. Note that as for an element whose content is low, the actual content may be different from the content obtained by analysis because of the influence of the analysis accuracy. In the case where the content of the element M is low, for example, the content of the element M obtained by analysis may be lower than the actual content.

In this specification and the like, the vicinity of the atomic ratio includes ±30% of an intended atomic ratio. For example, in the case of describing an atomic ratio of In:M:Zn=4:2:3 or a composition in the vicinity thereof, the case is included in which with the atomic ratio of indium being 4, the atomic ratio of M is higher than or equal to 1 and lower than or equal to 3 and the atomic ratio of zinc is higher than or equal to 2 and lower than or equal to 4. In the case of describing an atomic ratio of In:M:Zn=5:1:6 or a composition in the vicinity thereof, the case is included in which with the atomic ratio of indium being 5, the atomic ratio of M is higher than 0.1 and lower than or equal to 2 and the atomic ratio of zinc is higher than or equal to 5 and lower than or equal to 7. In the case of describing an atomic ratio of In to M to Zn that is 1:1:1 or a composition in the vicinity thereof, the case is included in which with the atomic ratio of indium being 1, the atomic ratio of M is higher than 0.1 and lower than or equal to 2 and the atomic ratio of zinc is higher than 0.1 and lower than or equal to 2.

For the formation of a metal oxide, a sputtering method or an atomic layer deposition (ALD) method can be suitably used. Note that in the case where the metal oxide is formed by a sputtering method, the atomic ratio in a target may be different from the atomic ratio in the metal oxide. Especially for zinc, the atomic ratio of zinc in the metal oxide is lower than that in the target in some cases. Specifically, the atomic ratio of zinc in the metal oxide may be approximately higher than or equal to 40% and lower than or equal to 90% of the atomic ratio of zinc in the target.

Here, the reliability of a transistor is described. Here, one of indexes for evaluating the reliability of a transistor is a gate bias-temperature stress (GBT) test in which an electric field applied to a gate is retained. A GBT test includes a positive bias-temperature stress (PBTS) test in which a positive potential (positive bias) with respect to a source potential and a drain potential is supplied to a gate and retained at a high temperature and a negative bias-temperature stress (NBTS) test in which a negative potential (negative bias) is supplied to a gate and retained at a high temperature. The PBTS test and the NBTS test conducted in a state where irradiation with light is performed are respectively referred to as a positive bias temperature illumination stress (PBTIS) test and a negative bias temperature illumination stress (NBTIS) test.

In an n-channel transistor, a positive potential is supplied to a gate when the transistor becomes an on state (a state in which a current flows); thus, the amount of change in the threshold voltage in a PBTS test is one of important indexes to be focused on as a reliability indicator of the transistor.

With the use of a metal oxide that does not contain gallium or has a low gallium content in the semiconductor layer 113, the transistor can be highly reliable against positive bias application. In other words, the amount of change in the threshold voltage of the transistor in the PBTS test can be small. Meanwhile, with the use of a metal oxide that contains gallium, the gallium content is preferably lower than the indium content so that the transistor can be highly reliable.

One of the factors changing the threshold voltage in the PBTS test is a defect state at the interface between a gate insulating layer and a semiconductor layer or in the vicinity of the interface. As the density of defect states increases, degradation in the PBTS test becomes significant. Generation of a defect state can be inhibited by a reduction in the gallium content in a region of the semiconductor layer, which is in contact with the gate insulating layer.

The following can be given as the reason why the amount of change in the threshold voltage in the PBTS test can be reduced when a metal oxide that does not contain gallium or has a low gallium content is used for the semiconductor layer. Gallium contained in the metal oxide more easily attracts oxygen than another metal element (e.g., indium or zinc). Therefore, when, at the interface between the metal oxide containing a large amount of gallium and the gate insulating layer, gallium is bonded to excess oxygen in the gate insulating layer, trap sites of carriers (here, electrons) are likely to be generated easily. This might cause the change in the threshold voltage when a positive potential is supplied to a gate and carriers are trapped at the interface between the semiconductor layer and the gate insulating layer.

Specifically, in the case where In—Ga—Zn oxide is used for the semiconductor layer 113, a metal oxide in which the atomic ratio of indium is higher than that of gallium can be used for the semiconductor layer 113. It is further preferable to use a metal oxide in which the atomic ratio of zinc is higher than that of gallium. In other words, a metal oxide with metal elements in an atomic ratio satisfying both relation In >Ga and Zn>Ga is preferably used for the semiconductor layer 113.

For example, a metal oxide with metal elements in any of the following atomic ratios can be used for the semiconductor layer 113: In:Ga:Zn=2:1:3, In:Ga:Zn=3:1:2, In:Ga:Zn=4:2:3, In:Ga:Zn=4:2:4.1, In:Ga:Zn=5:1:3, In:Ga:Zn=5:1:6, In:Ga:Zn=5:1:7, In:Ga:Zn=5:1:8, In:Ga:Zn=6:1:6, In:Ga:Zn=10:1:3, In:Ga:Zn=10:1:6, In:Ga:Zn=10:1:7, In:Ga:Zn=10:1:8, In:Ga:Zn=5:2:5, In:Ga:Zn=10:1:10, In:Ga:Zn=20:1:10, In:Ga:Zn=40:1:10, and the vicinity thereof.

In the case where a metal oxide is used for the semiconductor layer 113, the proportion of the number of gallium atoms to the number of atoms of the metal elements contained in the metal oxide is higher than 0 atomic % and lower than or equal to 50 atomic %, preferably higher than or equal to 0.1 atomic % and lower than or equal to 40 atomic %, further preferably higher than or equal to 0.1 atomic % and lower than or equal to 35 atomic %, further preferably higher than or equal to 0.1 atomic % and lower than or equal to 30 atomic %, further preferably higher than or equal to 0.1 atomic % and lower than or equal to 25 atomic %, further preferably higher than or equal to 0.1 atomic % and lower than or equal to 20 atomic %, further preferably higher than or equal to 0.1 atomic % and lower than or equal to 15 atomic %, further preferably higher than or equal to 0.1 atomic % and lower than or equal to 10 atomic %. The reduction in the gallium content in the semiconductor layer enables the transistor to be highly resistant to the PBTS test. Note that oxygen vacancies ($V_O$) are less likely to be generated in the metal oxide when the metal oxide contains gallium, for example.

A metal oxide that does not contain gallium may be used for the semiconductor layer 113. For example, In—Zn oxide can be used for the semiconductor layer 113. In this case, when the atomic ratio of indium to the metal elements contained in the metal oxide is increased, the field-effect mobility of the transistor can be increased. By contrast, when the atomic ratio of zinc to the metal elements contained in the metal oxide is increased, the metal oxide has high crystallinity; thus, a change in the electrical characteristics of the transistor can be suppressed and the reliability can be increased. A metal oxide that contains neither gallium nor zinc, such as indium oxide, can be used for the semiconductor layer 113. The use of a metal oxide not containing gallium can make a change in the threshold voltage particularly in the PBTS test extremely small.

For example, an oxide containing indium and zinc can be used for the semiconductor layer 113. At that time, for example, a metal oxide with metal elements in an atomic ratio of In:Zn=2:3, In:Zn=4:1, or the vicinity thereof can be used.

Although the case of using gallium is described as an example, the same applies in the case where the element M is used instead of gallium. A metal oxide that has an atomic ratio of indium higher than that of the element M is preferably used for the semiconductor layer 113. Furthermore, a metal oxide that has an atomic ratio of zinc higher than that of the element M is preferably used.

With the use of a metal oxide with a low content of the element M for the semiconductor layer 113, the transistor can be highly reliable against positive bias application. With the use of the transistor as a transistor that is required to have high reliability against positive bias application, a highly reliable display device can be provided.

Next, the reliability of a transistor against light is described.

Light incidence on a transistor may change its electrical characteristics. In particular, a transistor provided in a region on which light can be incident preferably exhibits a small variation in electrical characteristics under light irradiation and has high reliability against light. The reliability against light can be evaluated by the amount of change in threshold voltage in a NBTIS test, for example.

The high content of the element M in a metal oxide enables the transistor to be highly reliable against light. In other words, the amount of change in the threshold voltage of the transistor in the NBTIS test can be small. Specifically, in a metal oxide in which the atomic ratio of the element M is higher than or equal to that of indium, the band gap is increased and accordingly the amount of change in the threshold voltage of the transistor in the NBTIS test can be reduced. The band gap of the metal oxide in the semiconductor layer 113 is preferably greater than or equal to 2.0 eV, further preferably greater than or equal to 2.5 eV, further preferably greater than or equal to 3.0 eV, further preferably greater than or equal to 3.2 eV, further preferably greater than or equal to 3.3 eV, further preferably greater than or equal to 3.4 eV, further preferably greater than or equal to 3.5 eV.

For example, a metal oxide with metal elements in an atomic ratio of In:M:Zn=1:1:1, In:M:Zn=1:1:1.2, In:M:Zn=1:3:2, In:M:Zn=1:3:3, or In:M:Zn=1:3:4, or the vicinity thereof can be used for the semiconductor layer 113.

For the semiconductor layer 113, in particular, it is preferable to use a metal oxide in which the proportion of the number of atoms of the element Mto the number of atoms of the metal elements contained in the metal oxide is higher than or equal to 20 atomic % and lower than or equal to 70 atomic %, preferably higher than or equal to 30 atomic % and lower than or equal to 70 atomic %, further preferably higher than or equal to 30 atomic % and lower than or equal to 60 atomic %, further preferably higher than or equal to 40 atomic % and lower than or equal to 60 atomic %, further preferably higher than or equal to 50 atomic % and lower than or equal to 60 atomic %.

In the case where In—Ga—Zn oxide is used for the semiconductor layer 113, a metal oxide in which the atomic ratio of indium is lower than or equal to that of gallium can be used. For example, a metal oxide with metal elements in any of the following atomic ratios can be used: In:Ga:Zn=1:1:1, In:Ga:Zn=1:1:1.2, In:Ga:Zn=1:3:2, In:Ga:Zn=1:3:3, In:Ga:Zn=1:3:4, and the vicinity thereof.

For the semiconductor layer 113, in particular, it is preferable to use a metal oxide in which the proportion of the number of gallium atoms to the number of atoms of the metal elements contained in the metal oxide is higher than or equal to 20 atomic % and lower than or equal to 60 atomic %, preferably higher than or equal to 20 atomic % and lower than or equal to 50 atomic %, further preferably higher than or equal to 30 atomic % and lower than or equal to 50 atomic %, further preferably higher than or equal to 40 atomic % and lower than or equal to 60 atomic %, further preferably higher than or equal to 50 atomic % and lower than or equal to 60 atomic %.

With the use of a metal oxide with a high content of the element M for the semiconductor layer 113, the transistor can be highly reliable against light. With the use of the transistor as a transistor that is required to have high reliability against light, a highly reliable display device can be provided.

As described above, electrical characteristics and reliability of a transistor depend on the composition of the metal oxide used for the semiconductor layer 113. Thus, the composition of the metal oxide is varied according to the electrical characteristics and reliability required for the transistor so that a display device can achieve both excellent electrical characteristics and high reliability.

The semiconductor layer 113 may have a stacked-layer structure of two or more metal oxide layers. The two or more metal oxide layers included in the semiconductor layer 113 may have the same composition or substantially the same compositions. When the compositions of the stacked metal oxide layers are the same, they can be formed using the same sputtering target and manufactured at low cost.

The two or more metal oxide layers in the semiconductor layer 113 may have different compositions. For example, a stacked-layer structure of a first metal oxide layer having In:M:Zn=1:3:4 [atomic ratio] or a composition in the vicinity thereof and a second metal oxide layer having In:M:Zn=1:1:1 [atomic ratio] or a composition in the vicinity thereof and being formed over the first metal oxide layer can be favorably employed. In particular, gallium or aluminum is preferably used as the element M. A stacked-layer structure of one selected from indium oxide, indium gallium oxide, and IGZO, and one selected from IAZO, IAGZO, and ITZO (registered trademark) may be employed, for example.

A metal oxide having crystallinity is preferably used for the semiconductor layer 113. For example, a metal oxide layer having a c-axis aligned crystal (CAAC) structure, a nano-crystal (nc) structure, a polycrystalline structure, a microcrystalline structure, or the like can be used. By using a metal oxide having crystallinity for the semiconductor layer 113, the density of defect states in the semiconductor layer 113 can be reduced, which enables the display device to have high reliability.

As the metal oxide layer used for the semiconductor layer 113 has higher crystallinity, the density of defect states in the semiconductor layer 113 can be lower. By contrast, the use of a metal oxide layer with low crystallinity enables a transistor to flow a high current.

In the case where a metal oxide layer is formed by a sputtering method, the crystallinity of the metal oxide layer can be increased as the substrate temperature (the stage temperature) in formation is higher. The crystallinity of the metal oxide layer can be increased as the proportion of a flow rate of an oxygen gas to the whole formation gas (also referred to as oxygen flow rate ratio) used in formation is higher.

The semiconductor layer 113 may have a stacked-layer structure of two or more metal oxide layers having different crystallinities. For example, in a stacked-layer structure of a first metal oxide layer and a second metal oxide layer thereover, the second metal oxide layer can include a region with higher crystallinity than the first metal oxide layer. Alternatively, the second metal oxide layer can include a region with lower crystallinity than the first metal oxide layer. The two or more metal oxide layers included in the semiconductor layer 113 may have the same composition or substantially the same compositions. When the compositions of the stacked metal oxide layers are the same, they can be formed using the same sputtering target and the manufacturing cost can thus be reduced. For example, a stacked-layer structure of two or more metal oxide layers with different crystallinities can be formed with the use of the same sputtering target and different oxygen flow rates. Note that the two or more metal oxide layers included in the semiconductor layer 113 may have different compositions.

The thickness of the semiconductor layer 113 is preferably larger than or equal to 3 nm and smaller than or equal to 100 nm, further preferably larger than or equal to 5 nm and smaller than or equal to 100 nm, further preferably larger than or equal to 10 nm and smaller than or equal to 100 nm, further preferably larger than or equal to 10 nm and smaller than or equal to 70 nm, further preferably larger than or equal to 15 nm and smaller than or equal to 70 nm, further preferably larger than or equal to 15 nm and smaller than or equal to 50 nm, further preferably larger than or equal to 20 nm and smaller than or equal to 50 nm, further preferably larger than or equal to 20 nm and smaller than or equal to 40 nm, further preferably larger than or equal to 25 nm and smaller than or equal to 40 nm.

The substrate temperature at the time of forming the semiconductor layer 113 is preferably higher than or equal to room temperature (25° C.) and lower than or equal to 200° C., further preferably higher than or equal to room temperature and lower than or equal to 130° C. With the substrate temperature in the above range, the bending or warpage of the substrate can be suppressed in the case where the substrate is a large glass substrate.

Here, oxygen vacancies that might be formed in the semiconductor layer 113 will be described.

In the case where the semiconductor layer 113 includes an oxide semiconductor, hydrogen contained in the oxide semiconductor reacts with oxygen bonded to a metal atom to be water, and thus sometimes forms an oxygen vacancy ($V_O$) in the oxide semiconductor. Defects in which hydrogen enters oxygen vacancies (hereinafter, referred to as $V_OH$) serve as donors and generate electrons serving as carriers in some cases. In other cases, bonding of part of hydrogen to oxygen bonded to a metal atom generates electrons serving as carriers. Thus, a transistor including an oxide semiconductor that contains a large amount of hydrogen is likely to have normally-on characteristics. Moreover, hydrogen in an oxide semiconductor is easily transferred by a stress such as heat or an electric field; thus, a large amount of hydrogen in an oxide semiconductor might reduce the reliability of a transistor.

$V_OH$ can serve as a donor of the oxide semiconductor. However, it is difficult to evaluate the defects quantitatively. Thus, the oxide semiconductor is sometimes evaluated by not its donor concentration but its carrier concentration. Therefore, in this specification and the like, the carrier concentration assuming the state where an electric field is not applied is sometimes used, instead of the donor concentration, as the parameter of the oxide semiconductor. That is, "carrier concentration" in this specification and the like can be replaced with "donor concentration" in some cases.

Therefore, when an oxide semiconductor is used for the semiconductor layer 113, the $V_OH$ in the semiconductor layer 113 is reduced as long as possible to make the oxide semiconductor highly purified or substantially highly purified, which is preferable. It is effective to remove impurities such as water and hydrogen in an oxide semiconductor (sometimes described as dehydration or dehydrogenation treatment) and to fill oxygen vacancies ($V_O$) by supplying oxygen to the oxide semiconductor to obtain an oxide semiconductor whose $V_OH$ is reduced enough. When an oxide semiconductor with sufficiently reduced impurities such as $V_OH$ is used for a channel formation region of a transistor, the transistor can have stable electrical characteristics. Supplying oxygen to the oxide semiconductor to fill oxygen vacancies ($V_O$) is sometimes referred to as oxygen adding treatment.

When an oxide semiconductor is used for the semiconductor layer 113, the carrier density of the oxide semiconductor at a channel formation region is preferably lower than or equal to $1\times10^{18}$ $cm^{-3}$, further preferably lower than $1\times10^{17}$ $cm^{-3}$, further preferably lower than $1\times10^{16}$ $cm^{-3}$, further preferably lower than $1\times10^{13}$ $cm^{-3}$, further preferably lower than $1\times10^{12}$ $cm^{-3}$. The minimum carrier density of an oxide semiconductor at a channel formation region is not limited and can be $1\times10^{-9}$ $cm^{-3}$, for example.

[Insulating Layer 103]

For the insulating layer 103, an inorganic insulating material or an organic insulating material can be used. The insulating layer 103 may have a stacked-layer structure of an inorganic insulating material and an organic insulating material.

For the insulating layer 103, an inorganic material can be suitably used. As the inorganic insulating material, one or more of an oxide, an oxynitride, a nitride oxide, and a nitride can be used. For the insulating layer 103, for example, one or more of silicon oxide, silicon oxynitride, aluminum oxide, hafnium oxide, yttrium oxide, zirconium oxide, gallium oxide, tantalum oxide, magnesium oxide, lanthanum oxide, cerium oxide, neodymium oxide, silicon nitride, silicon nitride oxide, and aluminum nitride can be used.

Note that in this specification and the like, oxynitride refers to a material that contains more oxygen than nitrogen. Nitride oxide refers to a material that contains more nitrogen than oxygen. For example, silicon oxynitride refers to a material that contains more oxygen than nitrogen, and silicon nitride oxide refers to a material that contains more nitrogen than oxygen.

The oxygen content and the nitrogen content can be analyzed by secondary ion mass spectrometry (SIMS) or X-ray photoelectron spectroscopy (XPS). Note that XPS is suitable when the content of a target element is high (e.g., 0.5 atomic % or more, or 1 atomic % or more). In contrast, SIMS is suitable when the content of a target element is low (e.g., 0.5 atomic % or less, or 1 atomic % or less). To compare the contents of elements, analysis with a combination of SIMS and XPS is preferably used.

The insulating layer 103 may have a stacked-layer structure of two or more layers. FIG. 9B illustrates a structure in which the insulating layer 103 has a stacked-layer structure of the insulating layer 103*a* and the insulating layer 103*b* over the insulating layer 103*a*, for example. For the insulating layers 103*a* and 103*b*, the material that can be used for the insulating layer 103 can be used. For the insulating layers 103*a* and 103*b*, the same material or different materials may be used. Note that the insulating layers 103*a* and 103*b* may each have a stacked-layer structure of two or more layers.

The thickness of the insulating layer 103*a* can be larger than that of the insulating layer 103*b*. The deposition rate of the insulating layer 103*a* is preferably high. In particular, the deposition rate of the insulating layer 103*a* is preferably high in the case where the thickness of the insulating layer 103*a* is large. By increasing the deposition rate of the insulating layer 103*a*, the productivity can be increased. For example, by increasing power at the time of forming the insulating layer 103*a*, the deposition rate can be increased.

The stress of the insulating layer 103*a* is preferably low. The insulating layer 103*a* has high internal stress when having a large thickness, which might cause warpage of the substrate. The low stress of the insulating layer 103*a* can inhibit occurrence of problems during the process caused by stress such as warpage of the substrate.

The insulating layer 103*b* functions as a blocking film that inhibits release of gas from the insulating layer 103*a*. For the insulating layer 103*b*, a material in which gas is hardly diffused is preferably used. The insulating layer 103*b* preferably includes a region having a higher film density than the insulating layer 103*a*. The insulating layer 103*b* having a high film density can have a high blocking property. For the insulating layer 103*b*, a material containing more nitrogen than the insulating layer 103*a* can be used, for example. The insulating layer 103*b* in which the nitrogen content is high can have a high blocking property.

The insulating layer 103*b* can be thinner than the insulating layer 103*a* as long as the insulating layer 103*b* functions as a blocking film that inhibits release of gas from the insulating layer 103*a*. The deposition rate of the insulating layer 103*b* is preferably lower than that of the insulating layer 103*a*. Note that the insulating layer 103*b* deposited at a low deposition rate has a high film density and can have a high blocking property. Similarly, the insulating layer 103*b* deposited at a high substrate temperature has a high film density and can have a high blocking property.

The film density can be evaluated by Rutherford backscattering spectrometry (RBS) or X-ray reflection (XRR), for example. A difference in film densities can be evaluated using a transmission electron microscopy (TEM) image of a cross section in some cases. In the TEM observation, the transmission electron (TE) image is dark-colored (dark) when the film density is high, and the transmission electron (TE) image is pale (bright) when the film density is low. Therefore, in the transmission electron (TE) image, the insulating layer 103*b* is sometimes shown as a dark-colored (dark) image compared to the insulating layer 103*a*. Note that since the insulating layer 103*a* and the insulating layer 103*b* have different film densities even when including the same materials, it is sometimes possible to identify the boundary between the insulating layer 103*a* and the insulating layer 103*b* by a difference in contrast in a TEM image of a cross section.

The insulating layer 103*b* may include a region having a lower hydrogen concentration than the insulating layer 103*a*. The difference in hydrogen concentration between the insulating layer 103*a* and the insulating layer 103*b* can be evaluated by secondary ion mass spectrometry (SIMS), for example.

Here, the insulating layer 103 will be described in detail with use of a structure in which a metal oxide is used for the semiconductor layer 113 as an example.

In the case where an oxide semiconductor is used for the semiconductor layer 113, an inorganic insulating material can be suitably used for the insulating layer 103*a* and the insulating layer 103*b*.

It is preferable to use an oxide or an oxynitride for the insulating layer 103*a*. The insulating layer 103*a* is preferably formed using a film from which oxygen is released by heating. For example, silicon oxide or silicon oxynitride can be suitably used for the insulating layer 103*a*.

Oxygen released from the insulating layer 103*a* can be supplied to the semiconductor layer 113. Supplying oxygen from the insulating layer 103*a* to the semiconductor layer 113, particularly to the channel formation region of the semiconductor layer 113, can allow the amount of oxygen vacancy ($V_O$) and $V_OH$ to be reduced in the semiconductor layer 113, so that a highly reliable transistor having favorable electrical characteristics can be obtained. The insulating layer 103*a* preferably has a high oxygen diffusion coefficient. Oxygen is easily diffused in the insulating layer 103*a* having a high oxygen diffusion coefficient, so that oxygen can be efficiently supplied from the insulating layer 103*a* to the semiconductor layer 113. Examples of treatment for supplying oxygen to the semiconductor layer 113 include heat treatment in an oxygen-containing atmosphere and plasma treatment in an oxygen-containing atmosphere.

The amount of impurities (e.g., water and hydrogen) released from the insulating layer 103*a* itself is preferably small. With the insulating layer 103*a* from which a small amount of impurities is released, diffusion of impurities into the semiconductor layer 113 is inhibited, and the transistor can have favorable electrical characteristics and high reliability.

For example, silicon oxide or silicon oxynitride formed by a PECVD method can be suitably used for the insulating layer 103*a*. In that case, a mixed gas including a gas containing silicon and a gas containing oxygen is preferably used as a source gas. As the gas containing silicon, one or more of silane, disilane, trisilane, and silane fluoride can be used, for example. As the gas containing oxygen, one or more of oxygen ($O_2$), ozone ($O_3$), nitrous oxide ($N_2O$), nitric oxide (NO), and nitrogen dioxide ($NO_2$) can be used, for example. Note that by increasing power at the time of forming the insulating layer 103*a*, the amount of impurities (e.g., water and hydrogen) released from the insulating layer 103*a* can be reduced.

The insulating layer 103*b* is preferably less likely to transmit oxygen. The insulating layer 103*b* functions as a blocking film that inhibits release of oxygen from the insulating layer 103*a*. Moreover, the insulating layer 103*b* is preferably less likely to transmit hydrogen. The insulating layer 103*b* functions as a blocking film that inhibits diffusion of hydrogen into the semiconductor layer 113 from the outside of the transistor through the insulating layer 103. The insulating layer 103*b* preferably has a high film density. The insulating layer 103*b* having a high film density can have a high blocking property against oxygen and hydrogen. The film density of the insulating layer 103*b* is preferably higher than that of the insulating layer 103*a*. In the case where silicon oxide or silicon oxynitride is used for the insulating layer 103*a*, silicon nitride, silicon nitride oxide, or aluminum oxide can be suitably used for the insulating layer 103*b*, for example. The insulating layer 103*b* preferably includes a region containing more nitrogen than the insulating layer 103*a*. A material containing more nitrogen than the insulating layer 103*a* can be used for the insulating layer 103*b*. A nitride or a nitride oxide is preferably used for the insulating layer 103*b*. For example, silicon nitride or silicon nitride oxide can be suitably used for the insulating layer 103*b*.

When oxygen contained in the insulating layer 103*a* is diffused upward from a region of the insulating layer 103*a* that is not in contact with the semiconductor layer 113 (e.g., the top surface of the insulating layer 103*a*), the amount of oxygen supplied from the insulating layer 103*a* to the semiconductor layer 113 might be reduced. Provision of the insulating layer 103*b* over the insulating layer 103*a* can inhibit diffusion of oxygen contained in the insulating layer 103*a* from the region of the insulating layer 103*a* that is not in contact with the semiconductor layer 113. Accordingly, the amount of oxygen supplied from the insulating layer 103*a* to the semiconductor layer 113 is increased, whereby the amount of oxygen vacancy ($V_O$) and $V_OH$ in the semiconductor layer 113 can be reduced. Consequently, the transistor can have favorable electrical characteristics and high reliability.

The conductive layer 112 is oxidized by oxygen contained in the insulating layer 103*a* and has high resistance in some cases. Moreover, when the conductive layer 112 is oxidized by oxygen contained in the insulating layer 103*a*, the amount of oxygen supplied from the insulating layer 103*a* to the semiconductor layer 113 might be reduced. Provision of the insulating layer 103*b* over the insulating layer 103*a* can inhibit the conductive layer 112 from being oxidized and having high resistance. In addition, the amount of oxygen supplied from the insulating layer 103*a* to the semiconductor layer 113 is increased and the amount of oxygen vacancy ($V_O$) and $V_OH$ in the semiconductor layer 113 can be reduced, whereby the transistor can have favorable electric characteristics and high reliability.

Hydrogen diffused in the semiconductor layer 113 reacts with an oxygen atom contained in an oxide semiconductor to be water, and thus sometimes forms oxygen vacancy ($V_O$). Furthermore, $V_OH$ is formed and the carrier concentration is increased in some cases. Provision of the insulating layer 103*b* over the insulating layer 103*a* can allow the amount of oxygen vacancy ($V_O$) and $V_OH$ to be reduced in the semiconductor layer 113, whereby the transistor can have favorable electric characteristics and high reliability.

The insulating layer 103*b* preferably has a thickness with which the insulating layer can function as a blocking film against oxygen and hydrogen. When the insulating layer 103*b* is thin, the function of a blocking film might deteriorate. Meanwhile, when the insulating layer 103*b* is thick, a region where the semiconductor layer 113 is in contact with the insulating layer 103*a* is narrowed and the amount of oxygen supplied from the insulating layer 103*a* to the semiconductor layer 113 might be reduced. The insulating layer 103*b* may be thinner than the insulating layer 103*a*. The thickness of the insulating layer 103*b* is preferably larger than or equal to 5 nm and smaller than or equal to 100 nm, further preferably larger than or equal to 5 nm and smaller than or equal to 70 nm, further preferably larger than or equal to 10 nm and smaller than or equal to 70 nm, further preferably larger than or equal to 10 nm and smaller than or equal to 50 nm, further preferably larger than or equal to 20 nm and smaller than or equal to 50 nm, further preferably larger than or equal to 20 nm and smaller than or equal to 40 nm. The thickness of the insulating layer 103*b* in the above range can allow the amount of oxygen vacancy ($V_O$) and $V_OH$ to be reduced in the semiconductor layer 113, particularly in the channel formation region, whereby the transistor can have favorable electric characteristics and high reliability.

The amount of impurities (e.g., water and hydrogen) released from the insulating layer 103*b* itself is preferably small. With the insulating layer 103*b* from which a small amount of impurities is released, diffusion of impurities into the semiconductor layer 113 is inhibited, and the transistor can have favorable electrical characteristics and high reliability.

In the transistor 50, a region of the semiconductor layer 113 that is in contact with the insulating layer 103 can serve as a channel formation region. That is, oxygen is selectively supplied to the channel formation region, so that the amount of oxygen vacancy ($V_O$) and $V_OH$ can be reduced. Consequently, the transistor can have favorable electrical characteristics and high reliability.

[Conductive Layers 111, 112, and 115]

The conductive layers 111 and 112 functioning as a source electrode and a drain electrode and the conductive layer 115 functioning as a gate electrode can each be formed using one or more of chromium, copper, aluminum, gold, silver, zinc, molybdenum, tantalum, titanium, tungsten, manganese, nickel, iron, cobalt, and niobium; or an alloy including one or more of these metals as its components. For the conductive layers 115, 111, and 112, a conductive material with low resistance that contains one or more of copper, silver, gold, and aluminum can be suitably used. Copper or aluminum is particularly preferable because of its high mass-productivity.

As the conductive layers 115, 111, and 112, metal oxide films (also referred to as oxide conductors (OCs)) can be used. Examples of the oxide conductor include In—Sn oxide (ITO), In—W oxide, In—W—Zn oxide, In—Ti oxide, In—Ti—Sn oxide, In—Zn oxide, In—Sn—Si oxide (ITSO), and In—Ga—Zn oxide.

Here, an oxide conductor is described. For example, when oxygen vacancy is formed in a metal oxide having semiconductor characteristics and hydrogen is added to the oxygen vacancy, a donor level is formed in the vicinity of the conduction band. As a result, the conductivity of the metal oxide is increased, and thus, the metal oxide becomes a conductor. The metal oxide having become a conductor can be referred to as an oxide conductor.

The conductive layers 115, 111, and 112 may each have a stacked-layer structure of a conductive film containing the above-described oxide conductor (metal oxide) and a conductive film containing a metal or an alloy. The use of the conductive film containing a metal or an alloy can reduce the wiring resistance.

A Cu—X alloy film (X is Mn, Ni, Cr, Fe, Co, Mo, Ta, or Ti) may be used as the conductive layers 115, 111, and 112. The use of a Cu—X alloy film results in lower fabrication cost because the film can be processed by wet etching.

Note that the conductive layers 115, 111, and 112 may be formed using the same material or different materials.

Here, the conductive layers 111 and 112 will be described in detail with use of a structure in which a metal oxide is used for the semiconductor layer 113 as an example.

When an oxide semiconductor is used for the semiconductor layer 113, the conductive layers 111 and 112 are oxidized by oxygen contained in the semiconductor layer 113 and have high resistance in some cases. The conductive layers 111 and 112 are oxidized by oxygen contained in the insulating layer 103*a* and have high resistance in some cases. Moreover, when the conductive layers 111 and 112 are oxidized by oxygen contained in the semiconductor layer 113, the amount of oxygen vacancy ($V_O$) in the semiconductor layer 113 is increased in some cases. When the conductive layers 111 and 112 are oxidized by oxygen contained in the insulating layer 103*a*, the amount of oxygen supplied from the insulating layer 103*a* to the semiconductor layer 113 might be reduced.

A material that is less likely to be oxidized is preferably used for the conductive layers 111 and 112. An oxide conductor is preferably used for the conductive layers 111 and 112. For example, In—Sn oxide (ITO) or In—Sn—Si oxide (ITSO) can be suitably used. A nitride conductor may be used for the conductive layers 111 and 112. Examples of the nitride conductor include tantalum nitride and titanium nitride. The conductive layers 111 and 112 may have a stacked-layer structure of the above-described materials.

The conductive layers 111 and 112 including a material that is less likely to be oxidized can be inhibited from being oxidized by oxygen contained in the semiconductor layer 113 or oxygen contained in the insulating layer 103*a* and having high resistance. Furthermore, it is possible to increase the amount of oxygen supplied from the insulating layer 103*a* to the semiconductor layer 113 while an increase in the amount of oxygen vacancy ($V_O$) in the semiconductor layer 113 is inhibited. Accordingly, the amount of oxygen vacancy ($V_O$) and $V_OH$ in the semiconductor layer 113 can be reduced, whereby the transistor can have favorable electric characteristics and high reliability. Note that the conductive layers 111 and 112 may be formed using the same material or different materials.

[Insulating Layer 105]

The insulating layer 105 functioning as a gate insulating layer preferably has low defect density. With the insulating layer 105 having low defect density, the transistor can have favorable electrical characteristics. In addition, the insulating layer 105 preferably has high withstand voltage. With the insulating layer 105 having high withstand voltage, the transistor can have high reliability.

For the insulating layer 105, one or more of an insulating oxide, an insulating oxynitride, an insulating nitride oxide, and an insulating nitride can be used, for example. For the insulating layer 105, one or more of silicon oxide, silicon oxynitride, silicon nitride oxide, silicon nitride, aluminum oxide, aluminum oxynitride, aluminum nitride oxide, aluminum nitride, hafnium oxide, hafnium oxynitride, gallium oxide, gallium oxynitride, yttrium oxide, yttrium oxynitride, and Ga—Zn oxide can be used. The insulating layer 105 may be either a single layer or a stacked layer. The insulating layer 105 may have a stacked-layer structure of an oxide and a nitride.

A miniaturized transistor including a thin gate insulating layer may have a large leakage current. When a high dielectric constant material (also referred to as a high-k material) is used for the gate insulating layer, the voltage at the time of driving the transistor can be reduced while the physical thickness is maintained. Examples of the high-k material include gallium oxide, hafnium oxide, zirconium oxide, an oxide containing aluminum and hafnium, an oxynitride containing aluminum and hafnium, an oxide containing silicon and hafnium, an oxynitride containing silicon and hafnium, and a nitride containing silicon and hafnium.

The amount of impurities (e.g., water and hydrogen) released from the insulating layer 105 itself is preferably small. With the insulating layer 105 from which a small amount of impurities is released, diffusion of impurities into the semiconductor layer 113 is inhibited, and the transistor can have favorable electrical characteristics and high reliability.

The insulating layer 105 is formed over the semiconductor layer 113, and thus is preferably a film formed under conditions where damage to the semiconductor layer 113 is small. For example, the insulating layer 105 can be formed under conditions where the deposition rate is sufficiently low. For example, when the insulating layer 105 is formed by a plasma CVD method under a low-power condition, damage to the semiconductor layer 113 can be small.

Here, the insulating layer 105 will be described in detail with use of a structure in which a metal oxide is used for the semiconductor layer 113 as an example.

To improve the properties of the interface with the semiconductor layer 113, at least the side of a region in the insulating layer 105, which is in contact with the semiconductor layer 113, is preferably include an oxide. For example, one or more of silicon oxide and silicon oxynitride can be suitably used for the insulating layer 105. A film from which oxygen is released by heating is further preferably used for the insulating layer 105.

Note that the insulating layer 105 may have a stacked-layer structure. The insulating layer 105 can have a stacked-layer structure of an oxide film on the side in contact with the semiconductor layer 113 and a nitride film on the side in contact with the conductive layer 115. For example, one or more of silicon oxide and silicon oxynitride can be suitably used for the oxide film. Silicon nitride can be suitably used for the nitride film.

[Substrate 101]

There is no particular limitation on the properties of a material and the like of the substrate 101 as long as the material has heat resistance enough to withstand at least heat treatment to be performed later, for example. For example, a single crystal semiconductor substrate or a polycrystalline semiconductor substrate of silicon or silicon carbide, a compound semiconductor substrate of silicon germanium or the like, an SOI substrate, a glass substrate, a ceramic substrate, a quartz substrate, a sapphire substrate, a ceramic substrate, or an organic resin substrate may be used as the substrate 101. Alternatively, any of these substrates provided with a semiconductor element may be used as the substrate 101. Alternatively, a printed circuit board may be used as the substrate 101. Note that the shape of the semiconductor substrate and an insulating substrate may be circular or square.

A flexible substrate may be used as the substrate 101, and the transistor 50 and the like may be formed directly on the flexible substrate. Alternatively, a separation layer may be provided between the substrate 101 and the transistor 50 and the like. The separation layer can be used when part or the whole of a display device completed thereover is separated from the substrate 101 and transferred onto another substrate. In such a case, the transistor 50 and the like can be transferred to a substrate having low heat resistance or a flexible substrate as well.

[Insulating Layer 218]

The insulating layer 218 is preferably formed using a material through which impurities such as water are not easily diffused. Such an insulating layer 218 functions as a blocking film that inhibits the diffusion of impurities from the outside into the transistors. Examples of the impurities include water and hydrogen. With the insulating layer 218, reliability of the display device can be increased.

The insulating layer 218 can be an insulating layer including an inorganic material or an insulating layer including an organic material. An inorganic material such as an oxide or a nitride can be suitably used for the insulating layer 218, for example. Specifically, for example, one or more of an inorganic insulating material such as silicon nitride, silicon nitride oxide, silicon oxynitride, aluminum oxide, aluminum oxynitride, aluminum nitride, hafnium oxide, or hafnium aluminate can be used. For example, silicon nitride oxide can be suitably used for the insulating layer 218 because the amount of impurities (such as water and hydrogen) released from silicon nitride oxide itself is small and a silicon nitride oxide film can function as a blocking film that inhibits the diffusion of impurities into the transistors from above the transistors. As an organic material, for example, one or both of an acrylic resin and a polyimide resin can be used. As an organic material, a photosensitive material may be used. A stack including two or more of the above insulating films may also be used. The insulating layer 218 may have a stacked-layer structure of an insulating layer including an inorganic material and an insulating layer including an organic material.

[Insulating Layer 235]

The insulating layer 235 has a function of reducing unevenness caused by the transistors 51 and 52, the capacitor 57, and the like. In this specification and the like, the insulating layer 235 is referred to as a planarization layer in some cases.

As the insulating layer 235, an insulating layer containing an organic material can be favorably used. As the organic material, a photosensitive organic resin is preferably used, and for example, a photosensitive resin composite containing an acrylic resin is preferably used. Note that in this specification and the like, an acrylic resin refers to not only a polymethacrylic acid ester or a methacrylic resin, but also all the acrylic polymer in a broad sense in some cases.

Alternatively, the insulating layer 235 may be formed using an acrylic resin, a polyimide resin, an epoxy resin, an imide resin, a polyamide resin, a polyimide-amide resin, a silicone resin, a siloxane resin, a benzocyclobutene-based resin, a phenol resin, precursors of these resins, or the like. Alternatively, the insulating layer 235 may be formed using an organic material such as polyvinyl alcohol (PVA), polyvinyl butyral, polyvinylpyrrolidone, polyethylene glycol, polyglycerin, pullulan, water-soluble cellulose, or an alcohol-soluble polyamide resin. A photoresist may be used for the photosensitive resin. As the photosensitive organic resin, either a positive material or a negative material may be used.

The insulating layer 235 may have a stacked-layer structure of an organic insulating layer and an inorganic insulating layer. For example, the insulating layer 235 can have a stacked-layer structure of an organic insulating layer and an inorganic insulating layer over the organic insulating layer. An inorganic insulating layer provided on the outermost surface of the insulating layer 235 can function as an etching protective layer. This can inhibit a decrease in the flatness of the insulating layer 235, which is caused by etching of part of the insulating layer 235 in the formation of the pixel electrode 311.

The low flatness of the top surface of the insulating layer 235, which is the formation surface of the light-emitting element 60, might cause a connection defect due to disconnection of the common electrode 315 or an increase in electric resistance due to the locally thinned regions of the common electrode 315. In addition, the low flatness of the top surface of the insulating layer 235 might lower the processing accuracy of the layer to be formed over the insulating layer 235. Making the top surface of the insulating layer 235 flat increases, for example, the processing accuracy of the light-emitting element 60 to be provided over the insulating layer 235, whereby the display device can have high definition. Furthermore, since a connection defect due to disconnection of the common electrode 315 and an increase in electric resistance due to the locally thinned regions of the common electrode 315 can be prevented, the display device can have high display quality.

In some cases, the insulating layer 235 is partly removed when the pixel electrode 311 is formed. The insulating layer 235 may have a depression portion in a region not overlapping with the pixel electrode 311.

[Insulating Layer 237]

The insulating layer 237 can be an insulating layer including an inorganic material or an insulating layer including an organic material. A material that can be used for the insulating layer 218 or a material that can be used for the insulating layer 235 can be used for the insulating layer 237. The insulating layer 237 may have a stacked-layer structure of an insulating layer including an inorganic material and an insulating layer including an organic material.

[Protective Layer 331]

The protective layer 331 may have a single-layer structure or a stacked-layer structure of two or more layers. There is no limitation on the conductivity of the protective layer 331. As the protective layer 331, at least one type of insulating films, semiconductor films, and conductive films can be used.

The inorganic film included in the protective layer 331 can inhibit oxidation of the common electrode 315 and entry of impurities (e.g., moisture and oxygen) into the light-emitting element 60. Thus, the light-emitting element 60 is inhibited from deteriorating and the reliability of the display device can be increased.

For the protective layer 331, an inorganic insulating film such as an oxide insulating film, a nitride insulating film, an oxynitride insulating film, or a nitride oxide insulating film can be used, for example. For specific examples of these inorganic insulating films, the description of an insulating layer 325 described later can be referred to. In particular, the protective layer 331 preferably includes a nitride insulating film or a nitride oxide insulating film, and further preferably includes a nitride insulating film.

As the protective layer 331, an inorganic film containing In—Sn oxide (also referred to as ITO), In—Zn oxide, Ga—Zn oxide, Al—Zn oxide, indium gallium zinc oxide (In—Ga—Zn oxide, also referred to as IGZO), or the like can also be used. The inorganic film preferably has high resistance, specifically, higher resistance than the common electrode 315. The inorganic film may further contain nitrogen.

When light emitted from the light-emitting element 60 is extracted through the protective layer 331, the protective layer 331 preferably has a good property of transmitting visible light. For example, ITO, IGZO, and aluminum oxide are preferable because they are inorganic materials having a good property of transmitting visible light.

The protective layer 331 can be, for example, a stack of an aluminum oxide film and a silicon nitride film over the aluminum oxide film, or a stack of an aluminum oxide film and an IGZO film over the aluminum oxide film. Such a stacked-layer structure can inhibit entry of impurities (e.g., water and oxygen) into the EL layer.

Furthermore, the protective layer 331 may include an organic film. For example, the protective layer 331 may include both an organic film and an inorganic film. For organic materials that can be used for the protective layer 331, organic insulating materials that can be used for an insulating layer 327 described later can be referred to, for example.

The protective layer 331 may have a stacked-layer structure of two layers which are formed by different formation methods. Specifically, the first layer of the protective layer 331 may be formed by an ALD method, and the second layer of the protective layer 331 may be formed by a sputtering method.

[Substrate 152]

For the substrate 152, glass, quartz, ceramic, sapphire, a resin, a metal, an alloy, a semiconductor, or the like can be used. The substrate through which light from the light-emitting element 60 is extracted is formed using a material that transmits the light. When the substrate 152 is formed using a flexible material, the flexibility of the display device can be increased. Furthermore, a polarizing plate may be used as the substrate 152. Alternatively, an attachment film or a base film may be used as the substrate 152.

For the substrate 152, any of the following can be used, for example: polyester resins such as polyethylene terephthalate (PET) and polyethylene naphthalate (PEN), a polyacrylonitrile resin, an acrylic resin, a polyimide resin, a polymethyl methacrylate resin, a polycarbonate (PC) resin, a polyethersulfone (PES) resin, polyamide resins (e.g., nylon and aramid), a polysiloxane resin, a cycloolefin resin, a polystyrene resin, a polyamide-imide resin, a polyurethane resin, a polyvinyl chloride resin, a polyvinylidene chloride resin, a polypropylene resin, a polytetrafluoroethylene (PTFE) resin, an ABS resin, and cellulose nanofiber. Glass that is thin enough to have flexibility may be used as the substrate 152.

When a film used as the substrate absorbs water, the shape of the display apparatus might be changed, e.g., creases might be caused. Thus, as the substrate, a film with a low water absorption rate is preferably used. For example, the water absorption rate of the film is preferably 1% or lower, further preferably 0.1% or lower, further preferably 0.01% or lower.

A variety of optical members can be arranged on the outer surface of the substrate 152. Examples of optical members include a polarizing plate (e.g., a circularly polarizing plate), a retardation plate, a light diffusion layer (e.g., a diffusion film), an anti-reflective layer, and a light-condensing film. Furthermore, an antistatic film inhibiting the attachment of dust, a water repellent film inhibiting the attachment of stain, a hard coat film inhibiting generation of a scratch caused by the use, an impact-absorbing layer, or the like may be provided as a surface protective layer on the outer surface of the substrate 152. For example, it is preferable to provide, as the surface protective layer, a glass layer or a silica layer ($SiO_x$ layer), in which case the surface contamination or damage can be inhibited from being generated. The surface protective layer may be formed using diamond like carbon (DLC), aluminum oxide ($AlO_x$), a polyester-based material, a polycarbonate-based material, or the like. For the surface protective layer, a material having a high visible light transmittance is preferably used. The surface protective layer is preferably formed using a material with high hardness.

In the case where a circularly polarizing plate overlaps with the display device, a highly optically isotropic substrate is preferably used as the substrate included in the display device. A highly optically isotropic substrate has a low birefringence (in other words, a small amount of birefringence).

The absolute value of a retardation (phase difference) of a highly optically isotropic substrate is preferably less than or equal to 30 nm, further preferably less than or equal to 20 nm, further preferably less than or equal to 10 nm.

Examples of a highly optically isotropic film include a triacetyl cellulose (TAC, also referred to as cellulose triacetate) film, a cycloolefin polymer (COP) film, a cycloolefin copolymer (COC) film, and an acrylic film.

[Adhesive Layer 142]

For the adhesive layer 142, a variety of curable adhesives such as a photocurable adhesive like an ultraviolet curable adhesive, a reactive curable adhesive, a thermosetting adhesive, and an anaerobic adhesive can be used. Examples of these adhesives include an epoxy resin, an acrylic resin, a silicone resin, a phenol resin, a polyimide resin, an imide resin, a polyvinyl chloride (PVC) resin, a polyvinyl butyral (PVB) resin, and an ethylene vinyl acetate (EVA) resin. In particular, a material with low moisture permeability, such as an epoxy resin, is preferable. A two-component-mixture-type resin may be used. An adhesive sheet may be used, for example.

[Light-Blocking Layer 317]

Examples of a material that can be used for the light-blocking layer 317 include carbon black, an oxide semiconductor, and a composite oxide containing a solid solution of a plurality of oxide semiconductors. A layered film containing the materials of the coloring layers can also be used for the light-blocking layer. For example, a stacked-layer structure of a film containing a material of a coloring layer which transmits light of a certain color and a film containing a material of a coloring layer which transmits light of another color can be employed.

The above is the description of the components.

Modification Example

Examples of transistors whose structures are partly different from those in FIGS. 4A and 4B and the like are described below. Note that the description of the same portions as those in FIGS. 4A and 4B and the like is omitted below in some cases.

Figure 30A:
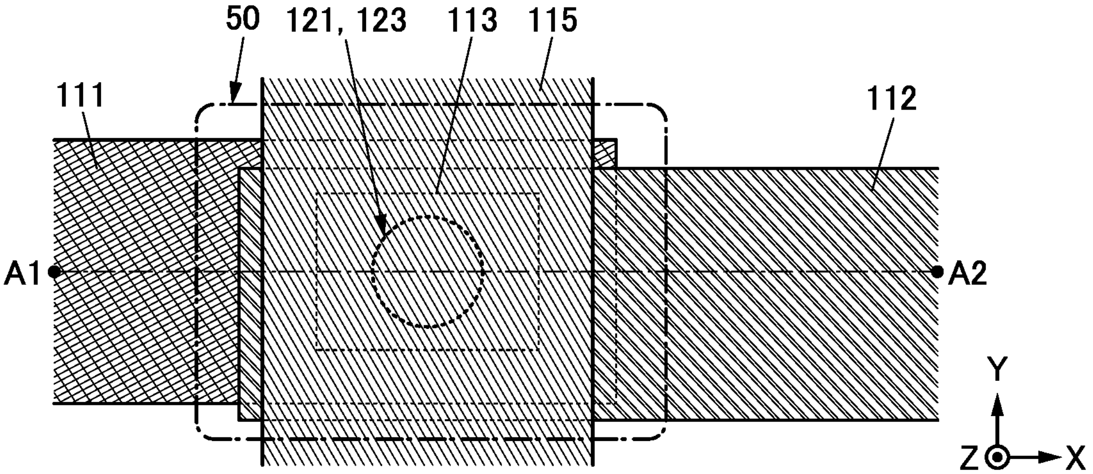
FIGS. 30A to 30C are plan views illustrating structure examples of a display device.

In FIG. 4A, the conductive layers 111 and 112 extend in the Y direction and the conductive layer 115 extends in the X direction in a plan view. In FIG. 4A, end portions of the conductive layer 111 in a direction perpendicular to the direction in which the conductive layer 111 extends (the X direction in FIG. 4A) include regions overlapping with the conductive layer 112 in a plan view. That is, the end portions of the conductive layer 111 in the direction perpendicular to the direction in which the conductive layer 111 extends are positioned inside end portions of the conductive layer 112 in the X direction. In addition, in FIG. 4A, end portions of the conductive layer 115 in a direction perpendicular to the direction in which the conductive layer 115 extends (the Y direction in FIG. 4A) are positioned inside end portions of the semiconductor layer 113 in the Y direction in a plan view. Note that one embodiment of the present invention is not limited to the structure in FIG. 4A or the like. In FIG. 30A, the conductive layers 111 and 112 extend in the Y direction and the conductive layer 115 extends in the X direction in a plan view. FIG. 30A illustrates an example in which the lower end portion of the conductive layer 112 does not overlap with the conductive layer 111 in a plan view. That is, in the example illustrated in FIG. 30A, the lower end portion of the conductive layer 112 is positioned outside the lower end portion of the conductive layer 111.

Figure 30B:
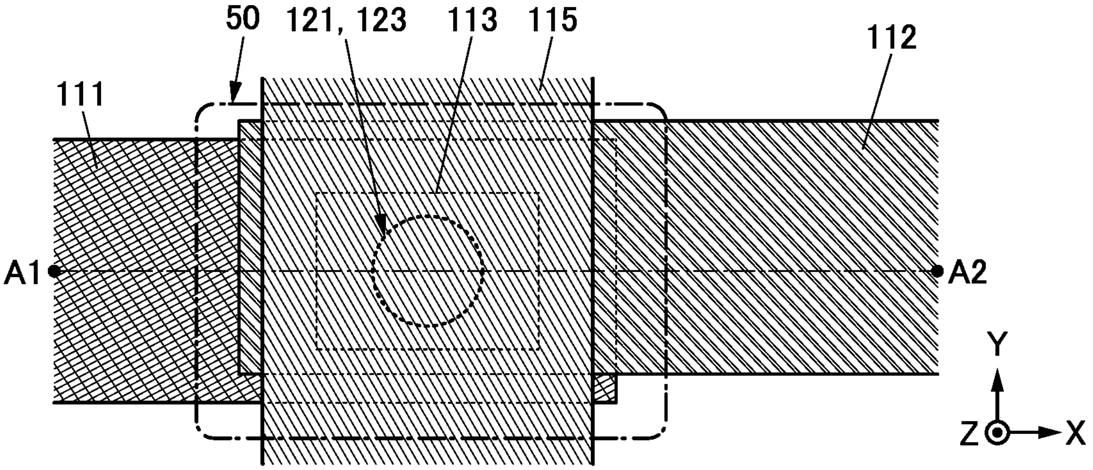

FIG. 30B illustrates an example in which the upper end portion of the conductive layer 112 does not overlap with the conductive layer 111 in a plan view. That is, in the example illustrated in FIG. 30B, the upper end portion of the conductive layer 112 is positioned outside the upper end portion of the conductive layer 111.

Figure 30C:
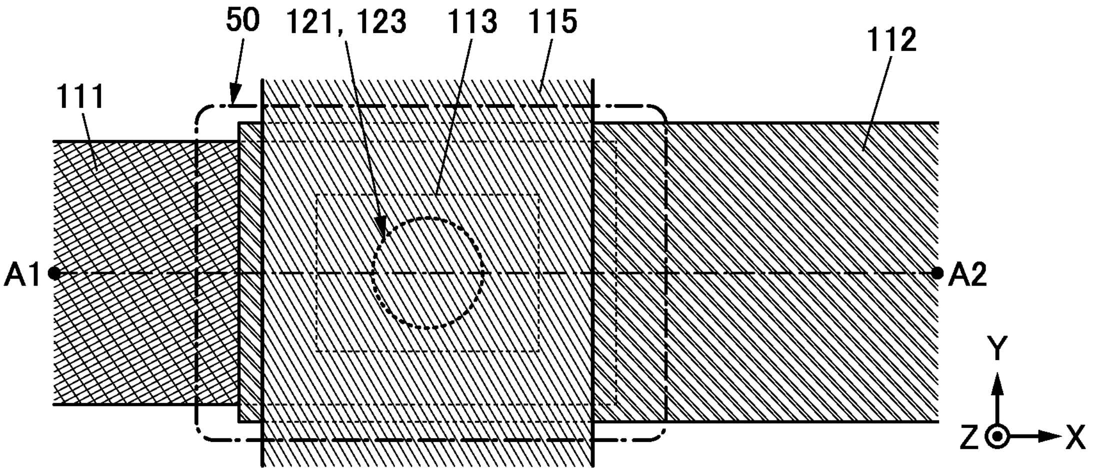

FIG. 30C illustrates an example in which both the upper end portion and the lower end portion of the conductive layer 112 do not overlap with the conductive layer 111 in a plan view. That is, in the example illustrated in FIG. 30C, the upper end portion of the conductive layer 112 is positioned outside the upper end portion of the conductive layer 111 and the lower end portion of the conductive layer 112 is positioned outside the lower end portion of the conductive layer 111.

Figure 31A:
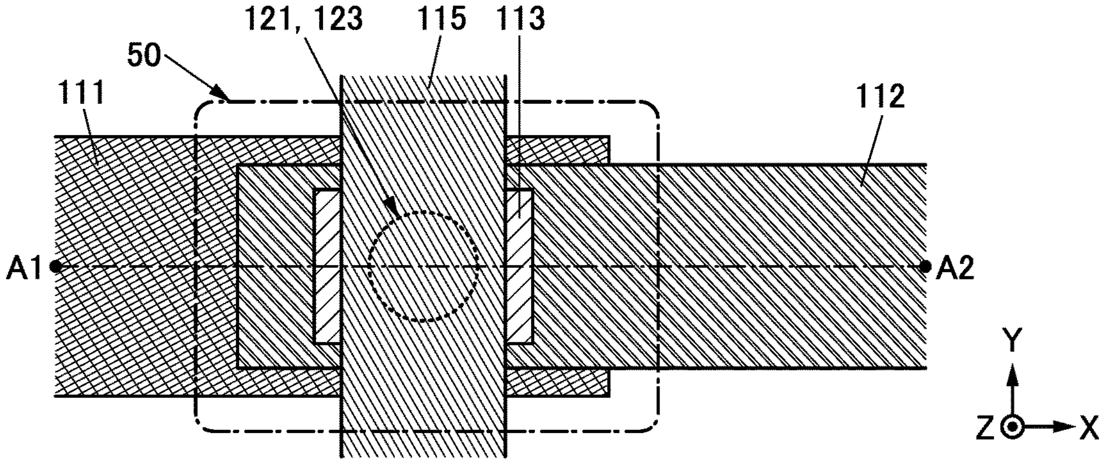
FIG. 31A is a plan view illustrating a structure example of a display device and FIGS. 31B and 31C are cross-sectional views illustrating structure examples of the display device.
Figure 31B:
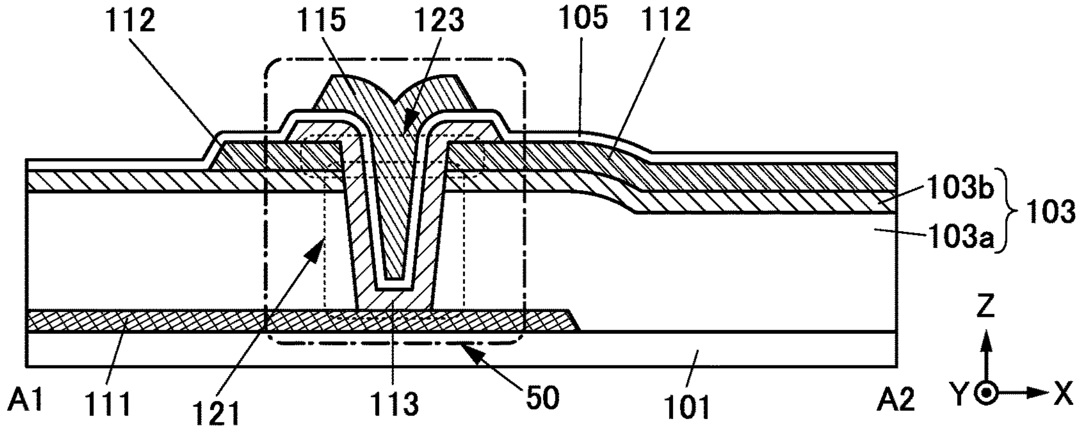
Figure 31C:
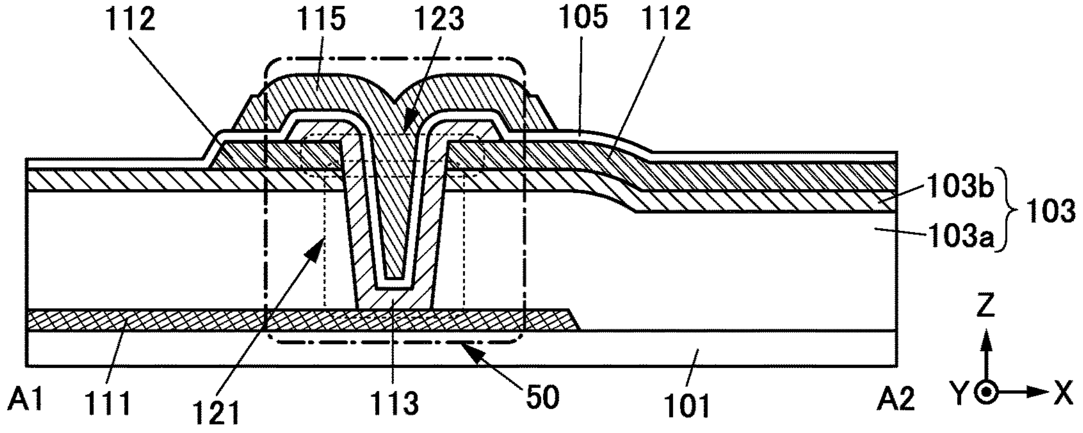

FIG. 31C shows a cross-sectional view taken along dashed-dotted line A1-A2 in each of the structures illustrated in FIGS. 30A, 30B, and 30C. In a cross section shown in FIG. 31C, the conductive layer 115 includes a region overlapping with the semiconductor layer 113 with the insulating layer 105 therebetween in the openings 121 and 123. Moreover, the conductive layer 115 includes regions overlapping with the conductive layers 111 and 112 with the insulating layer 105 and the semiconductor layer 113 therebetween. The conductive layer 115 covers the entire semiconductor layer 113. With such a structure, a gate electric field can be applied to the entire semiconductor layer 113, which allows the transistor 50 to have better electrical characteristics, such as a higher on-state current.

FIG. 31A is a modification example of the structure illustrated in FIG. 4A, and FIG. 31B is a cross-sectional view taken along dashed-dotted line A1-A2 in FIG. 31A. FIGS. 31A and 31B illustrate an example in which in the X direction, an end portion of the conductive layer 115 is positioned inside the end portion of the semiconductor layer 113, that is, on the opening 123 side. In the example illustrated in FIGS. 31A and 31B, the semiconductor layer 113 includes a region not overlapping with the conductive layer 115. With such a structure, the area of a region where the conductive layer 115 overlaps with the conductive layer 112 can be small. Thus, parasitic capacitance can be reduced.

Figure 32A:
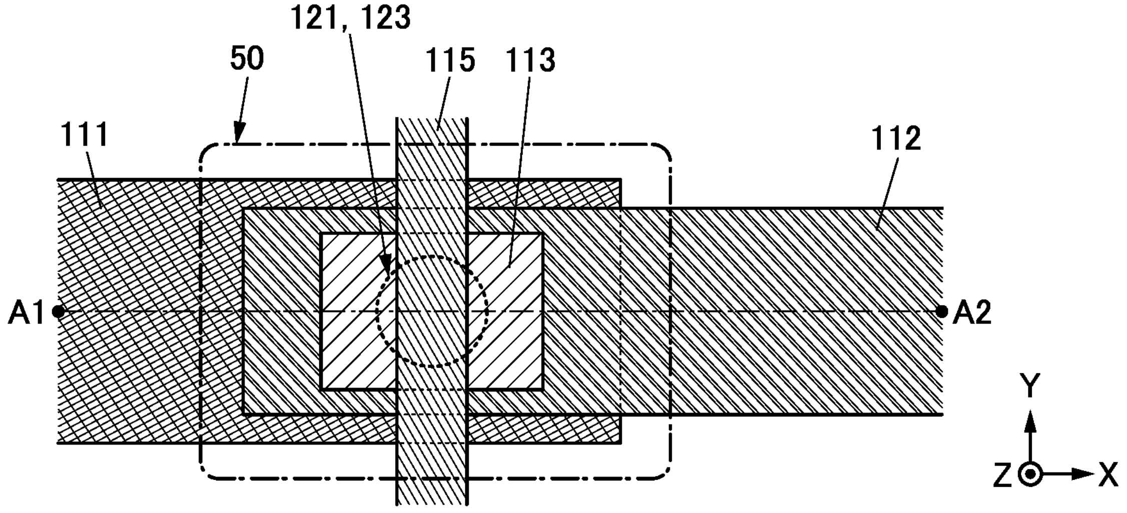
FIG. 32A is a plan view illustrating a structure example of a display device and FIG. 32B is a cross-sectional view illustrating the structure example of the display device.
Figure 32B:
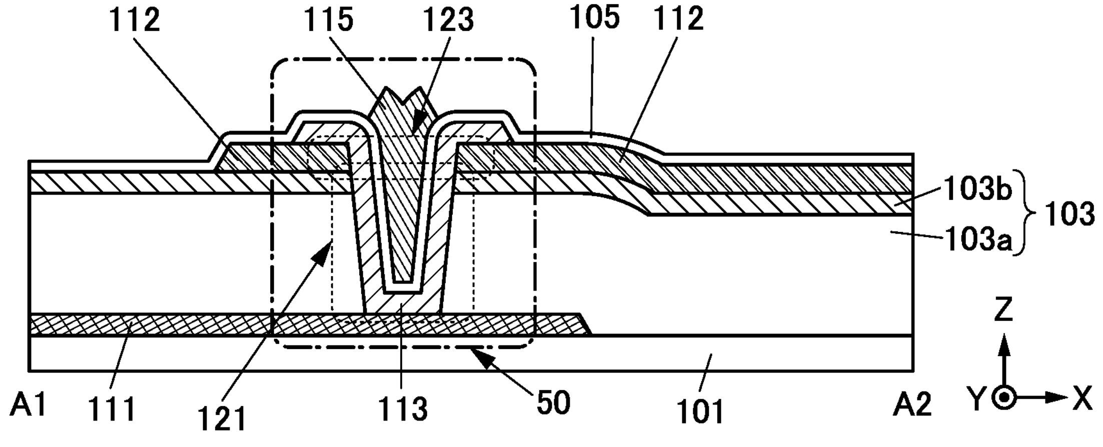

FIG. 32A is a modification example of the structure illustrated in FIG. 31A, and FIG. 32B is a cross-sectional view taken along dashed-dotted line A1-A2 in FIG. 32A. FIGS. 32A and 32B illustrate an example in which in the X direction, the end portion of the conductive layer 115 is positioned inside the end portion of the conductive layer 112 on the opening 123 side. In the example illustrated in FIGS. 32A and 32B, the openings 121 and 123 include regions not overlapping with the conductive layer 115. With such a structure, the area of the region where the conductive layer 115 overlaps with the conductive layer 112 can be smaller. Thus, parasitic capacitance can be further reduced.

Figure 33A:
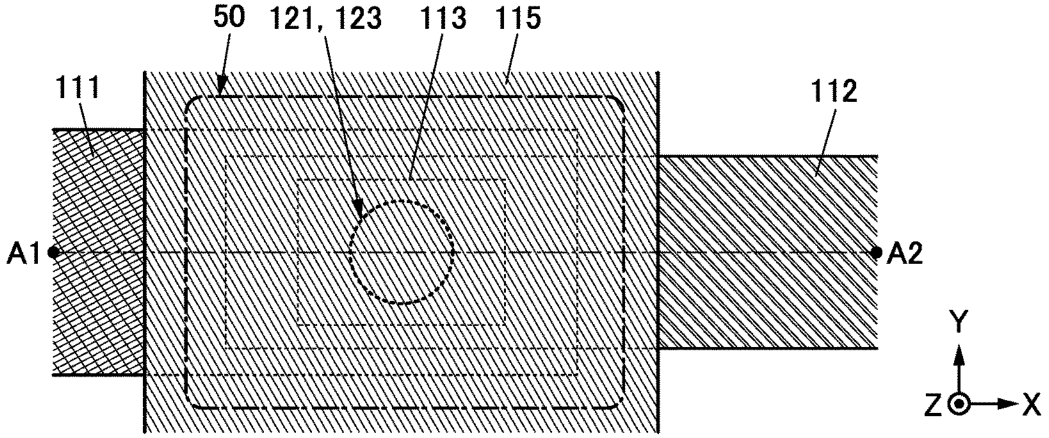
Figure 33A:
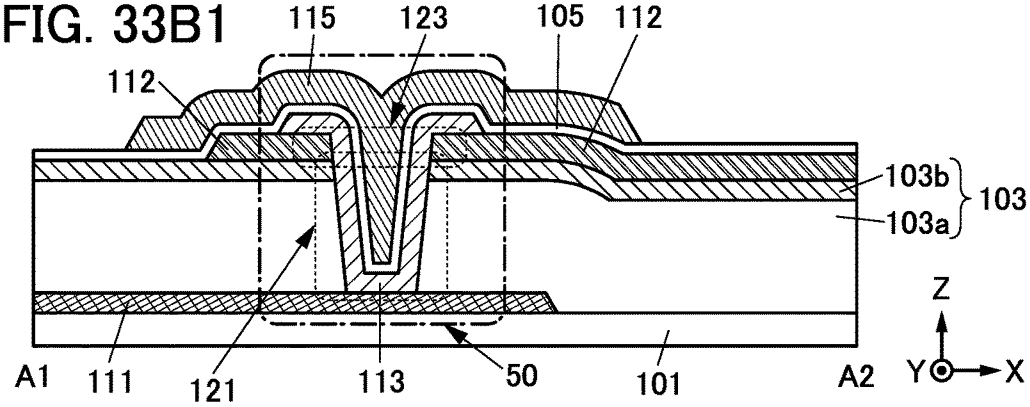
Figure 33A:
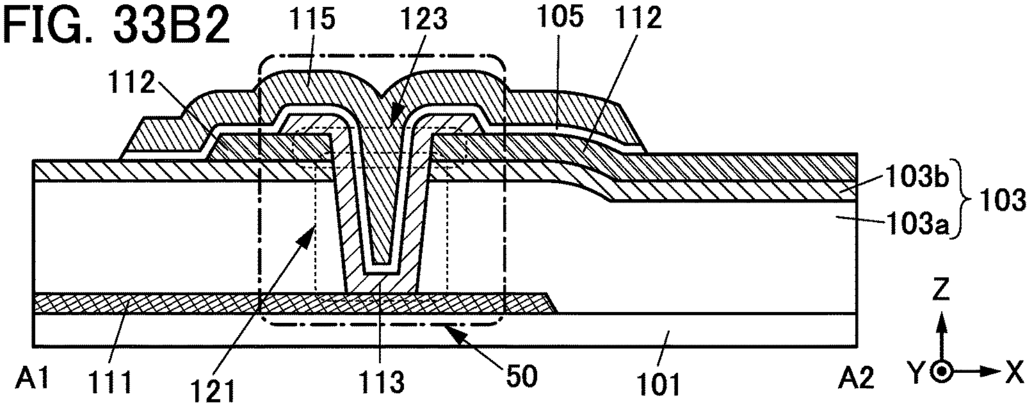
Figure 33A:
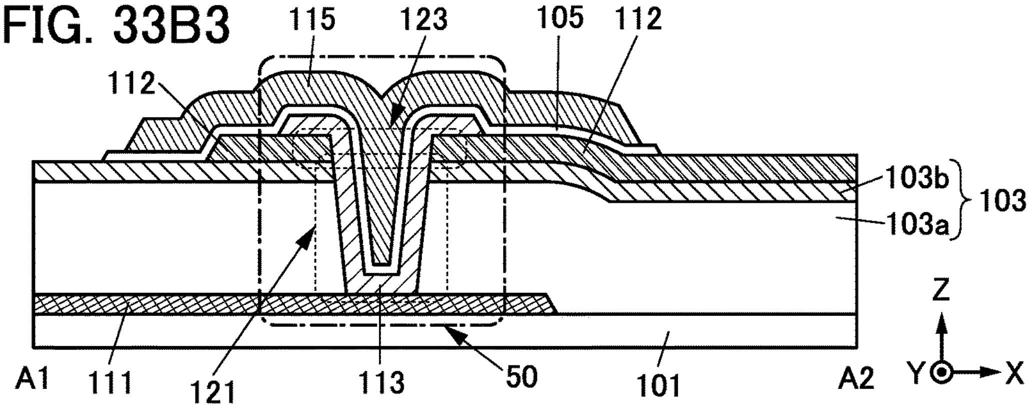

FIG. 33A is a modification example of the structure illustrated in FIG. 4A, and FIG. 33B1 is a cross-sectional view taken along dashed-dotted line A1-A2 in FIG. 33A. FIGS. 33A and 33B1 illustrate an example in which the end portion of the conductive layer 115 in the X direction is positioned outside the end portion of the conductive layer 112 in a region where the conductive layer 111 and the conductive layer 112 overlap with each other. In the example illustrated in FIGS. 33A and 33B1, the conductive layer 115 covers the entire region where the conductive layer 111 and the conductive layer 112 overlap with each other. With such a structure, when the conductive layer 115 is formed by a photolithography method and an etching method, the alignment accuracy of a photomask is not necessarily high. Thus, the transistor 50 can be easily manufactured.

FIG. 33B2 illustrates a modification example of the structure illustrated in FIG. 33B1, in which an end portion of the top surface of the insulating layer 105 is the same or substantially the same as an end portion of a bottom surface of the conductive layer 115. For example, in the case where the conductive layer 115 is formed by a photolithography method and an etching method and the insulating layer 105 has low etching selectivity with respect to the conductive layer 115, the structure illustrated in FIG. 33B2 may be formed.

FIG. 33B3 illustrates a modification example of the structure illustrated in FIG. 33B2, in which the end portion of the bottom surface of the conductive layer 115 is positioned inside the end portion of the top surface of the insulating layer 105, that is, on the conductive layer 112 side. For example, in the case where the conductive layer 115 is etched in the X direction at a rate higher than a rate at which the insulating layer 105 is etched in the X direction, the structure illustrated in FIG. 33B3 may be formed.

FIG. 33A can be referred to for a plan view of each of the structures illustrated in FIGS. 33B2 and 33B3.

Figure 34A:
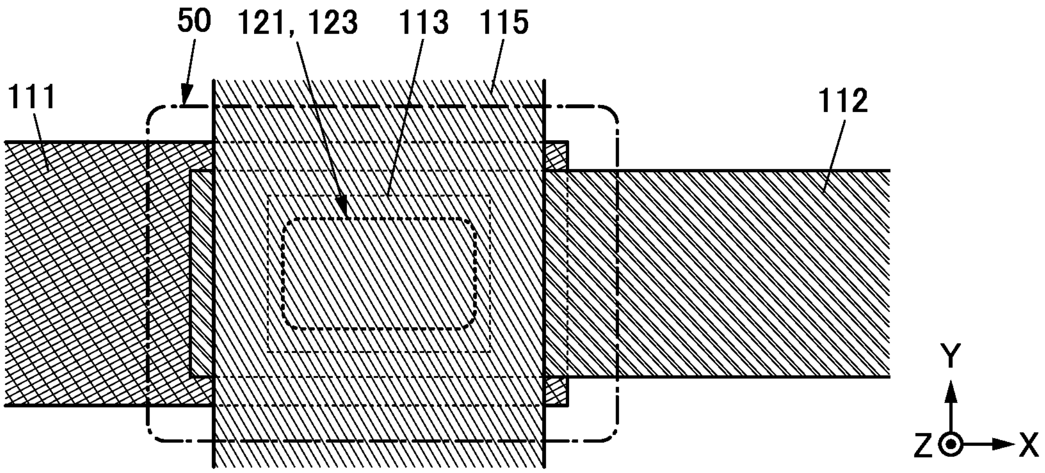
FIGS. 34A and 34B are plan views illustrating structure examples of a display device.
Figure 34B:
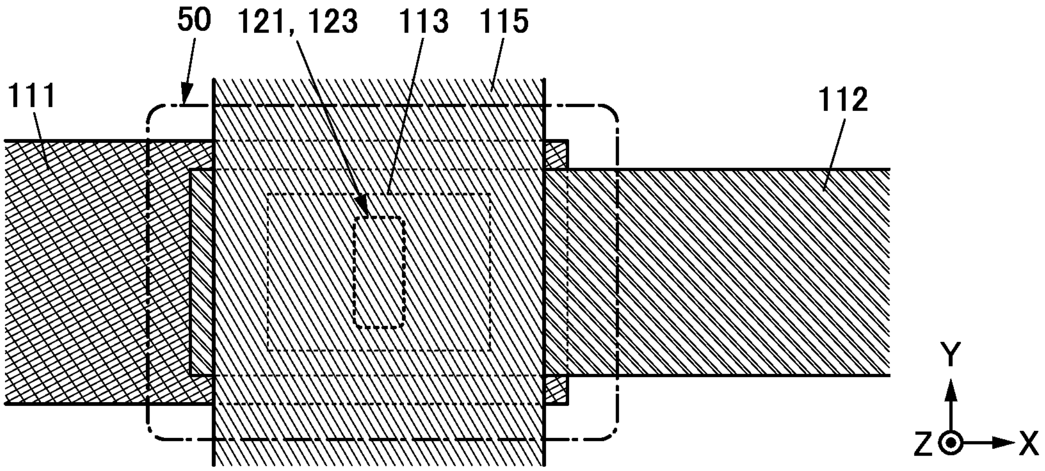

FIGS. 34A and 34B are modification examples of the structure illustrated in FIG. 4A, in which the openings 121 and 123 each have a rectangular shape with rounded corners in a plan view. In each of the openings 121 and 123 in the example in FIG. 34A, the length in the X direction is longer than the length in the Y direction. In each of the openings 121 and 123 in the example in FIG. 34B, the length in the X direction is shorter than the length in the Y direction. FIG. 31C shows a cross-sectional view of each of the structures illustrated in FIGS. 34A and 34B.

In the examples illustrated in FIGS. 34A and 34B, the side surface of the insulating layer 103 in the opening 121 and the side surface of the conductive layer 112 in the opening 123 each include a region not curved but flat. Thus, the coverage with the semiconductor layer 113, the insulating layer 105, and the conductive layer 115 can be increased in the openings 121 and 123. Note that the openings 121 and 123 do not necessarily have rounded corners in a plan view; for example, the openings 121 and 123 may have rectangular, rhombus, or square planar shapes. Alternatively, the openings 121 and 123 may have triangular planar shapes having or not having rounded corners. Further alternatively, the openings 121 and 123 may have polygonal planar shapes such as pentagonal planar shapes, or the polygonal planar shapes having rounded corners. The above is applicable to all the structures described in this specification and the like.

FIG. 35A1 illustrates a modification example of the structure illustrated in FIG. 4A, in which the conductive layer 112 surrounds the periphery of the opening 121 not entirely but partly in a plan view. FIG. 35A2 illustrates a modification example of the structure illustrated in FIG. 35A1, in which the end portion of the conductive layer 112 is in contact with one point of the periphery of the opening 121 in a plan view. In the example illustrated in FIG. 35A2, the opening 121 has a circular shape and one of end portions of the conductive layer 112 extending in the Y direction is a tangent of the opening 121 in a plan view. FIG. 35B is a cross-sectional view taken along dashed-dotted line A1-A2 in each of FIGS. 35A1 and 35A2.

In the examples illustrated in FIGS. 35A1, 35A2, and 35B, the area of the region where the conductive layer 112 overlaps with the conductive layer 115 can be small. Thus, parasitic capacitance can be reduced. Meanwhile, in the examples illustrated in FIGS. 4A and 4B and the like, the width of the other of the source region and the drain region can be increased.

Figure 36A:
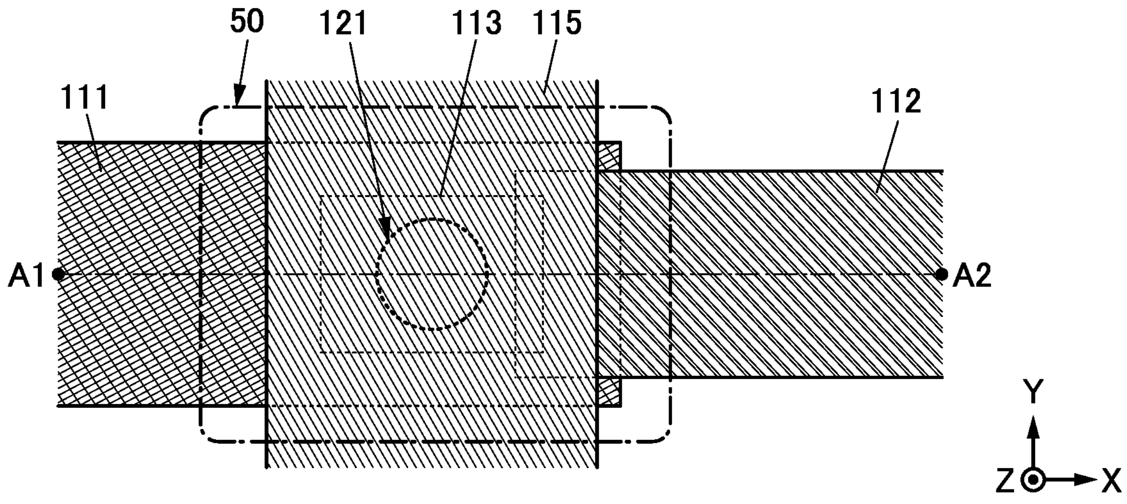
FIG. 36A is a plan view illustrating a structure example of a display device and FIG. 36B is a cross-sectional view illustrating the structure example of the display device.
Figure 36B:
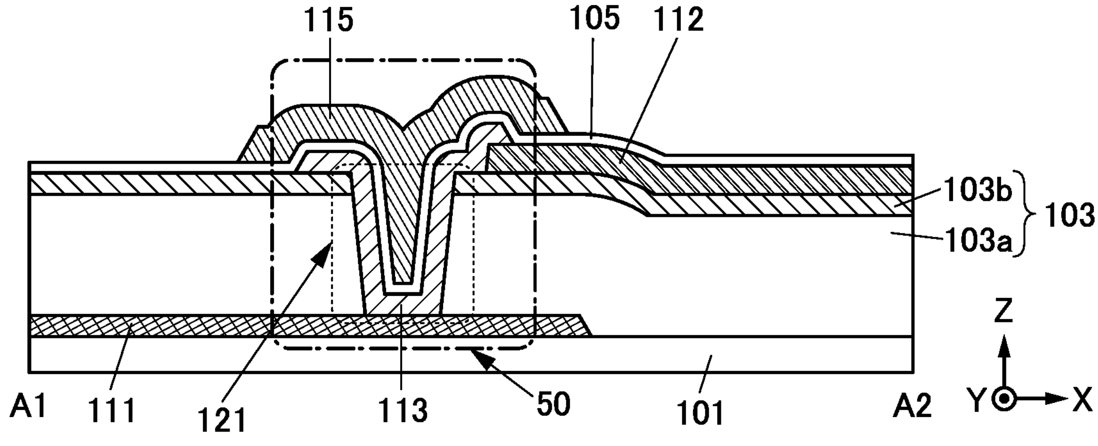

FIG. 36A illustrates a modification example of the structures illustrated in FIGS. 35A1 and 35A2, in which the conductive layer 112 is not in contact with the opening 121 in a plan view. FIG. 36B is a cross-sectional view taken along dashed-dotted line A1-A2 in FIG. 36A.

In the example illustrated in FIGS. 36A and 36B, the area of the region where the conductive layer 112 overlaps with the conductive layer 115 can be smaller. Thus, parasitic capacitance can be further reduced.

Figure 37A:
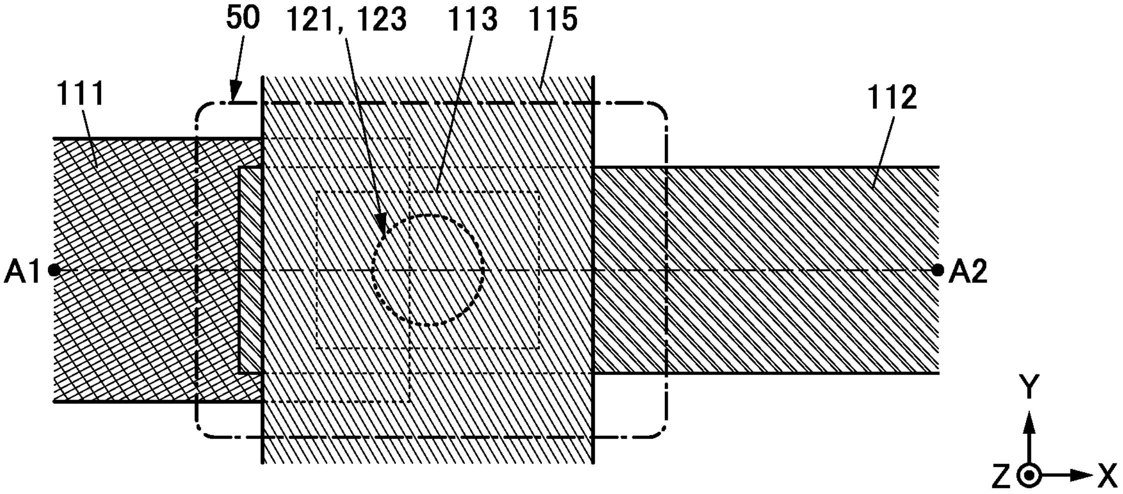
FIG. 37A is a plan view illustrating a structure example of a display device and FIG. 37B is a cross-sectional view illustrating the structure example of the display device.
Figure 37B:
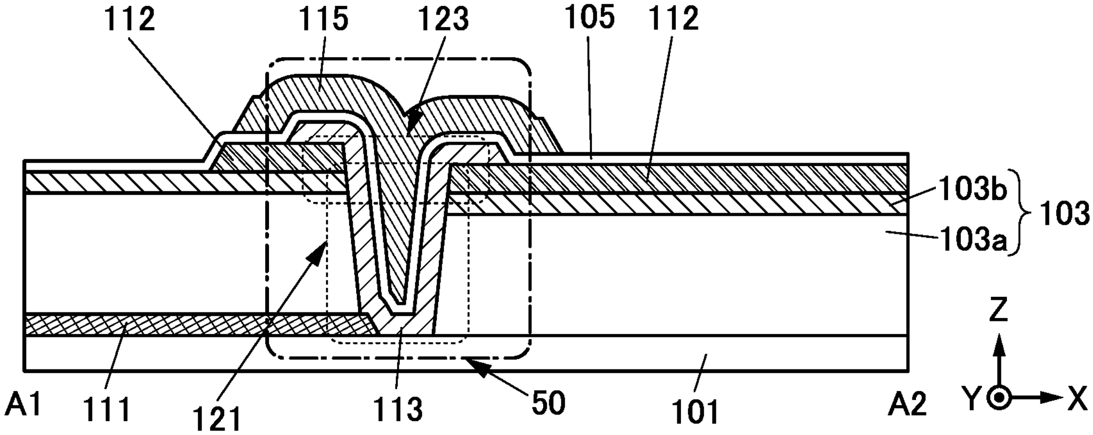

FIG. 37A illustrates a modification example of the structure illustrated in FIG. 4A, in which the conductive layer 111 overlaps with not the whole but part of the opening 121. FIG. 37B is a cross-sectional view taken along dashed-dotted line A1-A2 in FIG. 37A. In the example illustrated in FIGS. 37A and 37B, the semiconductor layer 113 includes a region not overlapping with the conductive layer 111 in the opening 121.

In the example illustrated in FIGS. 37A and 37B, parasitic capacitance between the conductive layer 111 and the conductive layer 115 can be small, for example. Meanwhile, in the examples illustrated in FIGS. 4A and 4B and the like, the width of one of the source region and the drain region can be increased.

Figure 38A:
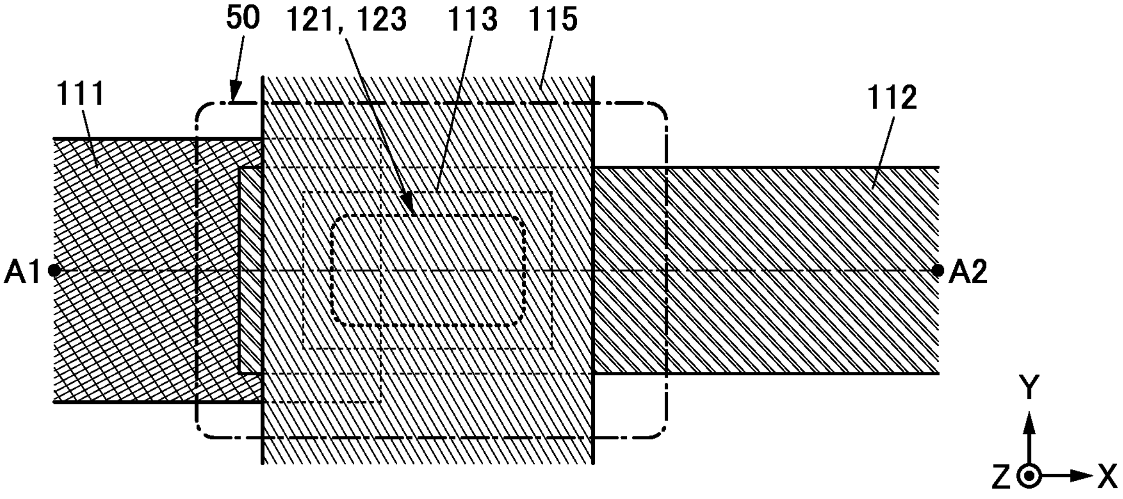
FIG. 38A is a plan view illustrating a structure example of a display device and FIG. 38B is a cross-sectional view illustrating the structure example of the display device.
Figure 38B:
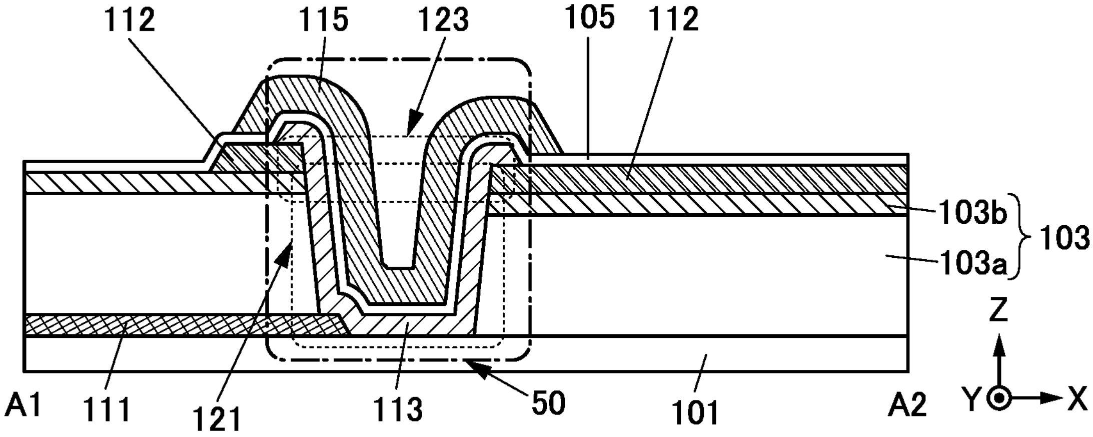

FIG. 38A is a modification example of the structure illustrated in FIG. 37A, in which the openings 121 and 123 each have a rectangular shape with rounded corners in a plan view. FIG. 38B is a cross-sectional view taken along dashed-dotted line A1-A2 in FIG. 38A.

In the example illustrated in FIG. 38A, the side surface of the insulating layer 103 in the opening 121 and the side surface of the conductive layer 112 in the opening 123 each include a region not curved but flat. Thus, the coverage with the semiconductor layer 113, the insulating layer 105, and the conductive layer 115 can be increased in the openings 121 and 123. In each of the openings 121 and 123 in the example in FIG. 38A, the length in the X direction is longer than the length in the Y direction, but the length in the X direction may be shorter than the length in the Y direction.

FIG. 39A1 illustrates a modification example of the structure illustrated in FIG. 37A, in which the conductive layer 112 surrounds the periphery of the opening 121 not entirely but partly in a plan view. FIG. 39A2 illustrates a modification example of the structure illustrated in FIG. 39A1, in which the end portion of the conductive layer 112 is in contact with one point of the periphery of the opening 121 in a plan view. In the example illustrated in FIG. 39A2, the opening 121 has a circular shape and one of the end portions of the conductive layer 112 extending in the Y direction is a tangent of the opening 121 in a plan view. FIG. 39B is a cross-sectional view taken along dashed-dotted line A1-A2 in each of FIGS. 39A1 and 39A2.

In the examples illustrated in FIGS. 39A1, 39A2, and 39B, the area of the region where the conductive layer 112 overlaps with the conductive layer 115 can be small. Thus, parasitic capacitance can be reduced. Meanwhile, in the examples illustrated in FIGS. 37A and 37B and the like, the width of the other of the source region and the drain region can be increased.

Figure 40A:
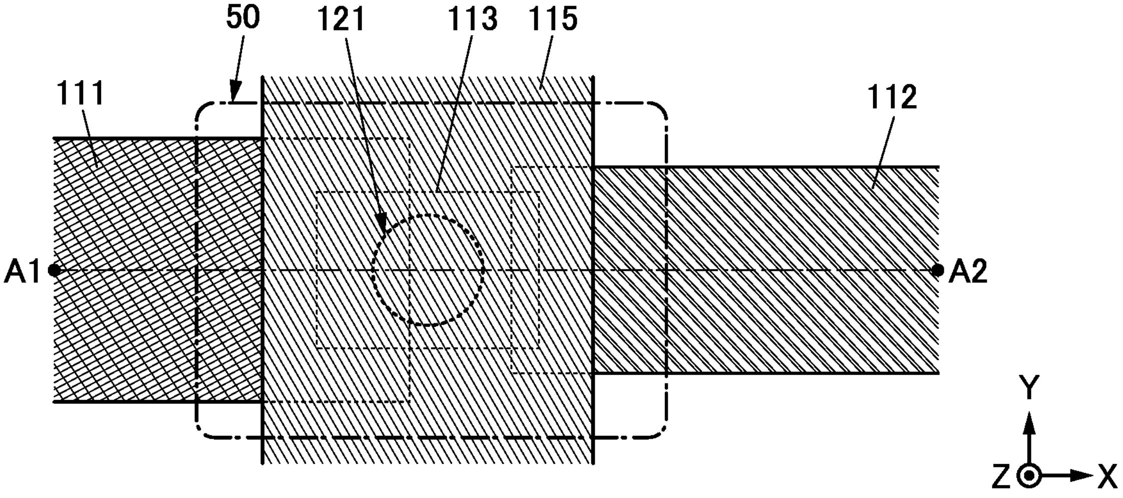
FIG. 40A is a plan view illustrating a structure example of a display device and FIG. 40B is a cross-sectional view illustrating the structure example of the display device.
Figure 40B:
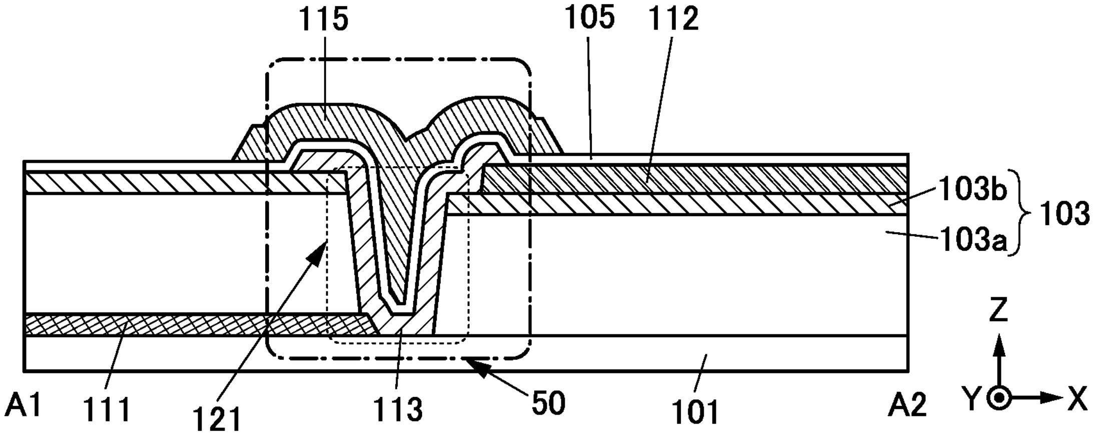

FIG. 40A illustrates a modification example of the structures illustrated in FIGS. 39A1 and 39A2, in which the conductive layer 112 does not overlap with the opening 121. FIG. 40B is a cross-sectional view taken along dashed-dotted line A1-A2 in FIG. 40A.

In the example illustrated in FIGS. 40A and 40B, the area of the region where the conductive layer 112 overlaps with the conductive layer 115 can be smaller. Thus, parasitic capacitance can be further reduced.

Figure 41A:
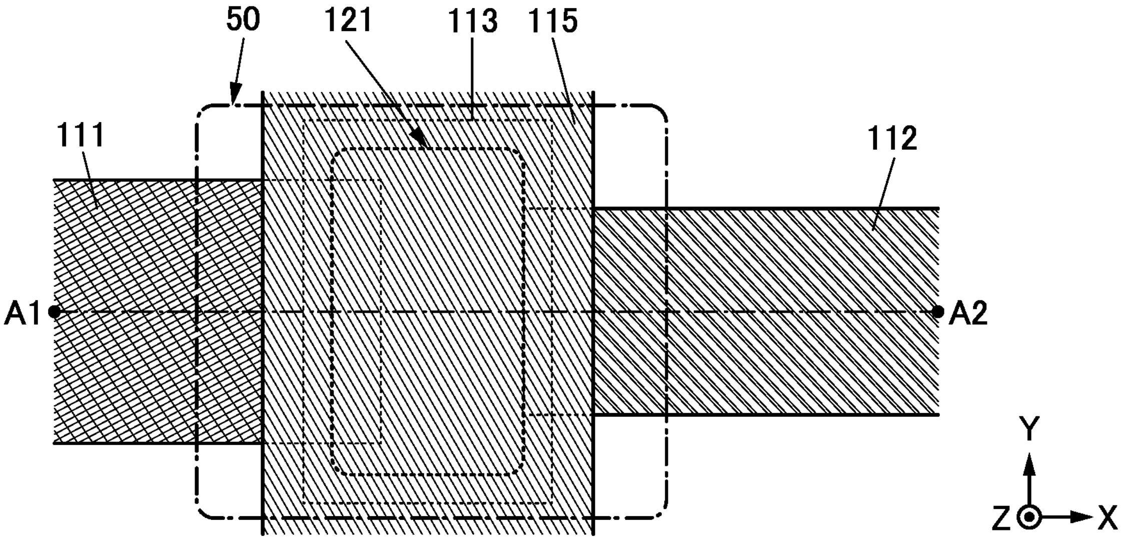
FIG. 41A is a plan view illustrating a structure example of a display device and FIG. 41B is a cross-sectional view illustrating the structure example of the display device.
Figure 41B:
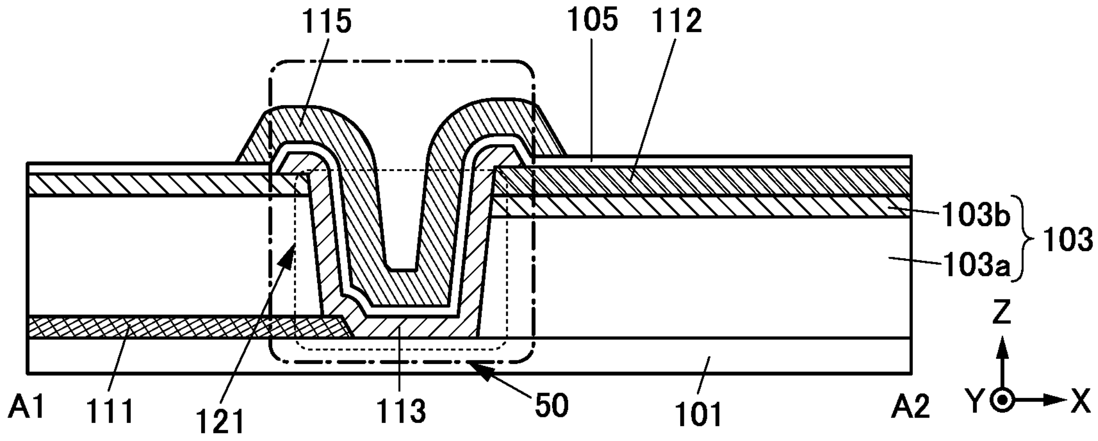

FIG. 41A illustrates a modification example of the structure illustrated in FIG. 38A, in which part of one side of the opening 121 is in contact with the end portion of the conductive layer 112 and the length of the opening 121 in the X direction is shorter than the length in the Y direction in a plan view. FIG. 41B is a cross-sectional view taken along dashed-dotted line A1-A2 in FIG. 41A.

In the example illustrated in FIGS. 41A and 41B, the area of the region where the conductive layer 112 overlaps with the conductive layer 115 can be small. Thus, parasitic capacitance can be reduced. Meanwhile, in the examples illustrated in FIGS. 38A and 38B and the like, the width of the other of the source region and the drain region can be increased.

Figure 42A:
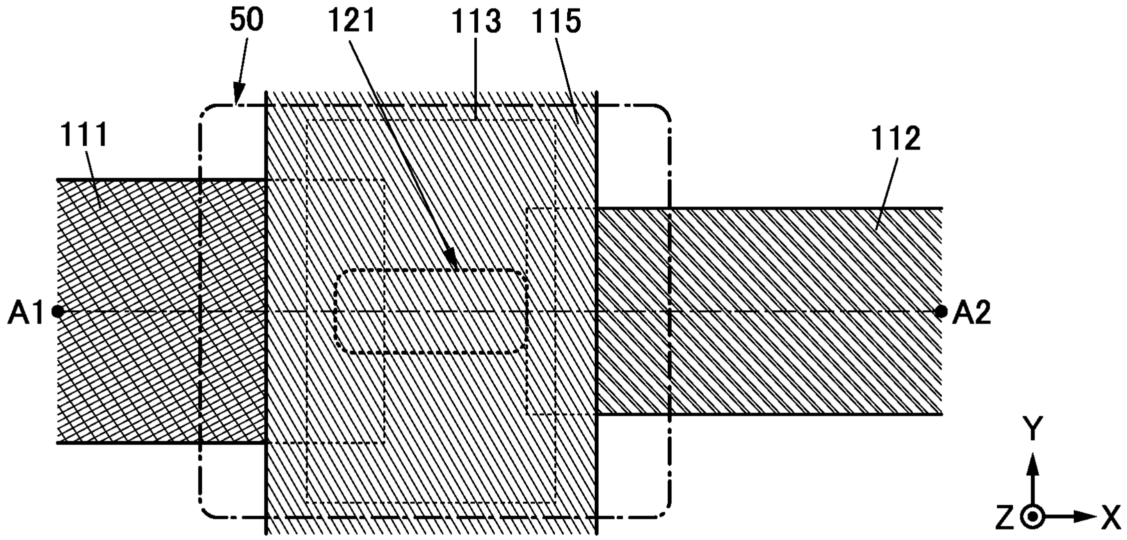
FIGS. 42A and 42B are plan views illustrating structure examples of a display device.

FIG. 42A illustrates a modification example of the structure illustrated in FIG. 41A, in which the length of the opening 121 in the X direction is longer than the length in the Y direction. In the example illustrated in FIG. 42A, the entire one side of the opening 121 can be in contact with the end portion of the conductive layer 112 in a plan view.

Figure 42B:
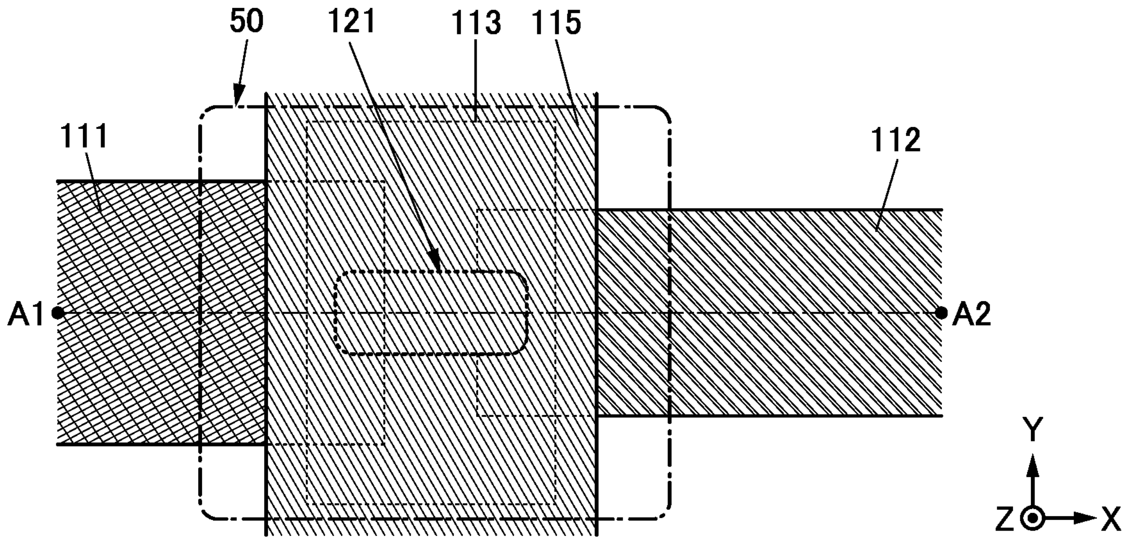

FIG. 42B illustrates a modification example of the structure illustrated in FIG. 42A, in which parts of three sides of the opening 121 are in contact with the end portion of the conductive layer 112 in a plan view. In the example illustrated in FIG. 42B, the conductive layer 112 covers the entire side of the opening 121 extending in the Y direction on the conductive layer 112 side and parts of the sides of the opening 121 extending in the X direction in a plan view.

In the example illustrated in FIG. 42B, the width of the other of the source region and the drain region can be increased. Meanwhile, in the example illustrated in FIG. 42A, the area of the region where the conductive layer 112 overlaps with the conductive layer 115 can be small; thus, parasitic capacitance can be reduced. FIG. 41B can be referred to for a cross-sectional view taken along dashed-dotted line A1-A2 in each of FIGS. 42A and 42B.

FIG. 43A1 illustrates a modification example of the structure illustrated in FIG. 41A, in which the conductive layer 112 is not in contact with the opening 121 in a plan view. FIG. 43A2 illustrates a modification example of the structure illustrated in FIG. 43A1, in which the length of the opening 121 in the X direction is longer than the length in the Y direction. FIG. 43B is a cross-sectional view taken along dashed-dotted line A1-A2 in each of FIGS. 43A1 and 43A2.

In the examples illustrated in FIGS. 43A1, 43A2, and 43B, the area of the region where the conductive layer 112 overlaps with the conductive layer 115 can be smaller. Thus, parasitic capacitance can be further reduced.

Figure 44A:
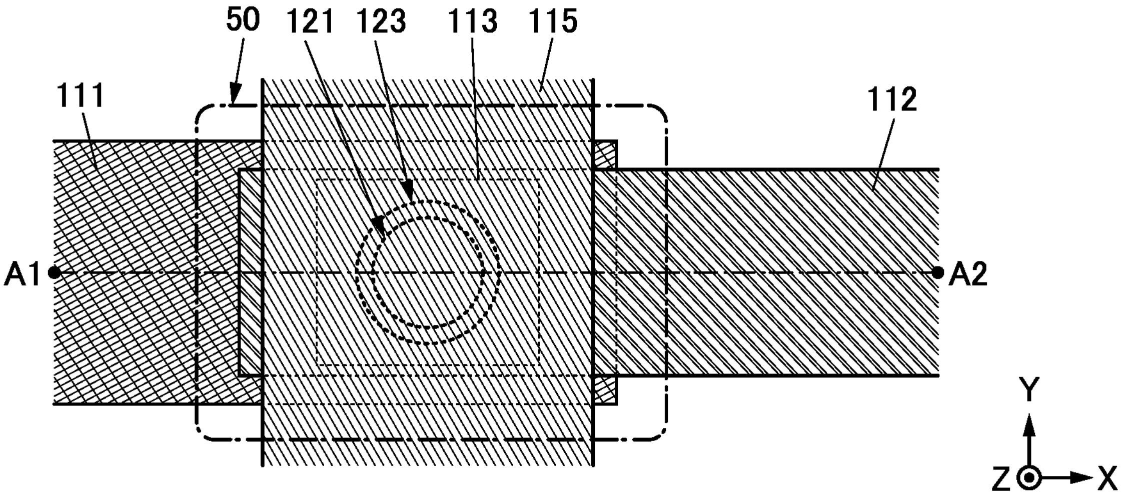
Figure 44A:
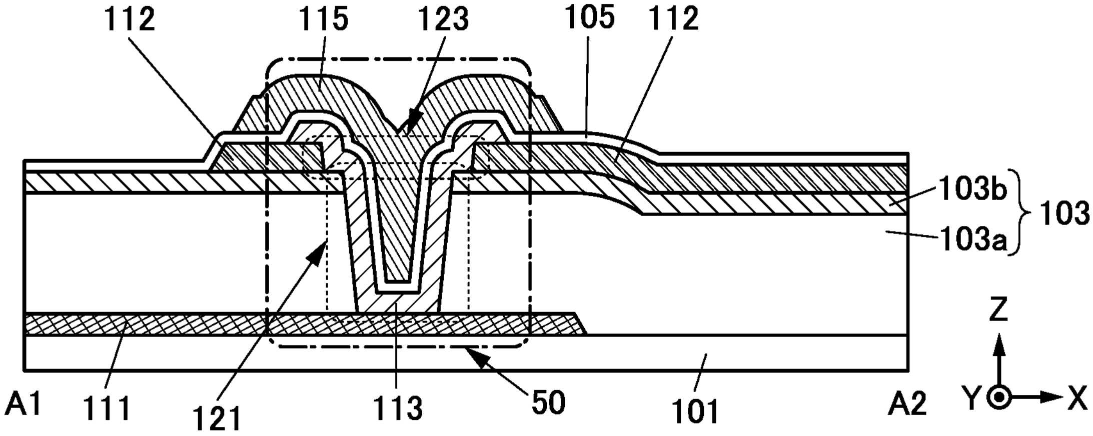
Figure 44A:
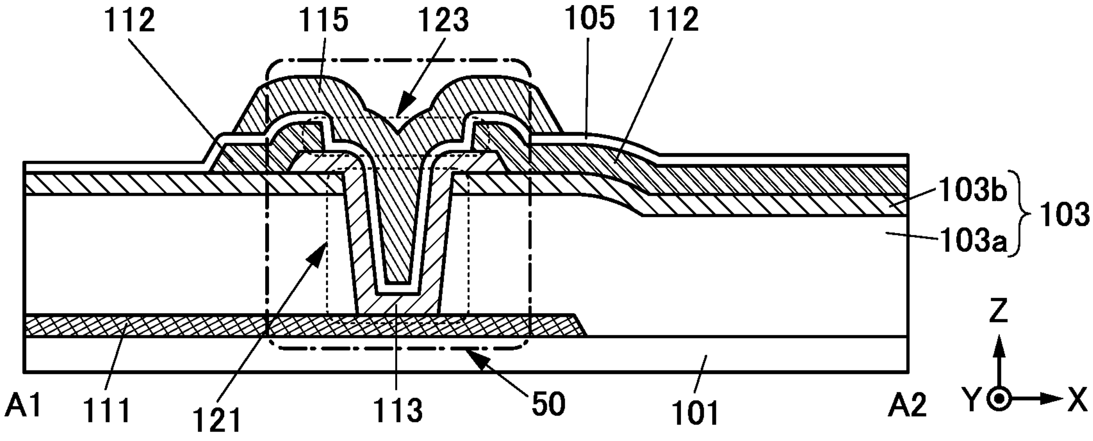

FIG. 44A illustrates a modification example of the structure illustrated in FIG. 4A, in which the planar shape of the opening 121 is not the same as the planar shape of the opening 123. In the example illustrated in FIG. 44A, the opening 123 has a circular planar shape with a radius larger than that of the opening 121. One or both of the openings 121 and 123 do not necessarily have a circular planar shape. Specifically, one or both of the openings 121 and 123 can have the above-described planar shape such as the rectangular planar shape having rounded corners. FIG. 44B1 is a cross-sectional view taken along dashed-dotted line A1-A2 in FIG. 44A.

In the case where the openings 121 and 123 are formed in different steps, for example, the openings 121 and 123 may have shapes illustrated in FIGS. 44A and 44B1. For example, in the case where the conductive layer 112 is etched in the X and Y directions at a rate different from a rate at which the insulating layer 103 is etched in the X and Y directions, the openings 121 and 123 may have the shapes illustrated in FIGS. 44A and 44B1 even though being formed in the same step. For example, in the case where the conductive layer 112 is etched in the X and Y directions at a rate higher than a rate at which the insulating layer 103 is etched in the X and Y directions, the openings 121 and 123 may have the shapes illustrated in FIGS. 44A and 44B1 even though being formed in the same step.

FIG. 44B2 is a modification example of the structure illustrated in FIG. 44B1, in which the top surface of the semiconductor layer 113 includes a region in contact with the conductive layer 112. The structure illustrated in FIG. 44B2 can be formed by, for example, forming the opening 121 in the insulating layer 103, forming the semiconductor layer 113, forming a film to be the conductive layer 112, and then forming the opening 123 in the film.

As described above, the channel width of the transistor 50 can be equal to the length of the periphery of the opening 123 in a plan view. Thus, when the opening 123 has a larger area than the opening 121, for example, the transistor 50 can have a large channel width in some cases. Meanwhile, when the areas of the openings 123 and 121 are equal to each other, for example, the transistor 50 can be miniaturized in some cases.

Figure 45A:
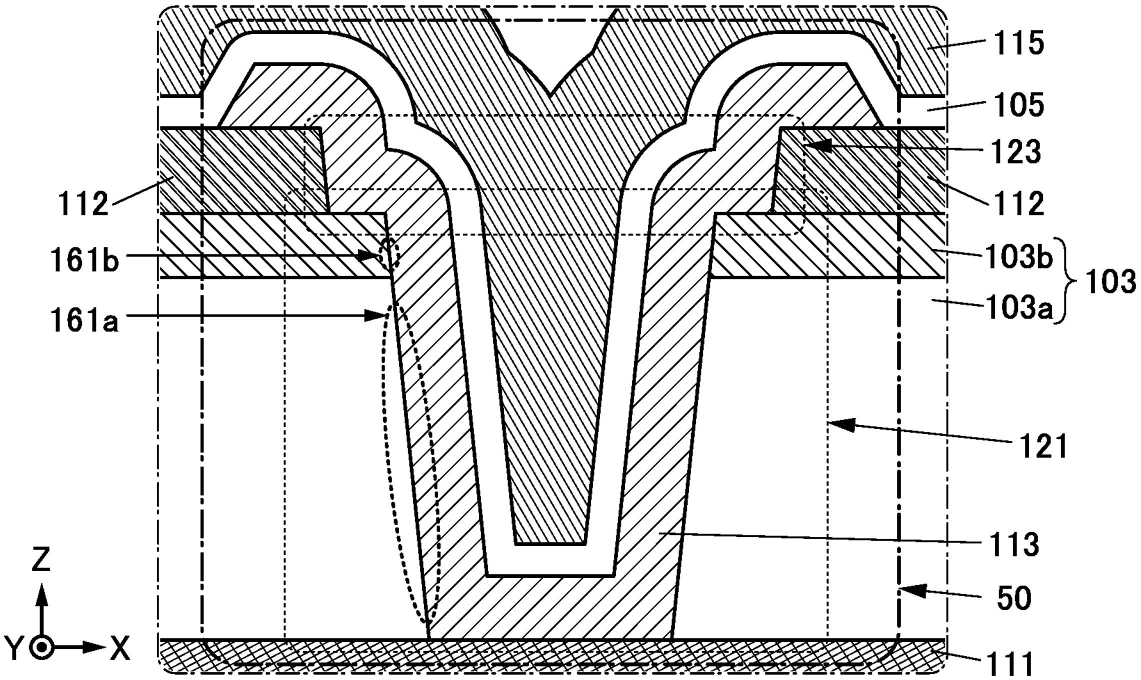
FIGS. 45A and 45B are cross-sectional views illustrating structure examples of a display device.
Figure 45B:
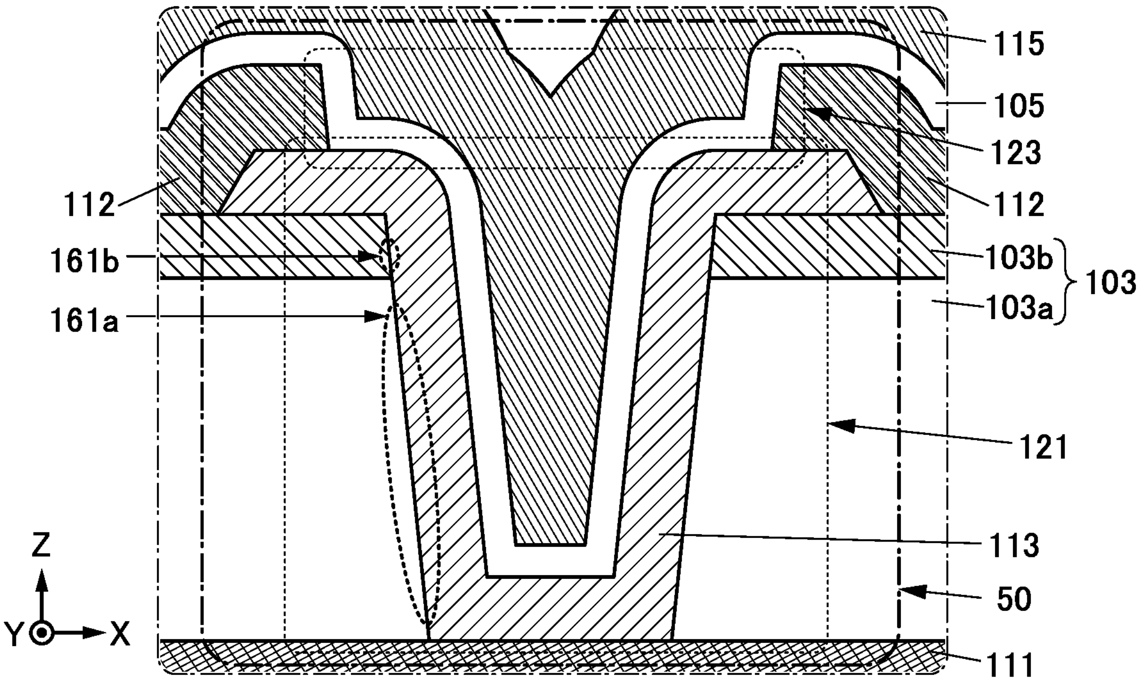

FIG. 45A is an enlarged view illustrating the structure example of the transistor 50 illustrated in FIG. 44B1 and the vicinity thereof. FIG. 45B is an enlarged view illustrating the structure example of the transistor 50 illustrated in FIG. 44B2 and the vicinity thereof. As illustrated in FIGS. 45A and 45B, a side surface of the insulating layer 103*a* on the opening 121 side includes a tapered portion 161*a* and a side surface of the insulating layer 103*b* on the opening 121 side includes a tapered portion 161*b*.

As illustrated in FIGS. 45A and 45B, an end portion of the top surface of the insulating layer 103*a* on the opening 121 side can be the same or substantially the same as an end portion of a bottom surface of the insulating layer 103*b* on the opening 121 side. Furthermore, the taper angle of the tapered portion 161*a* can be equal to or substantially equal to the taper angle of the tapered portion 161*b*. Here, the taper angle of a side surface of the conductive layer 112 on the opening 123 side may be larger or smaller than those of the tapered portions 161*a* and 161*b*. The taper angle of the side surface of the conductive layer 112 on the opening 123 side may be equal to or substantially equal to those of the tapered portions 161*a* and 161*b*.

Figure 46A:
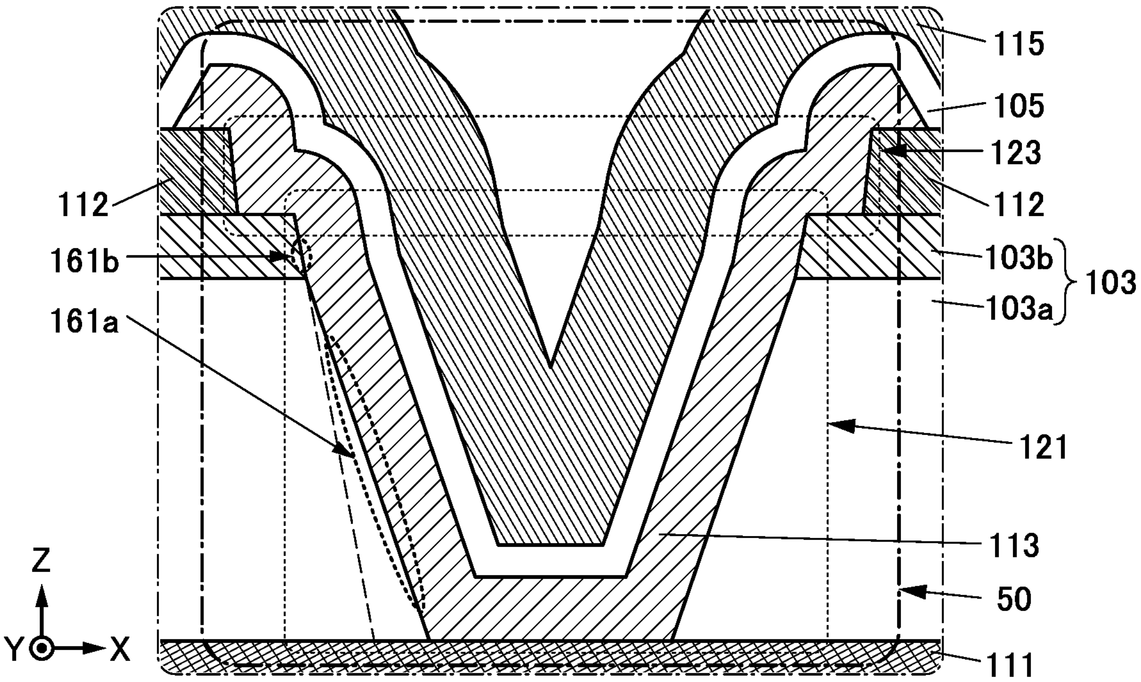
FIGS. 46A and 46B are cross-sectional views illustrating structure examples of a display device.
Figure 46B:
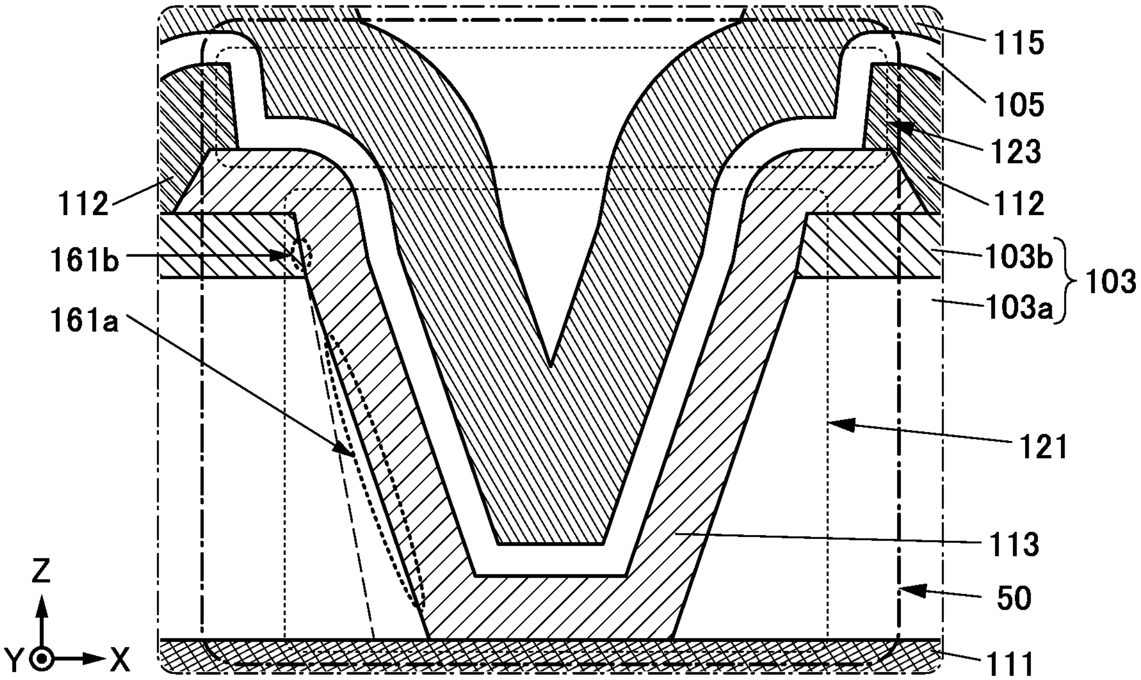

FIGS. 46A and 46B illustrate modification examples of the structures illustrated in FIGS. 45A and 45B, respectively, in which the tapered portions 161*a* and 161*b* have different taper angles. In each of FIGS. 46A and 46B, the tapered portion 161*b* extending to the insulating layer 103*a* side is indicated by a dashed straight line. For example, in the case where the insulating layers 103*a* and 103*b* include different materials and thus have different processabilities, the tapered portions 161*a* and 161*b* have different taper angles in some cases.

FIGS. 46A and 46B illustrate examples in which the taper angle of the tapered portion 161*a* is smaller than that of the tapered portion 161*b*. The taper angle of the tapered portion 161*a* may be larger than that of the tapered portion 161*b*. Here, the taper angle of the side surface of the conductive layer 112 on the opening 123 side may be larger or smaller than that of the tapered portion 161*a* and may be larger or smaller than that of the tapered portion 161*b*. The taper angle of the side surface of the conductive layer 112 on the opening 123 side may be equal to or substantially equal to that of the tapered portion 161*a* and may be equal to or substantially equal to that of the tapered portion 161*b*.

Figure 47A:
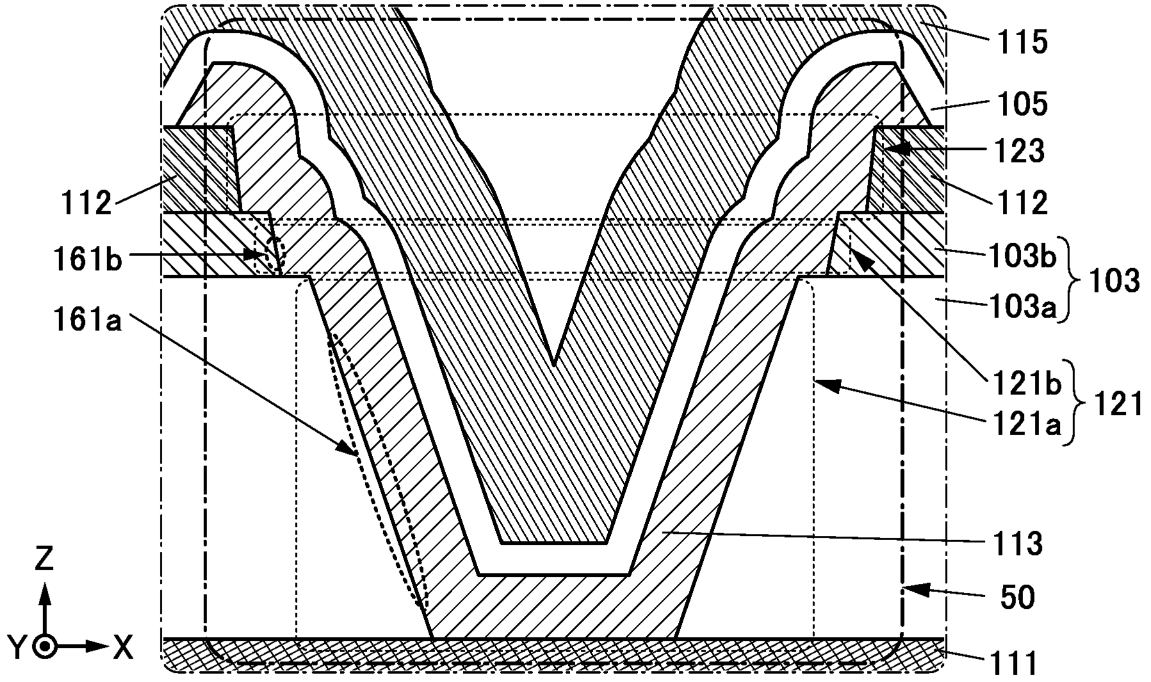
FIGS. 47A and 47B are cross-sectional views illustrating structure examples of a display device.
Figure 47B:
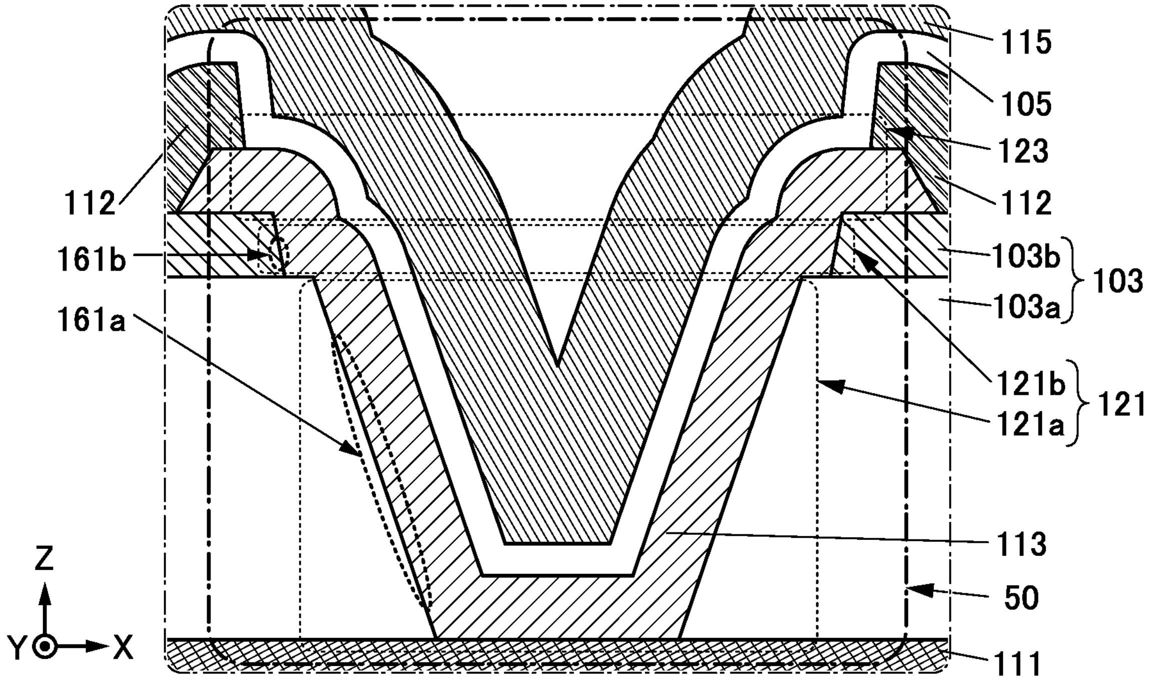

FIGS. 47A and 47B illustrate modification examples of the structures illustrated in FIGS. 45A and 45B, respectively, in which the end portion of the top surface of the insulating layer 103*a* is not the same as the end portion of the bottom surface of the insulating layer 103*b*, specifically, an end portion of the insulating layer 103*b* on the opening 121 side is positioned outside an end portion of the insulating layer 103*a* on the opening 121 side. In FIGS. 47A and 47B, the opening 121 provided in the insulating layer 103*a* is an opening 121*a*, and the opening 121 provided in the insulating layer 103*b* is an opening 121*b*.

For example, in the case where the insulating layer 103*a* is etched in the X direction at a rate different from a rate at which the insulating layer 103*b* is etched in the X direction, the end portion of the top surface of the insulating layer 103*a* is sometimes not the same as the end portion of the bottom surface of the insulating layer 103*b*. Specifically, in the case where the insulating layer 103*b* is etched in the X direction at a rate higher than a rate at which the insulating layer 103*a* is etched in the X direction, any of the structures illustrated in FIGS. 47A and 47B may be formed. Here, the taper angles of the tapered portions 161*a* and 161*b* may be equal to, substantially equal to, or different from each other. In addition, the taper angle of the side surface of the conductive layer 112 on the opening 123 side may be larger or smaller than that of the tapered portion 161*a* and may be larger or smaller than that of the tapered portion 161*b*. The taper angle of the side surface of the conductive layer 112 on the opening 123 side may be equal to or substantially equal to that of the tapered portion 161*a* and may be equal to or substantially equal to that of the tapered portion 161*b*.

The taper angles of the tapered portions 161*a* and 161*b* and the side surface of the conductive layer 112, the positional relation between the insulating layer 103*a*, the insulating layer 103*b*, and the end portion of the conductive layer 112, and the like described with reference to FIGS. 45A and 45B, FIGS. 46A and 46B, and FIGS. 47A and 47B are applicable to all the structures described in this specification and the like.

Figure 48A:
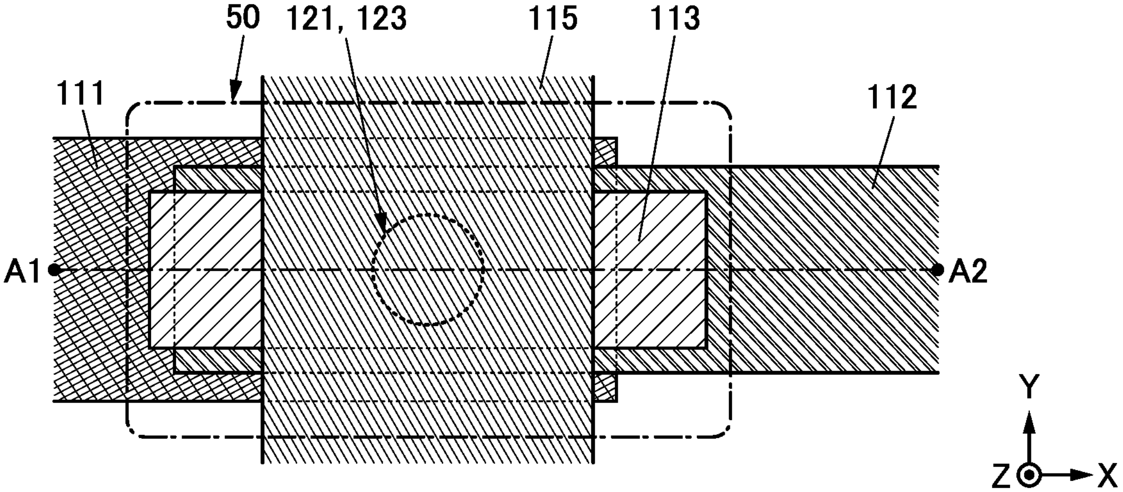
FIG. 48A is a plan view illustrating a structure example of a display device and FIG. 48B is a cross-sectional view illustrating the structure example of the display device.
Figure 48B:
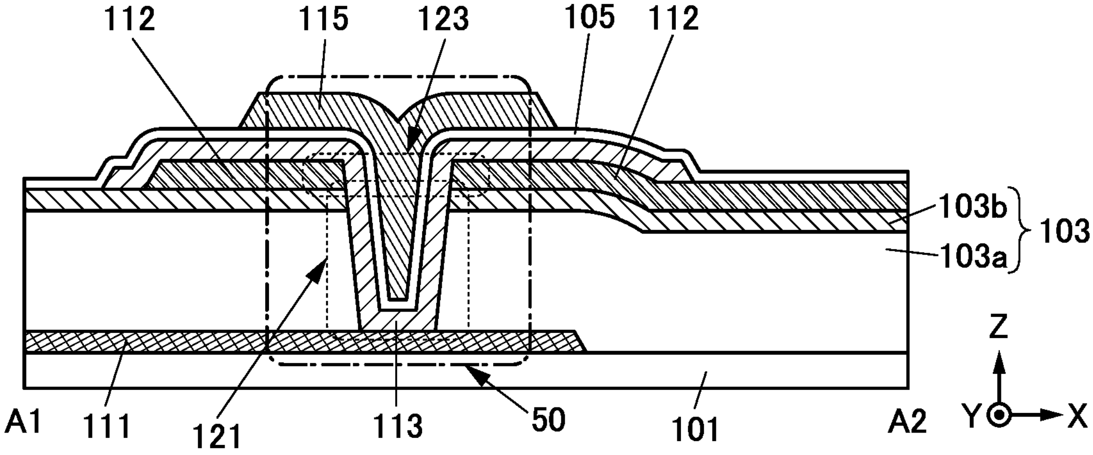

FIG. 48A is a modification example of the structure illustrated in FIG. 4A, in which the semiconductor layer 113 extends in the X direction beyond an end portion of the conductive layer 112 not facing the opening 123. FIG. 48B is a cross-sectional view taken along dashed-dotted line A1-A2 in FIG. 48A.

In the example illustrated in FIG. 48B, when seen from the XZ plane, the semiconductor layer 113 covers the end portion of the conductive layer 112 not facing the opening 123. The semiconductor layer 113 can include a region in contact with the top surface of the insulating layer 103.

Figure 49A:
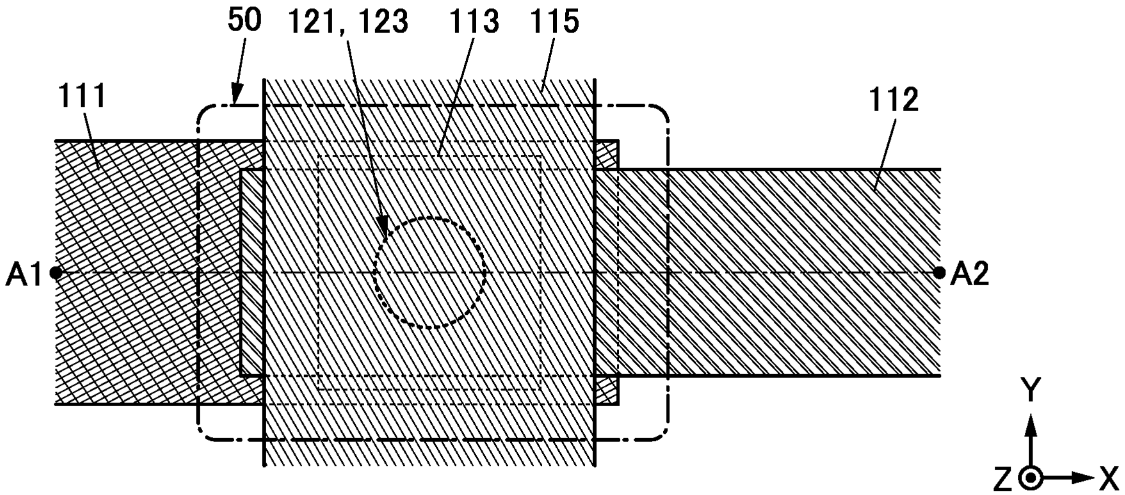
FIGS. 49A and 49B are plan views illustrating structure examples of a display device.

FIG. 49A is a modification example of the structure illustrated in FIG. 4A, in which the end portion of the semiconductor layer 113 is positioned outside the end portion of the conductive layer 112 and inside an end portion of the conductive layer 111 in the Y direction. In the example illustrated in FIG. 49A, the end portion of the semiconductor layer 113 overlaps with not the conductive layer 112 but the conductive layer 111 in the Y direction.

Figure 49B:
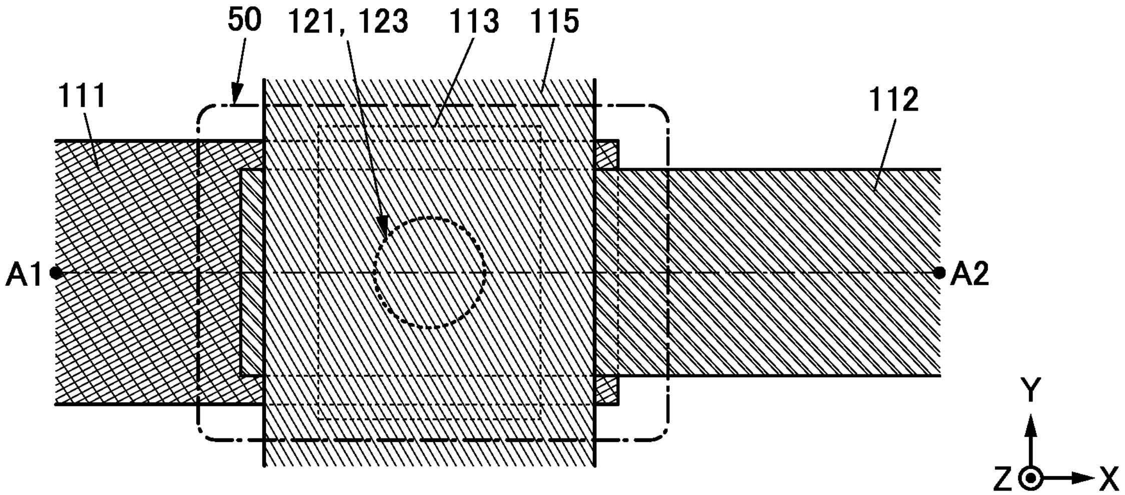

FIG. 49B is a modification example of the structure illustrated in FIG. 4A, in which the end portion of the semiconductor layer 113 is positioned outside the end portions of the conductive layers 112 and 111 in the Y direction. In the example illustrated in FIG. 49B, the end portion of the semiconductor layer 113 overlaps with neither the conductive layer 111 nor the conductive layer 112 in the Y direction. FIG. 31C shows a cross-sectional view taken along dashed-dotted line A1-A2 in each of FIGS. 49A and 49B.

Figure 50A:
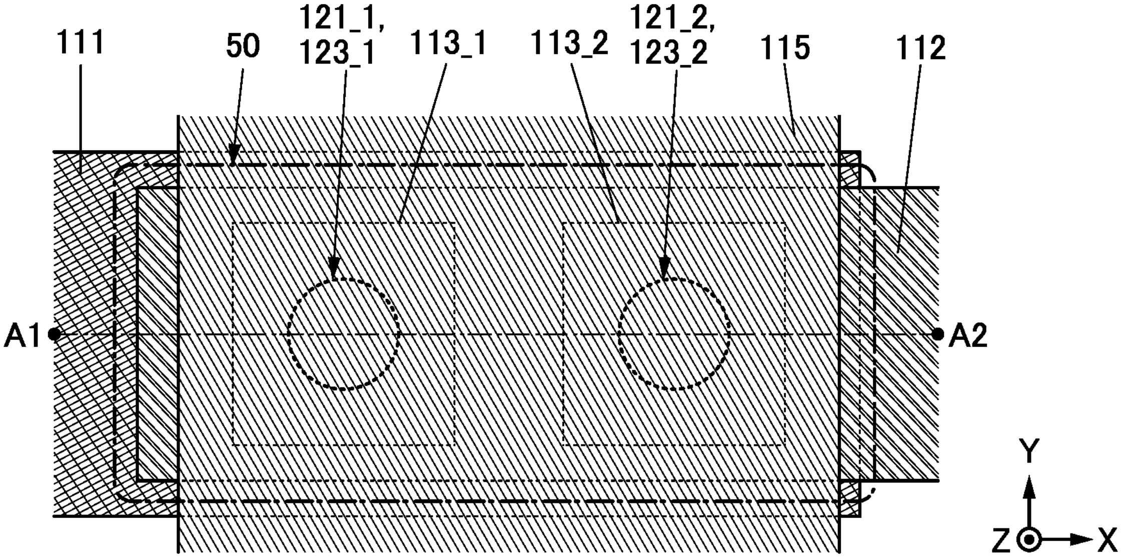
FIG. 50A is a plan view illustrating a structure example of a display device and FIG. 50B is a cross-sectional view illustrating the structure example of the display device.
Figure 50B:
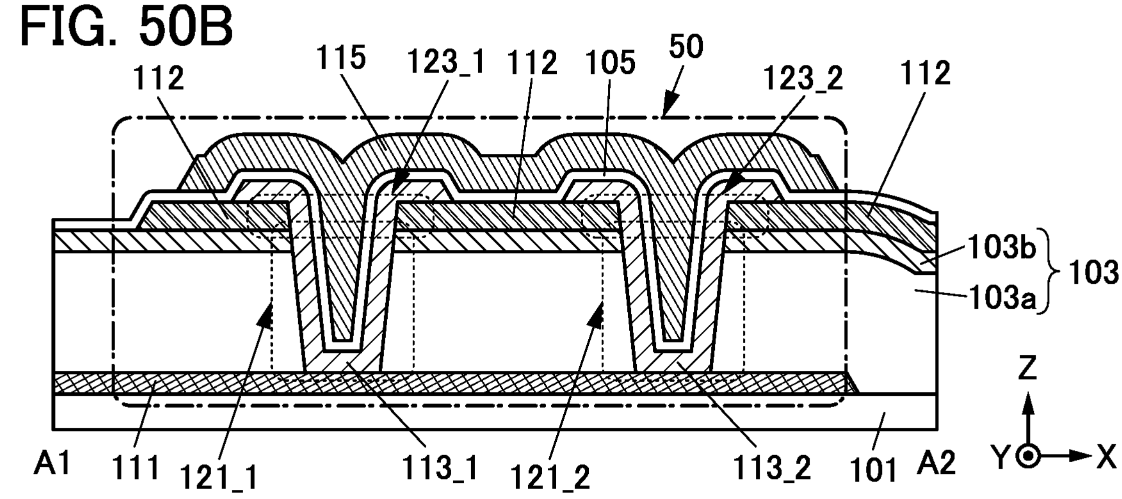

FIG. 50A is a modification example of the structure illustrated in FIG. 4A, in which the transistor 50 includes two combinations of the openings 121 and 123 and the two combinations are arranged in the X direction. FIG. 50B is a cross-sectional view taken along dashed-dotted line A1-A2 in FIG. 50A. In the description of the structure in which one transistor 50 includes a plurality of openings 121 and a plurality of openings 123, the X direction and the Y direction are respectively referred to as the row direction and the column direction in some cases.

In FIGS. 50A and 50B, two openings 121 are denoted by the opening 121_1 and the opening 1212 to be distinguished from each other, and two openings 123 are denoted by the opening 123_1 and the opening 123_2 to be distinguished from each other. In the example illustrated in FIGS. 50A and 50B, the semiconductor layer 113 provided in the openings 1211 and 123_1 is different from the semiconductor layer 113 provided in the openings 1212 and 123_2, and the two semiconductor layers 113 are denoted by a semiconductor layer 113_1 and a semiconductor layer 1132 to be distinguished from each other. The same applies to the following drawings.

Figure 51A:
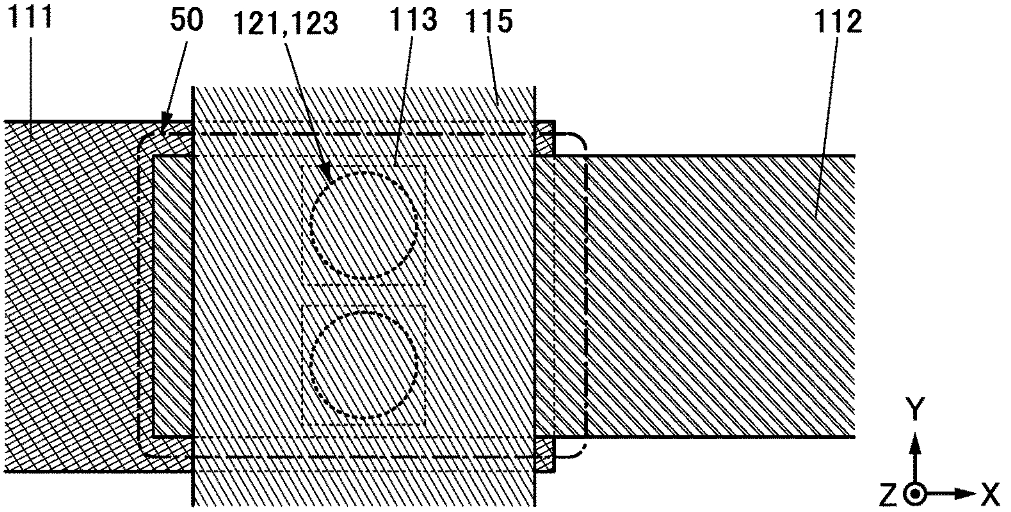
FIGS. 51A to 51C are plan views illustrating structure examples of a display device.
Figure 51B:
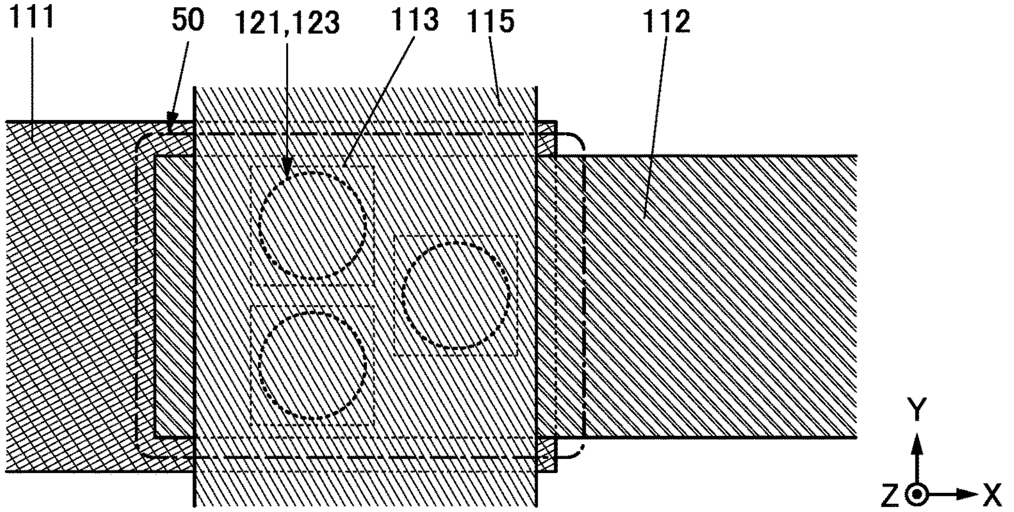

FIG. 51A is a modification example of the structure illustrated in FIG. 50A; a combination of the openings 121 and 123 is denoted by a reference numeral "121, 123" in the drawings. In this example, two combinations of the openings 121 and 123 are arranged in the Y direction. FIG. 51B is a modification example of the structure illustrated in FIG. 51A, in which one combination of the openings 121 and 123 is provided on the right side of two combinations of the openings 121 and 123 arranged in the Y direction. When the two combinations of the openings 121 and 123 arranged in the Y direction are provided in the first column and the one combination of the openings 121 and 123 is provided in the second column, for example, the center of the one combination in the second column can be positioned between the center of the upper combination and the center of the lower combination in the first column in the Y direction.

Figure 51C:
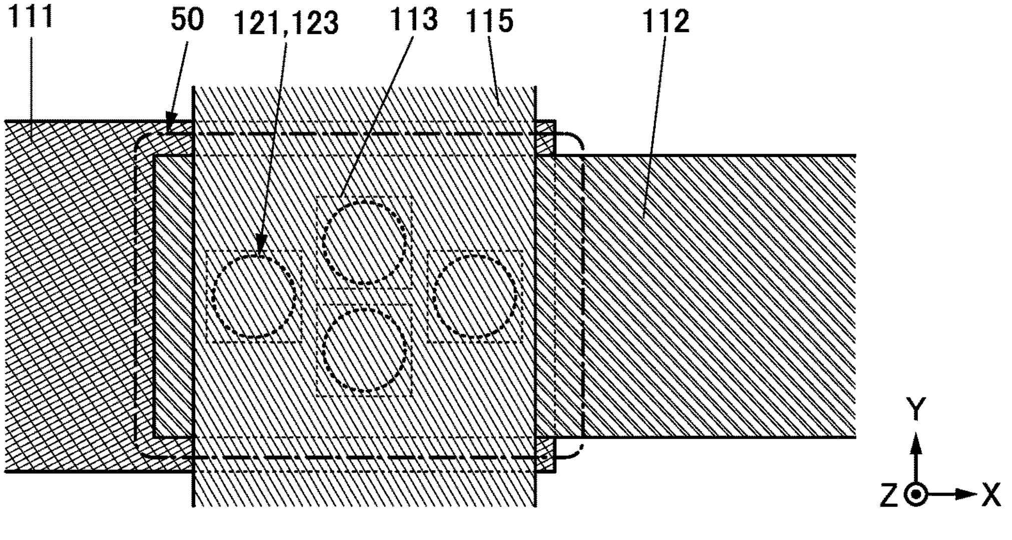

FIG. 51C is a modification example of the structure illustrated in FIG. 51A, in which one combination of the openings 121 and 123 and another combination of the openings 121 and 123 are respectively provided on the left side and the right side of two combinations of the openings 121 and 123 arranged in the Y direction. When the one combination of the openings 121 and 123 and the other combination of the openings 121 and 123 are respectively provided in the first column and the third column and the two combinations of the openings 121 and 123 arranged in the Y direction are provided in the second column, for example, the center of the one combination in the first column and the center of the other combination in the third column can be positioned between the centers of the two combinations in the second column.

Figure 52A:
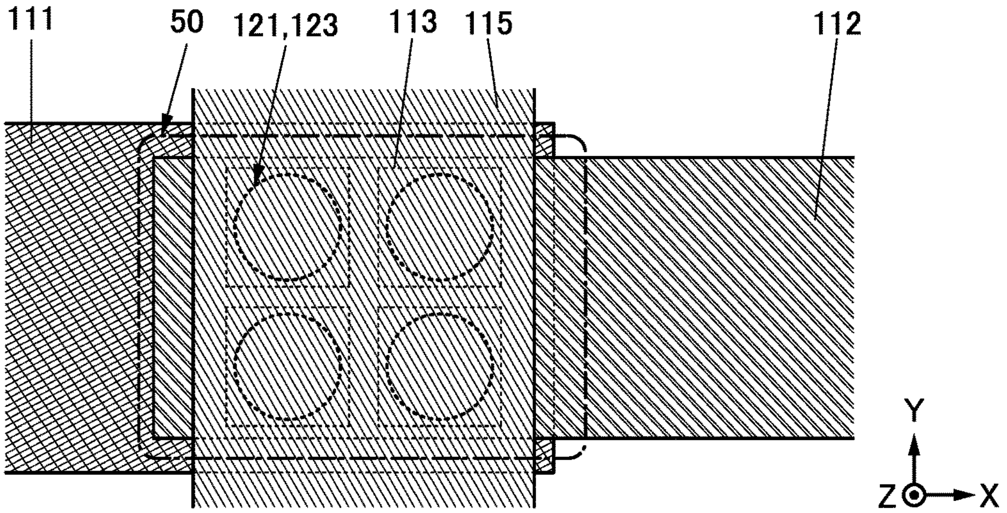
FIGS. 52A to 52C are plan views illustrating structure examples of a display device.
Figure 52B:
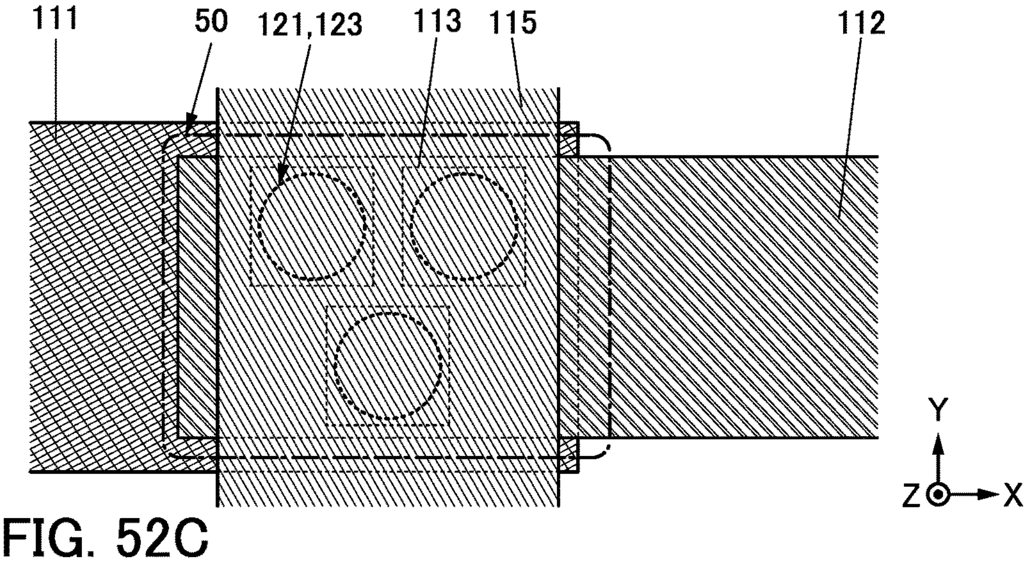

FIG. 52A is a modification example of the structure illustrated in FIG. 4A, in which four combinations of the openings 121 and 123 are arranged in a matrix of two rows and two columns. FIG. 52B is a modification example of the structure illustrated in FIG. 50A, in which one combination of the openings 121 and 123 is provided on the lower side of two combinations of the openings 121 and 123 arranged in the X direction. When the two combinations of the openings 121 and 123 arranged in the X direction are provided in the first row and the one combination of the openings 121 and 123 is provided in the second row, for example, the center of the one combination in the second row can be positioned between the center of the left combination and the center of the right combination in the first row in the X direction.

Figure 52C:
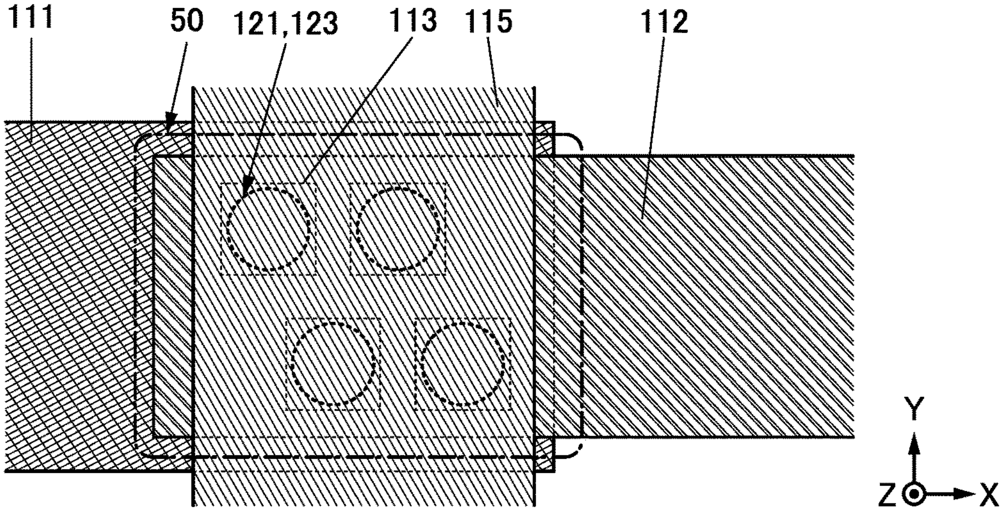

FIG. 52C is a modification example of the structure illustrated in FIG. 52A, in which two combinations of the openings 121 and 123 on the lower side are positioned closer to the right side than those in FIG. 52A. In the structure illustrated in FIG. 52C, four combinations of the openings 121 and 123 are arranged in a zigzag manner.

Figure 53A:
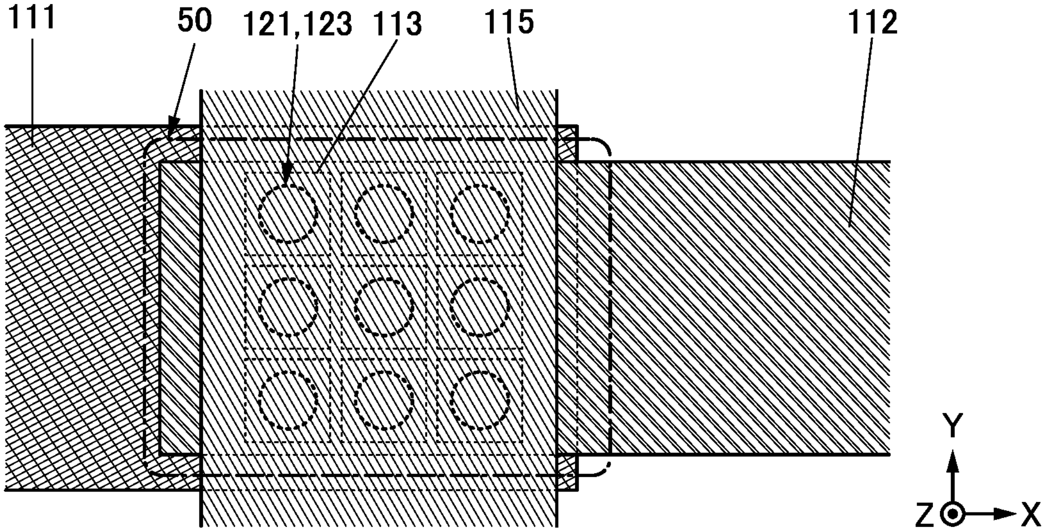
FIGS. 53A and 53B are plan views illustrating structure examples of a display device.
Figure 53B:
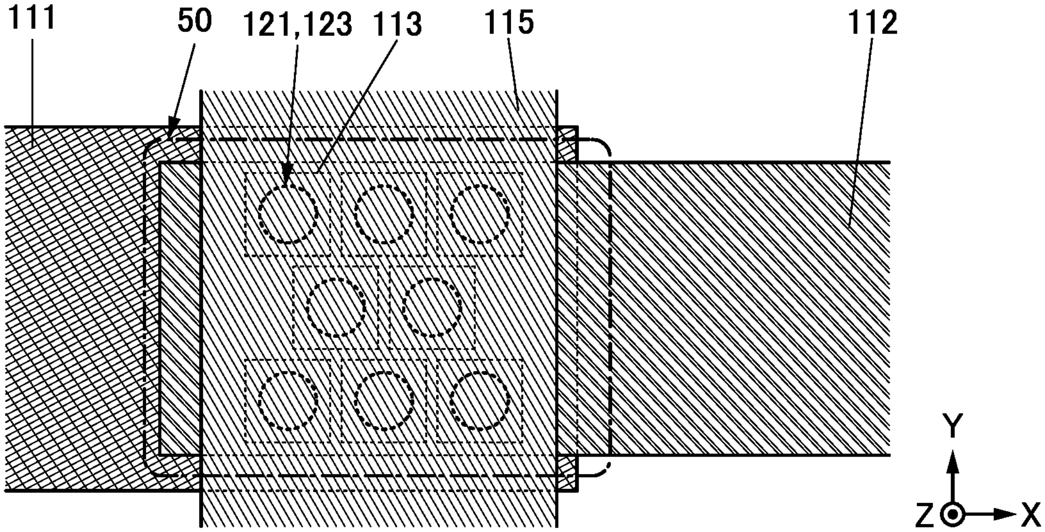

FIG. 53A is a modification example of the structure illustrated in FIG. 4A, in which nine combinations of the openings 121 and 123 are arranged in a matrix of three rows and three columns. FIG. 53B is a modification example of the structure illustrated in FIG. 53A, in which the number of combinations of the openings 121 and 123 provided in the middle row is two. In the example illustrated in FIG. 53B, the combinations of the openings 121 and 123 in the upper row and the combinations of the openings 121 and 123 in the middle row are arranged in a zigzag manner. Also in the structure illustrated in FIG. 53B, the combinations of the openings 121 and 123 in the lower row and the combinations of the openings 121 and 123 in the middle row are arranged in a zigzag manner.

When the transistor 50 includes a large number of openings 121 and 123, the total length of the periphery of the opening 121 and the periphery of the opening 123 can be long in some cases in a plan view. As described above, the channel width of the transistor 50 can be equal to the length of the periphery of the opening 123 in a plan view, for example. Thus, the transistor 50 including a plurality of openings 121 and 123 can have a large channel width in some cases. Meanwhile, the transistor 50 including a small number of openings 121 and 123 can be manufactured easily and miniaturized in some cases.

Figure 54A:
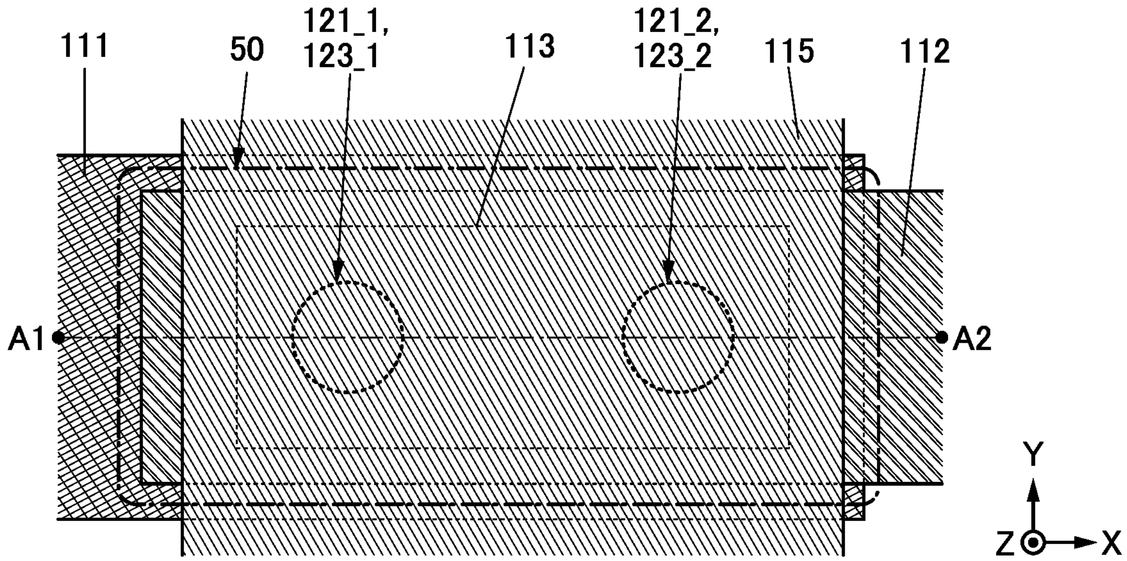
FIG. 54A is a plan view illustrating a structure example of a display device and FIG. 54B is a cross-sectional view illustrating the structure example of the display device.
Figure 54B:
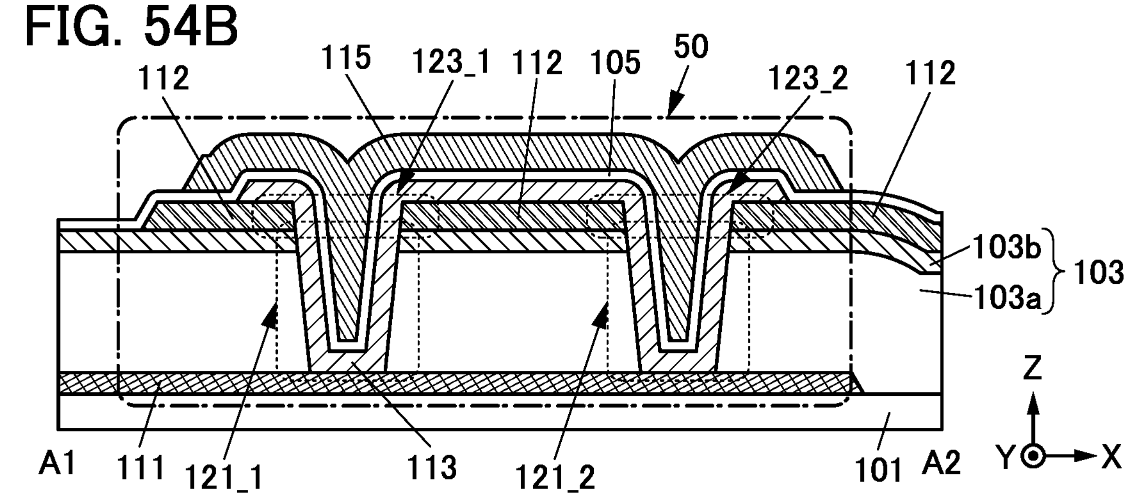

FIG. 54A is a modification example of the structure illustrated in FIG. 50A, in which one semiconductor layer 113 is provided in all of the openings 121_1 and 123_1 and the openings 121_2 and 123_2. That is, in the example illustrated in FIG. 54A, the transistor 50 includes two openings 121, two openings 123, and one semiconductor layer 113. FIG. 54B is a cross-sectional view taken along dashed-dotted line A1-A2 in FIG. 54A.

In the structure illustrated in FIGS. 54A and 54B, for example, when the semiconductor layer 113 is formed by a photolithography method and an etching method, the alignment accuracy of a photomask is not necessarily high. Thus, the transistor 50 can be easily manufactured. Meanwhile, in the structure illustrated in FIGS. 50A and 50B, the surface area of the semiconductor layer 113 having higher electric resistance than the conductive layer 112 can be reduced; thus, the on-state current of the transistor 50 can be increased. Also in the structures illustrated in FIGS. 51A to 51C, FIGS. 52A to 52C, and FIGS. 53A and 53B, the number of semiconductor layers 113 can be one.

A plurality of structure examples described in this embodiment can be combined as appropriate. This embodiment can be combined with any of the other embodiments, as appropriate.

Embodiment 2

In this embodiment, display apparatuses of embodiments of the present invention are described with reference to FIGS. 55A to 55G and FIGS. 56A to 56K.

In this embodiment, pixel layouts are mainly described. There is no particular limitation on the arrangement of subpixels, and a variety of methods can be employed. Examples of the arrangement of subpixels include stripe arrangement, S stripe arrangement, matrix arrangement, delta arrangement, Bayer arrangement, and PenTile arrangement.

The planar shape of the subpixel illustrated in the diagrams in this embodiment corresponds to the planar shape of a light-emitting region (or a light-receiving region).

Examples of the planar shape of the subpixel include polygons such as a triangle, a tetragon (including a rectangle and a square), and a pentagon; polygons with rounded corners; an ellipse; and a circle.

The circuit constituting the subpixel is not necessarily placed within the dimensions of the subpixel illustrated in the diagrams and may be placed outside the subpixel.

Figure 55A:
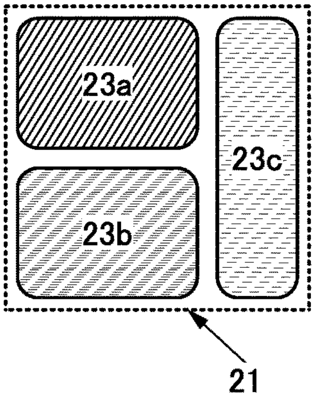
FIGS. 55A to 55G are plan views illustrating structure examples of pixels.

The pixel 21 in FIG. 55A employs S-stripe arrangement. In FIG. 55A, three subpixels 23*a*, 23*b*, and 23*c* form the pixel 21.

Figure 55B:
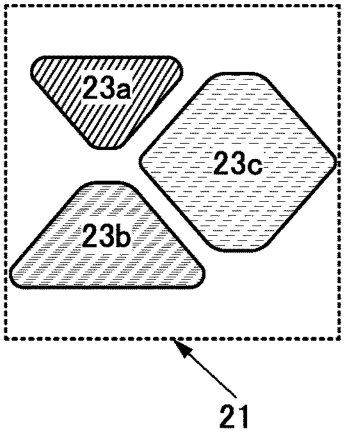

The pixel 21 illustrated in FIG. 55B includes the subpixel 23*a* whose planar shape is a rough triangle or rough trapezoidal shape with rounded corners, the subpixel 23*b* whose planar shape is a rough triangle or rough trapezoidal shape with rounded corners, and the subpixel 23*c* whose planar shape is a rough tetragonal or rough hexagonal shape with rounded corners. The subpixel 23*b* has a larger light-emitting area than the subpixel 23*a*. In this manner, the shapes and sizes of the subpixels can be determined independently. For example, the size of a subpixel including a light-emitting element with higher reliability can be smaller.

Figure 55C:
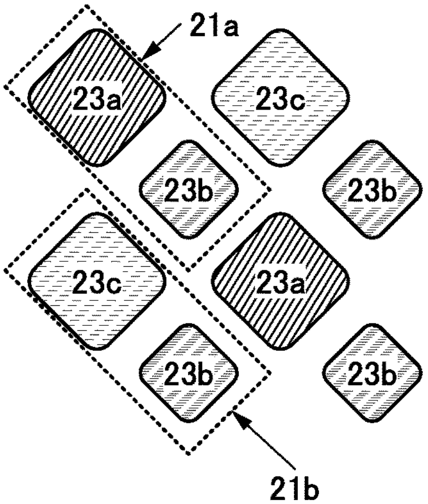

A pixel 21*a* and a pixel 21*b* illustrated in FIG. 55C employ PenTile arrangement. FIG. 55C illustrates an example in which the pixels 21*a* including the subpixels 23*a* and 23*b* and the pixels 21*b* including the subpixels 23*b* and 23*c* are alternately arranged.

Figure 55D:
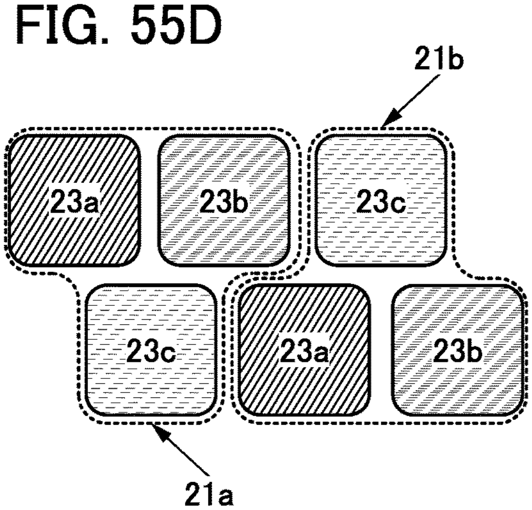
Figure 55E:
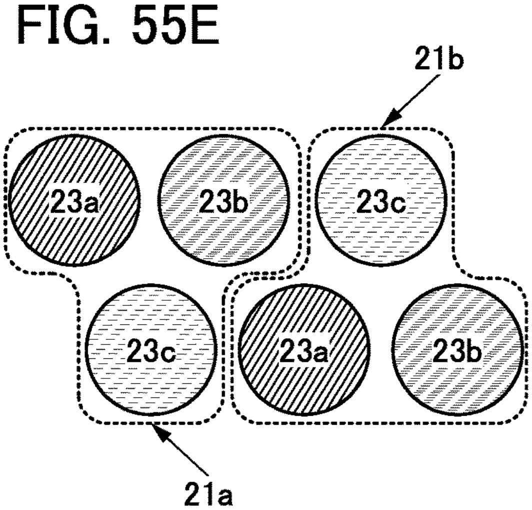
Figure 55F:
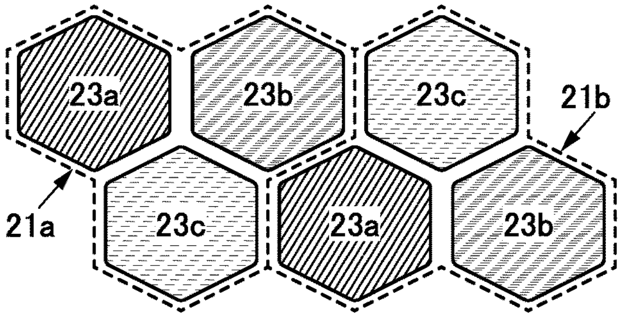

The pixels 21*a* and 21*b* illustrated in FIGS. 55D and 55F employ delta arrangement. The pixel 21*a* includes two subpixels (the subpixels 23*a* and 23*b*) in the upper row (first row) and one subpixel (the subpixel 23*c*) in the lower row (second row). The pixel 21*b* includes one subpixel (the subpixel 23*c*) in the upper row (first row) and two subpixels (the subpixels 23*a* and 23*b*) in the lower row (second row).

FIG. 55D illustrates an example in which the planar shape of each subpixel is a rough square shape with rounded corners, FIG. 55E illustrates an example in which the planar shape of each subpixel is a circular shape, and FIG. 55F illustrates an example in which the planar shape of each subpixel is a rough hexagonal shape with rounded corners.

In FIG. 55F, each subpixel is provided inside one of the closest-packed hexagonal regions. Focusing on one of the subpixels, the subpixel is placed so as to be surrounded by six subpixels. In addition, the subpixels are arranged such that subpixels exhibiting the same color are not adjacent to each other. For example, focusing on the subpixel 23*a*, three subpixels 23*b* and three subpixels 23*c* are alternately provided so as to surround the subpixel 23*a*.

Figure 55G:
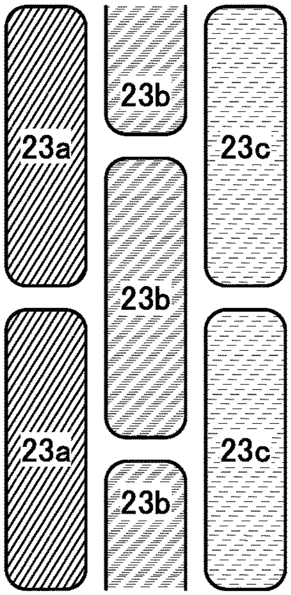

FIG. 55G illustrates an example in which subpixels of different colors are arranged in a zigzag manner. Specifically, the positions of the top sides of two subpixels arranged in the column direction (e.g., the subpixel 23*a* and the subpixel 23*b* or the subpixel 23*b* and the subpixel 23*c*) are not aligned in the top view.

For example, in each pixel in FIGS. 55A to 55G, it is preferable that the subpixel 23*a* be a subpixel R emitting red light, the subpixel 23*b* be a subpixel G emitting green light, and the subpixel 23*c* be a subpixel B emitting blue light. Note that the structures of the subpixels are not limited to this, and the colors and arrangement order of the subpixels can be determined as appropriate. For example, the subpixel 23*b* may be the subpixel R emitting red light and the subpixel 23*a* may be the subpixel G emitting green light.

In a photolithography method, as a pattern to be formed by processing becomes finer, the influence of light diffraction becomes more difficult to ignore; therefore, the fidelity in transferring a photomask pattern by light exposure is degraded, and it becomes difficult to process a resist mask into a desired shape. Thus, a pattern with rounded corners is likely to be formed even with a rectangular photomask pattern. Consequently, the planar shape of a subpixel may be a polygonal shape with rounded corners, an elliptical shape, a circular shape, or the like.

To obtain a desired planar shape of the subpixel, a technique of correcting a mask pattern in advance so that a transferred pattern agrees with a design pattern (an optical proximity correction (OPC) technique) may be used. Specifically, with the OPC technique, a pattern for correction is added to a corner portion or the like of a figure on a mask pattern.

As illustrated in FIGS. 56A to 56I, the pixel can include four types of subpixels.

Figure 56A:
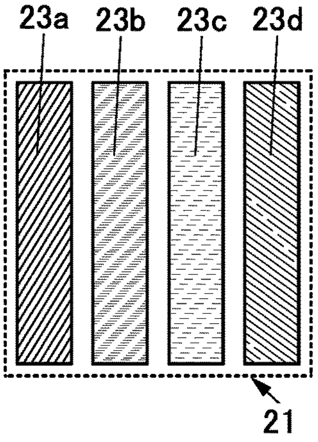
FIGS. 56A to 56K are plan views illustrating structure examples of a pixel.
Figure 56B:
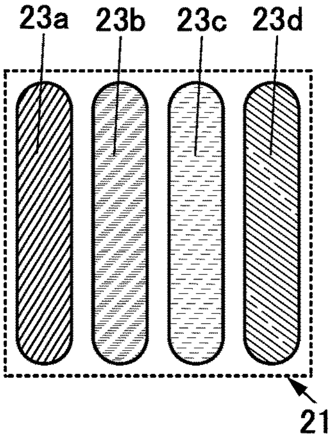
Figure 56C:
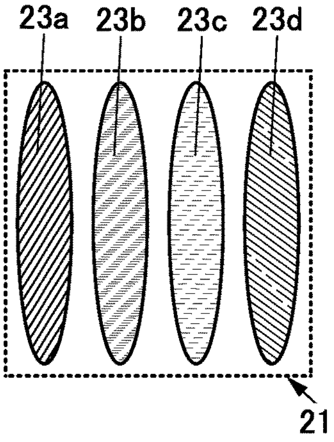

The pixel 21 illustrated in FIGS. 56A to 56C employs stripe arrangement.

FIG. 56A illustrates an example in which each subpixel has a rectangular planar shape, FIG. 56B illustrates an example in which each subpixel has a planar shape formed by combining two half circles and a rectangle, and FIG. 56C illustrates an example in which each subpixel has an elliptical planar shape.

Figure 56D:
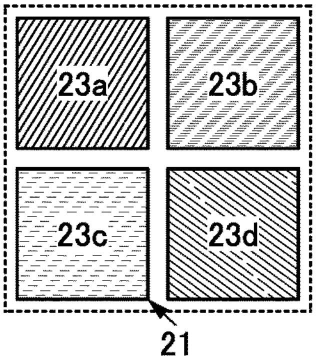
Figure 56E:
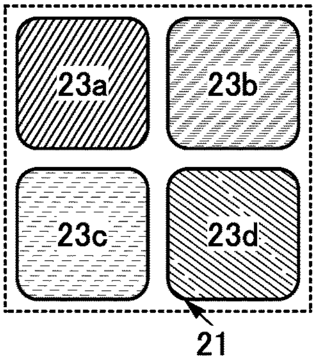
Figure 56F:
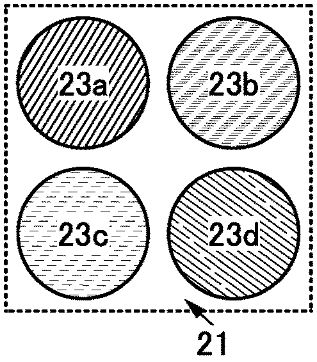

The pixel 21 illustrated in FIGS. 56D to 56F employs matrix arrangement.

FIG. 56D illustrates an example in which the top surface of each subpixel has a square shape, FIG. 56E illustrates an example in which the top surface of each subpixel has a rough square shape with rounded corners, and FIG. 56F illustrates an example in which the top surface of each subpixel has a circular shape.

Figure 56G:
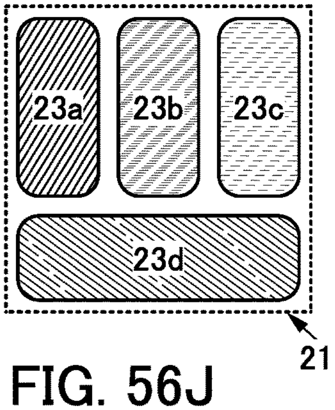
Figure 56H:
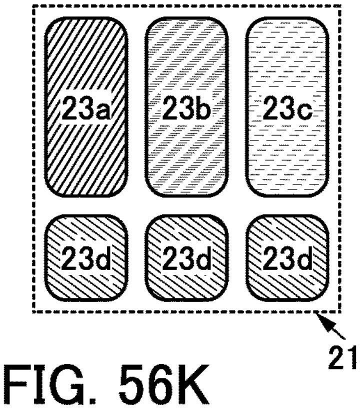

FIGS. 56G and 56H each illustrate an example in which one pixel 21 is composed of two rows and three columns.

The pixel 21 illustrated in FIG. 56G includes three subpixels (the subpixels 23*a*, 23*b*, and 23*c*) in the upper row (first row) and one subpixel (subpixel 23*d*) in the lower row (second row). In other words, the pixel 21 includes the subpixel 23*a* in the left column (first column), the subpixel 23*b* in the center column (second column), the subpixel 23*c* in the right column (third column), and the subpixel 23*d* across these three columns.

The pixel 21 illustrated in FIG. 56H includes three subpixels (the subpixels 23*a*, 23*b*, and 23*c*) in the upper row (first row) and three subpixels 23*d* in the lower row (second row). In other words, the pixel 21 includes the subpixel 23*a* and the subpixel 23*d* in the left column (first column), the subpixel 23*b* and another subpixel 23*d* in the center column (second column), and the subpixel 23*c* and another subpixel 23*d* in the right column (third column). Matching the positions of the subpixels in the upper row and the lower row as illustrated in FIG. 56H enables dust and the like that would be produced in the manufacturing process to be removed efficiently. Thus, a display device having high display quality can be provided.

Figure 56I:
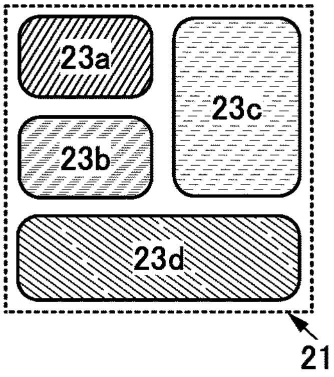

FIG. 56I illustrates an example in which one pixel 21 is composed of three rows and two columns.

The pixel 21 illustrated in FIG. 56I includes the subpixel 23*a* in the upper row (first row), the subpixel 23*b* in the center row (second row), the subpixel 23*c* across the first and second rows, and one subpixel (the subpixel 23*d*) in the lower row (third row). In other words, the pixel 21 includes the subpixels 23*a* and 23*b* in the left column (first column), the subpixel 23*c* in the right column (second column), and the subpixel 23*d* across these two columns.

The pixel 21 illustrated in FIGS. 56A to 56I includes four types of subpixels 23*a*, 23*b*, 23*c*, and 23*d*.

The subpixels 23*a*, 23*b*, 23*c*, and 23*d* include light-emitting elements that emit light of different colors. The subpixels 23*a*, 23*b*, 23*c*, and 23*d* can be of four colors of R, G, B, and white (W), of four colors of R, G, B, and Y, or of R, G, B and infrared (IR) light, for example.

In the pixel 21 illustrated in FIGS. 56A to 56I, it is preferable that the subpixel 23*a* be the subpixel R emitting red light, the subpixel 23*b* be the subpixel G emitting green light, the subpixel 23*c* be the subpixel B emitting blue light, and the subpixel 23*d* be any of a subpixel W emitting white light, a subpixel Y emitting yellow light, and a subpixel IR emitting near-infrared light, for example. In the case of such a structure, stripe arrangement is employed as the layout of R, G, and B in the pixel 21 illustrated in FIGS. 56G and 56H, leading to an increase in the display quality. In the pixel 21 illustrated in FIG. 56I, what is called S stripe arrangement is employed as the layout of R, G, and B, leading to higher display quality.

The pixel 21 may include a subpixel including a light-receiving element.

In the pixel 21 illustrated in FIGS. 56A to 56I, any one of the subpixels 23*a* to 23*d* may be a subpixel including a light-receiving element.

In the pixel 21 illustrated in FIGS. 56A to 56I, for example, it is preferable that the subpixel 23*a* be the subpixel R emitting red light, the subpixel 23*b* be the subpixel G emitting green light, the subpixel 23*c* be the subpixel B emitting blue light, and the subpixel 23*d* be a subpixel S including a light-receiving element. In the case of such a structure, stripe arrangement is employed as the layout of R, G, and B in the pixel 21 illustrated in FIGS. 56G and 56H, leading to higher display quality. In addition, what is called S stripe arrangement is employed as the layout of R, G, and B in the pixel 21 illustrated in FIG. 56I, leading to higher display quality.

There is no particular limitation on the wavelength of light sensed by the subpixel S including a light-receiving element. The subpixel S can have a structure in which one or both of infrared light and visible light can be sensed.

Figure 56J:
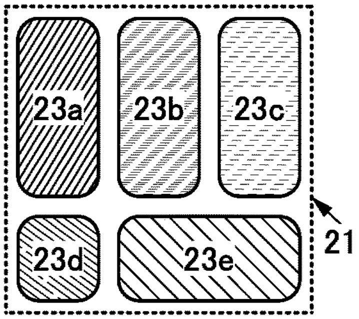
Figure 56K:
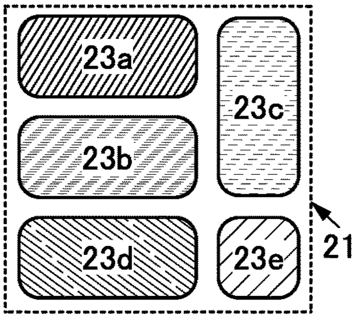

As illustrated in FIGS. 56J and 56K, the pixel can include five types of subpixels.

FIG. 56J illustrates an example in which one pixel 21 is composed of two rows and three columns.

The pixel 21 illustrated in FIG. 56J includes three subpixels (the subpixels 23*a*, 23*b*, and 23*c*) in the upper row (first row) and two subpixels (the subpixel 23*d* and a subpixel 23*e*) in the lower row (second row). In other words, the pixel 21 includes the subpixels 23*a* and 23*d* in the left column (first column), the subpixel 23*b* in the center column (second column), the subpixel 23*c* in the right column (third column), and the subpixel 23*e* across the second and third columns.

FIG. 56K illustrates an example in which one pixel 21 is composed of three rows and two columns.

The pixel 21 illustrated in FIG. 56K includes the subpixel 23*a* in the upper row (first row), the subpixel 23*b* in the center row (second row), the subpixel 23*c* across the first and second rows, and two subpixels (the subpixels 23*d* and 23*e*) in the lower row (third row). In other words, the pixel 21 includes the subpixels 23*a*, 23*b*, and 23*d* in the left column (first column), and the subpixels 23*c* and 23*e* in the right column (second column).

In the pixel 21 illustrated in FIGS. 56J and 56K, for example, it is preferable that the subpixel 23*a* be the subpixel R emitting red light, the subpixel 23*b* be the subpixel G emitting green light, and the subpixel 23*c* be the subpixel B emitting blue light. In the case of such a structure, stripe arrangement is employed as the layout of R, G, and B in the pixel 21 illustrated in FIGS. 56J, leading to higher display quality. In addition, what is called S stripe arrangement is employed as the layout of R, G, and B in the pixel 21 illustrated in FIG. 56K, leading to higher display quality.

In the pixel 21 illustrated in FIGS. 56J and 56K, for example, it is preferable to use the subpixel S including a light-receiving element as at least one of the subpixels 23*d* and 23*e*. In the case where light-receiving elements are used in both the subpixels 23*d* and 23*e*, the light-receiving elements may have different structures. For example, the wavelength ranges of sensed light may be different at least partly. Specifically, one of the subpixels 23*d* and 23*e* may include a light-receiving element mainly sensing visible light and the other may include a light-receiving element mainly sensing infrared light.

In the pixel 21 illustrated in FIGS. 56J and 56K, for example, it is preferable that the subpixel S including a light-receiving element be used as one of the subpixels 23*d* and 23*e* and a subpixel including a light-receiving element that can be used as a light source be used as the other. For example, it is preferable that one of the subpixels 23*d* and 23*e* be the subpixel IR emitting infrared light and the other be the subpixel S including a light-receiving element sensing infrared light.

In the pixel including the subpixels R, G, B, IR, and S, while displaying an image using the subpixels R, G, and B, the subpixel S can sense reflected light of infrared light emitted from the subpixel IR that is used as a light source.

As described above, the pixel composed of the subpixels each including the light-emitting element can employ any of a variety of layouts in the display device of one embodiment of the present invention. The display device of one embodiment of the present invention can have a structure in which the pixel includes both a light-emitting element and a light-receiving element. In this case, any of a variety of layouts can be employed.

A plurality of structure examples described in this embodiment can be combined as appropriate. This embodiment can be combined with any of the other embodiments as appropriate.

Embodiment 3

In this embodiment, a display device of one embodiment of the present invention is described.

The display device in this embodiment can be a high-definition display device. Accordingly, the display device in this embodiment can be used for display portions of information terminals (wearable devices) such as watch-type and bracelet-type information terminals and display portions of wearable devices capable of being worn on the head, such as a VR device like a head-mounted display (HMD) and a glasses-type AR device.

[Display Device 10A]

Figure 57:
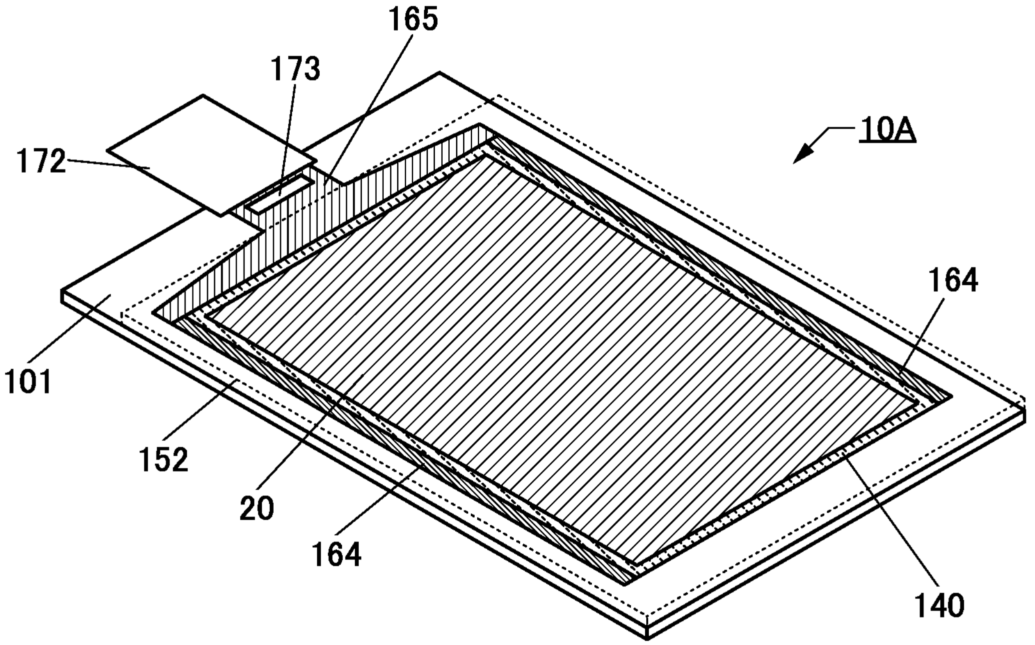
FIG. 57 is a perspective view illustrating a structure example of a display device.
Figure 58:
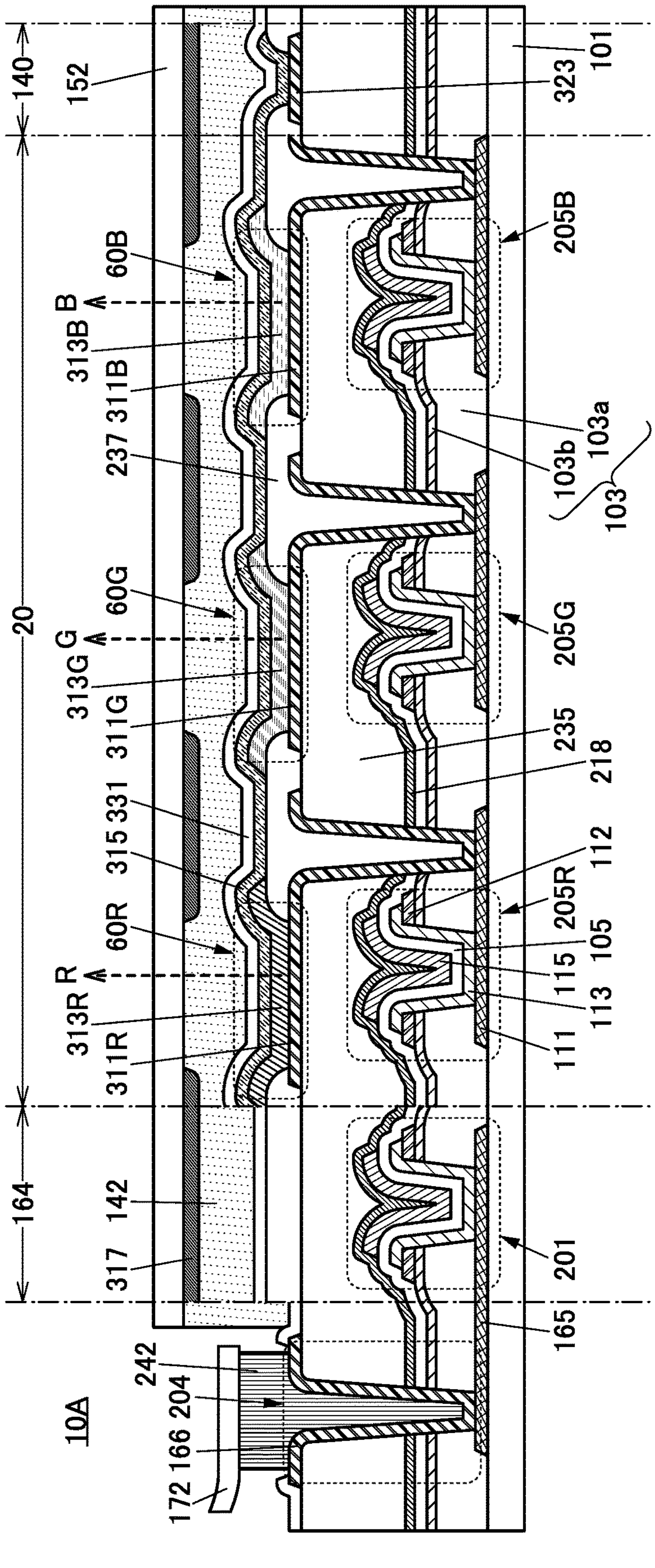
FIG. 58 is a cross-sectional view illustrating a structure example of a display device.

FIG. 57 is a perspective view illustrating a structure example of a display device 10A and FIG. 58 is a cross-sectional view illustrating a structure example of the display device 10A. The structure of the display device 10 described in Embodiment 1 is applicable to the display device 10A.

In the display device 10A, the substrate 152 and the substrate 101 are attached to each other. In FIG. 57, the substrate 152 is denoted by a dashed line.

The display device 10A includes the display portion 20, a connection portion 140, circuits 164, a wiring 165, and the like. FIG. 57 illustrates an example in which an IC 173 and an FPC 172 are mounted on the display device 10A. Thus, the structure illustrated in FIG. 57 can be regarded as a display module including the display device 10A, the IC (integrated circuit), and the FPC.

In this specification and the like, a display device in which a substrate is equipped with a connector such as an FPC or mounted with an IC is referred to as a display module.

The connection portion 140 is provided outside the display portion 20. The connection portion 140 can be provided along one side or a plurality of sides of the display portion 20. The number of connection portions 140 may be one or more. FIG. 57 illustrates an example in which the connection portion 140 is provided to surround the four sides of the display portion. The common electrode of the light-emitting element is electrically connected to a conductive layer in the connection portion 140, and thus potential can be supplied to the common electrode through the conductive layer.

The circuit 164 can include at least one of the scan line driver circuit 11, the signal line driver circuit 13, and the power supply circuit 15 illustrated in FIG. 1A in Embodiment 1.

The wiring 165 has a function of supplying a signal and power to the display portion 20 and the circuit 164. The signal and power are input to the wiring 165 from the outside through the FPC 172 or from the IC 173.

FIG. 57 illustrates an example in which the IC 173 is provided over the substrate 101 by a chip on glass (COG) method, a chip on film (COF) method, or the like. The IC 173 can include at least one of the scan line driver circuit 11, the signal line driver circuit 13, and the power supply circuit 15 illustrated in FIG. 1A in Embodiment 1. Note that the display device 10A and the display module are not necessarily provided with an IC. The IC may be mounted on the FPC by a COF method or the like.

FIG. 58 illustrates an example of cross sections of part of a region including the FPC 172, part of the circuit 164, part of the display portion 20, part of the connection portion 140, and part of a region including an end portion of the display device 10A.

The display device 10A illustrated in FIG. 58 includes a transistor 201, a transistor 205R, a transistor 205G, a transistor 205B, a light-emitting element 60R, a light-emitting element 60G, a light-emitting element 60B, and the like between the substrates 101 and 152. Here, the light-emitting element 60R includes a pixel electrode 311R and a layer 313R. The light-emitting element 60G includes a pixel electrode 311G and a layer 313G. The light-emitting element 60B includes a pixel electrode 311B and a layer 313B. The common electrode 315 is provided over the layers 313R, 313G, and 313B. The common electrode 315 is shared by the light-emitting elements 60R, 60G, and 60B. In the example in FIG. 58, the conductive layer 111 of the transistor 205R is electrically connected to the pixel electrode 311R, the conductive layer 111 of the transistor 205G is electrically connected to the pixel electrode 311G, and the conductive layer 111 of the transistor 205B is electrically connected to the pixel electrode 311B.

In this specification and the like, matters common to the transistors 205R, 205G, and 205B are sometimes described using the term "transistor 205" without any letter of the alphabet distinguishing these transistors. In the description of matters common to other components that are distinguished using letters of the alphabet, reference numerals without the letters of the alphabet are sometimes used.

The insulating layer 237 is provided to cover upper end portions of the pixel electrodes 311R, 311G, and 311B. In each of the pixel electrodes 311R, 311G, and 3111B, a depression portion is formed to cover the opening in the insulating layers 103, 105, 218, and 235. The insulating layer 237 is embedded in the depression portion.

Although FIG. 58 illustrates a plurality of cross sections of the insulating layer 237, the insulating layer 237 is one continuous layer when the display device 10A is seen from above. In other words, the display device 10A can have a structure including one insulating layer 237. Note that the display device 10A may include a plurality of insulating layers 237 that are separated from each other.

The layers 313R, 313G, and 313B each include at least a light-emitting layer. For example, the layer 313R, the layer 313G, and the layer 313B respectively include a light-emitting layer that emits red light, a light-emitting layer that emits green light, and a light-emitting layer that emits blue light. In other words, the layer 313R, the layer 313G, and the layer 313B respectively include a light-emitting substance that emits red light, a light-emitting substance that emits green light, and a light-emitting substance that emits blue light. Accordingly, the light-emitting element 60R can emit red light, the light-emitting element 60G can emit green light, and the light-emitting element 60B can emit blue light.

The layers 313R, 313G, and 313B may each include one or more of a hole-injection layer, a hole-transport layer, a hole-blocking layer, a charge-generation layer, an electron-blocking layer, an electron-transport layer, and an electron-injection layer.

For example, the layers 313R, 313G, and 313B may each include a hole-injection layer, a hole-transport layer, a light-emitting layer, an electron-transport layer, and an electron-injection layer in this order. In addition, an electron-blocking layer may be provided between the hole-transport layer and the light-emitting layer. In addition, a hole-blocking layer may be provided between the electron-transport layer and the light-emitting layer.

The layers 313R, 313G, and 313B may each include an electron-injection layer, an electron-transport layer, a light-emitting layer, a hole-transport layer, and a hole-injection layer in this order, for example. In addition, a hole-blocking layer may be provided between the electron-transport layer and the light-emitting layer. In addition, an electron-blocking layer may be provided between the hole-transport layer and the light-emitting layer.

The light-emitting elements 60R, 60G, and 60B may have either a single structure (a structure including only one light-emitting unit) or a tandem structure (a structure including a plurality of light-emitting units). The light-emitting unit includes at least one light-emitting layer.

In the case where the light-emitting elements 60R, 60G, and 60B have a tandem structure, preferably, the layer 313R includes a plurality of light-emitting units that emit red light, the layer 313G includes a plurality of light-emitting units that emit green light, and the layer 313B includes a plurality of light-emitting units that emit blue light. A charge-generation layer is preferably provided between the light-emitting units. In the case where the light-emitting elements 60R, 60G, and 60B have a tandem structure, the layers 313R, 313G, and 313B can each include a first light-emitting unit, a charge-generation layer over the first light-emitting unit, and a second light-emitting unit over the charge-generation layer, for example.

The layers 313R, 313G, and 313B can be formed by a vacuum evaporation method using a fine metal mask, for example. In the vacuum evaporation method using a fine metal mask, the layers 313R, 313G, and 313B are deposited in an area wider than an opening of the fine metal mask in many cases. Thus, the layers 313R, 313G, and 313B can be formed in an area wider than an opening of the fine metal mask. The end portions of the layers 313R, 313G, and 313B each have a tapered shape. Here, the layers 313R, 313G, and 313B may be formed over the insulating layer 237. Note that a sputtering method using a fine metal mask or an inkjet method may be used to form the layers 313R, 313G, and 313B. Preferably, none of the layers 313R, 313G, and 313B are provided over a conductive layer 323.

The protective layer 331 is provided over the light-emitting elements 60R, 60G, and 60B. The protective layer 331 and the substrate 152 are bonded to each other with the adhesive layer 142. The substrate 152 is provided with the light-blocking layer 317. A solid sealing structure, a hollow sealing structure, or the like can be employed to seal the light-emitting elements. In FIG. 58, a solid sealing structure is employed, in which a space between the substrate 152 and the substrate 101 is filled with the adhesive layer 142. Alternatively, a hollow sealing structure may be employed, in which the space is filled with an inert gas (e.g., nitrogen or argon). In this case, the adhesive layer 142 may be provided not to overlap with the light-emitting elements. Alternatively, the space may be filled with a resin other than the frame-like adhesive layer 142.

The protective layer 331 is provided at least in the display portion 20, and preferably provided to cover the entire display portion 20. The protective layer 331 is preferably provided to cover not only the display portion 20 but also the connection portion 140 and the circuit 164. It is further preferable that the protective layer 331 be provided to extend to the end portion of the display device 10A.

A connection portion 204 is provided in a region of the substrate 101 not overlapping with the substrate 152. In the connection portion 204, the wiring 165 is electrically connected to the FPC 172 through the conductive layer 166 and a connection layer 242. The conductive layer 166 can be formed in the same step as the pixel electrodes 311R, 311G, and 311B. On the top surface of the connection portion 204, the conductive layer 166 is exposed. Thus, the connection portion 204 and the FPC 172 can be electrically connected to each other through the connection layer 242.

The conductive layer 323 is provided over the insulating layer 235 in the connection portion 140. End portions of the conductive layer 323 are covered with the insulating layer 237. The common electrode 315 is provided over the conductive layer 323; for example, the connection portion 140 includes a region where the conductive layer 323 is in contact with the common electrode 315. With such a structure, the common electrode 315 is electrically connected to the conductive layer 323 provided in the connection portion 140. As the conductive layer 323, a conductive layer formed using the same material and the same step as the pixel electrodes 311R, 311G, and 311B is preferably used.

The display device 10A is atop-emission display device. Light from the light-emitting element is emitted toward the substrate 152. For the substrate 152, a material having a good property of transmitting visible light is preferably used. By contrast, there is no limitation on the light-transmitting property of a material used for the substrate 101.

A material having a good property of transmitting visible light is used for the common electrode 315. A material that reflects visible light is preferably used for the pixel electrodes 311R, 311G, and 311B.

The transistor 201 and the transistor 205 are both formed over the substrate 101. These transistors can be fabricated using the same materials in the same step. A structure similar to that of the transistor 50 described in Embodiment 1 can be suitably employed for the transistors 201 and 205. The transistor 201 provided in the circuit 164 can be used as, for example, each of the transistors 51 and 52 illustrated in FIGS. 1C to 1E in Embodiment 1.

The transistors included in the circuit 164 and the transistors included in the display portion 20 may have the same structure or different structures. A plurality of transistors included in the circuit 164 may have the same structure or two or more kinds of structures. Similarly, one structure or two or more kinds of structures may be employed for a plurality of transistors included in the display portion 20.

All of the transistors included in the display portion 20 may be OS transistors or Si transistors. Alternatively, some of the transistors included in the display portion 20 may be OS transistors and the others may be Si transistors.

For example, when both an LTPS transistor and an OS transistor are used in the display portion 20, the display device can have low power consumption and high drive capability. Note that a structure in which the LTPS transistor and the OS transistor are combined is referred to as LTPO in some cases. Note that a structure is further preferable in which the OS transistor is used as a transistor functioning as a switch for controlling electrical continuity and discontinuity between wirings and the LTPS transistor is used as a transistor for controlling current.

For example, one transistor included in the display portion 20 can function as a transistor for controlling current flowing through the light-emitting element and be referred to as a driving transistor. One of a source and a drain of the driving transistor is electrically connected to the pixel electrode of the light-emitting element. An LTPS transistor is preferably used as the driving transistor. Accordingly, the amount of current flowing through the light-emitting element can be increased in the pixel circuit.

By contrast, another transistor included in the display portion 20 functions as a switch for controlling selection or non-selection of a pixel and can also be referred to as a selection transistor. A gate of the selection transistor is electrically connected to a gate line, and one of a source and a drain thereof is electrically connected to a signal line. An OS transistor is preferably used as the selection transistor. Accordingly, the gray level of the pixel can be maintained even with an extremely low frame frequency (e.g., 1 fps or lower); thus, power consumption can be reduced by stopping the driver in displaying a still image.

The light-blocking layer 317 is preferably provided on the surface of the substrate 152 on the substrate 101 side. The light-blocking layer 317 can be provided between adjacent light-emitting elements, in the connection portion 140, in the circuit 164, and the like. A variety of optical members can be arranged on the outer surface of the substrate 152.

As the connection layer 242, for example, an anisotropic conductive film (ACF) or an anisotropic conductive paste (ACP) can be used.

[Modification Example of Display Device 10A]

Figure 59:
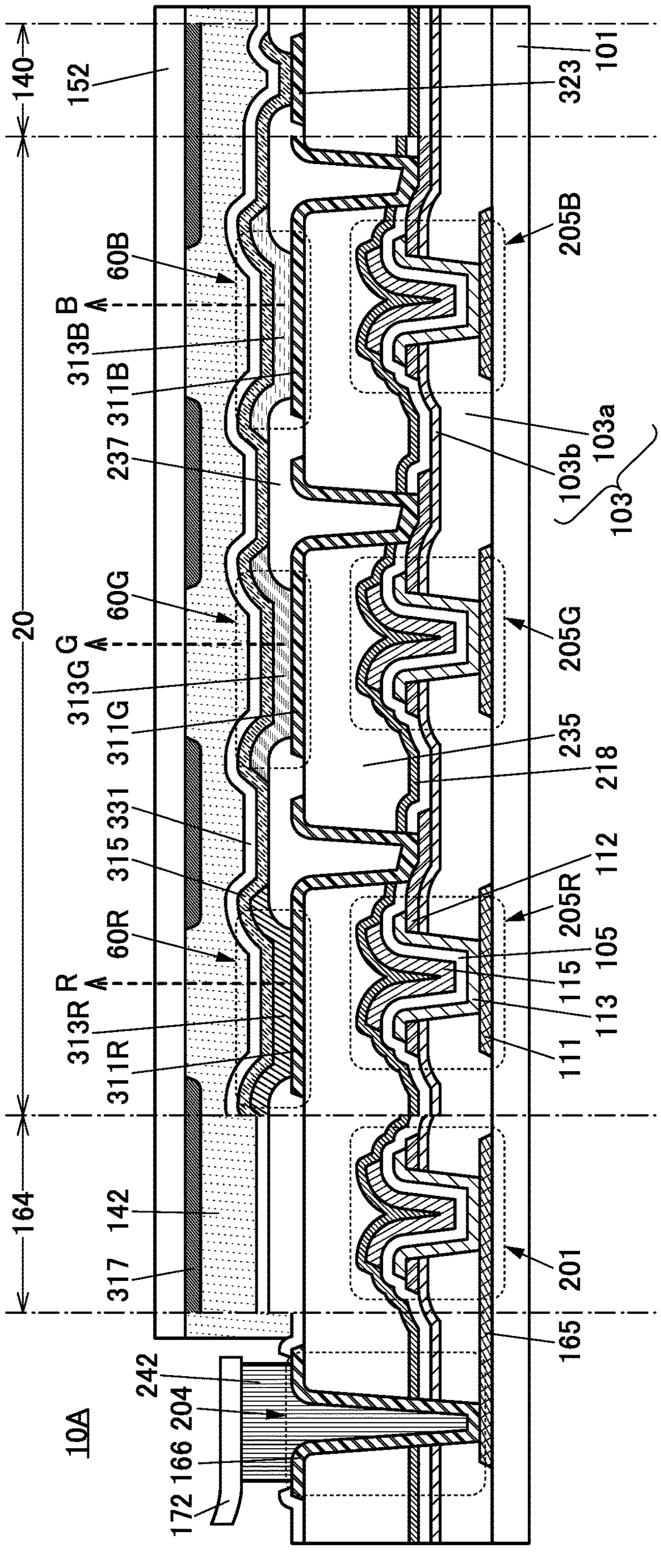
FIG. 59 is a cross-sectional view illustrating a structure example of a display device.

FIG. 59 illustrates a modification example of the display device in FIG. 58. In the example in FIG. 59, the pixel electrode 311 is electrically connected to the conductive layer 112 of the transistor 205 instead of the conductive layer 111.

In the display device 10A illustrated in FIG. 59, the conductive layer 112 of the transistor 205R is electrically connected to the pixel electrode 311R, the conductive layer 112 of the transistor 205G is electrically connected to the pixel electrode 311G, and the conductive layer 112 of the transistor 205B is electrically connected to the pixel electrode 311B.

[Display Device 10B]

Figures 60A, 60B, 60C:
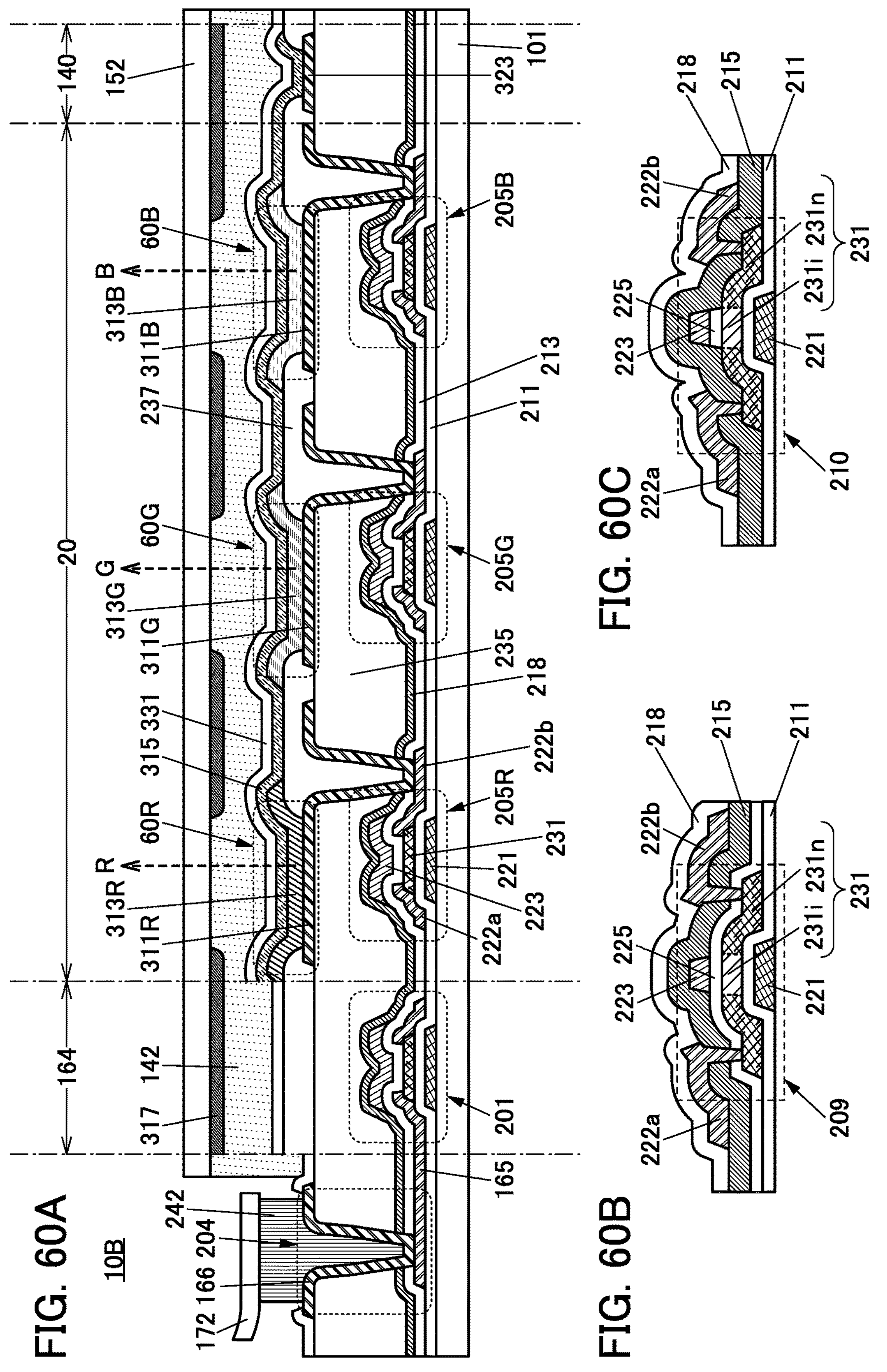
FIG. 60A is a cross-sectional view illustrating a structure example of a display device and FIGS. 60B and 60C are cross-sectional views illustrating structure examples of transistors.

FIG. 60A is a cross-sectional view illustrating a structure example of a display device 10B. The display device 10B is a modification example of the display device 10A and is different from the display device 10A in the structures of the transistors 201, 205R, 205G, and 205B, for example.

Each of the transistors 201 and 205 included in the display device 10B includes a conductive layer 221 functioning as a gate, an insulating layer 211 functioning as a first gate insulating layer, a conductive layer 222*a* and a conductive layer 222*b* functioning as a source and a drain, a semiconductor layer 231, an insulating layer 213 functioning as a second gate insulating layer, and a conductive layer 223 functioning as a gate. Here, a plurality of layers obtained by processing one conductive film are shown with the same hatching pattern. The insulating layer 211 is positioned between the conductive layer 221 and the semiconductor layer 231. The insulating layer 213 is positioned between the conductive layer 223 and the semiconductor layer 231. In the example in FIG. 60A, the conductive layer 222*b* of the transistor 205R is electrically connected to the pixel electrode 311R, the conductive layer 222*b* of the transistor 205G is electrically connected to the pixel electrode 311G, and the conductive layer 222*b* of the transistor 205B is electrically connected to the pixel electrode 311B.

For the conductive layer 221, a material similar to the material that can be used for the conductive layer 111 can be used, for example. For the conductive layers 222*a* and 222*b*, a material similar to the material that can be used for the conductive layer 112 can be used. For the conductive layer 223, a material similar to the material that can be used for the conductive layer 115 can be used. For the insulating layers 211 and 213, a material similar to the material that can be used for the insulating layer 103*a* or a material similar to the material that can be used for the insulating layer 103*b* can be used.

For the semiconductor layer 231, a material similar to the material that can be used for the semiconductor layer 113 can be used. Here, the transistors 201 and 205 can have improved field-effect mobility by including LTPS in the semiconductor layers 231, for example. Thus, the display device 10B can be driven at high speed.

There is no particular limitation on the structure of the transistors included in the display device of this embodiment. For example, a planar transistor, a staggered transistor, or an inverted staggered transistor can be used. A top-gate transistor or a bottom-gate transistor can be used. Alternatively, gates may be provided above and below a semiconductor layer where a channel is formed.

The structure in which the semiconductor layer where a channel is formed is provided between two gates is used for the transistors 201 and 205. The two gates may be connected to each other and supplied with the same signal to operate the transistor. Alternatively, the threshold voltage of the transistor may be controlled by applying potential for controlling the threshold voltage to one of the two gates and a potential for driving to the other of the two gates.

The transistor 201 illustrated in FIG. 60A can be used as the transistor included in the signal line driver circuit 13 illustrated in FIG. 1 in Embodiment 1, for example. The transistor 201 illustrated in FIG. 60A can be used as the transistor included in the scan line driver circuit 11 illustrated in FIG. 1 in Embodiment 1, for example. The transistor 201 illustrated in FIG. 60A can be used as the transistor included in the power supply circuit 15 illustrated in FIG. 1 in Embodiment 1, for example.

FIGS. 60B and 60C illustrate other structure examples of transistors.

Transistors 209 and 210 each include the conductive layer 221 functioning as a gate, the insulating layer 211 functioning as a first gate insulating layer, the semiconductor layer 231 including a channel formation region 231*i* and a pair of low-resistance regions 231*n*, the conductive layer 222*a* electrically connected to one of the pair of low-resistance regions 231*n*, the conductive layer 222*b* electrically connected to the other of the pair of low-resistance regions 231*n*, an insulating layer 225 functioning as a second gate insulating layer, the conductive layer 223 functioning as a gate, and an insulating layer 215 covering the conductive layer 223. The insulating layer 211 is positioned between the conductive layer 221 and the channel formation region 231*i*. The insulating layer 225 is positioned at least between the conductive layer 223 and the channel formation region 231*i*. Furthermore, the insulating layer 218 covering the transistor may be provided.

FIG. 60B illustrates an example of the transistor 209 in which the insulating layer 225 covers top and side surfaces of the semiconductor layer 231. The conductive layer 222*a* and the conductive layer 222*b* are electrically connected to the corresponding low-resistance regions 231*n* through openings provided in the insulating layer 225 and the insulating layer 215. One of the conductive layers 222*a* and 222*b* functions as a source, and the other functions as a drain.

In the transistor 210 illustrated in FIG. 60C, the insulating layer 225 overlaps with the channel formation region 231*i* of the semiconductor layer 231 and does not overlap with the low-resistance regions 231*n*. The structure illustrated in FIG. 60C can be obtained by processing the insulating layer 225 with the conductive layer 223 as a mask, for example. In FIG. 60C, the insulating layer 215 is provided to cover the insulating layer 225 and the conductive layer 223, and the conductive layer 222*a* and the conductive layer 222*b* are electrically connected to the corresponding low-resistance regions 231*n* through openings in the insulating layer 215.

[Display Device 10C]

Figure 61:
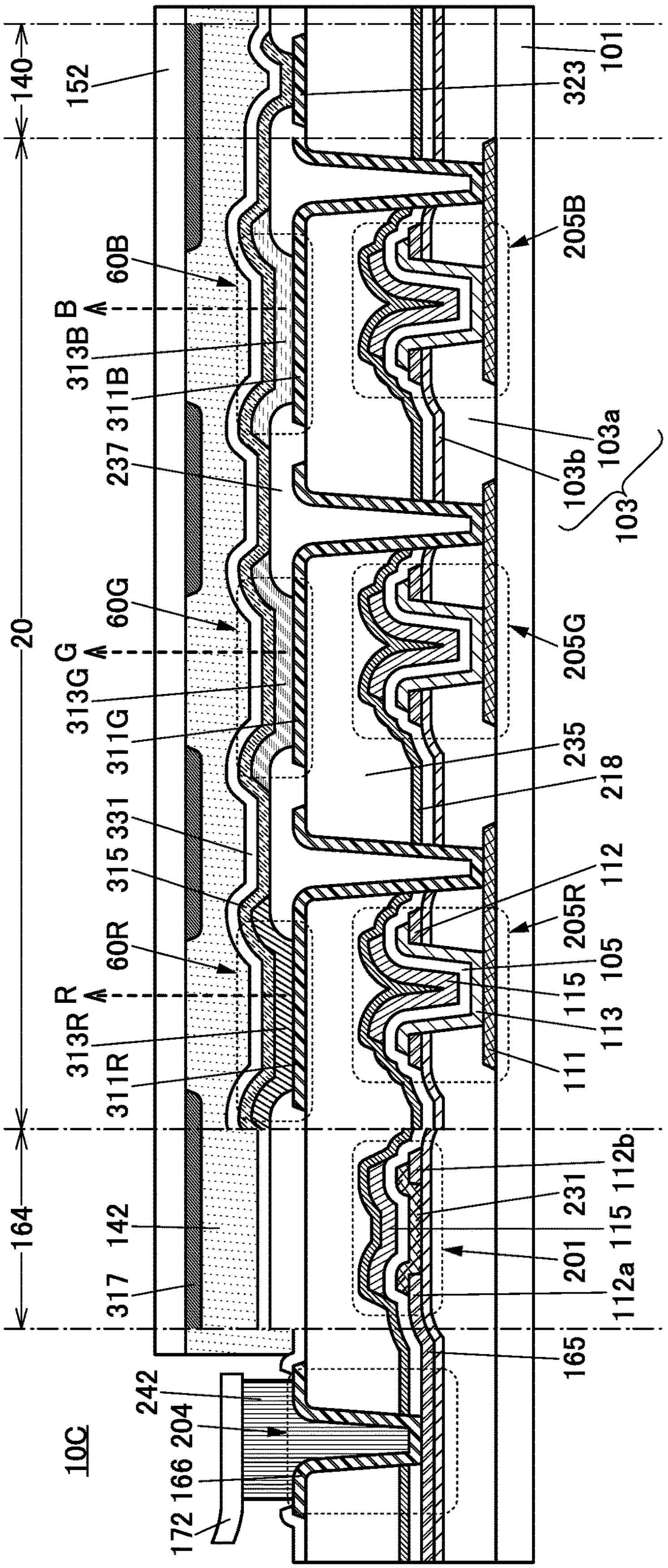
FIG. 61 is a cross-sectional view illustrating a structure example of a display device.

FIG. 61 is a cross-sectional view illustrating a structure example of a display device 10C. The display device 10C is a modification example of the display device 10A and is different from the display device 10A in the structure of the transistor 201, for example.

The transistor 201 included in the display device 10C includes the conductive layers 112*a* and 112*b* over the insulating layer 103, the semiconductor layer 231 over the conductive layers 112*a* and 112*b* and the insulating layer 103, the insulating layer 105 over the semiconductor layer 231 and the conductive layers 112*a* and 112*b*, and the conductive layer 115 over the insulating layer 105 including a region overlapping with the semiconductor layer 231.

The conductive layers 112*a* and 112*b* include the same material as the conductive layer 112 of the transistor 205 and can be formed in the same step as the conductive layer 112. The conductive layer 112*a* functions as one of the source electrode and the drain electrode of the transistor 201, and the conductive layer 112*b* functions as the other of the source electrode and the drain electrode of the transistor 201. In other words, the source electrode and the drain electrode of the transistor 201 having the structure illustrated in FIG. 61 can be formed in the same step.

For the semiconductor layer 231, silicon can be used; for example, LTPS can be used. The transistor 201 can have improved field-effect mobility by including LTPS in the semiconductor layer 231. Thus, the circuit 164 including the transistor 201 can be driven at high speed. Note that the semiconductor layer 231 may include the same material as the semiconductor layer 113; for example, the semiconductor layer 231 may include a metal oxide.

The transistor 201 illustrated in FIG. 61 can be used as the transistor included in the signal line driver circuit 13 illustrated in FIG. 1 in Embodiment 1, for example. The transistor 201 illustrated in FIG. 61 can be used as the transistor included in the scan line driver circuit 11 illustrated in FIG. 1 in Embodiment 1, for example. The transistor 201 illustrated in FIG. 61 can be used as the transistor included in the power supply circuit 15 illustrated in FIG. 1 in Embodiment 1, for example. Note that the transistor 201 illustrated in FIG. 61 may be used as each of the transistors 51 and 52 illustrated in FIGS. 1C to 1E in Embodiment 1.

In the display device 10C, the components included in the transistor 201 and the components included in the transistor 205 can be formed in the same step. Thus, the number of steps for manufacturing the display device can be smaller than that in the case where the components included in the transistor 201 and the components included in the transistor 205 are formed in different steps. Thus, the manufacturing method of the display device can be simplified. Note that when the semiconductor layer 231 includes the same material as the semiconductor layer 113, the semiconductor layer 231 and the semiconductor layer 113 can be formed in the same step.

The structure of the transistor 201 included in the display device 10C is applicable to the transistors 201 and 205 included in the display device 10B. In this case, the semiconductor layer of the transistor 201 and the semiconductor layer of the transistor 205 may be formed in different steps. Accordingly, the semiconductor layer of the transistor 201 and the semiconductor layer of the transistor 205 can include different materials.

[Display Device 10D]

Figure 62:
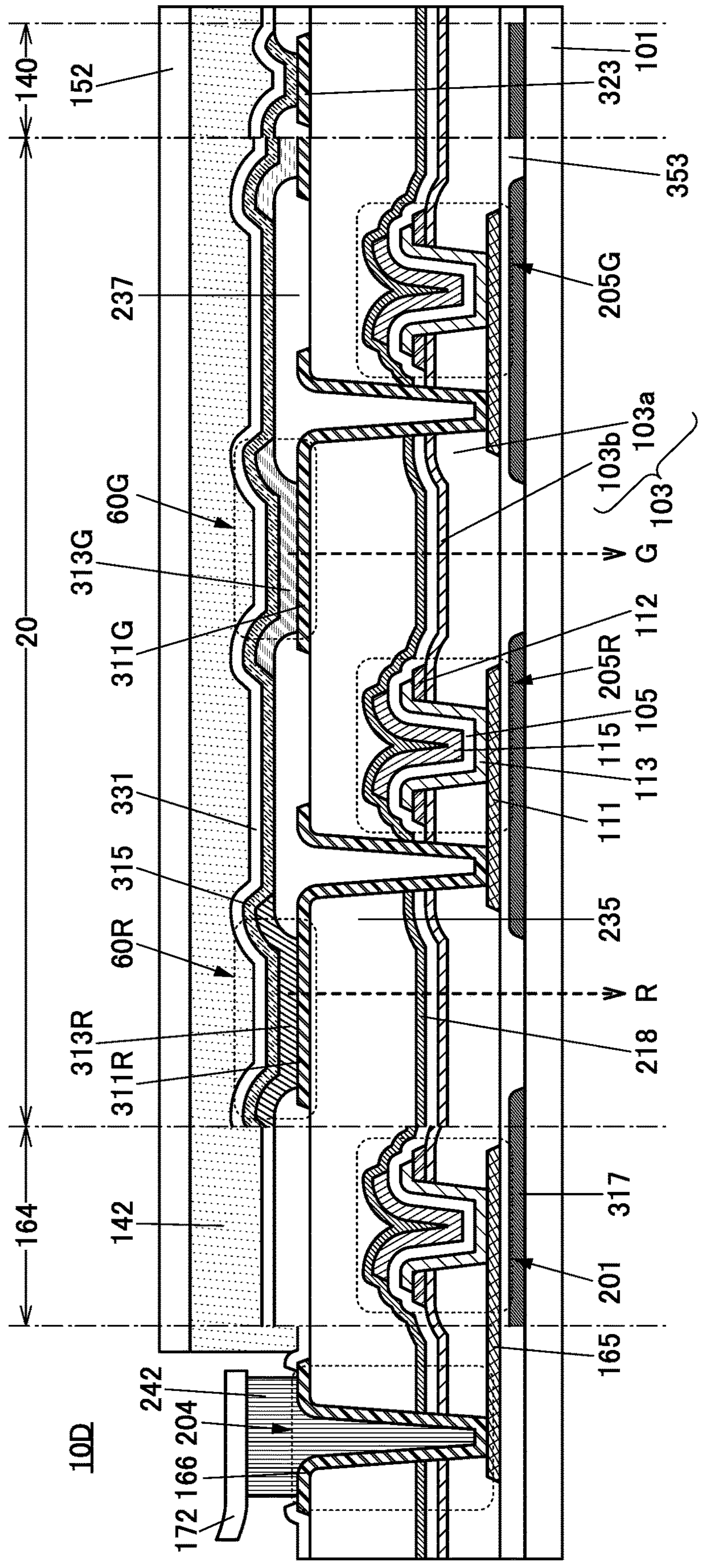
FIG. 62 is a cross-sectional view illustrating a structure example of a display device.

FIG. 62 is a cross-sectional view illustrating a structure example of a display device 10D. The display device 10D is a modification example of the display device 10A and is different from the display device 10A in having a bottom-emission structure, for example.

Light from the light-emitting element 60 in the display device 10D is emitted toward the substrate 101. For the substrate 101, a material having a good property of transmitting visible light is preferably used. By contrast, there is no limitation on the light-transmitting property of a material used for the substrate 152.

The light-blocking layer 317 is preferably formed between the substrate 101 and the transistor 201 and between the substrate 101 and the transistor 205. FIG. 62 illustrates an example in which the light-blocking layer 317 is provided over the substrate 101, an insulating layer 353 is provided over the light-blocking layer 317, and the transistors 201 and 205 and the like are provided over the insulating layer 353.

A material having a good property of transmitting visible light is used for each of the pixel electrodes 311R, 311G, and 311B. A material that reflects visible light is preferably used for the common electrode 315.

The structure of the display device 10D is also applicable to the display devices 10B and 10C. Specifically, the display devices 10B and 10C can have a bottom-emission structure. When a material having a good property of transmitting visible light is used for both the pixel electrode 311 and the common electrode 315, the display devices 10A to 10D can have a dual-emission structure. In the dual-emission display device 10, a material having a good property of transmitting visible light is preferably used for both the substrate 101 and the substrate 152.

[Display Device 10E]

Figure 63:
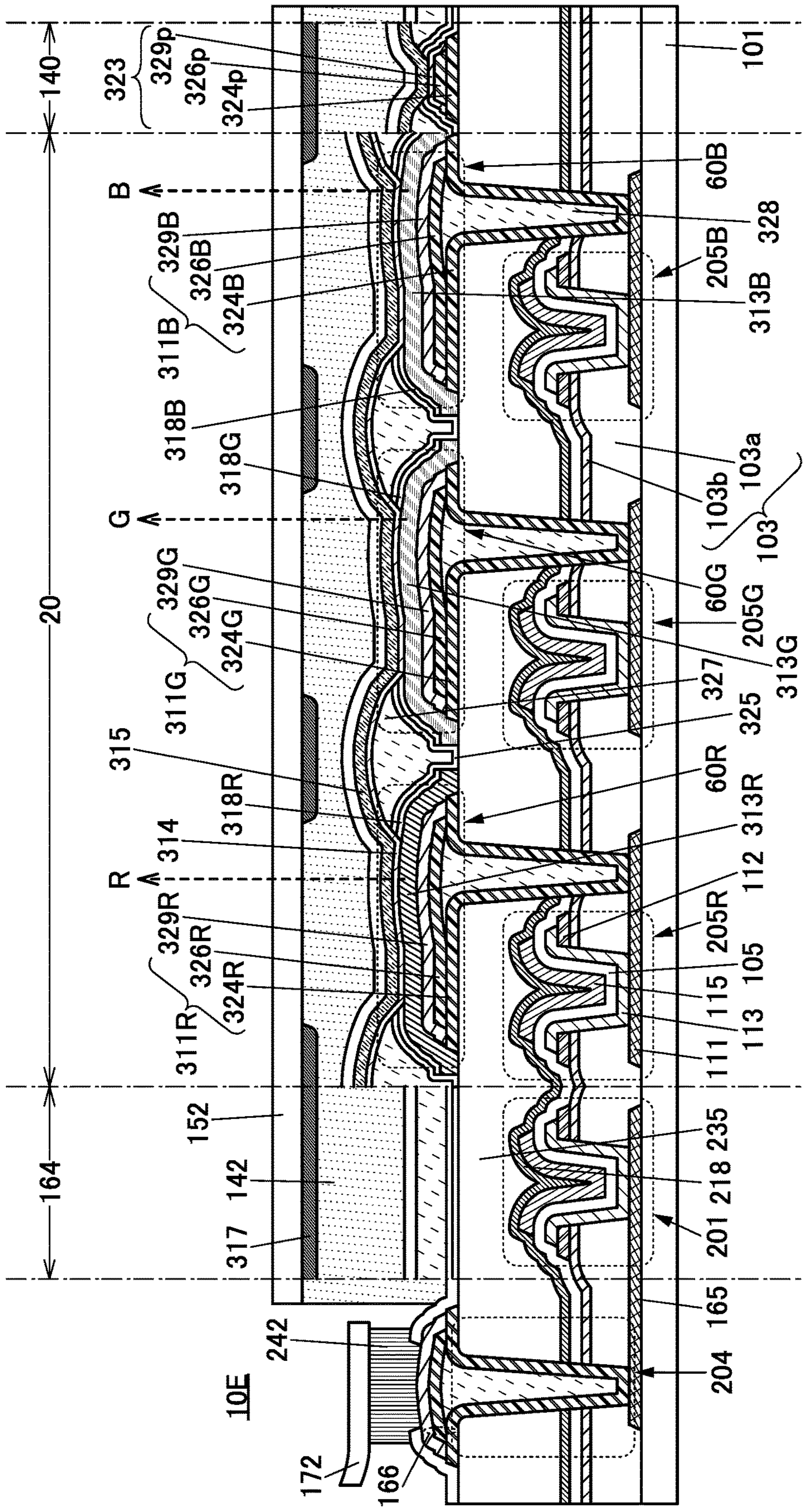
FIG. 63 is a cross-sectional view illustrating a structure example of a display device.

FIG. 63 is a cross-sectional view illustrating a structure example of a display device 10E. The display device 10E is a modification example of the display device 10A and is different from the display device 10A in the structures of the light-emitting elements 60R, 60G, and 60B, for example. In addition, the display device 10E is different from the display device 10A in that the insulating layer 237 is not included, the layer 313 covers the top and side surfaces of the pixel electrode 311, and the insulating layer 325, the insulating layer 327, and a common layer 314 are included.

The display device 10E is different from the display device 10A in that a layer 328 is included and the pixel electrodes 311R, 311G, and 311B and the conductive layer 323 have structures different from those in the display device 10A.

As illustrated in FIG. 63, the pixel electrode 311 included in the light-emitting element 60 has a stacked-layer structure including a conductive layer 324, a conductive layer 326 over the conductive layer 324, and a conductive layer 329 over the conductive layer 326. Here, the conductive layer 324, the conductive layer 326, and the conductive layer 329 included in the pixel electrode 311R are referred to as a conductive layer 324R, a conductive layer 326R, and a conductive layer 329R, respectively. The conductive layer 324, the conductive layer 326, and the conductive layer 329 included in the pixel electrode 311G are referred to as a conductive layer 324G, a conductive layer 326G, and a conductive layer 329G, respectively. The conductive layer 324, the conductive layer 326, and the conductive layer 329 included in the pixel electrode 311B are referred to as a conductive layer 324B, a conductive layer 326B, and a conductive layer 329B, respectively.

The conductive layer 324 is electrically connected to the conductive layer 111 included in the transistor 205 through an opening provided in the insulating layers 103, 105, 218, and 235.

An end portion of the conductive layer 326 is positioned inside an end portion of the conductive layer 324 and an end portion of the conductive layer 329. In other words, the end portion of the conductive layer 326 is positioned over the conductive layer 324 and top and side surfaces of the conductive layer 326 are covered with the conductive layer 329.

For the conductive layer 324, no particular limitations are imposed on the properties of transmitting and reflecting visible light. As the conductive layer 324, a conductive layer having a property of transmitting visible light or a conductive layer having a property of reflecting visible light can be used. As a conductive layer having a property of transmitting visible light, an oxide conductive layer can be used, for example. Specifically, In—Si—Sn oxide (ITSO) can be suitably used as the conductive layer 324. For a conductive layer having a property of reflecting visible light, metal such as aluminum, titanium, chromium, nickel, copper, yttrium, zirconium, silver, tin, zinc, platinum, gold, molybdenum, tantalum, or tungsten, or an alloy containing the metal as its main component (e.g., an alloy of silver, palladium, and copper (Ag—Pd—Cu (APC))) can be used, for example. The conductive layer 324 may have a stacked-layer structure of a conductive layer having a property of transmitting visible light and a conductive layer having a property of reflecting visible light having a property of transmitting visible light over the conductive layer. For the conductive layer 324, a material with high adhesion to the formation surface of the conductive layer 324 (here, the insulating layer 235) is preferably used. Accordingly, separation of the conductive layer 324 can be inhibited.

A conductive layer having a property of reflecting visible light can be used as the conductive layer 326. The conductive layer 326 may have a stacked-layer structure of a conductive layer having a property of transmitting visible light and a conductive layer having a property of reflecting visible light having a property of transmitting visible light over the conductive layer. For the conductive layer 326, a material that can be used for the conductive layer 324 can be used. Specifically, a stacked-layer structure of In—Si—Sn oxide (ITSO), an alloy of silver, palladium, and copper (APC) over the In—Si—Sn oxide (ITSO) can be suitably used as the conductive layer 326.

For the conductive layer 329, a material that can be used for the conductive layer 324 can be used. A conductive layer having a property of transmitting visible light can be used as the conductive layer 329. Specifically, In—Si—Sn oxide (ITSO) can be used for the conductive layer 329.

When a material that is easily oxidized is used for the conductive layer 326, a material that is not easily oxidized is used for the conductive layer 329 and the conductive layer 326 is covered with the conductive layer 329, whereby oxidation of the conductive layer 326 can be inhibited. In addition, precipitation of a metal component included in the conductive layer 326 can be inhibited. For example, when a material including silver is used for the conductive layer 326, In—Si—Sn oxide (ITSO) can be suitably used for the conductive layer 329. Thus, oxidation of the conductive layer 326 can be inhibited, and precipitation of silver can be inhibited.

The conductive layer 323 can have a stacked-layer structure of a conductive layer 324*p*, a conductive layer 326*p* over the conductive layer 324*p*, and a conductive layer 329*p* over the conductive layer 326*p*. The conductive layer 324*p* can be formed in the same step as the conductive layers 324R, 324G, and 324B. The conductive layer 326*p* can be formed in the same step as the conductive layers 326R, 326G, and 326B. The conductive layer 329*p* can be formed in the same step as the conductive layers 329R, 329G, and 329B.

FIG. 63 illustrates an example in which the thickness of the conductive layer 329*p* is different from those of the conductive layers 329R, 329G, and 329B. The thickness of the conductive layer 329*p* is different from those of the conductive layers 329R, 329G, and 329B depending on the resistivities of materials used for those layers. In the case of making the thickness of the conductive layer 329*p* different from those of the conductive layers 329R, 329G, and 329B, the conductive layer 329*p* may be formed in a step different from a step where the conductive layers 329R, 329G, and 329B are formed. Alternatively, some formation steps may be common between the conductive layer 329*p* and the conductive layers 329R, 329G, and 329B.

In each of the conductive layers 324R, 324G, and 324B, a depression portion is formed to cover the opening provided in the insulating layers 103, 105, 218, and 235. The layer 328 is embedded in the depression portion.

The layer 328 has a function of filling the depression portions of the conductive layers 324R, 324G, and 324B to obtain planarity. Over the conductive layers 324R, 324G, and 324B and the layer 328, the conductive layers 326R, 326G, and 326B that are respectively electrically connected to the conductive layers 324R, 324G, and 324B are provided. Thus, regions overlapping with the depression portions of the conductive layers 324R, 324G, and 324B can also serve as light-emitting regions, whereby the aperture ratio of the pixel can be increased.

The layer 328 may be an insulating layer or a conductive layer. Any of a variety of inorganic insulating materials, organic insulating materials, and conductive materials can be used for the layer 328 as appropriate. Specifically, the layer 328 is preferably formed using an insulating material, and the use of an organic insulating material is particularly preferable. For the layer 328, an organic insulating material that can be used for the insulating layer 327 can be used, for example.

When the layer 328 is a conductive layer, the layer 328 can serve as part of a pixel electrode.

The layer 328 included in the display device 10E can also be used for the display devices 10A to 10D. For example, instead of the insulating layer 237, the layer 328 can be embedded in at least part of the depression portions in the conductive layers 324R, 324G, and 324B.

FIG. 63 illustrates an example in which an end portion of the layer 313 is positioned outside an end portion of the pixel electrode 311. The layer 313 is formed to cover the end portion of the pixel electrode 311. Such a structure enables the entire top surface of the pixel electrode 311 to be a light-emitting region, and the aperture ratio can be increased as compared with the structure in which the end portion of the island-shaped layer 313 is positioned inside the end portion of the pixel electrode 311. Covering the side surface of the pixel electrode 311 with the layer 313 inhibits contact between the pixel electrode 311 and the common electrode 315, thereby inhibiting a short circuit of the light-emitting element 60.

The insulating layer 237 is not provided between the pixel electrode 311 and the layer 313. Thus, the distance between adjacent light-emitting elements 60 can be shortened. Accordingly, the display device 10E can have a high definition or a high resolution. In addition, a mask for forming the insulating layer is not needed, which leads to a reduction in manufacturing cost of the display device.

The layer 313 can be formed by a photolithography method and an etching method, for example. Specifically, a film to be the layers 313 is formed across a plurality of pixel electrodes 311 that have been formed independently for respective subpixels. Next, a mask layer is formed over the film to be the layer 313, and a resist mask is formed over the mask layer by a photolithography method. After that, the mask layer and the film to be the layer 313 are processed by an etching method, for example, and the resist mask is removed. A mask layer having a two-layer structure of a first mask layer and a second mask layer over the first mask layer is used, for example. In this case, a resist mask is formed over the second mask layer and the second mask layer is processed. Then, the resist mask is removed. After that, the first mask layer and the film to be the layer 313 are processed using the second mask layer as a hard mask, for example. In this manner, one island-shaped layer 313 is formed for every pixel electrode 311. Thus, the layer 313 can be divided into island-shaped layers 313 for respective subpixels. By performing a series of steps from the formation of the film to be the layer 313 to the processing of the film three times, for example, the layers 313R, 313G, and 313B can be separately formed.

The island-shaped layer 313 formed without using a fine metal mask can be a minute layer. Providing the island-shaped layer 313 in each of the light-emitting elements 60 can suppress a leakage current between the adjacent light-emitting elements 60. This can prevent crosstalk due to unintended light emission, so that a display device with extremely high contrast can be obtained. Specifically, a display device having high current efficiency at low luminance can be obtained.

In this specification and the like, a device formed using a metal mask or a fine metal mask (FMM) may be referred to as a device having a metal mask (MM) structure. In this specification and the like, a device formed without using a metal mask or a fine metal mask may be referred to as a device having a metal maskless (MML) structure.

In the case where the island-shaped layer 313 is formed without using a fine metal mask, a surface of the layer 313 is exposed in the manufacturing process of the display device. Thus, the layers 313R, 313G, and 313B each preferably include a carrier-transport layer over a light-emitting layer. Alternatively, the layers 313R, 313G, and 313B each preferably include a carrier-blocking layer over the light-emitting layer. Alternatively, the layers 313R, 313G, and 313B each preferably include a carrier-blocking layer over the light-emitting layer and a carrier-transport layer over the carrier-blocking layer. Accordingly, the light-emitting layer can be inhibited from being exposed on the outermost surface, thereby reducing damage to the light-emitting layer. Thus, the reliability of the light-emitting element 60 can be increased.

In the case where the light-emitting element 60 has a tandem structure in which, for example, the layer 313 includes a first light-emitting unit, a charge-generation layer over the first light-emitting unit, and a second light-emitting unit over the charge-generation layer, a surface of the second light-emitting unit is exposed in the manufacturing process of the display device. Thus, the second light-emitting unit preferably includes a carrier-transport layer over a light-emitting layer. Alternatively, the second light-emitting unit preferably includes a carrier-blocking layer over the light-emitting layer. Alternatively, the second light-emitting unit preferably includes a carrier-blocking layer over the light-emitting layer and a carrier-transport layer over the carrier-blocking layer. Accordingly, the light-emitting layer can be inhibited from being exposed on the outermost surface, thereby reducing damage to the light-emitting layer. Thus, the reliability of the light-emitting element 60 can be increased. Note that in the case where three or more light-emitting units are provided, the uppermost light-emitting unit preferably includes one or both of a carrier-transport layer and a carrier-blocking layer over a light-emitting layer.

In a region between adjacent light-emitting elements 60, the insulating layer 325 and the insulating layer 327 over the insulating layer 325 are provided. Although FIG. 63 illustrates a plurality of cross sections of the insulating layer 325 and a plurality of cross sections of the insulating layer 327, the insulating layer 325 and the insulating layer 327 are each one continuous layer when the display device 10E is seen from above. In other words, the display device 10E can have a structure including one insulating layer 325 and one insulating layer 327, for example. Note that the display device 10E may include a plurality of insulating layers 325 that are separated from each other and a plurality of insulating layers 327 that are separated from each other.

The insulating layer 325 preferably includes regions in contact with the side surfaces of the layers 313R, 313G, and 313B. The insulating layer 325 including the regions in contact with the layers 313R, 313G, and 313B can prevent separation of the layers 313R, 313G, and 313B. When the insulating layer 325 is in close contact with the layers 313R, 313G, and 313B, the layer 313B and the like adjacent to each other can be fixed or bonded to each other by the insulating layer 325. Accordingly, the reliability of the light-emitting elements 60 can be improved. The manufacturing yield of the light-emitting elements 60 can also be improved.

The insulating layer 325 can be formed using an inorganic material. As the insulating layer 325, an inorganic insulating film such as an oxide insulating film, a nitride insulating film, an oxynitride insulating film, or a nitride oxide insulating film can be used, for example. The insulating layer 325 may have a single-layer structure or a stacked-layer structure. Examples of the oxide insulating film include a silicon oxide film, an aluminum oxide film, a magnesium oxide film, an indium-gallium-zinc oxide film, a gallium oxide film, a germanium oxide film, an yttrium oxide film, a zirconium oxide film, a lanthanum oxide film, a neodymium oxide film, a hafnium oxide film, and a tantalum oxide film. Examples of the nitride insulating film include a silicon nitride film and an aluminum nitride film. Examples of the oxynitride insulating film include a silicon oxynitride film and an aluminum oxynitride film. Examples of the nitride oxide insulating film include a silicon nitride oxide film and an aluminum nitride oxide film. In particular, aluminum oxide is preferably used because it has high selectivity with respect to the layer 313 in etching and has a function of protecting the layer 313.

The insulating layer 325 preferably has a function of a barrier insulating film against at least one of water and oxygen. Alternatively, the insulating layer 325 preferably has a function of inhibiting diffusion of at least one of water and oxygen. Alternatively, the insulating layer 325 preferably has a function of capturing or fixing (also referred to as gettering) at least one of water and oxygen. Note that in this specification and the like, a barrier insulating layer refers to an insulating layer having a barrier property. A barrier property in this specification and the like means a function of inhibiting diffusion of a particular substance (also referred to as a function of less easily transmitting the substance).

When the insulating layer 325 has a function of the barrier insulating layer or a gettering function, entry of impurities (typically, at least one of water and oxygen) that would diffuse into the light-emitting elements from the outside can be inhibited. With this structure, a highly reliable light-emitting element and a highly reliable display device can be provided.

The insulating layer 327 is provided over the insulating layer 325 to fill a depression portion formed in the insulating layer 325. The insulating layer 327 can overlap with the side surface and part of a top surface of each of the layers 313R, 313G, and 313B with the insulating layer 325 therebetween. The insulating layer 327 preferably covers at least part of a side surface of the insulating layer 325. The insulating layers 325 and 327 can fill a gap between the adjacent island-shaped layers, whereby unevenness of the surface where the layer (e.g., the common electrode 315) provided over the island-shaped layers is formed can be reduced and the coverage with the layer can be improved. Thus, connection defects caused by step disconnection can be inhibited. In addition, an increase in the electric resistance, which is caused by local thinning of the common electrode 315 due to the level difference, can be inhibited. Note that a top surface of the insulating layer 327 preferably has a shape with higher flatness, but may include a projection portion, a convex surface, a concave surface, or a depression portion.

For the insulating layer 327, an insulating layer containing an organic material can be favorably used. As the organic material, a photosensitive organic resin is preferably used, and for example, a photosensitive resin composite containing an acrylic resin is preferably used. Note that in this specification and the like, an acrylic resin refers to not only a polymethacrylic acid ester or a methacrylic resin, but also all the acrylic polymer in a broad sense in some cases.

A mask layer 318R is positioned over the EL layer 313R included in the light-emitting element 60R, a mask layer 318G is positioned over the EL layer 313G included in the light-emitting element 60G, and a mask layer 318B is positioned over the EL layer 313B included in the light-emitting element 60B. Hereinafter, matters common to the mask layers 318R, 318G, and 318B are sometimes described using the term "mask layer 318" without any letter of the alphabet distinguishing these mask layers. The mask layer 318 is provided to surround the light-emitting region. In other words, the mask layer 318 has an opening in a portion overlapping with the light-emitting region. The mask layer 318R is a remaining part of the mask layer provided over the layer 313R at the time of forming the layer 313R. In a similar manner, the mask layer 318G is a remaining part of the mask layer at the time of forming the layer 313G, and the mask layer 318B is a remaining part of the mask layer provided at the time of forming the layer 313B. Thus, the mask layer used to protect the layer 313 in manufacture of the layer 313 may partly remain in the display device of one embodiment of the present invention.

Although the mask layer 318 has a single-layer structure in FIG. 63, the mask layer 318 may have a stacked-layer structure. For example, the mask layer 318 may have a two-layer structure or a stacked-layer structure of three or more layers. After the formation of the film to be the layer 313, a first mask layer and a second mask layer over the first mask layer are formed as mask layers in some cases. After that, the layers 313R, 313G, and 313B are formed using the mask layers, the second mask layer is removed, and then an opening reaching the layer 313 is formed in the first mask layer in some cases. In that case, the mask layer 318 remaining in the display device 10E has a single-layer structure. In other words, the remaining mask layer 318 may include a smaller number of layers than the mask layer 318 formed in the manufacturing process of the display device 10E.

In the display device 10E, the common layer 314 is provided over the layers 313R, 313G, and 313B and the insulating layer 327 and the common electrode 315 is provided over the common layer 314. Like the common electrode 315, the common layer 314 is shared by the light-emitting elements 60R, 60G, and 60B. In the case where the light-emitting element 60 includes the common layer 314, the layer 313 and the common layer 314 can be collectively referred to as an EL layer. Note that the common layer 314 is not necessarily included in the EL layer.

The common layer 314 includes, for example, an electron-injection layer or a hole-injection layer. Alternatively, the common layer 314 may include a stack of an electron-transport layer and an electron-injection layer, or may include a stack of a hole-transport layer and a hole-injection layer. Here, a structure can be employed in which the layer included in the common layer 314 is not included in the layer 313. For example, when the common layer 314 includes an electron-injection layer, the layer 313 does not necessarily include an electron-injection layer. When the common layer 314 includes a hole-injection layer, the layer 313 does not necessarily include a hole-injection layer.

In the case where the common layer 314 is provided in the display device, the common electrode 315 can be formed continuously after the formation of the common layer 314, without a step such as etching intervening therebetween. For example, after the common layer 314 is formed in a vacuum, the common electrode 315 can be formed in a vacuum without exposing the substrate 101 to the air. In other words, the common layer 314 and the common electrode 315 can be successively formed in a vacuum. Accordingly, the bottom surface of the common electrode 315 can be a clean surface, as compared to the case where the common layer 314 is not provided in the display device. Thus, in the case where the surface of the layer 313 is exposed to the air after the formation of the layer 313, the common layer 314 is preferably provided in the display device.

In the example in FIG. 63, the common layer 314 is not provided in the connection portion 140. For example, by using a mask for specifying a film formation area (also referred to as an area mask or a rough metal mask, which is distinguished from a fine metal mask), the common layer 314 and the common electrode 315 can be formed in different regions.

Here, in the case where the electric resistance of the common layer 314 in the thickness direction is negligible, electrical continuity between the conductive layer 323 and the common electrode 315 can be maintained even when the common layer 314 is provided between the conductive layer 323 and the common electrode 315. When the common layer 314 is provided not only in the display portion 20 but also in the connection portion 140, the common layer 314 can be formed, for example, without using a metal mask such as an area mask. Thus, the manufacturing process of the display device 10E can be simplified.

Although the display device 10E in FIG. 63 has a top-emission structure, the display device 10E may have a bottom-emission structure or a dual-emission structure.

The structure of the display device 10E is also applicable to the display devices 10A to 10D. Specifically, at least one of the following structures is also applicable to the display devices 10A to 10D: the structure of the light-emitting element 60, the structure without the insulating layer 237, the structure in which the layer 313 covers the top and side surfaces of the pixel electrode 311, the structure with the insulating layer 325, the structure with the insulating layer 327, and the structure with the common layer 314.

A plurality of structure examples described in this embodiment can be combined as appropriate. This embodiment can be combined with any of the other embodiments, as appropriate.

Embodiment 4

In this embodiment, a light-emitting element that can be used in the display device of one embodiment of the present invention will be described.

Figure 64A:
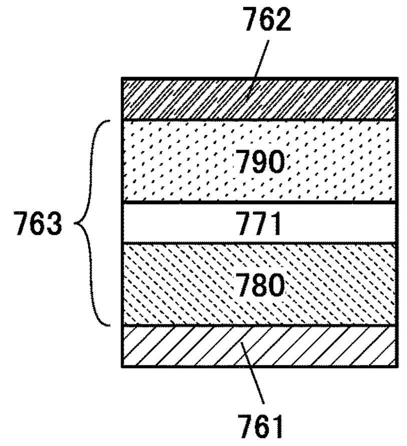
FIGS. 64A to 64F are cross-sectional views illustrating structure examples of a light-emitting element.

As illustrated in FIG. 64A, the light-emitting element includes an EL layer 763 between a pair of electrodes (a lower electrode 761 and an upper electrode 762). The EL layer 763 can be formed of a plurality of layers such as a layer 780, a light-emitting layer 771, and a layer 790.

The light-emitting layer 771 contains at least a light-emitting substance.

In the case where the lower electrode 761 is an anode and the upper electrode 762 is a cathode, the layer 780 includes one or more of a layer containing a substance having a high hole-injection property (a hole-injection layer), a layer containing a substance having a high hole-transport property (a hole-transport layer), and a layer containing a substance having a high electron-blocking property (an electron-blocking layer). The layer 790 includes one or more of a layer containing a substance having a high electron-injection property (an electron-injection layer), a layer containing a substance having a high electron-transport property (an electron-transport layer), and a layer containing a substance having a high hole-blocking property (a hole-blocking layer). In the case where the lower electrode 761 is a cathode and the upper electrode 762 is an anode, the structures of the layers 780 and 790 are replaced with each other.

The structure including the layer 780, the light-emitting layer 771, and the layer 790, which is provided between a pair of electrodes, can function as a single light-emitting unit, and the structure in FIG. 64A is referred to as a single structure in this specification.

Figure 64B:
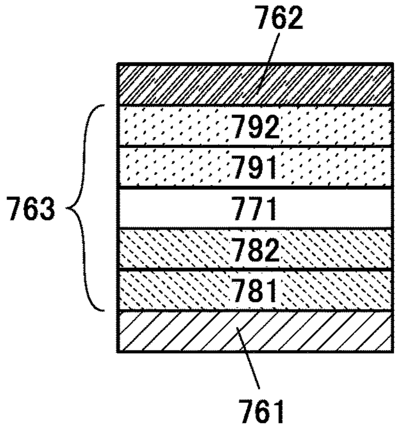

FIG. 64B is a modification example of the EL layer 763 included in the light-emitting element illustrated in FIG. 64A. Specifically, the light-emitting element illustrated in FIG. 64B includes a layer 781 over the lower electrode 761, a layer 782 over the layer 781, the light-emitting layer 771 over the layer 782, a layer 791 over the light-emitting layer 771, a layer 792 over the layer 791, and the upper electrode 762 over the layer 792.

In the case where the lower electrode 761 is an anode and the upper electrode 762 is a cathode, the layer 781 can be a hole-injection layer, the layer 782 can be a hole-transport layer, the layer 791 can be an electron-transport layer, and the layer 792 can be an electron-injection layer, for example. In the case where the lower electrode 761 is a cathode and the upper electrode 762 is an anode, the layer 781 can be an electron-injection layer, the layer 782 can be an electron-transport layer, the layer 791 can be a hole-transport layer, and the layer 792 can be a hole-injection layer. With such a layered structure, carriers can be efficiently injected to the light-emitting layer 771, and the efficiency of the recombination of carriers in the light-emitting layer 771 can be enhanced.

Figure 64C:
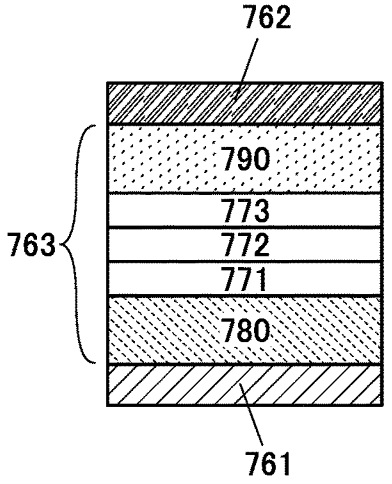
Figure 64D:
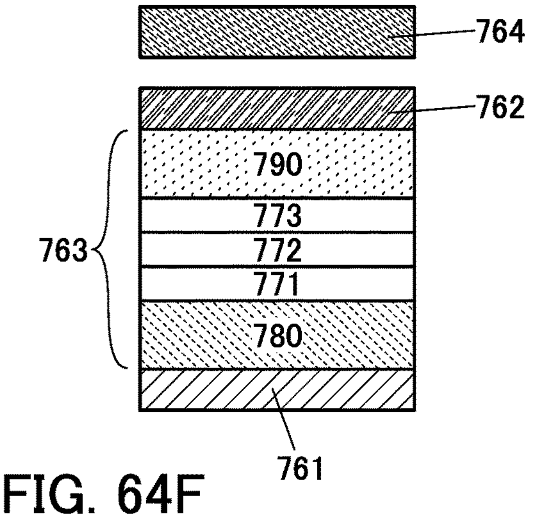

Note that structures in which a plurality of light-emitting layers (light-emitting layers 771, 772, and 773) are provided between the layers 780 and 790 as illustrated in FIGS. 64C and 64D are other variations of the single structure. Although FIGS. 64C and 64D illustrate the examples where three light-emitting layers are included, the light-emitting element having a single structure may include two or four or more light-emitting layers. In addition, the light-emitting element having a single structure may include a buffer layer between two light-emitting layers. A carrier-transport layer (a hole-transport layer or an electron-transport layer) can be used as the buffer layer, for example.

Figure 64E:
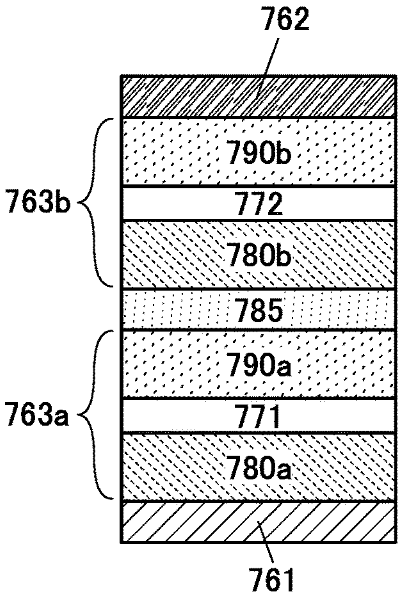
Figure 64F:
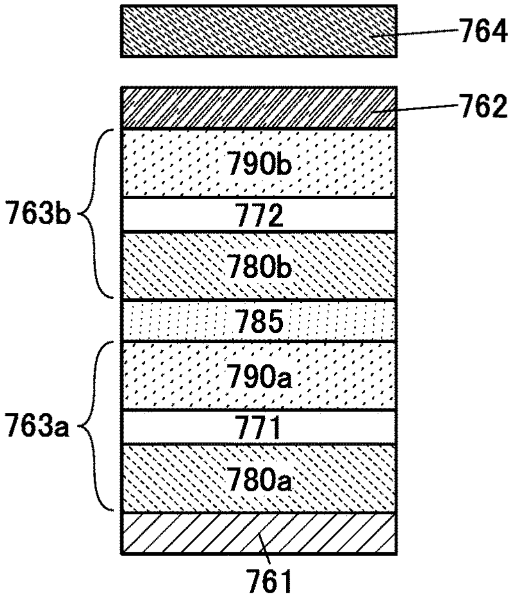

In this specification, as illustrated in FIGS. 64E and 64F, a structure in which a plurality of light-emitting units (a light-emitting unit 763*a* and a light-emitting unit 763*b*) are connected in series with a charge-generation layer 785 (also referred to as an intermediate layer) therebetween is referred to as a tandem structure. Note that a tandem structure may be referred to as a stack structure. The tandem structure enables a light-emitting element capable of high-luminance light emission. Furthermore, a tandem structure allows the amount of current needed for obtaining the same luminance to be reduced as compared to the case of using a single structure, and thus can improve the reliability.

Note that FIGS. 64D and 64F illustrate examples where the display device includes a layer 764 overlapping with the light-emitting element. FIG. 64D illustrates an example in which the layer 764 overlaps with the light-emitting element illustrated in FIG. 64C, and FIG. 64F illustrates an example in which the layer 764 overlaps with the light-emitting element illustrated in FIG. 64E. In FIGS. 64D and 64F, a conductive film transmitting visible light is used for the upper electrode 762 to extract light to the upper electrode 762 side.

One or both of a color conversion layer and a color filter (coloring layer) can be used as the layer 764.

In FIGS. 64C and 64D, light-emitting substances that emit light of the same color or the same light-emitting substance may be used for the light-emitting layers 771, 772, and 773. For example, a light-emitting substance that emits blue light may be used for the light-emitting layers 771, 772, and 773. In a subpixel that emits blue light, blue light from the light-emitting element can be extracted as it is. In each of a subpixel that emits red light and a subpixel that emits green light, a color conversion layer is provided as the layer 764 illustrated in FIG. 64D for converting blue light from the light-emitting element into light with a longer wavelength, so that red light or green light can be extracted. As the layer 764, both a color conversion layer and a coloring layer are preferably used. In some cases, part of light emitted from the light-emitting element is transmitted through the color conversion layer without being converted. When light transmitted through the color conversion layer is extracted through the coloring layer, light other than light of the intended color can be absorbed by the coloring layer, and color purity of light exhibited by a subpixel can be improved.

In FIGS. 64C and 64D, light-emitting substances that emit light of different colors may be used for the light-emitting layers 771, 772, and 773. When the light-emitting layers 771, 772, and 773 emit light of complementary colors, white light emission can be obtained. The light-emitting element having a single structure preferably includes a light-emitting layer containing a light-emitting substance emitting blue light and a light-emitting layer containing a light-emitting substance emitting visible light with a longer wavelength than blue light, for example.

A color filter may be provided as the layer 764 illustrated in FIG. 64D. When white light passes through a color filter, light of a desired color can be obtained.

In the case where the light-emitting element having a single structure includes three light-emitting layers, for example, a light-emitting layer containing a light-emitting substance emitting red (R) light, a light-emitting layer containing a light-emitting substance emitting green (G) light, and a light-emitting layer containing a light-emitting substance emitting blue (B) light are preferably included. The stacking order of the light-emitting layers can be RGB or RBG from an anode side, for example. In that case, a buffer layer may be provided between R and G or between R and B.

In the case where the light-emitting element having a single structure includes two light-emitting layers, for example, a light-emitting layer containing a light-emitting substance emitting blue (B) light and a light-emitting layer containing a light-emitting substance emitting yellow (Y) light are preferably included. Such a structure may be referred to as a BY single structure.

In the light-emitting element that emits white light, two or more kinds of light-emitting substances are preferably contained. To obtain white light emission, the two or more kinds of light-emitting substances are selected so as to emit light of complementary colors. For example, when emission colors of a first light-emitting layer and a second light-emitting layer are complementary colors, the light-emitting element can emit white light as a whole. The same applies to a light-emitting element including three or more light-emitting layers.

In FIGS. 64C and 64D, each of the layers 780 and 790 may independently has a stacked-layer structure of two or more layers as in FIG. 64B.

In FIGS. 64E and 64F, light-emitting substances emitting light of the same color or the same light-emitting substance may be used for the light-emitting layers 771 and 772. For example, in light-emitting elements included in subpixels emitting light of different colors, a light-emitting substance that emits blue light can be used for each of the light-emitting layer 771 and the light-emitting layer 772. In the subpixel that emits blue light, blue light from the light-emitting element can be extracted as it is. In each of the subpixel that emits red light and the subpixel that emits green light, a color conversion layer is provided as the layer 764 illustrated in FIG. 64F for converting blue light from the light-emitting element into light with a longer wavelength, so that red light or green light can be extracted. As the layer 764, both a color conversion layer and a coloring layer are preferably used.

In the case where the light-emitting element having any of the structures illustrated in FIG. 64E or 64F is used for the subpixels emitting different colors, the subpixels may use different light-emitting substances. Specifically, in the light-emitting element included in the subpixel emitting red light, a light-emitting substance that emits red light can be used for each of the light-emitting layer 771 and the light-emitting layer 772. In the light-emitting element included in the subpixel emitting green light, a light-emitting substance that emits green light can be used for each of the light-emitting layer 771 and the light-emitting layer 772. In the light-emitting element included in the subpixel emitting blue light, a light-emitting substance that emits blue light can be used for each of the light-emitting layer 771 and the light-emitting layer 772. A display device having such a structure can be regarded as employing a light-emitting element with the tandem structure and the SBS structure. Thus, such a display device takes advantages of both the tandem structure and the SBS structure. Thus, a light-emitting element being capable of high-luminance light emission and having high reliability can be obtained.

In FIGS. 64E and 64F, light-emitting substances emitting light of different colors may be used for the light-emitting layers 771 and 772. When the light-emitting layers 771 and 772 emit light of complementary colors, white light emission can be obtained. A color filter may be provided as the layer 764 illustrated in FIG. 64F. When white light passes through a color filter, light of a desired color can be obtained.

Although FIGS. 64E and 64F illustrate examples where the light-emitting unit 763*a* includes one light-emitting layer 771 and the light-emitting unit 763*b* includes one the light-emitting layer 772, one embodiment of the present invention is not limited thereto. The light-emitting units 763*a* and 763*b* may each include two or more light-emitting layers.

In addition, although FIGS. 64E and 64F illustrate the light-emitting element including two light-emitting units, one embodiment of the present invention is not limited thereto. The light-emitting element may include three or more light-emitting units. Note that a structure including two light-emitting units and a structure including three light-emitting units may be referred to as a two-unit tandem structure and a three-unit tandem structure, respectively.

In FIGS. 64E and 64F, the light-emitting unit 763*a* includes a layer 780*a*, the light-emitting layer 771, and a layer 790*a*, and the light-emitting unit 763*b* includes a layer 780*b*, the light-emitting layer 772, and a layer 790*b*.

In the case where the lower electrode 761 is an anode and the upper electrode 762 is a cathode, and the layers 780*a* and 780*b* each include one or more of a hole-injection layer, a hole-transport layer, and an electron-blocking layer. The layers 790*a* and 790*b* each include one or more of an electron-injection layer, an electron-transport layer, and a hole-blocking layer. In the case where the lower electrode 761 is a cathode and the upper electrode 762 is an anode, the structures of the layers 780*a* and 790*a* are replaced with each other, and the structures of the layers 780*b* and 790*b* are also replaced with each other.

In the case where the lower electrode 761 is an anode and the upper electrode 762 is a cathode, for example, the layer 780*a* includes a hole-injection layer and a hole-transport layer over the hole-injection layer, and may further include an electron-blocking layer over the hole-transport layer. The layer 790*a* includes an electron-transport layer, and may further include a hole-blocking layer between the light-emitting layer 771 and the electron-transport layer. The layer 780*b* includes a hole-transport layer, and may further include an electron-blocking layer over the hole-transport layer. The layer 790*b* includes an electron-transport layer and an electron-injection layer over the electron-transport layer, and may further include a hole-blocking layer between the light-emitting layer 772 and the electron-transport layer. In the case where the lower electrode 761 is a cathode and the upper electrode 762 is an anode, for example, the layer 780*a* includes an electron-injection layer and an electron-transport layer over the electron-injection layer, and may further include a hole-blocking layer over the electron-transport layer. The layer 790*a* includes a hole-transport layer, and may further include an electron-blocking layer between the light-emitting layer 771 and the hole-transport layer. The layer 780*b* includes an electron-transport layer, and may further include a hole-blocking layer over the electron-transport layer. The layer 790*b* includes a hole-transport layer and a hole-injection layer over the hole-transport layer, and may further include an electron-blocking layer between the light-emitting layer 772 and the hole-transport layer.

In the case of manufacturing a light-emitting element having a tandem structure, two light-emitting units are stacked with the charge-generation layer 785 therebetween. The charge-generation layer 785 includes at least a charge-generation region. The charge-generation layer 785 has a function of injecting electrons into one of the two light-emitting units and injecting holes to the other when voltage is applied between the pair of electrodes.

Figure 65A:
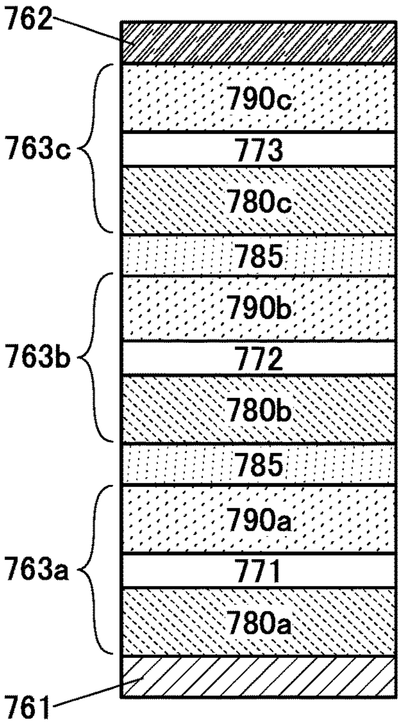
FIGS. 65A to 65C are cross-sectional views illustrating structure examples of a light-emitting element.
Figure 65B:
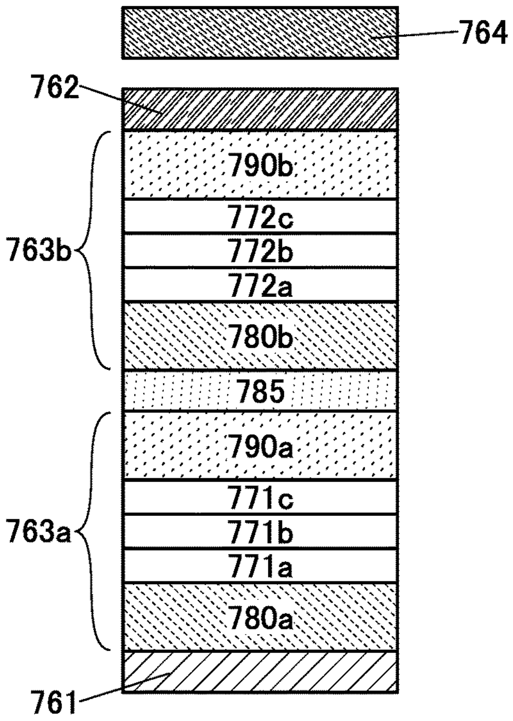
Figure 65C:
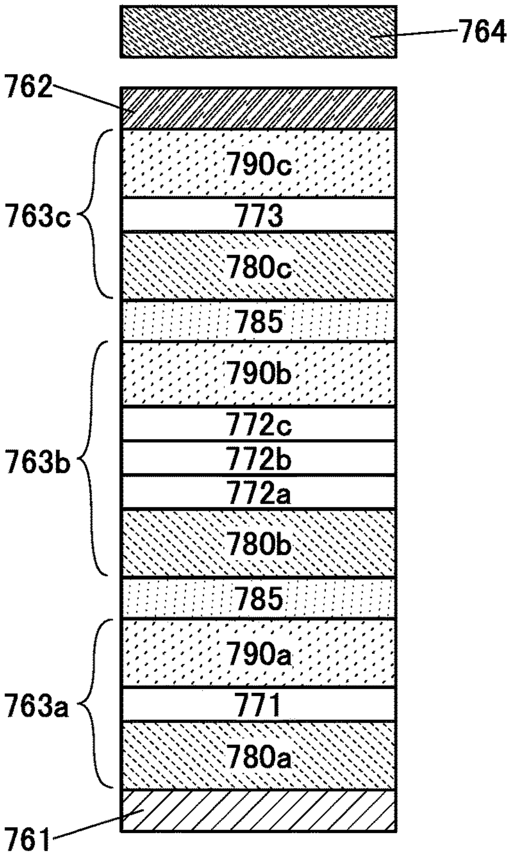

Examples of the light-emitting element with a tandem structure are structures illustrated in FIGS. 65A to 65C.

FIG. 65A shows a structure including three light-emitting units. In the structure illustrated in FIG. 65A, a plurality of light-emitting units (light-emitting units 763*a*, 763*b*, and 763*c*) are connected in series with the charge-generation layer 785 provided between each two light-emitting units. The light-emitting unit 763*a* includes the layer 780*a*, the light-emitting layer 771, and the layer 790*a*. The light-emitting unit 763*b* includes the layer 780*b*, the light-emitting layer 772, and the layer 790*b*. The light-emitting unit 763*c* includes a layer 780*c*, the light-emitting layer 773, and a layer 790*c*. Note that the layer 780*c* can have a structure applicable to the layers 780*a* and 780*b*, and the layer 790*c* can have a structure applicable to the layers 790*a* and 790*b*.

In FIG. 65A, the light-emitting layers 771, 772, and 773 preferably contain light-emitting substances that emit light of the same color. Specifically, the light-emitting layers 771, 772, and 773 can each contain a light-emitting substance that emits red (R) light (i.e., an R\R\R three-unit tandem structure), can each contain a light-emitting substance that emits green (G) light (i.e., a G\G\G three-unit tandem structure), or can each contain a light-emitting substance that emits blue (B) light (i.e., a B\B\B three-unit tandem structure). Note that "a\b" means that a light-emitting unit containing a light-emitting substance that emits light of the color "b" is provided over a light-emitting unit containing a light-emitting substance that emits light of the color "a" with a charge-generation layer therebetween.

In FIG. 65A, light-emitting substances that emit light of different colors may be used for some or all of the light-emitting layers 771, 772, and 773. Examples of a combination of emission colors for the light-emitting layers 771, 772, and 773 include blue (B) for two of them and yellow (Y) for the other; and red (R) for one of them, green (G) for another, and blue (B) for the other.

Note that the structure containing the light-emitting substances that emit light of the same color is not limited to the above structure. For example, a light-emitting element with a tandem structure may be employed in which light-emitting units each including a plurality of light-emitting layers are stacked as illustrated in FIG. 65B. FIG. 65B illustrates a structure in which two light-emitting units (light-emitting units 763*a* and 763*b*) are connected in series with the charge-generation layer 785 therebetween. The light-emitting unit 763*a* includes the layer 780*a*, a light-emitting layer 771*a*, a light-emitting layer 771*b*, a light-emitting layer 771*c*, and the layer 790*a*. The light-emitting unit 763*b* includes the layer 780*b*, a light-emitting layer 772*a*, a light-emitting layer 772*b*, a light-emitting layer 772*c*, and the layer 790*b*.

In FIG. 65B, the light-emitting unit 763*a* is configured to emit white (W) light by selecting light-emitting substances for the light-emitting layers 771*a*, 771*b*, and 771*c* so that their emission colors are complementary colors. Furthermore, the light-emitting unit 763*b* is configured to emit white (W) light by selecting light-emitting substances for the light-emitting layers 772*a*, 772*b*, and 772*c* are selected so that their emission colors are complementary colors. That is, the structure illustrated in FIG. 65B is a two-unit tandem structure of W\W. Note that there is no particular limitation on the stacking order of light-emitting substances that emit light of complementary colors, and a practitioner can select an optimum stacking order as appropriate. Although not illustrated, a three-unit tandem structure of W\W\W or a tandem structure with four or more units may be employed.

In the case of a light-emitting element with a tandem structure, any of the following structure may be employed, for example: a two-unit tandem structure of B\Y or Y\B including a light-emitting unit that emits yellow (Y) light and a light-emitting unit that emits blue (B) light; a two-unit tandem structure of R·G\B or B\R·G including a light-emitting unit that emits red (R) and green (G) light and a light-emitting unit that emits blue (B) light; a three-unit tandem structure of B\Y\B including a light-emitting unit that emits blue (B) light, a light-emitting unit that emits yellow (Y) light, and a light-emitting unit that emits blue (B) light in this order; a three-unit tandem structure of B\YG\B including a light-emitting unit that emits blue (B) light, a light-emitting unit that emits yellow-green (YG) light, and a light-emitting unit that emits blue (B) light in this order; and a three-unit tandem structure of B\G\B including a light-emitting unit that emits blue (B) light, a light-emitting unit that emits green (G) light, and a light-emitting unit that emits blue (B) light in this order. Note that "a·b" means that one light-emitting unit contains a light-emitting substance that emits light of the color "a" and a light-emitting substance that emits light of the color "b".

A light-emitting unit containing one light-emitting layer and a light-emitting unit including a plurality of light-emitting layers may be used in combination as illustrated in FIG. 65C.

Specifically, in the structure illustrated in FIG. 65C, a plurality of light-emitting units (the light-emitting units 763*a*, 763*b*, and 763*c*) are connected in series with the charge-generation layer 785 provided between each two light-emitting units. The light-emitting unit 763*a* includes the layer 780*a*, the light-emitting layer 771, and the layer 790*a*. The light-emitting unit 763*b* includes the layer 780*b*, the light-emitting layer 772*a*, the light-emitting layer 772*b*, the light-emitting layer 772*c*, and the layer 790*b*. The light-emitting unit 763*c* includes the layer 780*c*, the light-emitting layer 773, and the layer 790*c*.

The structure illustrated in FIG. 65C can be, for example, a three-unit tandem structure of B\R·G·YG\B in which the light-emitting unit 763*a* is a light-emitting unit that emits blue (B) light, the light-emitting unit 763*b* is a light-emitting unit that emits red (R), green (G), and yellow-green (YG) light, and the light-emitting unit 763*c* is a light-emitting unit that emits blue (B) light.

Examples of the number of stacked light-emitting units and the order of colors from the anode side include a two-unit structure of B and Y; a two-unit structure of B and a light-emitting unit X; a three-unit structure of B, Y, and B; and a three-unit structure of B, X, and B. Examples of the number of light-emitting layers stacked in the light-emitting unit X and the order of colors from an anode side include a two-layer structure of R and Y; a two-layer structure of R and G; a two-layer structure of G and R; a three-layer structure of G, R, and G; and a three-layer structure of R, G, and R. Another layer may be provided between two light-emitting layers.

Next, materials that can be used for the light-emitting element will be described.

A conductive film transmitting visible light is used for the electrode through which light is extracted, which is either the lower electrode 761 or the upper electrode 762. A conductive film reflecting visible light is preferably used for the electrode through which light is not extracted. In the case where the display device includes a light-emitting element emitting infrared light, a conductive film transmitting visible light and infrared light is used for the electrode through which light is extracted, and a conductive film reflecting visible light and infrared light is preferably used for the electrode through which light is not extracted.

A conductive film transmitting visible light may be used also for the electrode through which light is not extracted. In that case, the electrode is preferably provided between a reflective layer and the EL layer 763. In other words, light emitted from the EL layer 763 may be reflected by the reflective layer to be extracted from the display device.

For the pair of electrodes of the light-emitting element, a metal, an alloy, an electrically conductive compound, a mixture thereof, and the like can be used as appropriate. Specific examples of the material include metals such as aluminum, magnesium, titanium, chromium, manganese, iron, cobalt, nickel, copper, gallium, zinc, indium, tin, molybdenum, tantalum, tungsten, palladium, gold, platinum, silver, yttrium, and neodymium, and an alloy containing any of these metals in appropriate combination. Other examples of the material include indium tin oxide (In—Sn oxide, also referred to as ITO), In—Si—Sn oxide (also referred to as ITSO), indium zinc oxide (In—Zn oxide), and In—W—Zn oxide. Other examples of the material include an alloy containing aluminum (aluminum alloy), such as an alloy of aluminum, nickel, and lanthanum (Al—Ni—La), and an alloy containing silver, such as an alloy of silver and magnesium and an alloy of silver, palladium, and copper (APC). Other examples of the material include a Group 1 element and a Group 2 element of the periodic table, which are not described above (e.g., lithium, cesium, calcium, and strontium), rare earth metals such as europium and ytterbium, an alloy containing any of these elements in appropriate combination, and graphene.

The light-emitting element preferably employs a microcavity structure. Therefore, one of the pair of electrodes of the light-emitting element is preferably an electrode having properties of transmitting and reflecting visible light (a transflective electrode), and the other is preferably an electrode having a property of reflecting visible light (a reflective electrode). When the light-emitting element has a microcavity structure, light obtained from the light-emitting layer can be resonated between the electrodes, whereby light emitted from the light-emitting element can be intensified.

The transparent electrode has a light transmittance higher than or equal to 40%. For example, an electrode having a visible light (light with wavelengths greater than or equal to 400 nm and less than 750 nm) transmittance higher than or equal to 40% is preferably used in the transparent electrode of the light-emitting element. The transflective electrode has a visible light reflectance higher than or equal to 10% and lower than or equal to 95%, preferably higher than or equal to 30% and lower than or equal to 80%. The reflective electrode has a visible light reflectance higher than or equal to 40% and lower than or equal to 100%, preferably higher than or equal to 70% and lower than or equal to 100%. These electrodes preferably have a resistivity lower than or equal to $1\times10^{-2}$ Ωcm.

The light-emitting element includes at least a light-emitting layer. In addition to the light-emitting layer, the light-emitting element may further include a layer containing any of a substance having a high hole-injection property, a substance having a high hole-transport property, a hole-blocking material, a substance having a high electron-transport property, an electron-blocking material, a substance having a high electron-injection property, a substance having a bipolar property (a substance having a high electron- and hole-transport property), and the like. For example, the light-emitting element can include one or more of a hole-injection layer, a hole-transport layer, a hole-blocking layer, a charge-generation layer, an electron-blocking layer, an electron-transport layer, and an electron-injection layer in addition to the light-emitting layer.

Either a low molecular compound or a high molecular compound can be used in the light-emitting element, and an inorganic compound may also be included. Each layer included in the light-emitting element can be formed, for example, by an evaporation method (including a vacuum evaporation method), a transfer method, a printing method, an inkjet method, or a coating method.

The light-emitting layer can contain one or more kinds of light-emitting substances. As the light-emitting substance, a substance whose emission color is blue, violet, bluish violet, green, yellowish green, yellow, orange, red, or the like is appropriately used. Alternatively, as the light-emitting substance, a substance that emits near-infrared light can be used.

Examples of the light-emitting substance include a fluorescent material, a phosphorescent material, a TADF material, and a quantum dot material.

Examples of a fluorescent material include a pyrene derivative, an anthracene derivative, a triphenylene derivative, a fluorene derivative, a carbazole derivative, a dibenzothiophene derivative, a dibenzofuran derivative, a dibenzoquinoxaline derivative, a quinoxaline derivative, a pyridine derivative, a pyrimidine derivative, a phenanthrene derivative, and a naphthalene derivative.

Examples of a phosphorescent material include an organometallic complex (particularly an iridium complex) having a 4H-triazole skeleton, a 1H-triazole skeleton, an imidazole skeleton, a pyrimidine skeleton, a pyrazine skeleton, or a pyridine skeleton; an organometallic complex (particularly an iridium complex) having a phenylpyridine derivative including an electron-withdrawing group as a ligand; a platinum complex; and a rare earth metal complex.

The light-emitting layer may contain one or more kinds of organic compounds (e.g., a host material or an assist material) in addition to the light-emitting substance (guest material). As the one or more kinds of organic compounds, one or both of a substance having a high hole-transport property (a hole-transport material) and a substance having a high electron-transport property (an electron-transport material) can be used. As the hole-transport material, it is possible to use a substance having a high hole-transport property which can be used for the hole-transport layer and will be described later. As the electron-transport material, it is possible to use a material having a high electron-transport property which can be used for the electron-transport layer and will be described later. Alternatively, as one or more kinds of organic compounds, a bipolar material or a TADF material may be used.

The light-emitting layer preferably includes a phosphorescent material and a combination of a hole-transport material and an electron-transport material that easily forms an exciplex, for example. With such a structure, light emission can be efficiently obtained by exciplex-triplet energy transfer (ExTET), which is energy transfer from the exciplex to the light-emitting substance (phosphorescent material). When a combination of materials is selected so as to form an exciplex that emits light whose wavelength overlaps with the wavelength of a lowest-energy-side absorption band of the light-emitting substance, energy can be transferred smoothly and light emission can be obtained efficiently. With the above structure, high efficiency, low-voltage driving, and a long lifetime of a light-emitting element can be achieved at the same time.

The hole-injection layer injects holes from the anode to the hole-transport layer and contains a substance having a high hole-injection property. Examples of a substance having a high hole-injection property include an aromatic amine compound and a composite material containing a hole-transport material and an acceptor material (electron-accepting material).

As the hole-transport material, it is possible to use a substance having a high hole-transport property which can be used for the hole-transport layer and will be described later.

As the acceptor material, an oxide of a metal belonging to any of Group 4 to Group 8 of the periodic table can be used, for example. Specific examples include molybdenum oxide, vanadium oxide, niobium oxide, tantalum oxide, chromium oxide, tungsten oxide, manganese oxide, and rhenium oxide. Among these, molybdenum oxide is especially preferable since it is stable in the air, has a low hygroscopic property, and is easy to handle. Alternatively, an organic acceptor material containing fluorine can be used. Alternatively, organic acceptor materials such as a quinodimethane derivative, a chloranil derivative, and a hexaazatriphenylene derivative can also be used.

For example, a hole-transport material and a material containing an oxide of a metal belonging to any of Groups 4 to 8 of the periodic table (typically, molybdenum oxide) may be used as the substance having a high hole-injection property.

The hole-transport layer transports holes injected from the anode by the hole-injection layer, to the light-emitting layer. The hole-transport layer contains a hole-transport material. The hole-transport material preferably has a hole mobility higher than or equal to $1\times10^{-6}$ $cm^2/Vs$. Note that other materials can also be used as long as the substances have a hole-transport property higher than an electron-transport property. As the hole-transport material, substances with a high hole-transport property, such as a πT-electron rich heteroaromatic compound (e.g., a carbazole derivative, a thiophene derivative, and a furan derivative) and an aromatic amine (a compound having an aromatic amine skeleton), are preferable.

The electron-blocking layer is provided in contact with the light-emitting layer. The electron-blocking layer has a hole-transport property and contains a material capable of blocking electrons. Any of the materials having an electron-blocking property among the above hole-transport materials can be used for the electron-blocking layer.

The electron-blocking layer has a hole-transport property, and thus can also be referred to as a hole-transport layer. A layer having an electron-blocking property among the hole-transport layers can also be referred to as an electron-blocking layer.

The electron-transport layer transports electrons injected from the cathode by the electron-injection layer, to the light-emitting layer. The electron-transport layer contains an electron-transport material. The electron-transport material preferably has an electron mobility higher than or equal to $1\times10^{-6}$ $cm^2/Vs$. Note that other materials can also be used as long as the substances have an electron-transport property higher than a hole-transport property. As the electron-transport material, any of the following substances with a high electron-transport property can be used, for example: a metal complex having a quinoline skeleton, a metal complex having a benzoquinoline skeleton, a metal complex having an oxazole skeleton, a metal complex having a thiazole skeleton, an oxadiazole derivative, a triazole derivative, an imidazole derivative, an oxazole derivative, a thiazole derivative, a phenanthroline derivative, a quinoline derivative having a quinoline ligand, a benzoquinoline derivative, a quinoxaline derivative, a dibenzoquinoxaline derivative, a pyridine derivative, a bipyridine derivative, a pyrimidine derivative, and a π-electron deficient heteroaromatic compound such as a nitrogen-containing heteroaromatic compound.

The hole-blocking layer is provided in contact with the light-emitting layer. The hole-blocking layer has an electron-transport property and contains a material capable of blocking holes. Any of the materials having a hole-blocking property among the above electron-transport materials can be used for the hole-blocking layer.

The hole-blocking layer has an electron-transport property, and thus can also be referred to as an electron-transport layer. A layer having a hole-blocking property among the electron-transport layers can also be referred to as a hole-blocking layer.

The electron-injection layer injects electrons from the cathode to the electron-transport layer and contains a substance having a high electron-injection property. As the substance having a high electron-injection property, an alkali metal, an alkaline earth metal, or a compound thereof can be used. As the substance having a high electron-injection property, a composite material containing an electron-transport material and a donor material (electron-donating material) can also be used.

The difference between the lowest unoccupied molecular orbital (LUMO) level of the substance having a high electron-injection property and the work function value of the material used for the cathode is preferably small (specifically, smaller than or equal to 0.5 eV).

The electron-injection layer can be formed using an alkali metal, an alkaline earth metal, or a compound thereof, such as lithium, cesium, ytterbium, lithium fluoride (LiF), cesium fluoride (CsF), calcium fluoride ($CaF_x$, where x is a given number), 8-(quinolinolato)lithium (abbreviation: Liq), 2-(2-pyridyl)phenolatolithium (abbreviation: LiPP), 2-(2-pyridyl)-3-pyridinolato lithium (abbreviation: LiPPy), 4-phenyl-2-(2-pyridyl)phenolatolithium (abbreviation: LiPPP), lithium oxide ($LiO_x$), or cesium carbonate, for example. The electron-injection layer may have a stacked-layer structure of two or more layers. In the stacked-layer structure, for example, lithium fluoride can be used for the first layer and ytterbium can be used for the second layer.

The electron-injection layer may contain an electron-transport material. For example, a compound having an unshared electron pair and an electron deficient heteroaromatic ring can be used as the electron-transport material. Specifically, it is possible to use a compound having at least one of a pyridine ring, a diazine ring (a pyrimidine ring, a pyrazine ring, or a pyridazine ring), and a triazine ring.

Note that the LUMO level of the organic compound having an unshared electron pair is preferably greater than or equal to −3.6 eV and less than or equal to −2.3 eV. In general, the highest occupied molecular orbital (HOMO) level and the LUMO level of an organic compound can be estimated by cyclic voltammetry (CV), photoelectron spectroscopy, optical absorption spectroscopy, inverse photoelectron spectroscopy, or the like.

For example, 4,7-diphenyl-1,10-phenanthroline (abbreviation: BPhen), 2,9-di(naphthalen-2-yl)-4,7-diphenyl-1,10-phenanthroline (abbreviation: NBPhen), 2,2'-(1,3-phenylene)bis(9-phenyl-1,10-phenanthroline) (abbreviation: mPPhen2P), diquinoxalino[2,3-a:2',3'-c]phenazine (abbreviation: HATNA), 2,4,6-tris[3'-(pyridin-3-yl)biphenyl-3-yl]-1,3,5-triazine (abbreviation: TmPPPyTz), or the like can be used as the organic compound having an unshared electron pair. Note that NBPhen has a higher glass transition point (Tg) than BPhen and thus has high heat resistance.

As described above, the charge-generation layer includes at least a charge-generation region. The charge-generation region preferably contains an acceptor material, and for example, preferably contains a hole-transport material and an acceptor material which can be used for the hole-injection layer.

In addition, the charge-generation layer preferably includes a layer containing a substance having a high electron-injection property. The layer can also be referred to as an electron-injection buffer layer. The electron-injection buffer layer is preferably provided between the charge-generation region and the electron-transport layer. By provision of the electron-injection buffer layer, an injection barrier between the charge-generation region and the electron-transport layer can be lowered; thus, electrons generated in the charge-generation region can be easily injected into the electron-transport layer.

The electron-injection buffer layer preferably contains an alkali metal or an alkaline earth metal, and for example, can contain an alkali metal compound or an alkaline earth metal compound. Specifically, the electron-injection buffer layer preferably contains an inorganic compound containing an alkali metal and oxygen or an inorganic compound containing an alkaline earth metal and oxygen, further preferably contains an inorganic compound containing lithium and oxygen (e.g., lithium oxide ($Li_2O$)). Alternatively, a material that can be used for the electron-injection layer can be used for the electron-injection buffer layer.

The charge-generation layer preferably includes a layer containing a substance having a high electron-transport property. The layer can also be referred to as an electron-relay layer. The electron-relay layer is preferably provided between the charge-generation region and the electron-injection buffer layer. In the case where the charge-generation layer does not include an electron-injection buffer layer, the electron-relay layer is preferably provided between the charge-generation region and the electron-transport layer. The electron-relay layer has a function of preventing interaction between the charge-generation region and the electron-injection buffer layer (or the electron-transport layer) and smoothly transferring electrons.

A phthalocyanine-based material such as copper(II) phthalocyanine (abbreviation: CuPc) or a metal complex having a metal-oxygen bond and an aromatic ligand is preferably used for the electron-relay layer.

Note that the charge-generation region, the electron-injection buffer layer, and the electron-relay layer cannot be clearly distinguished from each other in some cases depending on the cross-sectional shapes, the characteristics, or the like.

Note that the charge-generation layer may contain a donor material instead of an acceptor material. For example, the charge-generation layer may include a layer containing an electron-transport material and a donor material, which can be used for the electron-injection layer.

When the light-emitting units are stacked, provision of a charge-generation layer between two light-emitting units can suppress an increase in driving voltage.

A plurality of structure examples described in this embodiment can be combined as appropriate. This embodiment can be combined with any of the other embodiments as appropriate.

Embodiment 5

In this embodiment, a memory device of one embodiment of the present invention is described.

[Memory Cell]

Figure 69A:
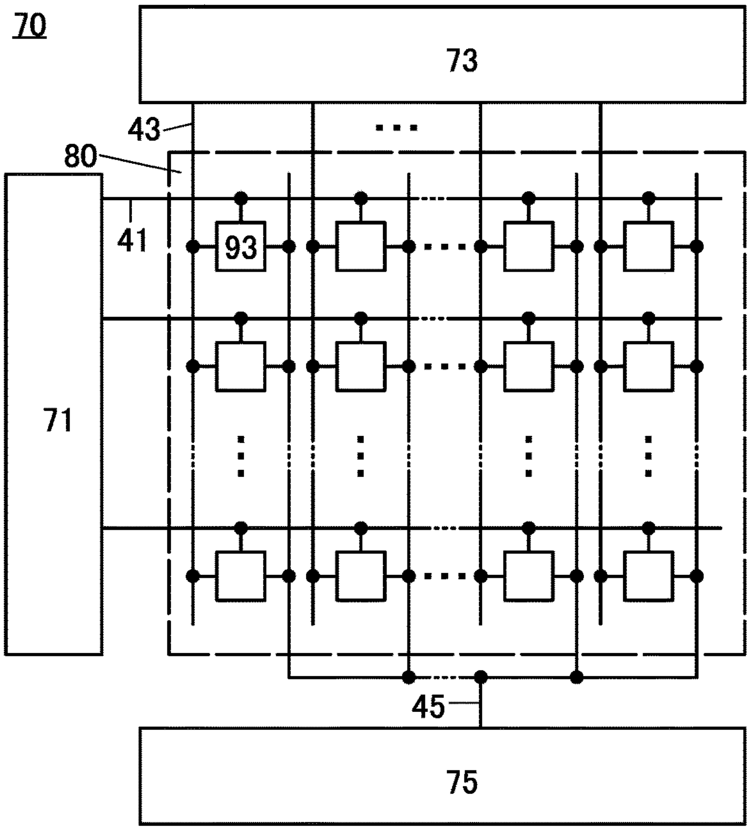
FIG. 69A illustrates an example of a memory device and FIGS. 69B to 69F are circuit diagrams illustrating configuration examples of memory cells.
Figure 69B:
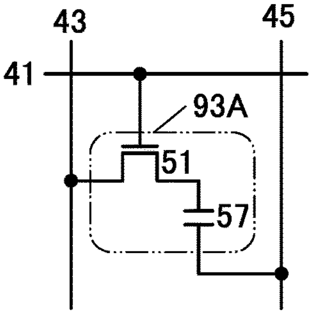
Figure 69C:
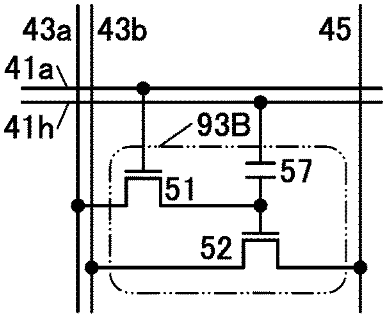
Figure 69D:
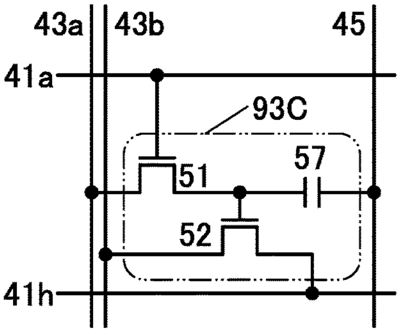
Figure 69E:
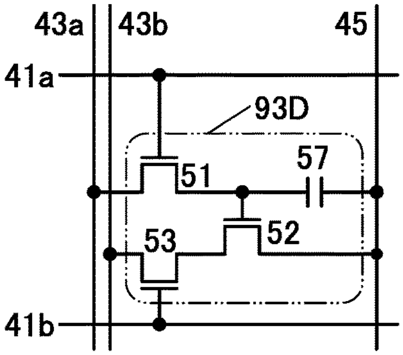
Figure 69F:
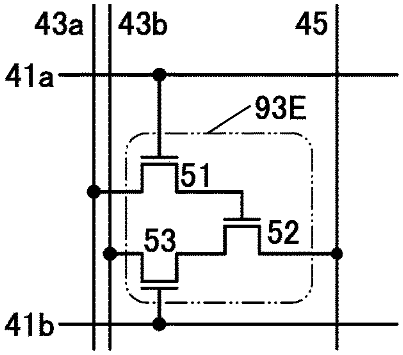

One embodiment of the present invention is applicable to not only a display device but also a memory device. FIG. 69A is a block diagram illustrating a configuration example of a memory device 70 to which one embodiment of the present invention is applicable. The memory device 70 includes a memory portion 80, a word line driver circuit 71, a bit line driver circuit 73, and a power supply circuit 75. The memory portion 80 includes a plurality of memory cells 93 arranged in a matrix. Note that the power supply circuit 75 may be provided outside the memory device 70.

The word line driver circuit 71 is electrically connected to the memory cells 93 through the wirings 41. As in the display device 10 illustrated in FIG. 1A or the like, the wiring 41 extends in the row direction of the matrix, for example. In the memory device 70, the wiring 41 functions as a word line.

The bit line driver circuit 73 is electrically connected to the memory cells 93 through the wirings 43. As in the display device 10 illustrated in FIG. 1A or the like, the wiring 43 extends in the column direction of the matrix, for example. In the memory device 70, the wiring 43 functions as a bit line.

The power supply circuit 75 is electrically connected to the memory cells 93 through the wiring 45. For example, all the memory cells 93 can be electrically connected to the power supply circuit 75 through the same wiring 45. The wiring 45 functions as a power supply line.

The word line driver circuit 71 has a function of selecting, row by row, the memory cell 93 to which data is to be written. The word line driver circuit 71 has a function of selecting, row by row, the memory cell 93 from which data is to be read. Specifically, by outputting a signal to the wiring 41, the word line driver circuit 71 can select the memory cell 93 to which data is to be written or the memory cell 93 from which data is to be read.

The bit line driver circuit 73 has a function of writing data through the wiring 43 to the memory cell 93 selected by the word line driver circuit 71. The bit line driver circuit 73 has a function of reading data retained in the memory cell 93 by amplifying data output from the memory cell 93 to the wiring 43 and outputting the amplified data to, for example, the outside of the memory device 70. Furthermore, the bit line driver circuit 73 has a function of precharging the wiring 43 before data is read from the memory cell 93.

The power supply circuit 75 has a function of generating a power supply potential and supplying it to the wiring 45. The power supply circuit 75 has a function of generating, for example, a high potential or a low potential and supplying it to the wiring 45.

FIG. 69B, FIG. 69C, FIG. 69D, FIG. 69E, and FIG. 69F are circuit diagrams illustrating configuration examples of the memory cell 93. Here, the memory cells 93 illustrated in FIG. 69B, FIG. 69C, FIG. 69D, FIG. 69E, and FIG. 69F are respectively referred to as a memory cell 93A, a memory cell 93B, a memory cell 93C, a memory cell 93D, and a memory cell 93E. To the transistor 51, the transistor 52, the capacitor 57, the wiring 41 (the wiring 41*a*), and the wiring 43 (a wiring 43*a*) included in each of the memory cells 93A, 93B, 93C, 93D, and 93E, for example, the structures of the transistor 51, the transistor 52, the capacitor 57, the wiring 41, and the wiring 43 included in the pixel circuit 40A illustrated in FIG. 1C can be respectively applied.

The memory cell 93A includes the transistor 51 and the capacitor 57. That is, the memory cell 93A is a 1Tr1C-type memory cell.

In the memory cell 93A, one of the source and the drain of the transistor 51 is electrically connected to the wiring 43. The other of the source and the drain of the transistor 51 is electrically connected to one electrode of the capacitor 57. The gate of the transistor 51 is electrically connected to the wiring 41. The other electrode of the capacitor 57 is electrically connected to the wiring 45.

In the memory cell 93A, when the transistor 51 is turned on, data is written to the memory cell 93A through the wiring 43, and when the transistor 51 is turned off, the written data is retained. When the transistor 51 is turned on, the data retained in the memory cell 93A can be output to the wiring 43, so that the bit line driver circuit 73 can read the data.

The memory cell 93B includes the transistors 51 and 52 and the capacitor 57. That is, the memory cell 93B is a 2Tr1C-type memory cell.

To the memory cell 93B, the wiring 41*a* and a wiring 41*h* are electrically connected as the wiring 41 and the wiring 43*a* and a wiring 43*b* are electrically connected as the wiring 43. Specifically, one of the source and the drain of the transistor 51 is electrically connected to the wiring 43*a*. The other of the source and the drain of the transistor 51 is electrically connected to one electrode of the capacitor 57. The one electrode of the capacitor 57 is electrically connected to the gate of the transistor 52. The gate of the transistor 51 is electrically connected to the wiring 41*a*. The other electrode of the capacitor 57 is electrically connected to the wiring 41*h*. One of the source and the drain of the transistor 52 is electrically connected to the wiring 43*b*. The other of the source and the drain of the transistor 52 is electrically connected to the wiring 45.

In the memory cell 93B, when the transistor 51 is turned on, data is written to the memory cell 93B through the wiring 43*a*, and when the transistor 51 is turned off, the written data is retained. Thus, in the memory cell 93B, the wiring 41*a* and the wiring 43*a* can be referred to as a write word line and a write bit line, respectively. By controlling the potential of the wiring 41*h*, the gate potential of the transistor 52 can be changed by capacitive coupling and the potential of the wiring 43*b* can be a potential corresponding to data retained in the memory cell 93B. Thus, the bit line driver circuit 73 can read the data retained in the memory cell 93B. Accordingly, in the memory cell 93B, the wiring 41*h* and the wiring 43*b* can be referred to as a read word line and a read bit line, respectively.

The memory cell 93C is a modification example of the memory cell 93B, in which the other of the source and the drain of the transistor 52 is electrically connected to the wiring 41*h* and the other electrode of the capacitor 57 is electrically connected to the wiring 45. In the memory cell 93C, the word line driver circuit 71 controls the potential of the other of the source or the drain of the transistor 52, whereby data retained in the memory cell 93C can be output to the wiring 43*b*.

The memory cell 93D is a modification example of the memory cell 93C and is different from the memory cell 93C in including the transistor 53. The memory cell 93D is a 3Tr1C-type memory cell.

To the memory cell 93D, the wirings 41*a* and 41*b* are electrically connected as the wiring 41. Specifically, the gate of the transistor 53 is electrically connected to the wiring 41*b*. One of the source and the drain of the transistor 52 is electrically connected to one of the source and the drain of the transistor 53. The other of the source and the drain of the transistor 52 is electrically connected to the wiring 45. The other of the source and the drain of the transistor 53 is electrically connected to the wiring 43*b*.

The transistor 53 has a function of a switch and has a function of controlling the conduction state or the non-conduction state between the wiring 43*b* and the one of the source and the drain of the transistor 52 on the basis of the potential of the wiring 41*b*. When the transistor 53 is turned on, the potential of the wiring 43*b* can be a potential corresponding to data retained in the memory cell 93D. Thus, the bit line driver circuit 73 can read the data retained in the memory cell 93D. Accordingly, in the memory cell 93D, the wiring 41*b* can be referred to as a read word line.

The memory cell 93E is a modification example of the memory cell 93D and is different from the memory cell 93D in not including the capacitor 57. In the memory cell 93E, the wiring 45 is electrically connected to the other of the source and the drain of the transistor 52.

In the case where parasitic capacitance such as the gate capacitance of the transistor 52 is sufficiently high, for example, data can be retained in the memory cell even without the capacitor 57.

An OS transistor is preferably used as the transistor 51 included in each of the memory cells 93A to 93E. As described above, an OS transistor has an extremely low off-state current. Thus, by using an OS transistor as the transistor 51, charge accumulated in the capacitor 57 can be retained for a long period. In addition, the gate potential of the transistor 52 can be retained for a long period. Accordingly, data written to the memory cell 93 can be retained for a long period and therefore the frequency of the refresh operation (rewriting data to the memory cell 93) can be reduced. Thus, power consumption of the memory device 70 can be reduced.

Moreover, an OS transistor is preferably used as each of the transistors 52 and 53. As described above, an OS transistor has much higher field-effect mobility than a transistor containing amorphous silicon, for example. Consequently, by using an OS transistor as each of the transistors 51 to 53, the memory device 70 can be driven at high speed.

The memory cell 93A can be referred to as a DOSRAM (registered trademark). Note that "DOSRAM" is an abbreviation for a dynamic oxide semiconductor random access memory (RAM). The DOSRAM is a RAM including a 1Tr1C-type memory cell. The DOSRAM is a dynamic random access memory (DRAM) formed using an OS transistor, which temporarily stores data sent from the outside. The DOSRAM is a memory utilizing low off-state currents of OS transistors.

The memory cells 93B to 93E can each be referred to as a NOSRAM (registered trademark). Note that "NOSRAM" is an abbreviation for a nonvolatile oxide semiconductor random access memory. A NOSRAM is capable of reading retained data without destruction (non-destructive reading). Thus, the NOSRAM is suitable for product-sum operation in which only data reading operation is repeated many times.

Embodiment 6

In this embodiment, electronic devices of embodiments of the present invention will be described with reference to FIGS. 66A to 66D, FIGS. 67A to 67F, and FIGS. 68A to 68G.

Electronic devices of this embodiment are each provided with the display device of one embodiment of the present invention in a display portion. Examples of the electronic devices include a digital camera, a digital video camera, a digital photo frame, a mobile phone, a portable game console, a portable information terminal, and an audio reproducing device, in addition to electronic devices with a relatively large screen, such as a television device, desktop and laptop personal computers, a monitor of a computer and the like, digital signage, and a large game machine such as a pachinko machine.

In particular, the display device of one embodiment of the present invention can have a high definition, and thus can be favorably used for an electronic device having a relatively small display portion. Examples of such an electronic device include watch-type and bracelet-type information terminal devices (wearable devices) and wearable devices worn on the head, such as a VR device like a head-mounted display, a glasses-type AR device, and an MR device.

The resolution of the display device of one embodiment of the present invention is preferably as high as HD (number of pixels: 1280×720), FHD (number of pixels: 1920×1080), WQHD (number of pixels: 2560×1440), WQXGA (number of pixels: 2560×1600), 4K (number of pixels: 3840×2160), or 8K (number of pixels: 7680×4320). In particular, a resolution of 4K, 8K, or higher is preferable. The pixel density (definition) of the display device of one embodiment of the present invention is preferably 100 ppi or higher, further preferably 300 ppi or higher, further preferably 500 ppi or higher, further preferably 1000 ppi or higher, further preferably 2000 ppi or higher, further preferably 3000 ppi or higher, further preferably 5000 ppi or higher, yet further preferably 7000 ppi or higher. With such a display device having one or both of high resolution and high definition, the electronic device can provide higher realistic sensation, sense of depth, and the like in portable use, home use, or the like. There is no particular limitation on the screen ratio (aspect ratio) of the display device of one embodiment of the present invention. For example, the display device is compatible with a variety of screen ratios such as 1:1 (a square), 4:3, 16:9, and 16:10.

The electronic device in this embodiment may include a sensor (a sensor having a function of sensing, detecting, or measuring force, displacement, position, speed, acceleration, angular velocity, rotational frequency, distance, light, liquid, magnetism, temperature, a chemical substance, sound, time, hardness, electric field, current, voltage, electric power, radiation, flow rate, humidity, gradient, oscillation, a smell, or infrared rays).

The electronic devices of this embodiment have a variety of functions. For example, the electronic devices can have a function of displaying a variety of information (a still image, a moving image, a text image, and the like) on the display portion, a touch panel function, a function of displaying a calendar, date, time, and the like, a function of controlling processing with the use of a variety of software (programs), a wireless communication function, and a function of reading out and processing a program or data stored in a recording medium. Note that the functions of the electronic devices are not limited thereto, and the electronic devices can have a variety of functions. The electronic devices may include a plurality of display portions. The electronic devices may be provided with a camera or the like and have a function of capturing a still image or a moving image, a function of storing the captured image in a storage medium (an external storage medium or a storage medium incorporated in the camera), a function of displaying the captured image on the display portion, and the like.

Examples of head-mounted wearable devices will be described with reference to FIGS. 66A to 66D. The wearable devices have at least one of a function of displaying AR contents, a function of displaying VR contents, a function of displaying SR contents, and a function of displaying MR contents. The electronic device having a function of displaying contents of at least one of AR, VR, SR, MR, and the like enables the user to feel a higher level of immersion.

Figure 66A:
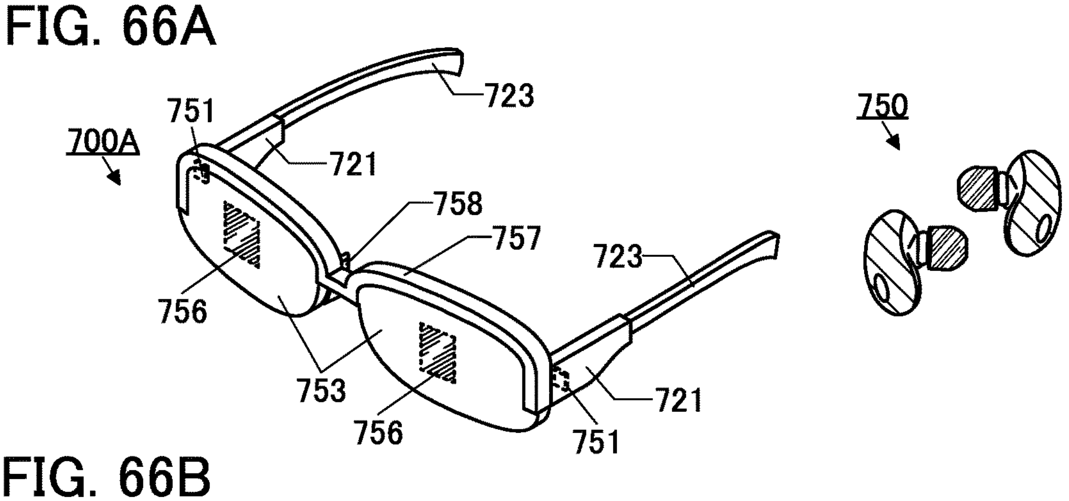
FIGS. 66A to 66D illustrate examples of electronic devices.
Figure 66B:
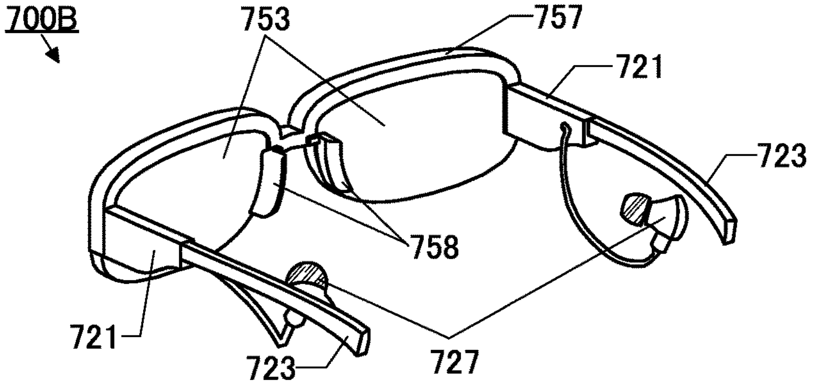

An electronic device 700A illustrated in FIG. 66A and an electronic device 700B illustrated in FIG. 66B each include a pair of display panels 751, a pair of housings 721, a communication portion (not illustrated), a pair of wearing portions 723, a control portion (not illustrated), an image capturing portion (not illustrated), a pair of optical members 753, a frame 757, and a pair of nose pads 758.

The display device of one embodiment of the present invention can be used for the display panels 751. Thus, the electronic devices are capable of performing ultrahigh-definition display.

The electronic devices 700A and 700B can each project images displayed on the display panels 751 onto display regions 756 of the optical members 753. Since the optical members 753 have a light-transmitting property, the user can see images displayed on the display regions, which are superimposed on transmission images seen through the optical members 753. Accordingly, the electronic devices 700A and 700B are electronic devices capable of AR display.

In the electronic devices 700A and 700B, a camera capable of capturing images of the front side may be provided as the image capturing portion. Furthermore, when the electronic devices 700A and 700B are provided with an acceleration sensor such as a gyroscope sensor, the orientation of the user's head can be sensed and an image corresponding to the orientation can be displayed on the display regions 756.

The communication portion includes a wireless communication device, and a video signal and the like can be supplied by the wireless communication device. Instead of or in addition to the wireless communication device, a connector that can be connected to a cable for supplying a video signal and a power supply potential may be provided.

The electronic devices 700A and 700B are provided with a battery so that they can be charged wirelessly and/or by wire.

A touch sensor module may be provided in the housing 721. The touch sensor module has a function of detecting a touch on the outer surface of the housing 721. Detecting a tap operation, a slide operation, or the like by the user with the touch sensor module enables various types of processing. For example, a video can be paused or restarted by a tap operation, and can be fast-forwarded or fast-reversed by a slide operation. When the touch sensor module is provided in each of the two housings 721, the range of the operation can be increased.

Various touch sensors can be applied to the touch sensor module. For example, any of touch sensors of the following types can be used: a capacitive type, a resistive type, an infrared type, an electromagnetic induction type, a surface acoustic wave type, and an optical type. In particular, a capacitive sensor or an optical sensor is preferably used for the touch sensor module.

In the case of using an optical touch sensor, a photoelectric conversion element (also referred to as a photoelectric conversion device) can be used as a light-receiving element. One or both of an inorganic semiconductor and an organic semiconductor can be used for an active layer of the photoelectric conversion element.

Figure 66C:
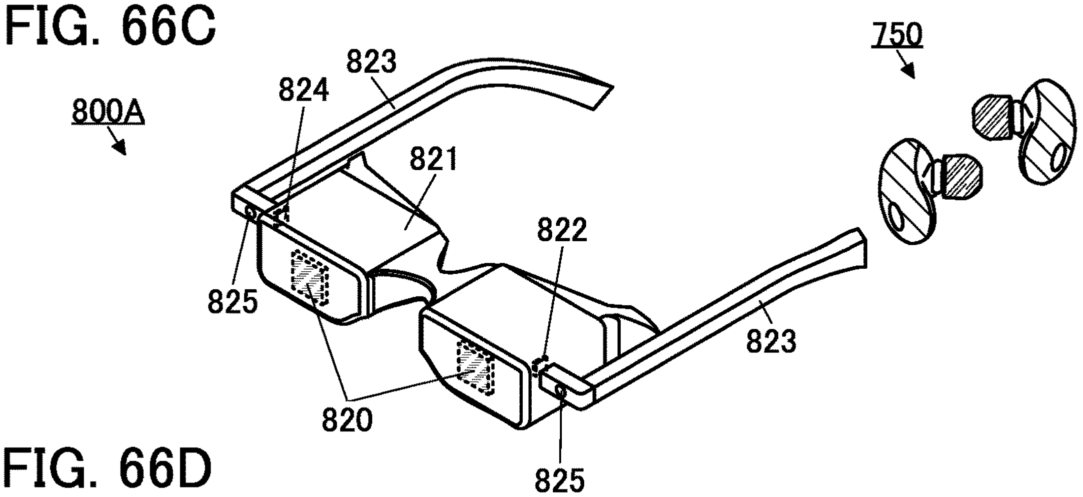
Figure 66D:
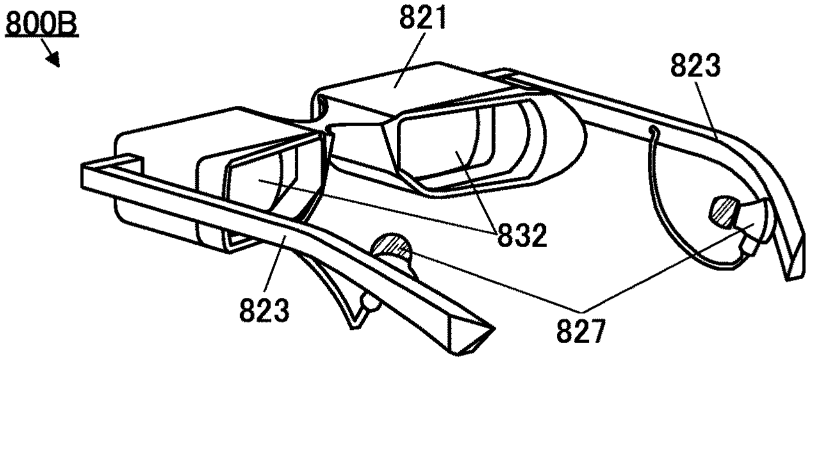

An electronic device 800A illustrated in FIG. 66C and an electronic device 800B illustrated in FIG. 66D each include a pair of display portions 820, a housing 821, a communication portion 822, a pair of wearing portions 823, a control portion 824, a pair of image capturing portions 825, and a pair of lenses 832.

The display device of one embodiment of the present invention can be used in the display portions 820. Thus, the electronic devices are capable of performing ultrahigh-definition display. Such electronic devices provide a high sense of immersion to the user.

The display portions 820 are positioned inside the housing 821 so as to be seen through the lenses 832. When the pair of display portions 820 display different images, three-dimensional display using parallax can be performed.

The electronic devices 800A and 800B can be regarded as electronic devices for VR. The user who wears the electronic device 800A or the electronic device 800B can see images displayed on the display portions 820 through the lenses 832.

The electronic devices 800A and 800B preferably include a mechanism for adjusting the lateral positions of the lenses 832 and the display portions 820 so that the lenses 832 and the display portions 820 are positioned optimally in accordance with the positions of the user's eyes. Moreover, the electronic devices 800A and 800B preferably include a mechanism for adjusting focus by changing the distance between the lenses 832 and the display portions 820.

The electronic device 800A or the electronic device 800B can be mounted on the user's head with the wearing portions 823. FIG. 66C and the like show examples where the wearing portion 823 has a shape like a temple of glasses; however, one embodiment of the present invention is not limited thereto. The wearing portion 823 can have any shape with which the user can wear the electronic device, for example, a shape of a helmet or a band.

The image capturing portion 825 has a function of obtaining information on the external environment. Data obtained by the image capturing portion 825 can be output to the display portion 820. An image sensor can be used for the image capturing portion 825. Moreover, a plurality of cameras may be provided so as to support a plurality of fields of view, such as a telescope field of view and a wide field of view.

Although an example in which the image capturing portions 825 are provided is shown here, a range sensor (hereinafter, also referred to as a sensing portion) capable of measuring a distance between the user and an object just is provided. In other words, the image capturing portion 825 is one embodiment of the sensing portion. As the sensing portion, an image sensor or a range image sensor such as a light detection and ranging (LiDAR) sensor can be used, for example. By using images obtained by the camera and images obtained by the range image sensor, more information can be obtained and a gesture operation with higher accuracy is possible.

The electronic device 800A may include a vibration mechanism to function as bone-conduction earphones. For example, at least one of the display portion 820, the housing 821, and the wearing portion 823 can include the vibration mechanism. Thus, without additionally requiring an audio device such as headphones, earphones, or a speaker, the user can enjoy video and sound only by wearing the electronic device 800A.

The electronic devices 800A and 800B may each include an input terminal. To the input terminal, a cable for supplying a video signal from a video output device or the like, power for charging the battery provided in the electronic device, and the like can be connected.

The electronic device of one embodiment of the present invention may have a function of performing wireless communication with earphones 750. The earphones 750 include a communication portion (not illustrated) and have a wireless communication function. The earphones 750 can receive information (e.g., audio data) from the electronic device with the wireless communication function. For example, the electronic device 700A in FIG. 66A has a function of transmitting information to the earphones 750 with the wireless communication function. As another example, the electronic device 800A in FIG. 66C has a function of transmitting information to the earphones 750 with the wireless communication function.

The electronic device may include an earphone portion. The electronic device 700B in FIG. 66B includes earphone portions 727. For example, the earphone portion 727 can be connected to the control portion by wire. Part of a wiring that connects the earphone portion 727 and the control portion may be positioned inside the housing 721 or the wearing portion 723.

Similarly, the electronic device 800B in FIG. 66D includes earphone portions 827. For example, the earphone portion 827 can be connected to the control portion 824 by wire. Part of a wiring that connects the earphone portion 827 and the control portion 824 may be positioned inside the housing 821 or the wearing portion 823. Alternatively, the earphone portions 827 and the wearing portions 823 may include magnets. This is preferable because the earphone portions 827 can be fixed to the wearing portions 823 with magnetic force and thus can be easily housed.

The electronic device may include an audio output terminal to which earphones, headphones, or the like can be connected. The electronic device may include one or both of an audio input terminal and an audio input mechanism. As the audio input mechanism, a sound collecting device such as a microphone can be used, for example. The electronic device may have a function of a headset by including the audio input mechanism.

As described above, both the glasses-type device (e.g., the electronic devices 700A and 700B) and the goggles-type device (e.g., the electronic devices 800A and 800B) are preferable as the electronic device of one embodiment of the present invention.

The electronic device of one embodiment of the present invention can transmit information to earphones by wire or wirelessly.

Figure 67A:
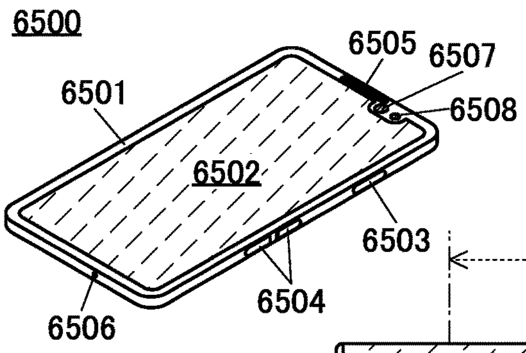
FIGS. 67A to 67F illustrate examples of electronic devices.

An electronic device 6500 illustrated in FIG. 67A is a portable information terminal that can be used as a smartphone.

The electronic device 6500 includes a housing 6501, a display portion 6502, a power button 6503, buttons 6504, a speaker 6505, a microphone 6506, a camera 6507, a light source 6508, and the like. The display portion 6502 has a touch panel function.

The display device of one embodiment of the present invention can be used in the display portion 6502.

Figure 67B:
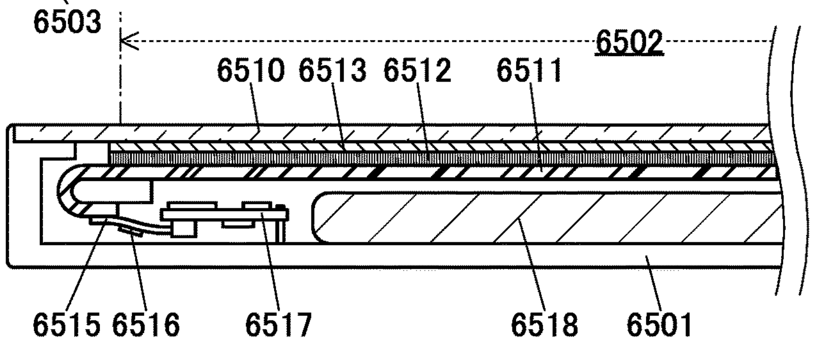

FIG. 67B is a schematic cross-sectional view including an end portion of the housing 6501 on the microphone 6506 side.

A protection member 6510 having a light-transmitting property is provided on the display surface side of the housing 6501. A display panel 6511, an optical member 6512, a touch sensor panel 6513, a printed circuit board 6517, a battery 6518, and the like are provided in a space surrounded by the housing 6501 and the protection member 6510.

The display panel 6511, the optical member 6512, and the touch sensor panel 6513 are fixed to the protection member 6510 with an adhesive layer (not illustrated).

Part of the display panel 6511 is folded back in a region outside the display portion 6502, and an FPC 6515 is connected to the part that is folded back. An IC 6516 is mounted on the FPC 6515. The FPC 6515 is connected to a terminal provided on the printed circuit board 6517.

A flexible display of one embodiment of the present invention can be used for the display panel 6511. Thus, an extremely lightweight electronic device can be achieved. Since the display panel 6511 is extremely thin, the battery 6518 with high capacity can be mounted without an increase in the thickness of the electronic device. Moreover, part of the display panel 6511 is folded back so that a connection portion with the FPC 6515 is provided on the back side of a pixel portion, whereby an electronic device with a narrow bezel can be achieved.

Figure 67C:
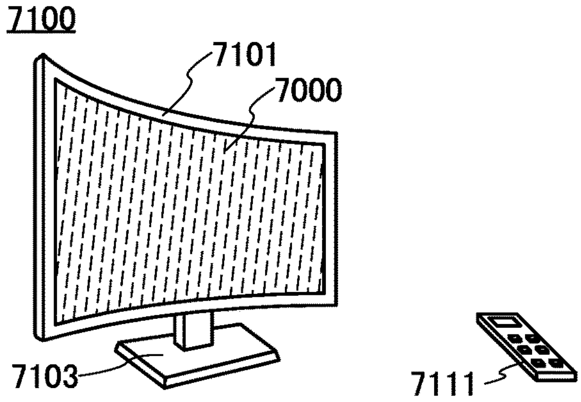

FIG. 67C illustrates an example of a television device. In a television device 7100, a display portion 7000 is incorporated in a housing 7101. Here, the housing 7101 is supported by a stand 7103.

The display device of one embodiment of the present invention can be used in the display portion 7000.

Operation of the television device 7100 illustrated in FIG. 67C can be performed with an operation switch provided in the housing 7101 and a separate remote controller 7111. Alternatively, the display portion 7000 may include a touch sensor, and the television device 7100 may be operated by touch on the display portion 7000 with a finger or the like. The remote controller 7111 may be provided with a display portion for displaying information output from the remote controller 7111. With operation keys or a touch panel provided in the remote controller 7111, channels and volume can be controlled and videos displayed on the display portion 7000 can be controlled.

Note that the television device 7100 includes a receiver, a modem, and the like. A general television broadcast can be received with the receiver. When the television device is connected to a communication network by wire or wirelessly via the modem, one-way (from a transmitter to a receiver) or two-way (between a transmitter and a receiver or between receivers, for example) data communication can be performed.

Figure 67D:
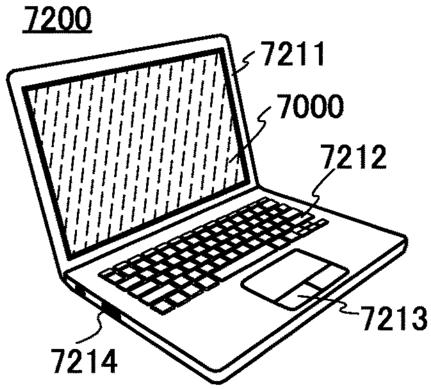

FIG. 67D illustrates an example of a laptop personal computer. The laptop personal computer 7200 includes a housing 7211, a keyboard 7212, a pointing device 7213, an external connection port 7214, and the like. The display portion 7000 is incorporated in the housing 7211.

The display device of one embodiment of the present invention can be used in the display portion 7000.

Figure 67E:
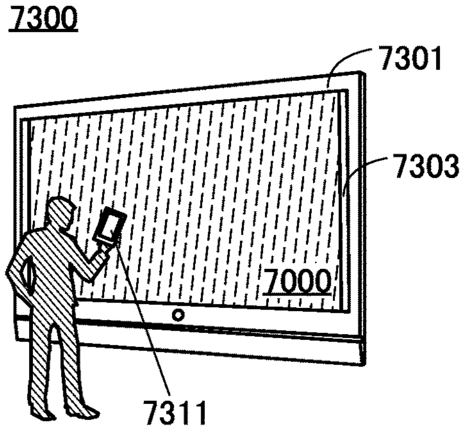
Figure 67F:
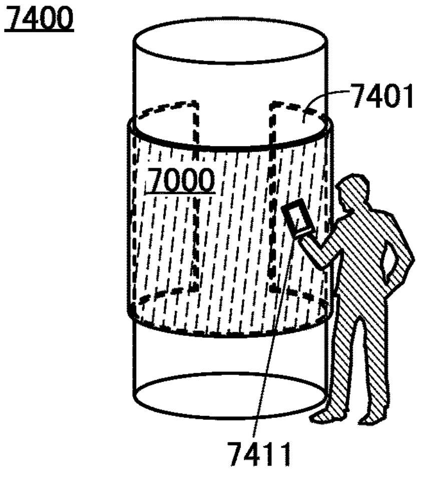

FIGS. 67E and 67F illustrate examples of digital signage.

Digital signage 7300 illustrated in FIG. 67E includes a housing 7301, the display portion 7000, a speaker 7303, and the like. The digital signage 7300 can also include an LED lamp, an operation key (including a power switch or an operation switch), a connection terminal, a variety of sensors, a microphone, and the like.

FIG. 67F illustrates digital signage 7400 attached to a cylindrical pillar 7401. The digital signage 7400 includes the display portion 7000 provided along a curved surface of the pillar 7401.

The display device of one embodiment of the present invention can be used in the display portion 7000 illustrated in each of FIGS. 67E and 67F.

A larger area of the display portion 7000 can increase the amount of information that can be provided at a time. The larger display portion 7000 attracts more attention, so that the effectiveness of the advertisement can be increased, for example.

The use of a touch panel in the display portion 7000 is preferable because in addition to display of a still image or a moving image on the display portion 7000, intuitive operation by a user is possible. Moreover, for an application for providing information such as route information or traffic information, usability can be enhanced by intuitive operation.

As illustrated in FIGS. 67E and 67F, it is preferable that the digital signage 7300 or the digital signage 7400 can work with an information terminal 7311 or an information terminal 7411, such as a smartphone that a user has, through wireless communication. For example, information of an advertisement displayed on the display portion 7000 can be displayed on a screen of the information terminal 7311 or the information terminal 7411. By operation of the information terminal 7311 or the information terminal 7411, display on the display portion 7000 can be switched.

It is possible to make the digital signage 7300 or the digital signage 7400 execute a game with use of the screen of the information terminal 7311 or the information terminal 7411 as an operation means (controller). Thus, an unspecified number of users can join in and enjoy the game concurrently.

Electronic devices illustrated in FIGS. 68A to 68G include a housing 9000, a display portion 9001, a speaker 9003, an operation key 9005 (including a power switch or an operation switch), a connection terminal 9006, a sensor 9007 (a sensor having a function of sensing, detecting, or measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, a smell, or infrared rays), a microphone 9008, and the like. The display device of one embodiment of the present invention can be used in the display portion 9001.

The electronic devices in FIGS. 68A to 68G will be described in detail below.

Figure 68A:
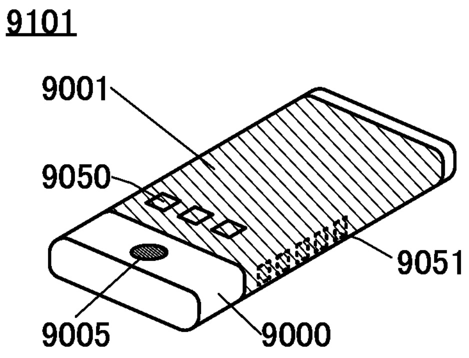
FIGS. 68A to 68G illustrate examples of electronic devices.

FIG. 68A is a perspective view of a portable information terminal 9101. The portable information terminal 9101 can be used as a smartphone, for example. The portable information terminal 9101 may include the speaker 9003, the connection terminal 9006, the sensor 9007, or the like. The portable information terminal 9101 can display text and image information on its plurality of surfaces. FIG. 68A illustrates an example in which three icons 9050 are displayed. Furthermore, information 9051 indicated by dashed rectangles can be displayed on another surface of the display portion 9001. Examples of the information 9051 include notification of reception of an e-mail, an SNS message, or an incoming call, the title and sender of an e-mail, an SNS message, or the like, the date, the time, remaining battery, and the radio field intensity. Alternatively, the icon 9050 or the like may be displayed at the position where the information 9051 is displayed.

Figure 68B:
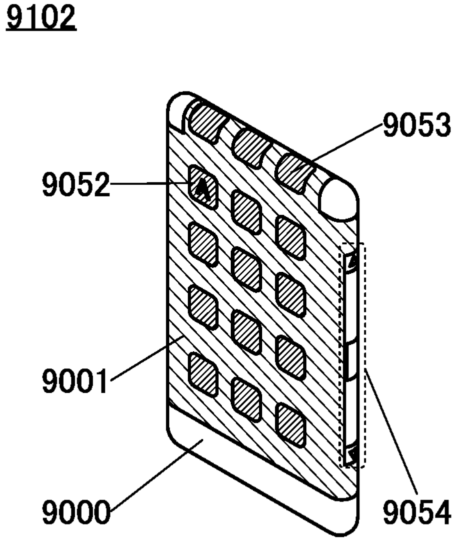

FIG. 68B is a perspective view of a portable information terminal 9102. The portable information terminal 9102 has a function of displaying information on three or more surface s of the display portion 9001. Here, information 9052, information 9053, and information 9054 are displayed on different surface s. For example, the user of the portable information terminal 9102 can check the information 9053 displayed such that it can be seen from above the portable information terminal 9102, with the portable information terminal 9102 put in a breast pocket of his/her clothes. Thus, the user can see the display without taking out the portable information terminal 9102 from the pocket and decide whether to answer the call, for example.

Figure 68C:
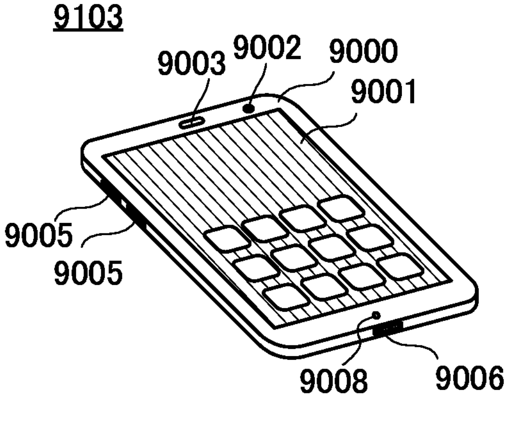

FIG. 68C is a perspective view of a tablet terminal 9103. The tablet terminal 9103 is capable of executing a variety of applications such as mobile phone calls, e-mailing, viewing and editing texts, music reproduction, Internet communication, and a computer game, for example. The tablet terminal 9103 includes the display portion 9001, the camera 9002, the microphone 9008, and the speaker 9003 on the front surface of the housing 9000; the operation keys 9005 as buttons for operation on the left side surface of the housing 9000; and the connection terminal 9006 on the bottom surface of the housing 9000.

Figure 68D:
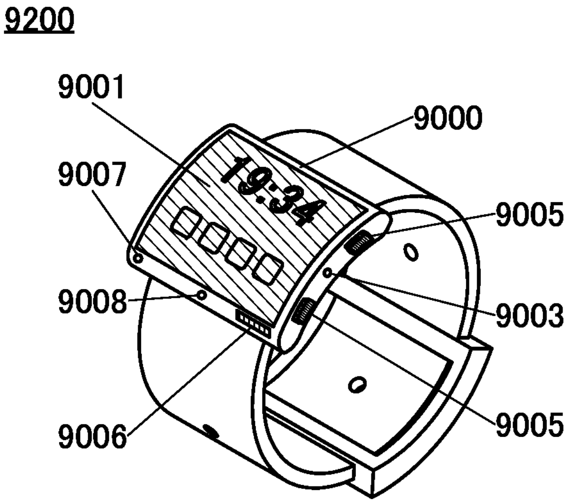

FIG. 68D is a perspective view of a watch-type portable information terminal 9200. The portable information terminal 9200 can be used as a Smartwatch (registered trademark), for example. The display surface of the display portion 9001 is curved, and an image can be displayed on the curved display surface. Furthermore, for example, mutual communication between the portable information terminal 9200 and a headset capable of wireless communication can be performed, and thus hands-free calling is possible. With the connection terminal 9006, the portable information terminal 9200 can perform mutual data transmission with another information terminal and charging. Note that the charging operation may be performed by wireless power feeding.

Figure 68E:
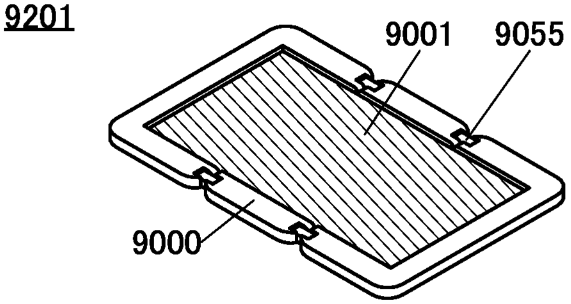
Figure 68F:
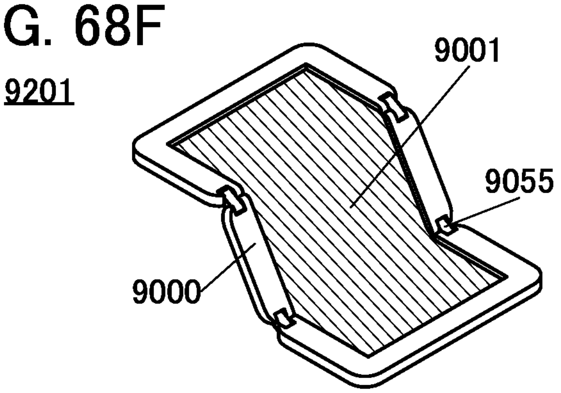
Figure 68G:
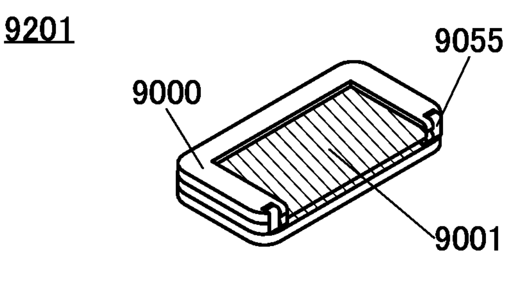

FIGS. 68E to 68G are perspective views of a foldable portable information terminal 9201. FIG. 68E is a perspective view illustrating the portable information terminal 9201 that is opened. FIG. 68G is a perspective view illustrating the portable information terminal 9201 that is folded. FIG. 68F is a perspective view illustrating the portable information terminal 9201 that is shifted from one of the states in FIGS. 68E and 68G to the other. The portable information terminal 9201 is highly portable when folded. When the portable information terminal 9201 is opened, a seamless large display region is highly browsable. The display portion 9001 of the portable information terminal 9201 is supported by three housings 9000 joined together by hinges 9055. The display portion 9001 can be folded with a radius of curvature greater than or equal to 0.1 mm and less than or equal to 150 mm, for example.

A plurality of structure examples described in this embodiment can be combined as appropriate. This embodiment can be combined with any of the other embodiments as appropriate.

This application is based on Japanese Patent Application Serial No. 2022-127671 filed with Japan Patent Office on Aug. 10, 2022, the entire contents of which are hereby incorporated by reference.

What is claimed is:

1. A display device comprising:

a plurality of pixels arranged in a matrix of a plurality of rows and a plurality of columns;

a first signal line;

a second signal line;

a scan line; and an insulating layer, wherein the first signal line comprises a first region overlapping with the second signal line with the insulating layer therebetween, wherein the plurality of pixels each comprise a first transistor and a second transistor, wherein the first signal line comprises a second region configured to be one of a source and a drain of the first transistor in each of pixels in one column comprising a first pixel, wherein in the first pixel, the first transistor comprises a first semiconductor layer, a first conductive layer, and a gate insulating layer over the first semiconductor layer, wherein the first conductive layer comprises a region configured to be the other of the source and the drain of the first transistor, wherein the first semiconductor layer comprises a first region in contact with a sidewall of a first opening in the insulating layer, a second region in contact with a top surface of the first signal line and overlapping with the first opening in a plan view, and a third region in contact with a top surface of the first conductive layer, wherein the scan line comprises a region overlapping with the first semiconductor layer with the gate insulating layer therebetween, wherein the region of the scan line is configured to be a gate of the first transistor, wherein the second signal line comprises a region configured to be one of a source and a drain of the second transistor in each of the pixels in one row comprising the first pixel, wherein the insulating layer is over the first signal line, and wherein the second signal line and the first conductive layer are over the insulating layer.

2. The display device according to claim 1, wherein the first conductive layer comprises a same material as the second signal line.

3. The display device according to claim 1, wherein the second transistor in the first pixel comprises a second conductive layer and a second semiconductor layer, wherein the second conductive layer comprises a region configured to be the other of the source and the drain of the second transistor, wherein the second semiconductor layer comprises a first region in contact with a sidewall of a second opening in the insulating layer, a second region in contact with a top surface of the second conductive layer and overlapping with the second opening in a plan view, and a third region in contact with a top surface of the second signal line, and wherein the insulating layer is over the second conductive layer.

4. The display device according to claim 3, wherein the first conductive layer comprises a same material as the second signal line, and wherein the second conductive layer comprises a same material as the first signal line.

5. The display device according to claim 1, wherein in each of the plurality of pixels, a gate of the second transistor is electrically connected to one of the source and the drain of the first transistor.

6. A display device comprising:

a plurality of pixels arranged in a matrix of a plurality of rows and a plurality of columns;

a first signal line;

a first wiring;

a first scan line; and an insulating layer, wherein the first signal line comprises a first region overlapping with the first wiring with the insulating layer therebetween, wherein the plurality of pixels each comprise a first transistor and a second transistor, wherein the first signal line comprises a second region configured to be one of a source and a drain of the first transistor in each of pixels in one column comprising a first pixel, wherein in the first pixel, the first transistor comprises a first semiconductor layer, a first conductive layer, and a gate insulating layer over the first semiconductor layer, wherein the first conductive layer comprises a region configured to be the other of the source and the drain of the first transistor, wherein the first semiconductor layer comprises a first region in contact with a sidewall of a first opening in the insulating layer, a second region in contact with a top surface of the first signal line and overlapping with the first opening in a plan view, and a third region in contact with a top surface of the first conductive layer, wherein the first scan line comprises a region overlapping with the first semiconductor layer with the gate insulating layer therebetween, wherein the region of the first scan line is configured to be a gate of the first transistor, wherein the first wiring comprises a region configured to be one of a source and a drain of the second transistor in each of the pixels in one row comprising the first pixel, wherein the insulating layer is over the first signal line, and wherein the first wiring and the first conductive layer are over the insulating layer.

7. The display device according to claim 6, wherein the first wiring is configured to be one of a power supply line, a current supply line, and a pulse signal line.

8. The display device according to claim 6, wherein the first conductive layer comprises a same material as the first wiring.

9. The display device according to claim 6, wherein the second transistor in the first pixel comprises a second conductive layer and a second semiconductor layer, wherein the second conductive layer comprises a region configured to be the other of the source and the drain of the second transistor, wherein the second semiconductor layer comprises a first region in contact with a sidewall of a second opening in the insulating layer, a second region in contact with a top surface of the second conductive layer and overlapping with the second opening in a plan view, and a third region in contact with a top surface of the first wiring, and wherein the insulating layer is over the second conductive layer.

10. The display device according to claim 9, wherein the first conductive layer comprises a same material as the first wiring, and wherein the second conductive layer comprises a same material as the first signal line.

11. The display device according to claim 6, wherein in each of the plurality of pixels, a gate of the second transistor is electrically connected to one of the source and the drain of the first transistor.

* * * * *